United States Patent
Weber et al.

(10) Patent No.: US 12,308,414 B2
(45) Date of Patent: May 20, 2025

(54) DEVICE ARCHITECTURES FOR METAL-AIR BATTERIES

(71) Applicant: FORM ENERGY INC., Somerville, MA (US)

(72) Inventors: Eric Weber, Pittsburgh, PA (US); Mitchell Terrance Westwood, Boston, MA (US); Rachel Elizabeth Mumma, Somerville, MA (US); Alexander H. Slocum, Bow, NH (US); Liang Su, Medfield, MA (US); Jarrod David Milshtein, Arlington, MA (US); William Henry Woodford, Cambridge, MA (US); Yet-Ming Chiang, Weston, MA (US); Mateo Cristian Jaramillo, San Francisco, CA (US); Ian Salmon Mckay, Seattle, WA (US); Fikile Brushett, Cambridge, MA (US); Helen Van Benschoten, Wakefield, MA (US); Tristan Gilbert, Evergreen, CO (US); Nicholas Reed Perkins, Cambridge, MA (US); Joseph Anthony Pantano, Canton, MA (US); Weston Smith, Boston, MA (US); Kristen Carlisle, Medford, CA (US); Isabella Caruso, Boston, MA (US); Benjamin Thomas Hultman, Somerville, MA (US); Annelise Christine Thompson, Medford, MA (US); Danielle Smith, Cambridge, MA (US); Vladimir Tarasov, Brookline, MA (US); Katherine Hartman, Cambridge, MA (US); Andrew Haynes Liotta, Cambridge, MA (US); Onur Talu, Needham, MA (US); Marc-Antoni Goulet, Somerville, MA (US); Rupak Chakraborty, Brookline, MA (US); Florian Wehner, Brookline, MA (US); Bradley Mileson, South Portland, ME (US); Alexandra Rousseau, Aylesford (CA)

(73) Assignee: FORM ENERGY, INC., Somerville, MA (US)

( * ) Notice: Subject to any disclaimer, the term of this patent is extended or adjusted under 35 U.S.C. 154(b) by 704 days.

(21) Appl. No.: 16/913,877

(22) Filed: Jun. 26, 2020

(65) Prior Publication Data
US 2020/0411932 A1     Dec. 31, 2020

Related U.S. Application Data

(60) Provisional application No. 63/021,301, filed on May 7, 2020, provisional application No. 62/868,479, filed on Jun. 28, 2019.

(51) Int. Cl.
*H01M 12/02*     (2006.01)
*H01M 12/08*     (2006.01)

(52) U.S. Cl.
CPC .......... *H01M 12/02* (2013.01); *H01M 12/08* (2013.01); *H01M 2250/10* (2013.01)

(58) Field of Classification Search
CPC .............................. H01M 12/02; H01M 12/08
See application file for complete search history.

(56) References Cited

U.S. PATENT DOCUMENTS

| | | | |
|---|---|---|---|
| 2,083,364 A | 6/1937 | Cook, Jr. et al. | |
| 2,643,276 A | 6/1953 | Salauze | |

(Continued)

FOREIGN PATENT DOCUMENTS

| | | | |
|---|---|---|---|
| CN | 1233861 A | 11/1999 | |
| CN | 1535489 A | 10/2004 | |

(Continued)

OTHER PUBLICATIONS

ISR-WO—International Search Report and Written Opinion in PCT/US2023/072684, mailed Dec. 18, 2023, 10 pages.

(Continued)

Primary Examiner — Olatunji A Godo
(74) *Attorney, Agent, or Firm* — The Marbury Law Group, PLLC

(57) ABSTRACT

Systems and methods of the various embodiments may provide device architectures for batteries. In various embodiments, these may be primary or secondary batteries. In various embodiments these devices may be useful for energy storage. Various embodiments may provide a battery including an Oxygen Reduction Reaction (ORR) electrode, an Oxygen Evolution Reaction (OER) electrode, a metal electrode; and an electrolyte separating the ORR electrode and the OER electrode from the metal electrode.

18 Claims, 114 Drawing Sheets

(56) References Cited

U.S. PATENT DOCUMENTS

| | | |
|---|---|---|
| 2,683,182 A | 7/1954 | Salauze |
| 3,219,486 A | 11/1965 | Salcedo et al. |
| 3,223,611 A | 12/1965 | Kergan et al. |
| 3,329,530 A | 7/1967 | Yutaka et al. |
| 3,338,746 A | 8/1967 | Gunther et al. |
| 3,363,570 A | 1/1968 | Scott |
| 3,415,689 A | 12/1968 | Carson, Jr. et al. |
| 3,483,036 A | 12/1969 | Gregor et al. |
| 3,484,291 A | 12/1969 | MacKenzie et al. |
| 3,489,610 A | 1/1970 | Berger et al. |
| 3,525,643 A | 8/1970 | Spahrbier et al. |
| 3,532,548 A | 10/1970 | Stachurski et al. |
| 3,615,843 A | 10/1971 | Moran |
| 3,615,844 A | 10/1971 | Spengler |
| 3,650,837 A | 3/1972 | Palmer |
| 3,686,225 A | 8/1972 | Pedersen et al. |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley et al. |
| 3,785,868 A | 1/1974 | Devitt |
| 3,801,376 A | 4/1974 | Lindstrom |
| 3,822,149 A | 7/1974 | Hale et al. |
| 3,840,455 A | 10/1974 | Cooley et al. |
| 3,847,603 A | 11/1974 | Fukuda et al. |
| 3,850,696 A | 11/1974 | Summers et al. |
| 3,886,426 A | 5/1975 | Daggett |
| 3,888,877 A | 6/1975 | Lehn |
| 3,902,916 A | 9/1975 | Warszawski |
| 3,919,062 A | 11/1975 | Lundquist, Jr. et al. |
| 3,945,849 A | 3/1976 | Hoffman |
| 3,947,292 A | 3/1976 | Jackovitz et al. |
| 3,965,116 A | 6/1976 | Cram |
| 3,966,766 A | 6/1976 | Lehn |
| 3,972,727 A | 8/1976 | Cohn |
| 4,001,212 A | 1/1977 | Richman |
| 4,001,279 A | 1/1977 | Cram |
| 4,007,059 A | 2/1977 | Witherspoon et al. |
| 4,054,725 A | 10/1977 | Tuburaya |
| 4,076,600 A | 2/1978 | Huebner |
| 4,117,205 A | 9/1978 | Kitai |
| 4,119,772 A | 10/1978 | Peters et al. |
| 4,132,837 A | 1/1979 | Soffer |
| 4,139,679 A | 2/1979 | Appleby et al. |
| 4,168,349 A | 9/1979 | Buzzelli |
| 4,201,653 A | 5/1980 | O'Neill et al. |
| 4,246,324 A | 1/1981 | de Nora et al. |
| 4,250,236 A | 2/1981 | Haschka et al. |
| 4,265,789 A | 5/1981 | Christopherson et al. |
| 4,312,927 A | 1/1982 | Salmon |
| 4,317,863 A | 3/1982 | Struthers |
| 4,331,460 A | 5/1982 | Dillmann et al. |
| 4,336,043 A | 6/1982 | Aonuma et al. |
| 4,340,449 A | 7/1982 | Srinivasan et al. |
| 4,369,235 A | 1/1983 | Bursell |
| 4,375,427 A | 3/1983 | Miller et al. |
| 4,384,928 A | 5/1983 | Hall |
| 4,385,101 A | 5/1983 | Catanzarite |
| 4,385,967 A | 5/1983 | Brady et al. |
| 4,386,141 A | 5/1983 | Weidner et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,479,856 A | 10/1984 | Ando |
| 4,484,936 A | 11/1984 | Sakai |
| 4,485,154 A | 11/1984 | Remick et al. |
| 4,487,818 A | 12/1984 | Ovshinsky et al. |
| 4,521,497 A | 6/1985 | Tamminen |
| 4,535,039 A | 8/1985 | Naarmann et al. |
| 4,552,630 A | 11/1985 | Wheeler et al. |
| 4,581,064 A | 4/1986 | Morrison et al. |
| 4,585,710 A | 4/1986 | McEvoy |
| 4,605,626 A | 8/1986 | Beck |
| 4,670,363 A | 6/1987 | Whitney et al. |
| 4,684,585 A | 8/1987 | Tamminen |
| 4,693,946 A | 9/1987 | Niksa et al. |
| 4,732,823 A | 3/1988 | Ito et al. |
| 4,765,799 A | 8/1988 | Waldrop |
| 4,828,942 A | 5/1989 | Licht |
| 4,842,963 A | 6/1989 | Ross, Jr. |
| 4,869,979 A | 9/1989 | Ohtani et al. |
| 4,871,627 A | 10/1989 | Strong et al. |
| 4,894,355 A | 1/1990 | Takeuchi et al. |
| 4,952,289 A | 8/1990 | Ciccone et al. |
| 4,977,044 A | 12/1990 | Ludwig |
| 5,006,424 A | 4/1991 | Evans et al. |
| 5,009,755 A | 4/1991 | Shor |
| 5,011,747 A | 4/1991 | Strong et al. |
| 5,041,194 A | 8/1991 | Mori et al. |
| 5,093,213 A | 3/1992 | O'Callaghan |
| 5,104,497 A | 4/1992 | Tetzlaff et al. |
| 5,130,211 A | 7/1992 | Wilkinson et al. |
| 5,131,387 A | 7/1992 | French et al. |
| 5,145,752 A | 9/1992 | Goldstein et al. |
| 5,185,218 A | 2/1993 | Brokman et al. |
| 5,188,914 A | 2/1993 | Blomgren et al. |
| 5,190,833 A | 3/1993 | Goldstein et al. |
| 5,200,057 A | 4/1993 | Canaris |
| 5,242,763 A | 9/1993 | Konishi et al. |
| 5,242,765 A | 9/1993 | Naimer et al. |
| 5,284,176 A | 2/1994 | Campau |
| 5,318,861 A | 6/1994 | Harats et al. |
| 5,360,680 A | 11/1994 | Goldman et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,419,987 A | 5/1995 | Goldstein et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,445,724 A | 8/1995 | Burkhart et al. |
| 5,451,475 A | 9/1995 | Ohta et al. |
| 5,453,334 A | 9/1995 | Melichar |
| 5,458,988 A | 10/1995 | Putt |
| 5,506,067 A | 4/1996 | Tinker |
| 5,512,391 A | 4/1996 | Fleischer |
| 5,549,991 A | 8/1996 | Licht et al. |
| 5,567,540 A | 10/1996 | Stone et al. |
| 5,569,551 A | 10/1996 | Pedicini et al. |
| 5,569,560 A | 10/1996 | Olsen et al. |
| 5,595,949 A | 1/1997 | Goldstein et al. |
| 5,645,952 A | 7/1997 | Lampinen et al. |
| 5,650,240 A | 7/1997 | Rogers |
| 5,652,068 A | 7/1997 | Shuster et al. |
| 5,665,481 A | 9/1997 | Shuster et al. |
| 5,700,596 A | 12/1997 | Ikoma et al. |

(56) References Cited

U.S. PATENT DOCUMENTS

| | | |
|---|---|---|
| 5,707,757 A | 1/1998 | Lee |
| 5,712,061 A | 1/1998 | Spak et al. |
| 5,716,726 A | 2/1998 | Cheiky |
| 5,731,105 A | 3/1998 | Fleischer et al. |
| 5,733,667 A | 3/1998 | Nakasuji et al. |
| 5,788,943 A | 8/1998 | Aladjov |
| 5,789,585 A | 8/1998 | Lee et al. |
| 5,840,443 A | 11/1998 | Gregg et al. |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,990,352 A | 11/1999 | Nobori et al. |
| 5,998,967 A | 12/1999 | Umeki et al. |
| 6,014,013 A | 1/2000 | Suppanz et al. |
| 6,025,696 A | 2/2000 | Lenhart et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,120,941 A | 9/2000 | Lee et al. |
| 6,127,061 A | 10/2000 | Shun et al. |
| 6,153,328 A | 11/2000 | Colborn |
| 6,162,333 A | 12/2000 | Lemon et al. |
| 6,162,555 A | 12/2000 | Gutierrez et al. |
| 6,164,309 A | 12/2000 | Brecht |
| 6,165,638 A | 12/2000 | Spillman et al. |
| 6,194,098 B1 | 2/2001 | Ying et al. |
| 6,207,037 B1 | 3/2001 | Dartnell et al. |
| 6,210,832 B1 | 4/2001 | Visco et al. |
| 6,211,650 B1 | 4/2001 | Mumaw et al. |
| 6,228,535 B1 | 5/2001 | Fierro et al. |
| 6,249,940 B1 | 6/2001 | Asano et al. |
| 6,265,846 B1 | 7/2001 | Flechsig et al. |
| 6,268,085 B1 | 7/2001 | Manthiram et al. |
| 6,271,646 B1 | 8/2001 | Evers et al. |
| 6,277,508 B1 | 8/2001 | Reiser et al. |
| 6,300,015 B1 | 10/2001 | Nishiyama et al. |
| 6,312,846 B1 | 11/2001 | Marsh |
| 6,355,369 B1 | 3/2002 | Iarochenko et al. |
| 6,358,643 B1 | 3/2002 | Katz et al. |
| 6,368,741 B1 | 4/2002 | Hackel et al. |
| 6,371,995 B1 | 4/2002 | Yasunami |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,416,649 B1 | 7/2002 | Ray et al. |
| 6,436,576 B1 | 8/2002 | Hossain |
| 6,458,480 B1 | 10/2002 | Morris et al. |
| 6,465,638 B2 | 10/2002 | Gorman et al. |
| 6,465,643 B1 | 10/2002 | Schiemenz et al. |
| 6,472,093 B2 | 10/2002 | Faris et al. |
| 6,475,658 B1 | 11/2002 | Pedicini et al. |
| 6,537,701 B1 | 3/2003 | Nimon et al. |
| 6,541,151 B2 | 4/2003 | Minamiura et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,562,494 B1 | 5/2003 | Tsai et al. |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,645,904 B2 | 11/2003 | Schiemenz et al. |
| 6,646,418 B1 | 11/2003 | Xie et al. |
| 6,649,294 B2 | 11/2003 | Faris et al. |
| 6,653,252 B2 | 11/2003 | Kawahara |
| 6,666,909 B1 | 12/2003 | TeGrotenhuis et al. |
| 6,673,490 B2 | 1/2004 | Miki et al. |
| 6,677,077 B2 | 1/2004 | Spillman et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,776,929 B2 | 8/2004 | Hossan et al. |
| 6,786,226 B2 | 9/2004 | Crook et al. |
| 6,787,260 B2 | 9/2004 | Smedley |
| 6,790,265 B2 | 9/2004 | Joshi et al. |
| 6,802,946 B2 | 10/2004 | Basol et al. |
| 6,811,819 B2 | 11/2004 | Joshi et al. |
| 6,811,903 B2 | 11/2004 | Vartak et al. |
| 6,822,423 B2 | 11/2004 | Yau et al. |
| 6,838,203 B2 | 1/2005 | Zheng |
| 6,849,172 B2 | 2/2005 | Rigby et al. |
| 6,849,356 B2 | 2/2005 | Dow et al. |
| 6,855,455 B1 | 2/2005 | Berger et al. |
| 6,858,347 B2 | 2/2005 | Tanigawa et al. |
| 6,866,950 B2 | 3/2005 | Connor et al. |
| 6,899,974 B2 | 5/2005 | Kamisuki et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,949,310 B2 | 9/2005 | Phillips |
| 6,962,992 B2 | 11/2005 | Martin et al. |
| 6,967,064 B2 | 11/2005 | Haltiner, Jr. et al. |
| 6,986,964 B2 | 1/2006 | Faris |
| 7,020,355 B2 | 3/2006 | Ahann et al. |
| 7,040,431 B2 | 5/2006 | Tartamella et al. |
| 7,060,388 B2 | 6/2006 | Naruoka |
| 7,070,632 B1 | 7/2006 | Visco et al. |
| 7,126,310 B1 | 10/2006 | Barron |
| 7,150,933 B1 | 12/2006 | McLean |
| 7,201,857 B2 | 4/2007 | Ovshinsky et al. |
| 7,226,676 B2 | 6/2007 | Faris et al. |
| 7,238,440 B2 | 7/2007 | Damore et al. |
| 7,252,898 B2 | 8/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,285,362 B2 | 10/2007 | Harrup et al. |
| 7,291,186 B2 | 11/2007 | Zhang |
| 7,303,835 B2 | 12/2007 | Mathias et al. |
| 7,466,104 B2 | 12/2008 | Wang et al. |
| 7,468,221 B2 | 12/2008 | LaFollette et al. |
| 7,482,081 B2 | 1/2009 | Hong |
| 7,488,547 B1 | 2/2009 | Iacovelli |
| 7,535,199 B2 | 5/2009 | Kimura et al. |
| 7,556,056 B2 | 7/2009 | Hutchinson |
| 7,598,796 B2 | 10/2009 | Mizuno et al. |
| 7,670,575 B2 | 3/2010 | Jarvinen et al. |
| 7,670,705 B2 | 3/2010 | Ueda et al. |
| 7,670,724 B1 | 3/2010 | Chan et al. |
| 7,722,988 B2 | 5/2010 | Webber |
| 7,794,582 B1 | 9/2010 | Cook et al. |
| 7,964,300 B2 | 6/2011 | Nakazawa et al. |
| 7,997,425 B2 | 8/2011 | Golden et al. |
| 8,058,165 B2 | 11/2011 | Kawano et al. |
| 8,168,337 B2 | 5/2012 | Friesen et al. |
| 8,206,469 B2 | 6/2012 | Chiang et al. |
| 8,309,259 B2 | 11/2012 | Friesen et al. |
| 8,329,346 B2 | 12/2012 | Janse Van Rensburg et al. |
| 8,361,288 B2 | 1/2013 | Reece et al. |
| 8,397,508 B2 | 3/2013 | Weimer et al. |
| 8,481,207 B2 | 7/2013 | Friesen et al. |
| 8,491,763 B2 | 7/2013 | Friesen |
| 8,492,052 B2 | 7/2013 | Friesen et al. |
| 8,632,921 B2 | 1/2014 | Friesen et al. |
| 8,659,268 B2 | 2/2014 | Krishnan et al. |
| 8,758,948 B2 | 6/2014 | Narayan et al. |
| 8,877,391 B2 | 11/2014 | Friesen et al. |
| 8,895,197 B2 | 11/2014 | Friesen et al. |
| 8,906,563 B2 | 12/2014 | Friesen et al. |
| 8,911,910 B2 | 12/2014 | Krishnan et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,172,123 B2 | 10/2015 | Albertus et al. |

(56) References Cited

U.S. PATENT DOCUMENTS

| | | |
|---|---|---|
| 9,178,207 B2 | 11/2015 | Friesen et al. |
| 9,214,708 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,269,998 B2 | 2/2016 | Hayes et al. |
| 9,368,486 B2 | 6/2016 | Licht |
| 9,368,788 B2 | 6/2016 | Ogg et al. |
| 9,419,273 B2 | 8/2016 | Kakeya et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,426 B2 | 1/2019 | Nitta |
| 10,302,320 B2 | 5/2019 | Howard |
| 10,530,001 B2 | 1/2020 | Finkelshtain et al. |
| 11,228,066 B2 | 1/2022 | Krishnan et al. |
| 11,611,115 B2 | 3/2023 | Pham et al. |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0029723 A1 | 2/2004 | Schiemenz et al. |
| 2004/0031251 A1 | 2/2004 | Priess |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0086779 A1 | 5/2004 | Higley et al. |
| 2004/0104124 A1 | 6/2004 | Cobley et al. |
| 2004/0110049 A1 | 6/2004 | Shimotori et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0105229 A1 | 5/2005 | Deng et al. |
| 2005/0123815 A1 | 6/2005 | Tsai et al. |
| 2005/0142398 A1 | 6/2005 | Browall et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0039853 A1 | 2/2006 | Fan et al. |
| 2006/0040174 A1 | 2/2006 | Peabody |
| 2006/0076295 A1 | 4/2006 | Leonard et al. |
| 2006/0107639 A1 | 5/2006 | Hamlin et al. |
| 2006/0127731 A1 | 6/2006 | Faris |
| 2006/0175720 A1 | 8/2006 | Kerfoot |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0281000 A1 | 12/2006 | Hayashigawa |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang Chen |
| 2007/0099037 A1 | 5/2007 | Senner |
| 2007/0120091 A1 | 5/2007 | Ovshinsky et al. |
| 2007/0134527 A1 | 6/2007 | Desouza et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner, Jr. et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0283811 A1 | 12/2007 | Wu |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0118826 A1 | 5/2008 | Shimamura et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0018668 A1 | 1/2009 | Galbraith |
| 2009/0027006 A1 | 1/2009 | Vezzini et al. |
| 2009/0081488 A1 | 3/2009 | Sato et al. |
| 2009/0087700 A1 | 4/2009 | Carlisle et al. |
| 2009/0117429 A1 | 5/2009 | Zillmer et al. |
| 2009/0163394 A1 | 6/2009 | Muraishi et al. |
| 2009/0167242 A1 | 7/2009 | Naganuma et al. |
| 2009/0230921 A1 | 9/2009 | Hsu et al. |
| 2009/0233153 A1 | 9/2009 | Carlisle et al. |
| 2009/0239131 A1 | 9/2009 | Winter |
| 2009/0239132 A1 | 9/2009 | Johnson |
| 2009/0284229 A1 | 11/2009 | Friesen et al. |
| 2009/0286149 A1 | 11/2009 | Ci et al. |
| 2009/0305090 A1 | 12/2009 | Chuang |

(56) References Cited

U.S. PATENT DOCUMENTS

| | | |
|---|---|---|
| 2010/0055508 A1 | 3/2010 | Renn |
| 2010/0062303 A1 | 3/2010 | Bae et al. |
| 2010/0062313 A1 | 3/2010 | Browning et al. |
| 2010/0119895 A1 | 5/2010 | Friesen |
| 2010/0119956 A1 | 5/2010 | Tokuda et al. |
| 2010/0178582 A1 | 7/2010 | Zhang et al. |
| 2010/0196768 A1 | 8/2010 | Roberts et al. |
| 2010/0261272 A1 | 10/2010 | Chalmers et al. |
| 2010/0266907 A1 | 10/2010 | Yazami |
| 2010/0285375 A1 | 11/2010 | Friesen et al. |
| 2010/0310905 A1 | 12/2010 | Oriet et al. |
| 2010/0310933 A1 | 12/2010 | Jiang et al. |
| 2010/0310947 A1 | 12/2010 | Rich et al. |
| 2010/0316935 A1 | 12/2010 | Friesen et al. |
| 2011/0023428 A1 | 2/2011 | Ziebold et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0045325 A1 | 2/2011 | Anzai et al. |
| 2011/0059355 A1 | 3/2011 | Zhang et al. |
| 2011/0070481 A1 | 3/2011 | Liang et al. |
| 2011/0070506 A1 | 3/2011 | Friesen et al. |
| 2011/0086278 A1 | 4/2011 | Friesen et al. |
| 2011/0111314 A1 | 5/2011 | Cui et al. |
| 2011/0143219 A1 | 6/2011 | Weiss et al. |
| 2011/0189551 A1 | 8/2011 | Friesen et al. |
| 2011/0200893 A1 | 8/2011 | Friesen et al. |
| 2011/0236730 A1 | 9/2011 | Jones |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0021303 A1 | 1/2012 | Amendola et al. |
| 2012/0034536 A1 | 2/2012 | Isom et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0193224 A1 | 8/2012 | Suk |
| 2012/0193242 A1 | 8/2012 | Marchal |
| 2012/0202127 A1 | 8/2012 | Friesen et al. |
| 2012/0237838 A1 | 9/2012 | Jesaka |
| 2012/0295172 A1 | 11/2012 | Peled et al. |
| 2012/0321969 A1 | 12/2012 | Friesen et al. |
| 2012/0321970 A1 | 12/2012 | Friesen et al. |
| 2013/0022881 A1 | 1/2013 | Friesen et al. |
| 2013/0052013 A1 | 2/2013 | Eckart |
| 2013/0078548 A1 | 3/2013 | Lee et al. |
| 2013/0095393 A1 | 4/2013 | Friesen et al. |
| 2013/0106359 A1 | 5/2013 | Noda et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1 | 5/2013 | Amendola et al. |
| 2013/0115532 A1 | 5/2013 | Friesen et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Msco et al. |
| 2014/0091631 A1 | 4/2014 | Naden et al. |
| 2014/0162096 A1 | 6/2014 | Lex et al. |
| 2014/0162129 A1 | 6/2014 | Kim et al. |
| 2014/0191727 A1 | 7/2014 | Toussaint et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0272477 A1 | 9/2014 | West et al. |
| 2014/0342214 A1 | 11/2014 | Wegner et al. |
| 2015/0010833 A1 | 1/2015 | Amendola et al. |
| 2015/0086884 A1 | 3/2015 | Narayan et al. |
| 2015/0140360 A1 | 5/2015 | Arthur et al. |
| 2015/0140455 A1 | 5/2015 | Mano |
| 2015/0200431 A1* | 7/2015 | Martirosyan ....... H01M 4/8657 429/405 |
| 2015/0240368 A1 | 8/2015 | Tacopetti et al. |
| 2015/0295291 A1* | 10/2015 | Sata ................. H01M 4/06 429/405 |
| 2015/0303539 A1 | 10/2015 | Stevens et al. |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0045841 A1 | 2/2016 | Kaplan et al. |
| 2016/0111730 A1 | 4/2016 | Kim et al. |
| 2016/0118636 A1 | 4/2016 | Jin et al. |
| 2016/0248136 A1 | 8/2016 | Bugga et al. |
| 2016/0293978 A1 | 10/2016 | Krishnan et al. |
| 2016/0308220 A1 | 10/2016 | Qi et al. |
| 2017/0141434 A1 | 5/2017 | Narayan et al. |
| 2017/0170451 A1 | 6/2017 | Englert |
| 2017/0173557 A1 | 6/2017 | Olson et al. |
| 2017/0207464 A1 | 7/2017 | Gyenge et al. |
| 2017/0214265 A1 | 7/2017 | Stevens et al. |
| 2017/0271731 A1 | 9/2017 | Hayashi et al. |
| 2017/0301922 A1 | 10/2017 | Goodenough et al. |
| 2017/0346147 A1 | 11/2017 | Weisenstein et al. |
| 2017/0352936 A1 | 12/2017 | Jin |
| 2018/0010228 A1 | 1/2018 | Ogg et al. |
| 2018/0048041 A1 | 2/2018 | Chen et al. |
| 2018/0123116 A1 | 5/2018 | Lee et al. |
| 2018/0145383 A1 | 5/2018 | Krishnan et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2018/0366799 A1 | 12/2018 | Amendola et al. |
| 2019/0006122 A1 | 1/2019 | Peled et al. |
| 2019/0006695 A1 | 1/2019 | Swiegers et al. |
| 2019/0051908 A1* | 2/2019 | Chen ................. H01M 12/08 |
| 2019/0074536 A1 | 3/2019 | Lee et al. |
| 2019/0229343 A1* | 7/2019 | Roumi ................. H01M 4/80 |
| 2020/0003570 A1 | 1/2020 | Marti et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Su et al. |
| 2020/0036002 A1 | 1/2020 | Chakraborty et al. |
| 2020/0068358 A1 | 2/2020 | Macrae |
| 2020/0136153 A1 | 4/2020 | Jaramillo et al. |
| 2020/0266423 A1* | 8/2020 | Kitagawa ............. H01M 50/46 |
| 2020/0280064 A1 | 9/2020 | Takahashi et al. |
| 2020/0411879 A1 | 12/2020 | Hartman et al. |
| 2020/0411932 A1 | 12/2020 | Weber et al. |
| 2021/0028452 A1 | 1/2021 | Su et al. |
| 2021/0028457 A1 | 1/2021 | Newhouse et al. |
| 2021/0036283 A1 | 2/2021 | Børsheim et al. |
| 2021/0013536 A1 | 4/2021 | Golden et al. |
| 2021/0351425 A1 | 11/2021 | Smith et al. |

FOREIGN PATENT DOCUMENTS

| | | |
|---|---|---|
| CN | 1543685 A | 11/2004 |
| CN | 2888658 Y | 4/2007 |
| CN | 101142706 A | 3/2008 |
| CN | 102232004 A | 11/2011 |
| CN | 103003199 A | 3/2013 |
| CN | 103098299 A | 5/2013 |
| CN | 103400947 A | 11/2013 |
| CN | 103443982 A | 12/2013 |
| CN | 103515636 A | 1/2014 |
| CN | 104269570 A | 1/2015 |
| CN | 104767006 A | 7/2015 |
| CN | 107196013 B | 6/2016 |

(56) References Cited

FOREIGN PATENT DOCUMENTS

| | | |
|---|---|---|
| CN | 106575800 A | 4/2017 |
| CN | 206340592 U | 7/2017 |
| CN | 107369813 A | 11/2017 |
| CN | 109478653 A | 3/2019 |
| CN | 114134521 A | 3/2022 |
| DE | 1266021 B | 4/1968 |
| EP | 0037634 A1 | 10/1981 |
| EP | 0058090 A1 | 8/1982 |
| EP | 0277937 A1 | 8/1988 |
| EP | 0677883 A1 | 10/1995 |
| EP | 0598144 B1 | 10/1996 |
| EP | 0637291 B1 | 10/1997 |
| EP | 0664932 B1 | 1/1998 |
| EP | 0832502 A1 | 4/1998 |
| EP | 0823135 B1 | 11/1998 |
| EP | 0895528 A1 | 2/1999 |
| EP | 0987349 A1 | 3/2000 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1723687 A1 | 11/2006 |
| EP | 1723687 B1 | 5/2010 |
| EP | 2274781 A1 | 1/2011 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| EP | 2973842 B1 | 5/2019 |
| GB | 1238356 A | 7/1971 |
| GB | 1286173 A | 8/1972 |
| IN | 201917002254 A | 4/2019 |
| JP | S4827097 A | 4/1973 |
| JP | S4827097 B1 | 8/1973 |
| JP | S56500790 A | 6/1981 |
| JP | S56162870 A | 12/1981 |
| JP | S56162870 U | 12/1981 |
| JP | H01159973 A | 6/1989 |
| JP | H01163977 A | 6/1989 |
| JP | H0790662 A | 4/1995 |
| JP | H09501256 A | 2/1997 |
| JP | H10509554 A | 9/1998 |
| JP | 2000205200 A | 7/2000 |
| JP | 2002194411 A | 7/2002 |
| JP | 3387724 B2 | 1/2003 |
| JP | 2008251491 A | 10/2008 |
| JP | 2008277315 A | 11/2008 |
| JP | 2009529213 A | 8/2009 |
| JP | 2009543674 A | 12/2009 |
| JP | 2010140736 A | 6/2010 |
| JP | 2010192313 A | 9/2010 |
| JP | 2010262876 A | 11/2010 |
| JP | 2011003313 A | 1/2011 |
| JP | 2011173083 A | 9/2011 |
| JP | 2011228079 A | 11/2011 |
| JP | 2012518095 A | 8/2012 |
| JP | 2013503257 A | 1/2013 |
| JP | 2013505544 A | 2/2013 |
| JP | 2013507741 A | 3/2013 |
| JP | 2013134838 A | 7/2013 |
| JP | 2014127289 A | 7/2014 |
| JP | 2014150056 A | 8/2014 |
| JP | 2015076379 A | 4/2015 |
| JP | 2016091605 A | 5/2016 |
| JP | 5952540 B2 | 6/2016 |
| JP | 2016136521 A | 7/2016 |
| JP | 6032018 B2 | 11/2016 |
| JP | 2017076595 A | 4/2017 |
| JP | 2017139231 A | 8/2017 |
| JP | 6234917 B2 | 11/2017 |
| JP | 2017216126 A | 12/2017 |
| JP | 2018006057 A | 1/2018 |
| JP | 2018006121 A | 1/2018 |
| JP | 2018046020 A | 3/2018 |
| JP | 2018067399 A | 4/2018 |
| JP | 6352884 B2 | 6/2018 |
| JP | 6363244 B2 | 7/2018 |
| JP | 2018529207 A | 10/2018 |
| JP | 6682102 B2 | 3/2020 |
| KR | 20120122053 A | 11/2012 |
| KR | 1020140068850 A | 6/2014 |
| KR | 10-20160115912 A | 10/2016 |
| KR | 20180063144 A | 6/2018 |
| KR | 20190066865 A | 6/2019 |
| NO | 2012012364 A1 | 1/2012 |
| TW | 201929311 A | 7/2019 |
| WO | WO8402429 A1 | 6/1984 |
| WO | 8905528 A1 | 6/1989 |
| WO | 9321664 A1 | 10/1993 |
| WO | 0201666 A2 | 1/2002 |
| WO | 2008058165 A2 | 5/2008 |
| WO | 2009087917 A1 | 7/2009 |
| WO | WO2010065890 A1 | 6/2010 |
| WO | 2011035176 A1 | 3/2011 |
| WO | 2011044528 A1 | 4/2011 |
| WO | 2011103142 A1 | 8/2011 |
| WO | 2011163553 A1 | 12/2011 |
| WO | WO2012012558 A2 | 1/2012 |
| WO | WO2012138576 A1 | 10/2012 |
| WO | 2012156972 A1 | 11/2012 |
| WO | WO2012174433 A3 | 12/2012 |
| WO | WO2013005050 A1 | 1/2013 |
| WO | 2013053653 A2 | 4/2013 |
| WO | 2013090680 A2 | 6/2013 |
| WO | 2014124386 A1 | 8/2014 |
| WO | WO2014142666 A1 | 9/2014 |
| WO | WO2015042573 A1 | 3/2015 |
| WO | 2015076299 A1 | 5/2015 |
| WO | 2015119041 A1 | 8/2015 |
| WO | WO2015145690 A1 | 10/2015 |
| WO | WO2015150784 A1 | 10/2015 |
| WO | 2016088673 A1 | 6/2016 |
| WO | 2016138594 A1 | 9/2016 |
| WO | 2016197109 A1 | 12/2016 |
| WO | 2017006666 A1 | 1/2017 |
| WO | 2017045072 A1 | 3/2017 |
| WO | 2017049414 A1 | 3/2017 |
| WO | WO2017075577 A1 | 5/2017 |
| WO | WO2017117373 A1 | 7/2017 |
| WO | 2017223219 A1 | 12/2017 |
| WO | WO2018009930 A2 | 1/2018 |
| WO | WO2018018036 A1 | 1/2018 |
| WO | WO2018052376 A1 | 3/2018 |
| WO | WO2018187561 A1 | 10/2018 |
| WO | 2020006436 A1 | 1/2020 |
| WO | 2020006506 A2 | 1/2020 |
| WO | WO2020006419 A1 | 1/2020 |
| WO | WO2020023912 A1 | 1/2020 |
| WO | WO2020067226 A1 | 4/2020 |
| WO | 2020264344 A1 | 12/2020 |
| WO | 2020264386 A1 | 12/2020 |
| WO | 2020264415 A1 | 12/2020 |
| WO | 2021226399 A1 | 12/2020 |
| WO | 2021021681 A1 | 2/2021 |
| WO | 2021021685 A1 | 2/2021 |

OTHER PUBLICATIONS

ISR-WO—International Search Report and Written Opinion in PCT/US2023/072680, mailed Dec. 18, 2023, 10 pages.
ISR-WO—International Search Report and Written Opinion in PCT/US2023/076700, mailed Jan. 22, 2024, 13 pages.
Cao, Z. et al., "Planar all-solid-state rechargeable Zn-air batteries for compact wearable energy storage", Journal of Materials Chem-

(56) References Cited

OTHER PUBLICATIONS istry A, 2019, vol. 7, pp. 17581-17593.
Second Office Action in CN201980056771.3, mailed Jun. 13, 2024, 12 pages with English language translation.
Final Office Action in U.S. Appl. No. 17/313,819, mailed May 31, 2024, 8 pages.
Office Action in CN201980056772.8, mailed Jul. 11, 2024, 12 pages with English language translation.
ISR-WO—International Search Report and Written Opinion in PCT/US2023/030935, mailed Dec. 14, 2023, 9 pages.
International Search Report for International Application No. PCT/US2019/031118 dated Aug. 29, 2019, 3 pages.
Japanese Office Action dated Feb. 9, 2016 for Application No. 2014-540009, 14 pages.
Japanese Office Action dated Jan. 10, 2017 for Application No. 2014-540009, 17 pages.
Jayashree, et al., "Air-Breathing Laminar Flow-Based Microfluidic Fuel Cell," Journal of American Chemical Society, 2005, vol. 127, pp. 16758-16759.
Jorne J., et al., "Suppression of Dendrites and Roughness during Electrodeposition by Impinging Flow," Journal of the Electrochemical Society, Jun. 1987, vol. 134, No. 6, pp. 1399-1402.
Li Q., et al., "All Solid Lithium Polymer Batteries With a Novel Composite Polymer Electrolyte," Solid State Ionics, 2003, vol. 159, pp. 97-109.
Li Z., et al., "Air-Breathing Aqueous Sulfur Flow Battery for Ultralow-Cost Long-Duration Electrical Storage," Joule 1, Cell Press, Oct. 11, 2017, vol. 1, No. 2, pp. 306-327, doi:10.1016/j.joule.2017.08.007, ISSN 2542-4351, XP055667017.
"Low," Lexico.com, US Dictionary, Oxford University Press, Retrieved on Oct. 13, 2021, 5 Pages, Retrieved from URL: https://www.lexico.com/en/definition/low.
"Nickel," Efunda: The Ultimate Online Reference for Engineers, eFunda, Inc., Web, Sep. 5, 2014.
Non-Final Office Action dated Oct. 8, 2019 issued in corresponding Japanese Patent Application No. 2018-550404 with English translation, 4 pages.
Non-final Office Action U.S. Appl. No. 14/505,234 dated Aug. 25, 2017, 15 Pages.
Notice of Allowance for U.S. Appl. No. 14/505,234 dated Jun. 29, 2018, 10 Pages.
Notice of Allowance Japanese Patent Application No. 2015-557176 dated Mar. 13, 2018 with English translation, 5 pages.
Office Action dated Jan. 13, 2012 issued in corresponding Chinese Patent Application No. 201120307185.2 w/English translation, 9 Pages.
Office Action dated Jun. 17, 2021, issued in corresponding Brazilian Application No. BR112019000713-0 with informal translation, 5 Pages.
Office Action dated Jun. 3, 2021, issued in corresponding Chinese Patent Application No. 201780045371.3 with English translation, 8 Pages.
Office Action dated Mar. 28, 2017 in Chinese Application 201480017311.7, 21 pages.
Office Action dated May 7, 2021, issued in corresponding Chinese Patent Application No. 201780034966.9, with English translation, 18 pages.
Office Action for Australian Patent Application No. 2012332825 dated Nov. 25, 2015, 3 pages.
Office Action for Canadian Patent Application 2853245 dated Jun. 15, 2017, 3 pages.
Office Action for Canadian Patent Application 2853245 dated Sep. 23, 2016, 3 pages.
Office Action for Indian Patent Application No. 201817034674 dated May 27, 2020, 7 pages.
Office Action issued in corresponding Japanese Patent Application No. 2017-093977 dated May 8, 2018 with English translation, 4 pages.
Office Action issued in corresponding Mexico Application No. MX/a/2014/005136 dated Apr. 17, 2018.
Park C.H., et al., "Electrochemical Stability and Conductivity Enhancement of Composite Polymer Electrolytes," Solid State Ionics, 2003, vol. 159, pp. 111-119.
"PTFE," Polymers: A Properties Database (Online), Taylor and Francis Group, LLC, Web, Sep. 5, 2014.
Rejection Decision, Japanese Patent Application No. 2015-557176 dated Oct. 17, 2017 with English translation, 12 pages.
Ross P.N., et al., "Feasibility Study of a New Zinc-Air Battery Concept Using Flowing Alkaline Electrolyte," Intersociety Energy Conversion Engineering Conference, Aug. 25, 1986, vol. 2, pp. 1066-1072.
Salloum et al., "Sequential Flow Membraneless Microfluidic Fuel Cell with Porous Electrodes," Journal of Power Sources, 2008, vol. 180, pp. 243-252.
Sayilgan E., et al., "A Review of Technologies for the Recovery of Metals from Spent Alkaline and Zinc-Carbon Batteries," Hydrometallurgy, 2009, vol. 97, No. 3-4, pp. 158-166, XP026116549.
Second Office Action Chinese Patent Application No. 201480017311.7 dated Feb. 2, 2018 with English translation.
Smedley, et al., "A Regenerative Zinc-air Fuel Cell," Journal of Power Sources, 2007, vol. 165, pp. 897-904.
Thirsk H.R., "Electrochemistry," Thirsk, Ed., The Chemical Society Great Britain Oxford Alden Press, 1974, vol. 4, pp. 16.
Timofeeva E.V., "Rechargeable Nanofluid Electrodes for High Energy Density Flow Battery," NSTI-Nanotech, Jan. 1, 2013, vol. 2, pp. 679-682, XP055863711.
Written Opinion for International Application No. PCT/US2016/036026, mailed Sep. 29, 2016, 14 Pages.
Written Opinion of the International Preliminary Examining Authority dated Feb. 24, 2017 for Application. No. PCT/US2016/023564.
Written Opinion of the International Preliminary Examining Authority PCT/US2016/036026 dated May 9, 2017, 13 Pages.
Written Opinion of the International Searching Authority PCT/US2019/031118 dated Aug. 29, 2019, 13 Pages.
Yu W., et al., "Toward a New Generation of Low Cost, Efficient, and Durable Metal-Air Flow Batteries," Journal of Materials Chemistry A, Royal Society of Chemistry, GB, Dec. 3, 2019, vol. 7, No. 47, pp. 26744-26768, DOI: 10.1039/C9TA10658H, ISSN 2050-7488, XP055863708.
Zheng J., et al., "Rotating Ring-Disk Electrode Method," Rotating Electrode Methods and Oxygen Reduction Electrocatalysts, NL , Elsevier, Apr. 25, 2014, pp. 199-229, DOI: 10.1016/B978-0-444-63278-4.00006-9, ISBN 9780444632784, XP009522170.
Ai, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).
Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 4959-4973, (2012).
Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).
Bandal, H. et al., "Iron-based heterogeneous catalysts for oxygen evolution reaction; change in perspective from activity promoter to active catalyst," Journal of Power Sources, vol. 395, pp. 106-127, (2018).
Blurton, K. F. et al., "Metal/Air Batteries: Their Status and Potential—A Review," Journal of Power Sources, vol. 4, pp. 263-279, (1979).
Burke, M. S. et al., "Cobalt-Iron (Oxy)Hudroxide Oxygen Evlolution Electrocatalysts: The Role of Structur5e and Composition on Activity, Stability, and Mechanism," J. Am. Chem. Soc., vol. 137, pp. 3638-3648, DOI: 10.1021/iacs.5b00281, (2015).
Burke, M. S. et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Oregon 97403, United States, Chemistry of Materials, 10 pages, (2015).
Chen, Y. et al., "Harvesting polysul!des by sealing the sulfur electrode in a composite ion-selective net," Journal of Power Sources, vol. 368, pp. 38-45, (2017).

(56) References Cited

OTHER PUBLICATIONS

Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).

Colli, A. N. et al., "High energy density MnO4-/MnO42 redox couple for alkaline redox flow batteries," Chem. Commun., vol. 52, pp. 14039-14042, (2016).

Cui, B. et al., "Improved Cycle Iron Molten Air Battery Performance Using a Robust Fin Air Electrode," Journal of The Electrochemical Society, vol. 164, No. 2, pp. A88-A92, (2017).

Demir-Cakan, R. et al., "An aqueous electrolyte rechargeable Li-ion/polysul!de battery," Journal of Materials Chemistry A, View Article Online DOI: 10.1039/c4ta01308e, 5 pages, (2014).

Demir-Cakan, R. et al., "Use of ion-selective polymer membranes for an aqueous electrolyte rechargeable Li-ion-polysulphide battery," View Online DOI: 10.1039/c4ta05756b, J. Mater. Chem. A, vol. 3, pp. 2869-2875, (2015).

Egashira, M. et al., "Iron-Air (Secondary and Primpary)," Yamaguchi University, Yamaguchi, Japan & 2009 Elsevier B.V. All rights reserved, pp. 372-375, (2009).

Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148- A1157, (2017).

Gross, M. M. et al., "Aqueous Polysulfide-Air Battery with a Mediator-Ion Solid Electrolyte and a Copper Sullde Catalyst for Polysulfide Redox," View Online DOI: 10.1021/acsaem.8b01679, ACS Applied Energy Materials, vol. 1, No. 12, pp. 7230-7236, (2018).

Hall, D. E., "Ni(OH)2_Impregnated Anodes for alkaline Water Electrolysis," J. Electrochem. So., vol. 130, No. 2, pp. 317-321, (1983).

Hall, D. E., "Electrolysis: Corrosion Resistance," J. Electrochem. Soc., vol. 129, No. 2, pp. 310-315, (1982).

Hang, B. T. et al., "Effect of metal-sulfide additives on electrochemical properties of nano-sized Fe2O3-loaded carbon for Fe/air battery anodes," Journal of Power Sources, vol. 168, pp. 522-532, (2007).

Hang, B. T. et al., "Effect of additives on the electrochemical properties of Fe2O3/C nanocomposite for Fe/air battery anode," Journal of Electroanalytical Chemistry, vol. 762, pp. 59-65, (2016).

Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-115, (2013).

Notification Concerning Transmittal of a International Preliminary Report on Patentability and Written Opinion of the International Search Authority for International Patent Application No. PCT/US2018/026243, mailed Oct. 17, 2019 9 pages.

International Search Report and Written Opinion of the International Searching Authority for International Patent Application No. PCT/US2018/026243, mailed Jul. 27, 2018, 12 pages.

International Search Report and Written Opinion of the International Searching Authority for International Patent Application No. PCT/US2019/039844, mailed Oct. 23, 2019, 15 pages.

International Search Report and Written Opinion of the International Searching Authority for International Patent Application No. PCT/US2019/039867, mailed Nov. 15, 2019, 19 pages.

International Search Report and Written Opinion of the International Searching Authority for International Patent Application No. PCT/US2019/039973, mailed Jan. 13, 2020, 26 pages.

International Search Report and Written Opinion of the International Searching Authority for International Patent Application No. PCT/US2019/043745, mailed Nov. 13, 2019, 17 pages.

Ji, X. et al., "Stabilizing lithium-sulphur cathodes using polysulphide reservoirs," View Online DOI: 10.1038/ncomms1293, Nature Communications, vol. 2, No. 325, 8 pages, (2011).

Jin, X. et al., "A high-!delity multiphysics model for the new solid oxide iron-air redox battery part I: Bridging mass transport and charge transfer with redox cycle kinetics," Journal of Power Sources, vol. 280, pp. 195-204, (2015).

Kadyk, T. et al., "How to Enhance Gas Removal from Porous Electrodes?" View Online DOI: 10.1038/SREP38780, Scientific Reports, vol. 6, No. 38780, pp. 1-14, (2016).

Klaus, S. et al., "Elects of Fe Electrolyte Impurities on Ni(OH)2/NiOOH Structure and Oxygen Evolution Activity," View Online DOI:10.1021/acs.jpcc.5b00105, Journal of Physical Chemistry C, vol. 119, No. 13, pp. 7243-7254, (2015).

Licht, S., "A Novel Aqueous Aluminum permanganate fuel cell," Electrochemistry Communications, vol. 1, pp. 33-36, (1999).

Li, Z. et al., "A high-energy and low-cost polysul!de/iodide redox ow battery," Nano Energy, vol. 30, pp. 283-292, (2016).

Sevinc, S. et al., "In-situ tracking of NaFePO4 formation in aqueous electrolytes and its electrochemical performances in Na-ion/polysul!de batteries," Journal of Power Sources, vol. 412, pp. 55-62, (2019).

Mainar, A. R. et al., "Alkaline aqueous electrolytes for secondary zinc-air batteries: an overview," Int. J. Energy Res. 2016; vol. 40, pp. 1032-1049, (2016).

Malkhandi, S. et al., "Organo-Sulfur Additives for Suppressing Hydrogen Evolution in Iron-air Battery," Abstract #688, 220th ECS Meeting, 2011 The Electrochemical Society.

Matsuda, A. et al., "Preparation of hydroxide ion conductive KOH-ZrO2 electrolyte for all-solid state iron/air secondary battery," Solid State Ionics, vol. 262, pp. 188-191, (2014).

Maurya, S. et al., "A review on recent developments of anion exchange membranes for fuel cells and redox flow batteries," View online DOI: 10.1039/c5ra04741b, RSC Adv., vol. 5, pp. 37206-37230, (2015).

McKerracher, R. D. et al., "A Review of the Iron-Air Secondary Battery for Energy Storage," View online DOI: 10.1002/cplu.201402238, ChemPlusChem 2015, vol. 80, pp. 323-335, (2015).

Merle, G. et al., "Anion exchange membranes for alkaline fuel cells: A review," Journal of Membrane Science, vol. 377, pp. 1-35, (2011).

Mitra, D. et al., "An Efficient and Robust Surface-Modified Iron Electrode for Oxygen Evolution in AlkalineWater Electrolysis," Journal of The Electrochemical Society, vol. 165, No. 5, pp. F392-F400, (2018).

Mitra, D. et al., "A Stable and Electrocatalytic Iron Electrode for Oxygen Evolution in Alkaline Water Electrolysis," View Online https://doi.org/10.1007/s11244-018-0971-9, Springer Science+Business Media, LLC, part of Springer Nature 2018.

Narayan, S. R. et al., "Bi-Functional Oxygen Electrodes—Challenges and Prospects," The Electrochemical Society Interface, Summer 2015, pp. 65-69, (2015).

Neburchilov, V. et al., "Metal-Air And Metal-Sulfur Batteries: Fundamentals and Applications," CRC Press Taylor & Francis Group, 6000 Broken Sound Parkway NW, Suite 300, Boca Raton, FL 33487-2742, © 2017 by Taylor & Francis Group, LLC, CRC Press is an imprint of Taylor & Francis Group, an Informa business.

Ojefors, L. et al., "An-iron-Air Vehicle Battery," Journal of Power Sources, vol. 2, pp. 287-296, (1977).

Pan, J. et al., "Constructing Ionic Highway in Alkaline Polymer Electrolytes," Energy Environ. Sci. 2014, vol. 7, pp. 354-360, (2014).

Roe, S. et al., "A High Energy Density Vanadium Redox Flow Battery with 3 M Vanadium Electrolyte," Journal of The Electrochemical Society, vol. 163, No. 1, pp. A5023-A5028, (2016).

Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 96 pages, (1988).

Tekin, B. et al., "A New Sodium-Based Aqueous Rechargeable Battery System: The Special Case of Na0.44MnO2/Dissolved Sodium Polysulfide," View online DOI: 10.1002/ente.201700245, Energy Technol. vol. 5, pp. 2182-2188, (2017).

Tian, B. et al., "The effect of Na2S additive in alkaline electrolyte on improved performances of Fe-based air batteries," Electrochimica Acta, vol. 259, pp. 196-203, (2018).

(56) References Cited

OTHER PUBLICATIONS

Trocino, S. et al., "High performance solid-state iron-air rechargeable ceramic battery operating at intermediate temperatures (500-650° C.)," Applied Energy, pp. 233-234 & pp. 386-394, (2019).
Vijayamohanan, K. et al., "Rechargeable Alkaline Iron Electrodes," Journal of Power Sources, vol. 34, pp. 269-285, (1991).
Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).
Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research—Fundamental Electrochemistry (IEK-9) Center for Nanophase Materials Sciences, Oak Ridge National Laboratory, Oak Ridge, Tennessee 378, US, 46 pages, (2017).
Wilke, S. K. et al., "Structural evolution of directionally freeze-cast iron foams during oxidation/reduction cycles," Acta Materialia, vol. 162, pp. 90-102, (2019).
Yang, B. et al., "Organo-Sulfur Molecules enable iron-based battery electrodes to meet the challenges of large-scale electrical energy storage," Energy Environ. Sci., vol. 7, pp. 2753-2763, (2014).
Yang, C. et al., "Unique aqueous Li-ion/sulfur chemistry with high energy density and reversibility," View online, www.pnas.org/cgi/doi/10.1073/pnas.1703937114, PNAS, vol. 114, No. 24, pp. 6197-6202, (2017).
You, S. et al., "A microbial fuel cell using permanganate as the cathodic electron acceptor," Journal of Power Sources, vol. 162, pp. 1409-1415, (2006).
Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).
Yun, S. et al., "Materials and Device Constructions for Aqueous Lithium-Sulfur Batteries," View online DOI: 10.1002/adfm.201707593, Adv. Funct. Mater., vol. 28, pp. 1-17 (1707593), (2018).
Notification of Transmittal of the International Search Report and Written Opinion of the International Search Authority for International Patent Application No. PCT/US2020/039889, mailed Oct. 15, 2020, 11 pages.
Perkins, N. R. et al., "Hydrogen Oxidation Electrodes and Electrochemical Cells Including the Same," U.S. Appl. No. 16/951,396, filed Nov. 18, 2020.
Carta, M. et al., "The synthesis of microporous polymers using Troger's base formation", Polymer Chemistry, 2014, vol. 5, pp. 5267-5272.
Bisol, S. et al., "Gas separation properties of Troeger's base-bridged polyamides", e-Polymers, 2017, vol. 17, No. 4, pp. 283-293, DOI: https://doi.org/10.1515/epoly-2016-0291.
Li, Z. et al., "Air-breathing aqueous sulfur flow battery for ultralow-cost long-duration electrical storage", Joule, 2017, vol. 1, No. 2, pp. 306-327.
Notification of Transmittal of the International Search Report and Written Opinion of the International Search Authority for International Patent Application No. PCT/US2020/039942, mailed Oct. 22, 2020, 17 pages.
Notification of Transmittal of the International Search Report and Written Opinion of the International Search Authority for International Patent Application No. PCT/US2020/039976, mailed Oct. 23, 2020, 11 pages.
Notification of Transmittal of the International Search Report and Written Opinion of the International Search Authority for International Patent Application No. PCT/US2020/043630, mailed Nov. 11, 2020, 10 pages.
Notification of Transmittal of the International Search Report and Written Opinion of the International Search Authority for International Patent Application No. PCT/US2020/043639, mailed Nov. 13, 2020, 11 pages.

Chinese Office Action dated Dec. 28, 2015 for Chinese Application No. 2012102393449, 27 pages, including English-language translation.
Office Action for Chinese Application No. 201780034966.9, mailed Mar. 31, 2022, 19 pages, including English-language translation.
International Preliminary Report on Patentability for International Application No. PCT/US2021/031184, mailed Nov. 17, 2022, 6 Pages.
Office Action for Chinese Application No. 201780034966.9, mailed Jan. 13, 2023, 17 pages, including English-language translation.
Office Action for Chinese Application No. 201780034966.9, mailed Jul. 3, 2023, 29 pages, including English-language translation.
Song T., et al., "Solubility and Diffusivity of Oxygen in Ionic Liquids," Oct. 10, 2019, Journal of Chemical and Engineering Data, vol. 64, pp. 4956-4967.
Agarwal R.C., et al., "Study of Electrical and Electrochemical Behaviour on Hot-press Synthesized Nano-Composite Polymer Electrolyte (NCPE) Membranes: [(70PEO: 30 KNO3) + x SiO2]," International Journal of Electrochemical Science, 2011, vol. 6, pp. 867-881.
"Busbar," Lexico.com, US Dictionary, Oxford University Press, Retrieved on Oct. 13, 2021, 1 page, Retrieved from URL: https://www.lexico.com/en/definition/busbar.
Chakraborty R., et al., "Negative Electrodes For Electrochemical Cells," U.S. Appl. No. 16/523,722, filed Jul. 26, 2019, 157 Pages.
Cherepy N.J., et al., "A Zinc/Air Fuel Cell for Electric Vehicles," IEEE publication, 1999, pp. 11-14.
Chinese Office Action dated Dec. 28, 2015 for Appln. No. 2015122301567800.
Chinese Office Action dated Feb. 19, 2013 (with partial English Language translation) of Chinese Patent Appln. No. 201220585211.2 filed Nov. 162012, 4 Pages.
Chinese Office Action dated Feb. 3, 2017 for Application No. 2012800344431, 7 pages.
Chinese Office Action dated Jul. 18, 2016 for Appln. No. 2012102393449.
Chinese Office Action dated May 4, 2016 for Application No. 2012800344431, 17 pages.
Chinese Search Report dated Dec. 6, 2012 of Chinese Appl No. 201220336003.9 filed Jul. 10, 2012 (1 page Chinese Actionwith 3-page Engl. translation).
Cohen J.L., et al., "Fabrication and Preliminary Testing of a Planar Membraneless Microchannel Fuel Cell," Journal of Power Sources, 2005, vol. 139, pp. 96-105.
Communication under Rule 71(3) EPC, EP Application No. 14749407.4, dated Sep. 29, 2017, 6 Pages.
Decision to Grant EP Application No. 14749407.4 dated Mar. 8, 2018, 2 Pages.
Dias F.B., et al., "Trends in Polymer Electrolytes for Secondary Lithium Batteries", Journal of Power Sources, 2000, vol. 88, pp. 169-191.
Examination Report for Australian Patent Application No. 2014214641 dated Jun. 26, 2017, 6 pages.
Extended European Search Report for European Application No. 12845720.7, mailed Jul. 16, 2015, 7 Pages.
Extended European Search Report for European Application No. 14749407.4, mailed Aug. 31, 2016, 6 Pages.
Extended European Search Report for European Application No. 19826880.7, mailed Feb. 4, 2022, 8 Pages.
Extended European Search Report for European Application No. 19827057.1, mailed Feb. 11, 2022, 8 Pages.
Extended European Search Report of EP Application No. 09751078.8, dated Jul. 27, 2012, 6 Pages.
Ferrigno R., et al., "Membraneless Vanadium Redox Fuel Cell Using Laminar Flow," Journal of American Chemical Society, 2002, vol. 124, pp. 12930-12931.
"High," Lexico.com, US Dictionary, Oxford University Press, Retrieved on Oct. 13, 2021, 7 pages, Retrieved from URL: https://www.lexico.com/en/definition/high.
International Preliminary Report on Patentability (Chapter 1 of the Patent Cooperation Treaty) for International Application No. PCT/US2009/040658 dated Dec. 2, 2010, 5 Pages.

(56) References Cited

OTHER PUBLICATIONS

International Preliminary Report on Patentability for International Application No. PCT/US12/47395 mailed Sep. 19, 2014, 27 pages.
International Preliminary Report on Patentability for International Application No. PCT/US12/62503 mailed Nov. 27, 2013, 25 pages.
International Preliminary Report on Patentability for International Application No. PCT/US2011/049558 mailed Jan. 11, 2013, 15 pages.
International Preliminary Report on Patentability for International Application No. PCT/US2012/062503, dated Oct. 19, 2013, 25 Pages.
International Preliminary Report on Patentability for International Application No. PCT/US2014/015613, mailed Aug. 20, 2015, 19 Pages.
International Preliminary Report on Patentability for International Application No. PCT/US2016/023564, dated May 30, 2017, 16 Pages.
International Preliminary Report on Patentability for International Application No. PCT/US2016/036026 mailed Oct. 13, 2017, 26 Pages.
International Preliminary Report on Patentability for International Application No. PCT/US2017/043489, dated Aug. 6, 2018, 20 Pages.
International Preliminary Report on Patentability for International Application No. PCT/US2017/043500, dated Jul. 23, 2018, 18 Pages.
International Preliminary Report on Patentability for International Application No. PCT/US2019/039844, mailed Jan. 7, 2021, 11 Pages.
International Preliminary Report on Patentability for International Application No. PCT/US2019/039973, mailed Jan. 7, 2021, 20 Pages.
International Preliminary Report on Patentability for International Application No. PCT/US2020/031760, dated Nov. 25, 2021, 07 Pages.
International Preliminary Report on Patentability for International Application No. PCT/US2020/039889, mailed Jan. 6, 2022, 8 Pages.
International Preliminary Report on Patentability for International Application No. PCT/US2020/061081, mailed Jun. 2, 2022, 07 Pages.
International Search Report and Written Opinion for International Application No. PCT/US2011/049558 mailed Nov. 16, 2011, 11 pages.
International Search Report and Written Opinion for International Application No. PCT/US2012/047395 mailed Sep. 28, 2012, 10 pages.
International Search Report and Written Opinion for International Application No. PCT/US2012/062503, mailed Jan. 24, 2013, 09 Pages.
International Search Report and Written Opinion for International Application No. PCT/US2014/015613, mailed Jul. 11, 2014, 23 Pages.
International Search Report and Written Opinion for International Application No. PCT/US2016/023564, mailed Jun. 16, 2016, 12 Pages.
International Search Report and Written Opinion for International Application No. PCT/US2017/043489, mailed Nov. 29, 2017, 12 Pages.
International Search Report and Written Opinion for International Application No. PCT/US2017/043500, mailed Nov. 29, 2017, 12 Pages.
International Search Report and Written Opinion for International Application No. PCT/US2020/061081, mailed Apr. 19, 2021, 10 Pages.
International Search Report and Written Opinion for International Application No. PCT/US2021/031184, mailed Aug. 27, 2021, 07 Pages.
International Search Report and Written Opinion of the International Searching Authority dated Aug. 25, 2020, issued In corresponding International Application No. PCT/US2020/031760, 13 Pages.
International Search Report for International Application No. PCT/US2009/039460, mailed May 26, 2009, 3 pages.
International Search Report for International Application No. PCT/US2009/040658, mailed Aug. 24, 2009, 3 pages.
International Search Report for International Application No. PCT/US2016/036026, mailed Sep. 29, 2016, 05 Pages.
Office Action in U.S. Appl. No. 16/456,860, mailed Apr. 17, 2024, 17 pages.
Notice of Allowance in U.S. Appl. No. 16/457,253, mailed Oct. 16, 2024, 7 pages.
Office Action in CN2019800567713, dated Aug. 30, 2024, 2 pages.
Office Action in TW109144569, including English translation, mailed Sep. 5, 2024, 25 pages.
Partial Supplementary European Search Report in EP20889924.5, dated Jan. 2, 2025, 10 pages.

* cited by examiner

Top

Bottom
- 0.5 cm baffle height
- 30° angle to bubble stream

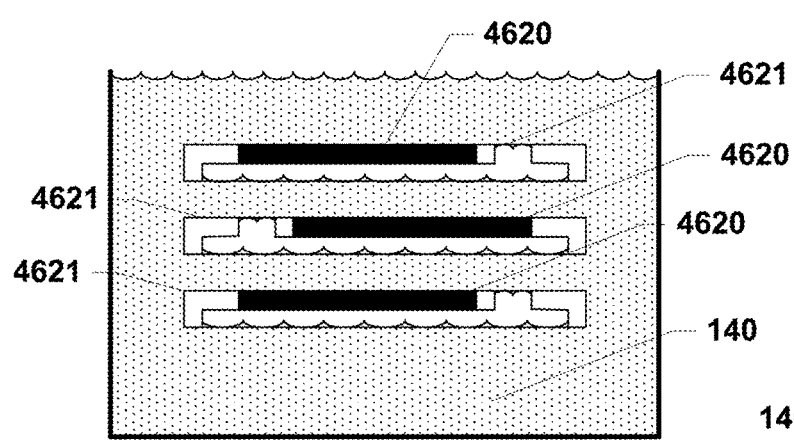 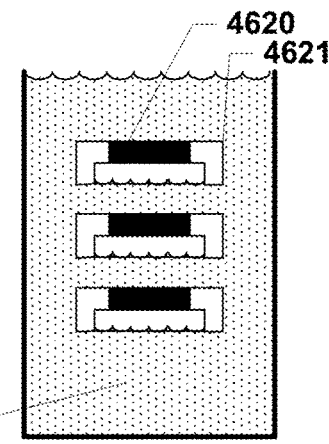
FIG. 46A  FIG. 46B
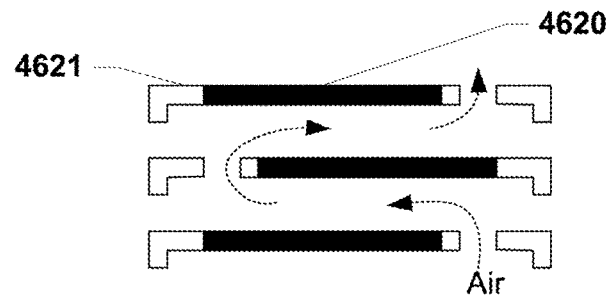
FIG. 47A
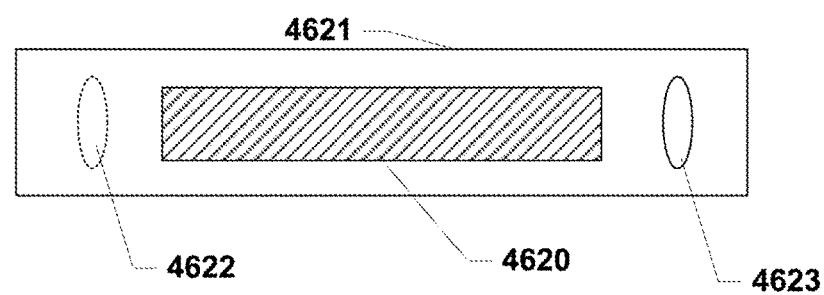
FIG. 47B Edge Crimp Seal The edge crimp seal may be aided by adhesive or gasket material

DEVICE ARCHITECTURES FOR METAL-AIR BATTERIES

RELATED APPLICATIONS

This application claims the benefit of priority to U.S. Provisional Patent Application No. 62/868,479 entitled "Device Architectures For Metal-Air Batteries" filed Jun. 28, 2019 and U.S. Provisional Patent Application No. 63/021,301 entitled "Device Architectures For Metal-Air Batteries" filed May 7, 2020 and the entire contents of both applications are hereby incorporated by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least ≥8 h) energy storage systems.

Metal-air batteries are attractive options for electrochemical energy storage due to the low cost and abundance of air as a reagent for the energy storing reactions. Many challenges associated with the development of metal-air batteries are associated with the mechanical cell architecture. Certain architectures which are suitable for small-scale storage, such as are used for zinc-air hearing aid batteries are not suitable for large scale energy storage such as for grid-connected applications.

This Background section is intended to introduce various aspects of the art, which may be associated with embodiments of the present inventions. Thus, the foregoing discussion in this section provides a framework for better understanding the present inventions, and is not to be viewed as an admission of prior art

SUMMARY

Systems and methods of the various embodiments may provide device architectures for batteries. In various embodiments, these may be primary or secondary batteries. In various embodiments these devices may be useful for energy storage.

Various embodiments may provide a battery including an Oxygen Reduction Reaction (ORR) electrode, an Oxygen Evolution Reaction (OER) electrode, a metal electrode; and an electrolyte separating the ORR electrode and the OER electrode from the metal electrode. In various embodiments, the ORR electrode and the OER electrode are portions of the same single air electrode. In various embodiments, the ORR electrode and the OER electrode are separate electrodes. In various embodiments, the ORR electrode floats on a surface of the electrolyte and the OER electrode is submerged in the electrolyte. In various embodiments, the battery includes a stackable vessel supporting the ORR electrode, the OER electrode, the metal electrode, and the electrolyte, wherein the stackable vessel is configured to be self-stacking on other stackable vessels. In various embodiments, the ORR electrode is wavy or rippled. In various embodiments, a housing of the battery operates as a current conductor for the metal electrode. In various embodiments, the ORR electrode and the OER electrode are submerged in the electrolyte. In various embodiments, the ORR electrode is supported in a frame that displaces electrolyte to create a gas volume at a depth below a surface of the electrolyte. In various embodiments, the ORR electrode comprises a box configuration filled with air. In various embodiments, the ORR electrode is supplied air. In various embodiments, the ORR electrode is curved. In various embodiments, the ORR electrode is supported in a frame that traps the supplied air in an air chamber bounded by a surface of the ORR electrode. In various embodiments, the ORR electrode is tube shaped. In various embodiments, the ORR electrode is a series of two or more ORR electrodes submerged in the electrolyte, the series of ORR electrodes are arranged vertically above one another in a stack, and the supplied air bubbles move up the stack from each lower ORR electrode to the next higher ORR electrode. In various embodiments, the ORR electrodes are angled in the stack relative to one another. In various embodiments, the ORR electrodes include baffles at a higher edge. In various embodiments, the ORR electrodes include passages therein to allow bubbles to flow upward to the next ORR electrode. In various embodiments, the stack is aligned vertically. In various embodiments, the stack is staggered vertically. In various embodiments, the ORR electrode is configured as a cylindrical core surrounded by the metal electrode, and the OER electrode is configured as a hexagonal tube surrounding and containing the metal electrode with the ORR electrode therein. In various embodiments, the ORR electrode, OER electrode, and metal electrode are configured as one cell of a series of similar cells arranged in the battery as an array of cells. In various embodiments, the electrolyte is a pool of electrolyte and the array of cells are submerged in the pool of electrolyte. In various embodiments, the metal electrode is configured to change position relative to the ORR electrode and the OER electrode. In various embodiments, the metal electrode is a bed of direct reduced iron pellets.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

FIGS. 45-47B illustrate various rectilinear ORR electrode configurations, in accordance with various embodiments.

DETAILED DESCRIPTION

Figure 1A:
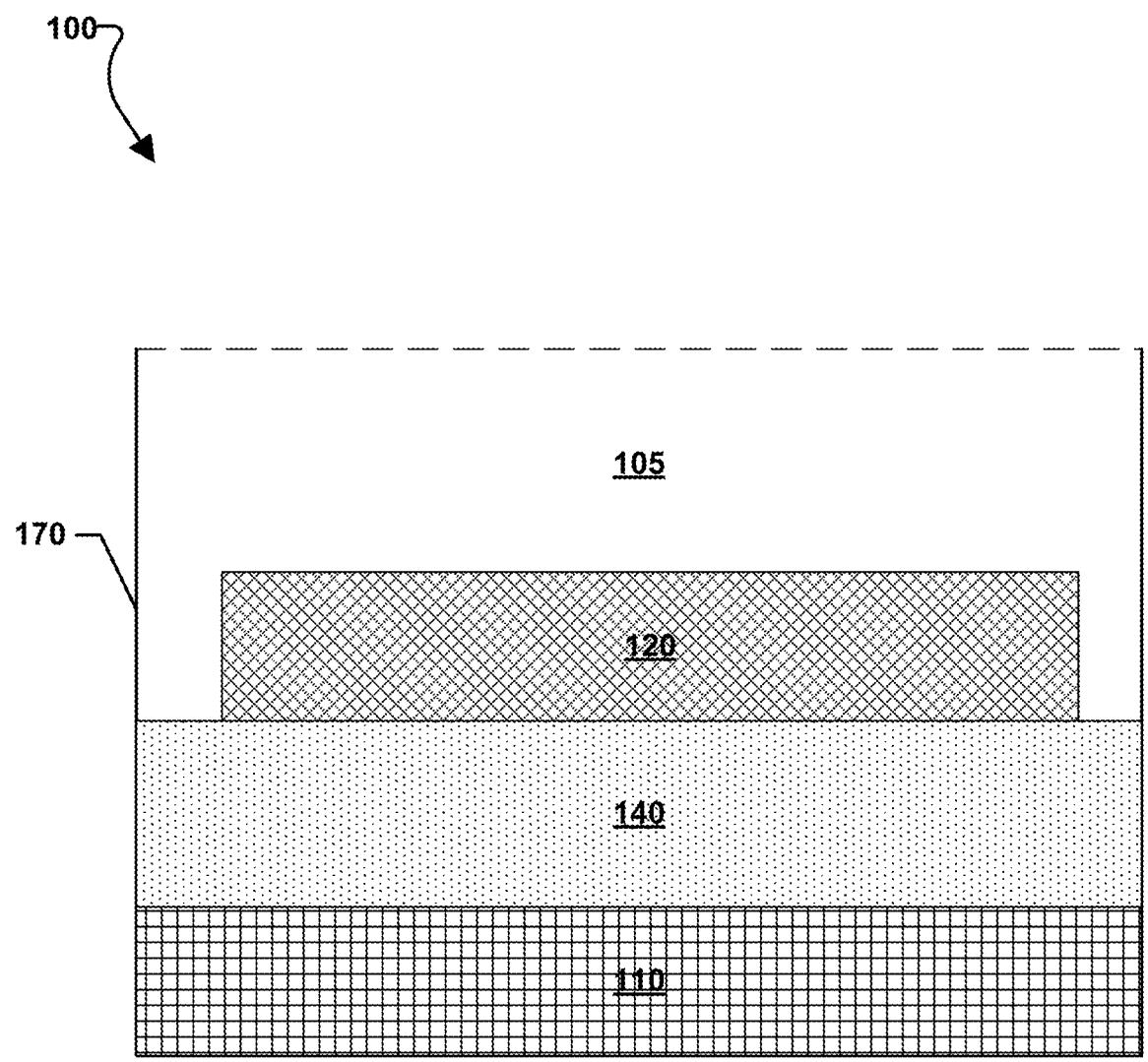
FIG. 1A illustrates a portion of an embodiment battery.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories may not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

Embodiments of the present invention include apparatus, systems, and methods for long-duration, and ultra-long-duration, low-cost, energy storage. Herein, "long duration" and/or "ultra-long duration" may refer to periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. In other words, "long duration" and/or "ultra-long duration" energy storage cells may refer to electrochemical cells that may be configured to store energy over time spans of days, weeks, or seasons. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements. Long duration energy storage systems may also be referred to as LODES.

FIG. 1A shows a portion of an embodiment battery 100, such as a metal air battery. The battery 100 (e.g., a metal air battery) includes a first negative electrode (commonly called the anode) 110, a first positive electrode 120 (commonly called the cathode), an electrolyte 140, and a housing 170.

In various embodiments, the electrolyte 140 is liquid. In various embodiments, the anode 110 is solid and the electrolyte 140 is excluded from the anode. In various other embodiments the anode 110 is porous and the electrolyte 140 is interspersed geometrically with the anode 110, creating a greater interfacial surface area for reaction. In various embodiments, the cathode 120 is porous and the electrolyte is interspersed geometrically with the anode 110, creating a greater interfacial surface area for reaction. In various embodiments, the cathode 120 is positioned at the interface of the electrolyte and a gaseous headspace 105. In various embodiments, the gaseous headspace is sealed in the housing 170. In various other embodiments, the housing 170 is unsealed and the gaseous headspace is an open system which can freely exchange mass with the environment.

The anode 110 may be formed from a metal or metal alloy, such as lithium (Li), sodium (Na), potassium (K), magnesium (Mg), calcium (Ca), silicon (Si), aluminum (Al), zinc (Zn), or iron (Fe); or alloys substantially comprised of one or more of the forgoing metallic elements, such as an aluminum alloy or iron alloy (e.g., FeAl, FeZn, FeMg, etc.) that can undergo an oxidation reaction for discharge. As such, the anode 110 may be referred to as the metal electrode herein. In certain embodiments, the battery is rechargeable and the metal electrode undergoes a reduction reaction when the battery is charged. The anode 110 may be a solid, including a dense or porous solid, or a mesh or foam, or a particle or collection of particles, or may be a slurry, ink, suspension, or paste deposited within the housing 170. In various embodiments, the anode 110 composition may be selected such that the anode 110 and the volume of liquid electrolyte 140 may not mix together. For example, the anode 110 may be a metal electrode that may be a bulk solid. As another example, the anode 110 may be a collection of particles, such as small or bulky particles, within a suspension that are not buoyant enough to escape the suspension into the electrolyte. As another example, the anode 110 may be formed from particles that are not buoyant in the electrolyte.

The cathode electrode (sometimes called an air electrode) 120 supports the reaction with oxygen on the positive electrode. The cathode 120 may be a so-called gas diffusion electrode (GDE) in which the cathode is a solid, and it sits at the interface of the gas headspace 105 and the electrolyte 140. During the discharge process, the cathode 120 supports the reduction of oxygen from the gaseous headspace 170, the so-called Oxygen Reduction Reaction (ORR). In certain embodiments, the battery 100 is rechargeable and the reverse reaction occurs, in which cathode 120 supports the evolution of oxygen from the battery, the so-called Oxygen Evolution Reaction (OER). The OER and ORR reactions are commonly known to those skilled in the art.

In certain embodiments the cathode 120 is a single electrode which supports only ORR and the battery is a primary (discharge-only) metal-air battery. In certain other embodiments the cathode 120 is a single electrode which supports both ORR (discharge reaction) and OER (charge reaction) and the metal-air battery is rechargeable (a secondary battery). The cathode 120 may be a single air electrode, a "bifunctional electrode," which operates in both OER and ORR mode, or it may be a combination of two electrodes, a "dual electrode," in which one electrode is configured to operate in OER mode and another electrode is configured to operate in ORR mode.

In various embodiments the electrolyte 140 is a liquid. In certain embodiments, the electrolyte 140 is an aqueous solution, a non-aqueous solution, or a combination thereof. In various embodiments the electrolyte 140 is an aqueous solution which may be acidic (low-pH), neutral (intermediate pH), or basic (high pH; also called alkaline or caustic). In certain embodiments the liquid electrolyte 140 may comprise an electropositive element, such as Li, K, Na, or combinations thereof. In some embodiments, the liquid electrolyte may be basic, namely with a pH greater than 7. In some embodiments the pH of the electrolyte is greater than 10, and in other embodiments, greater than 12. For example, the electrolyte 140 may comprise a 6M (mol/liter) concentration of potassium hydroxide (KOH). In certain embodiments, the electrolyte 140 may comprise a combination of ingredients such as 5.5M potassium hydroxide (KOH) and 0.5M lithium hydroxide (LiOH). In certain embodiments the electrolyte 140 may comprise a 6M (mol/liter) concentration of sodium hydroxide (NaOH). In certain embodiments the electrolyte 140 may comprise a 5M (mol/liter) concentration of sodium hydroxide (NaOH) and 1M potassium hydroxide (KOH).

In certain embodiments, the battery 100 (e.g., metal-air battery) discharges by reducing oxygen ($O_2$) typically sourced from air. This requires a triple-phase contact between gaseous oxygen, an electronically active conductor which supplies the electrons for the reduction reaction, and an electrolyte 140 which contains the product of the reduction step. For example, in certain embodiments involving an aqueous alkaline electrolyte, oxygen from air is reduced to hydroxide ions through the half-reaction $O_2+H_2O+4e^- \rightarrow 4OH^-$. Thus, oxygen delivery to metal-air cells requires gas handling and maintenance of triple-phase points. In certain embodiments, called "normal air-breathing" configurations, the cathode 120 is mechanically positioned at the gas-liquid interface to promote and maintain triple-phase boundaries. The cathode 120 may be positioned vertically or horizontally, or at any intermediate angle with respect to gravity, and maintain a "normal air-breathing" configuration. In these "normal air-breathing" configurations, the gas phase is at atmospheric pressure (i.e. it is unpressurized beyond the action of gravity).

Figure 1B:
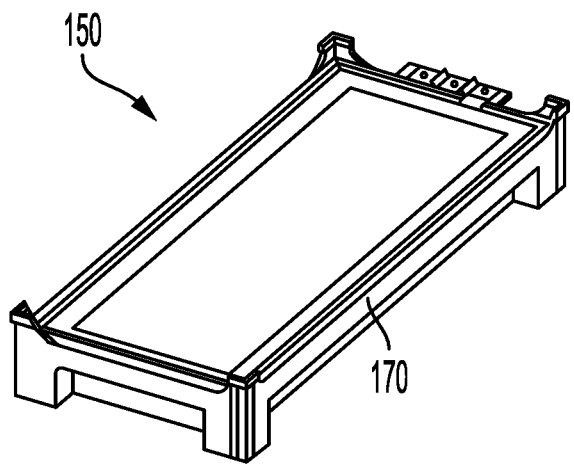
FIGS. 1B-1D illustrate a cell architecture, with a floating ORR electrode, in accordance with various embodiments.
Figure 1C:
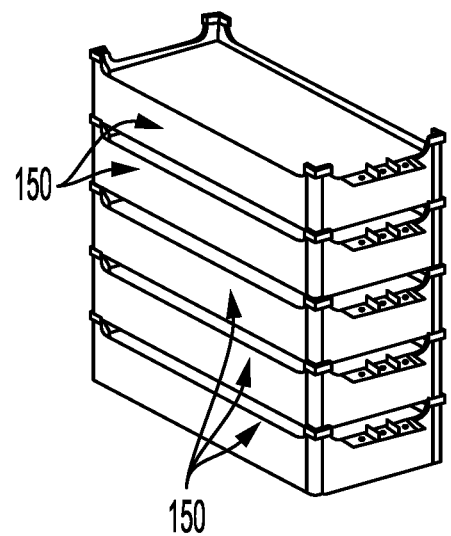
Figure 1D:
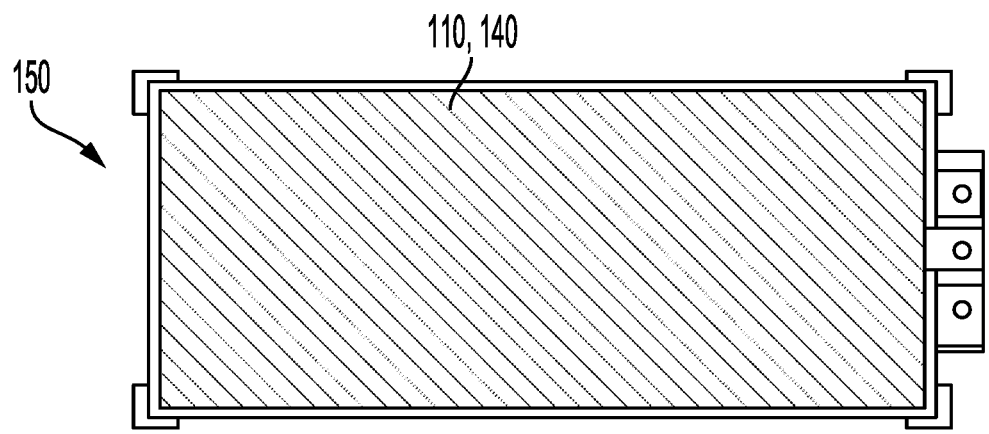

FIGS. 1B-1E and 2A-2B illustrate a cell architecture, with a floating ORR electrode on top, in accordance with various embodiments. As an example, the configuration of the architecture in FIGS. 1B-1D and 2A-2B may be components of a battery system incorporating one or more batteries 100 (such as a metal air-batteries) described with reference to FIG. 1A. In various embodiments, the battery 100 may be in a stackable vessel configuration as illustrated in FIGS. 1B, 1C, and 1D in which each battery 100 may be represent a stackable vessel 150 in which the housing 170 is configured to support other vessels 150 when stacked together. The self-stacking nature of the vessels 150 may provide a system architecture that increases plant power density (MW/acre). Stacking vessels may be designed with conductive contact points, allowing stacked cells to be in electrical contact and in series with each other. In one embodiment, the vessels are much wider and longer than they are tall, resulting in enhanced structural stability, reduced pressure gradient within the vessel, and increased surface area for thermal management. In other embodiments, the vessel may be roughly as tall as it is wide or long, resulting in the maximum volume for the vessel surface area, or may be much taller than it is wide or long, conserving floor space.

Figure 1E:
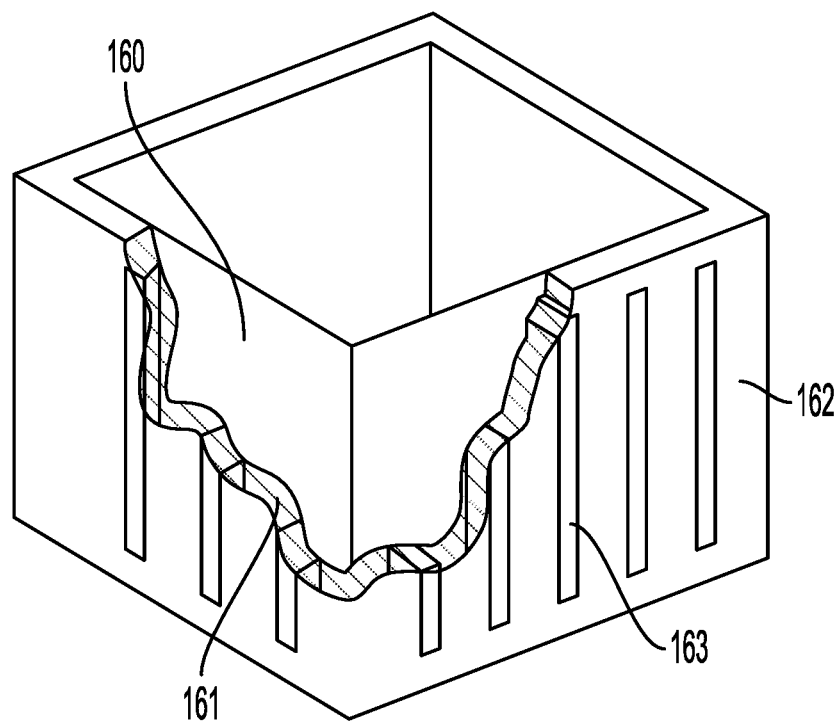
FIGS. 1E and 1F illustrate a vessel design which may be used with various cell architectures.
Figure 1F:
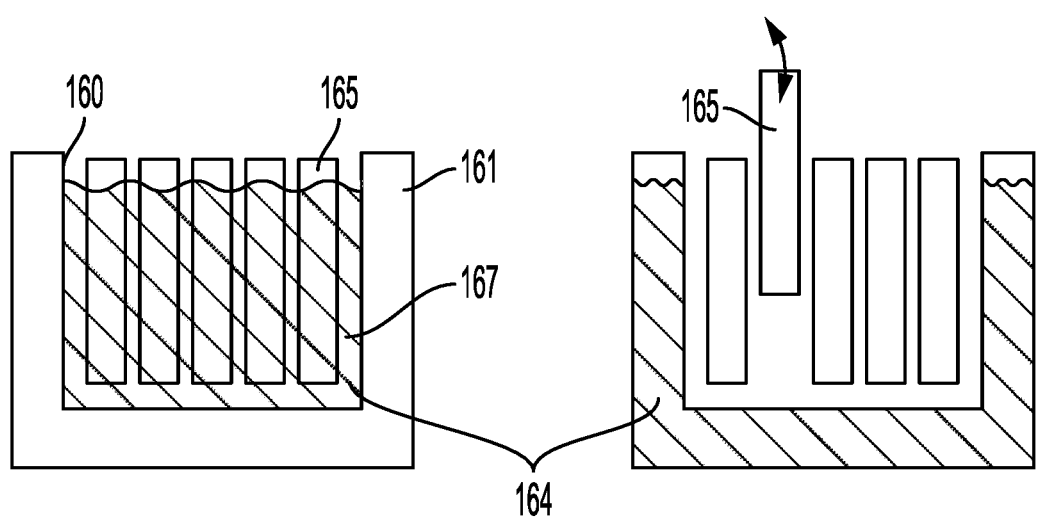

The vessel that contains battery components may fulfill multiple functions in a single economical part. The main function is to contain the electrolyte. The electrolyte is a hazardous liquid that needs a secondary containment to catch any leaks in case of a damage of the primary vessel. Other functions of the vessel can be conducting waste heat or thermally isolating the electro-chemical components, or electrically isolating the components. In some embodiments, the vessel may comprise a double-walled vessel, for example, a double-walled vessel formed through rotary molding. In one embodiment, an example of which is illustrated in FIGS. 1E and 1F, the inner wall 160 is the main cell vessel. FIG. 1E illustrates a perspective partial cut-away view of the main cell vessel and FIG. 1F illustrates a side-cut away view of the cell in operation on the left hand side of FIG. 1F with the components 165 inserted and in a maintenance mode in the right hand side of FIG. 1F with a component 165 being replaced. The outer wall 162 is separated from the inner wall 160 by a cavity 161. The outer wall 162 acts as a secondary containment for the inner vessel. The cavity 161 may also be used for other additional functions such as providing an additional air gap for electric isolation or thermal management of the cell components 165. The thermal management may be done by flowing a fluid such as air through the cavity 161. The inner wall 160 and outer wall 160 may be connected with ribs 163. These ribs 163 are formed in a way to provide an optimal fluid flow for thermal management. The overall material usage for the double walled vessel is lower than for a single walled vessel and additional secondary containment. If the cavity 161 is not used as a sole secondary containment, it may also be filled with a different fluid to provide other functions such as adding thermal mass by filling it with a liquid (e.g. water) or flowing a liquid through the cavity 161 for thermal management. Thirdly, the cavity 161 may also be used for maintenance purposes. If the electrolyte 164 has to be drained to maintain cell components 165, a reasonably sized cavity holds the electrolyte 164 from the cell while the components 165 are maintained. After the maintenance, the electrolyte 164 is pumped back into the main vessel 166. The advantage is that no extra storage capacity or piping have to be kept on site for maintenance purposes.

In some embodiments, the structural and containment functions of the vessel are fulfilled by different parts. In one embodiment, a strong bag to contain the electrolyte and cell contents sits in a structural vessel. The bag is strong enough to hold the pressure of the electrolyte, with a box strong enough to hold the weight of the bag. This 'bag in a box' vessel eliminates the need for a costly structural vessel. The box may also serve as a temporary secondary containment vessel, should the bag leak or break.

Figure 2A:
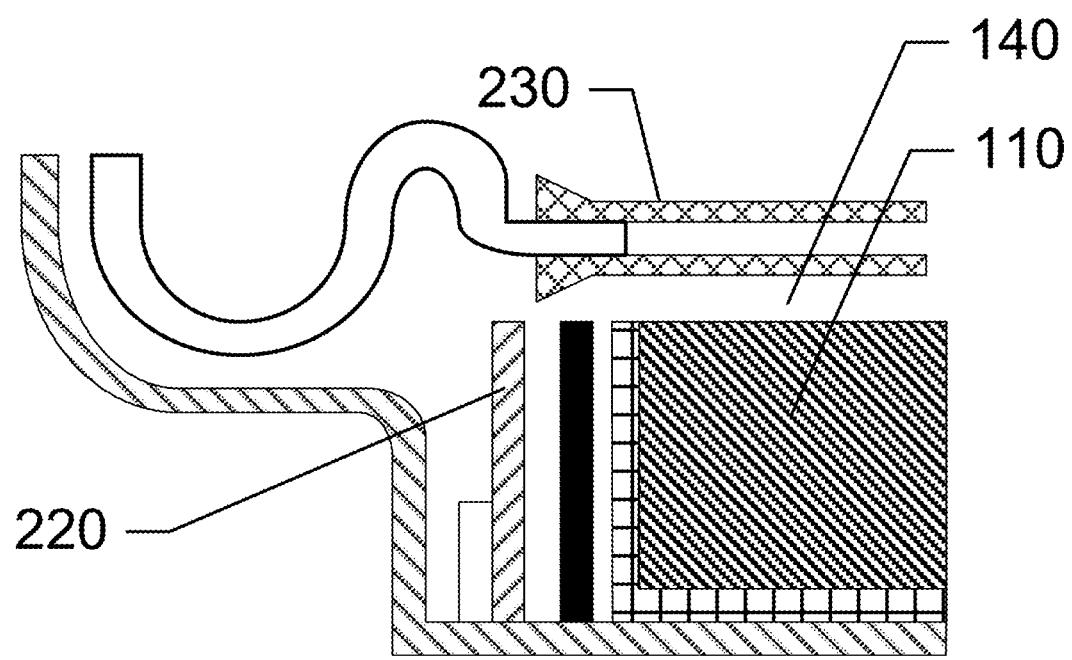
FIGS. 2A-2B illustrate a cell architecture, with a floating ORR electrode, in accordance with various embodiments.
Figure 2B:
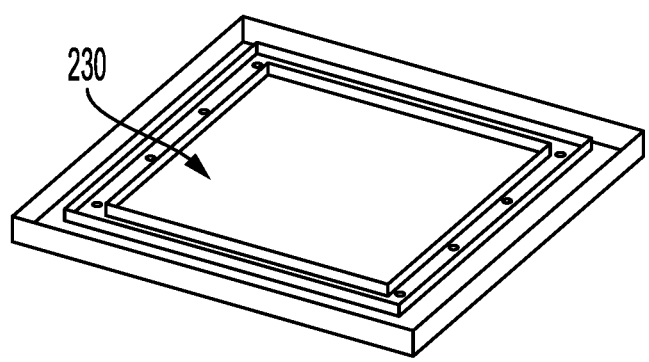
Figure 3:
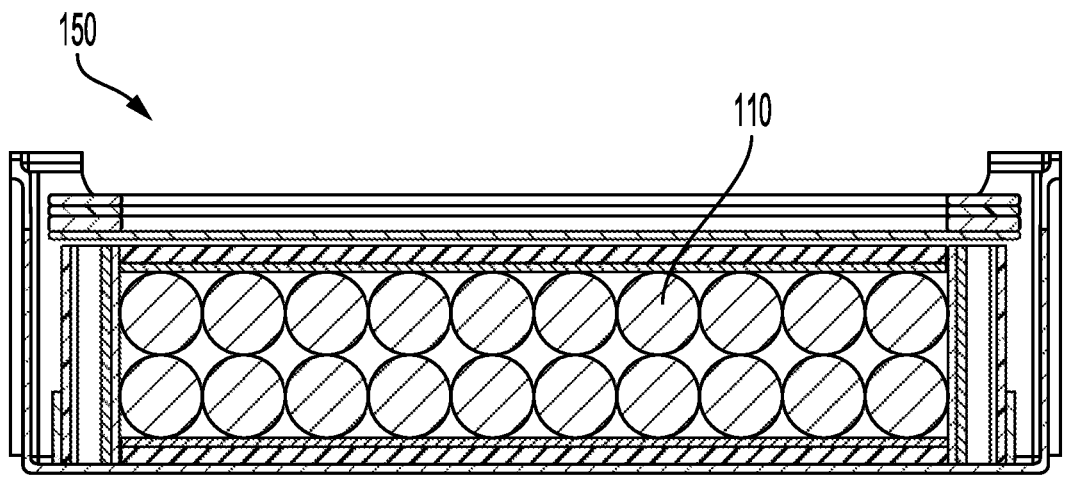
FIG. 3 illustrates additional details of the embodiment battery in FIGS. 2A-2B.

The electrolyte 140 and anode 110 may be supported in the vessel 150. As illustrated in FIG. 2A, in some embodiments, the battery 100 may be configured such that the cathode 120 is a dual electrode having an ORR electrode 230 that is air breathing floating on the electrolyte 140 above the anode 110 and an OER electrode 220 submerged in the electrolyte 140. FIG. 2B illustrates another view of the floating ORR electrode 230. FIG. 3 illustrates a cross-section side view of the vessel 150. As illustrated in FIG. 3, the anode may be a packed bed of pellets (or marbles), for example formed of iron, such as direct reduced iron (DRI).

Figure 4A:
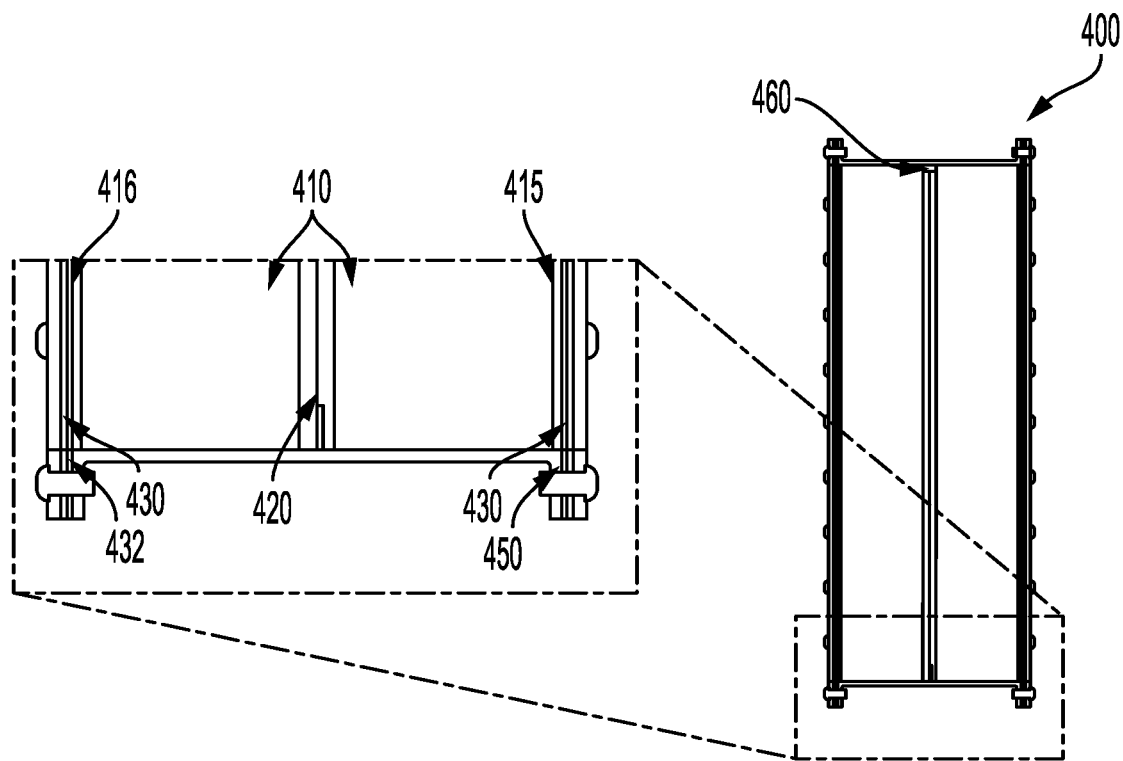
FIGS. 4A-4C illustrate an alternative cell architecture with a vertical ORR electrode in accordance with various embodiments.

FIG. 4A illustrates an alternative cell architecture with a vertical ORR for "natural air breathing," in accordance with various embodiments. The vessel 400 illustrated in FIG. 4A may be similar to the vessels described with reference to FIGS. 1B-2B except that the vessel 400 may have two anode beds 410 (e.g., two anode beds of DRI marbles). The OER cathode 420 and a current collector may be disposed between the beds 410. The vessel may include inter-electrode separators 416 (e.g., ORR-anode, anode-OER), an anode containment and current collector structure 415, face seals 450 (e.g., an EPDM gasket), two ORR cathodes 430, an ORR current collector 432, and electrolyte plumbing and gas venting passages 460. In certain embodiments, the inter-electrode separator may block dissolved oxygen gas or oxygen gas bubbles from reaching the anode, without substantial increase to the resistance of the electrochemical cell. In certain embodiments, an oxygen blocking separator may maintain suitable hydrophilicity and macro-porosity as to not impede ion transport between anode and air electrode. In additional embodiments, the ORR electrode may include a hydrophobic layer with embedded conductive carbon particles, which may introduce electrical conductivity to the gas diffusion layer of the ORR electrode. In such an embodiment, tab-shaped current collectors may be placed on both sides of the ORR electrode to conduct electrons out of the reactor, which may reduce cell resistances.

Figure 4B:
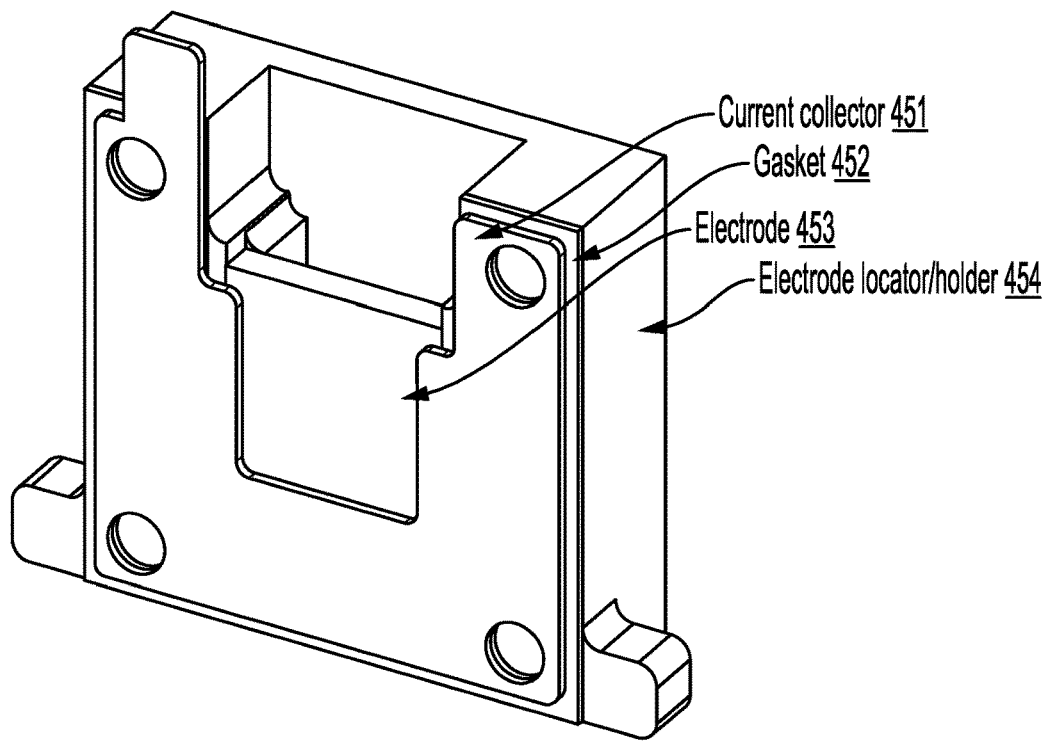
Figure 4C:
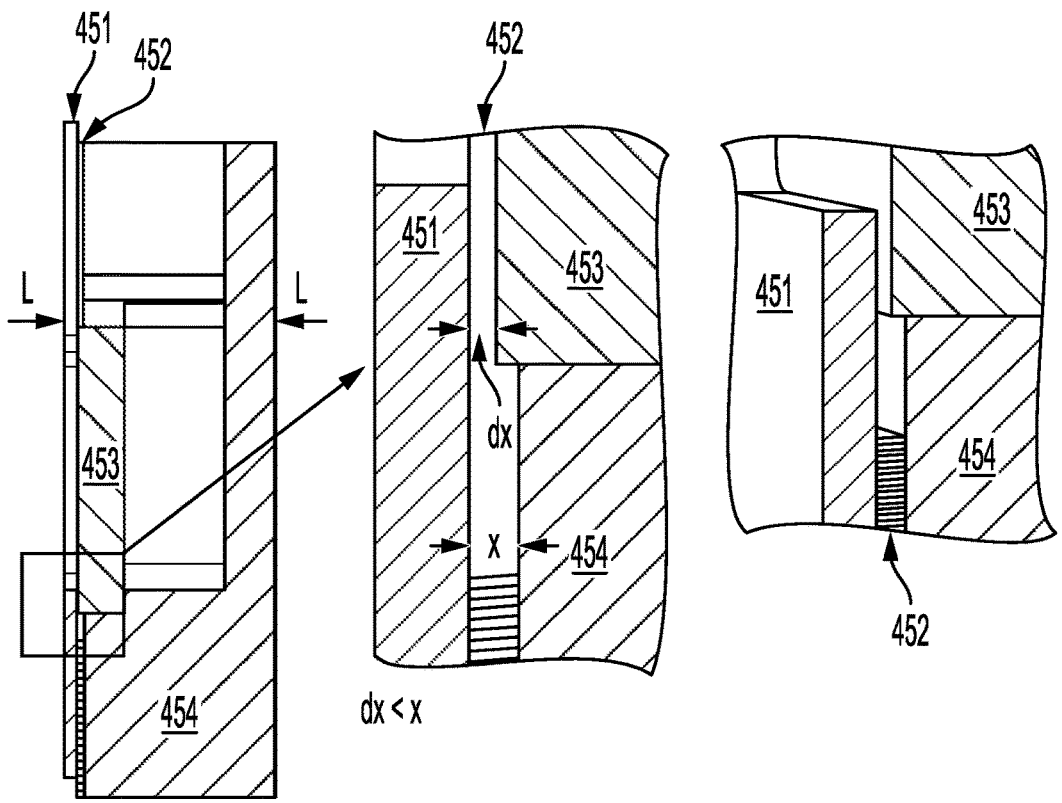

In some embodiments, ORR electrodes may be sealed against a chamber of electrolyte (e.g., 6 M KOH) by sandwiching a compliant rubber gasket 452 (e.g., EPDM) between a rigid electrode 453 and current collector 451 (e.g., Ni-coated steel), for example as illustrated in FIG. 4B. In such an embodiment a compressive force may be applied to the assembly 454, compressing and deforming the gasket 452 to create both a seal and an electrical connection between the electrode 453 and current collector 451. The gasket 452 deforms by a distance (dx) under a compressive load (L), creating a compressive seal and bringing the current collector 451 into contact with the electrode 453 as illustrated in FIG. 4C which shows three cut away views of portions of the ORR electrode. Additional compressive force improves the contact of the current collector 451 to the electrode 453, which may reduce contact resistances emerging in the electrochemical cell.

Figure 5A:
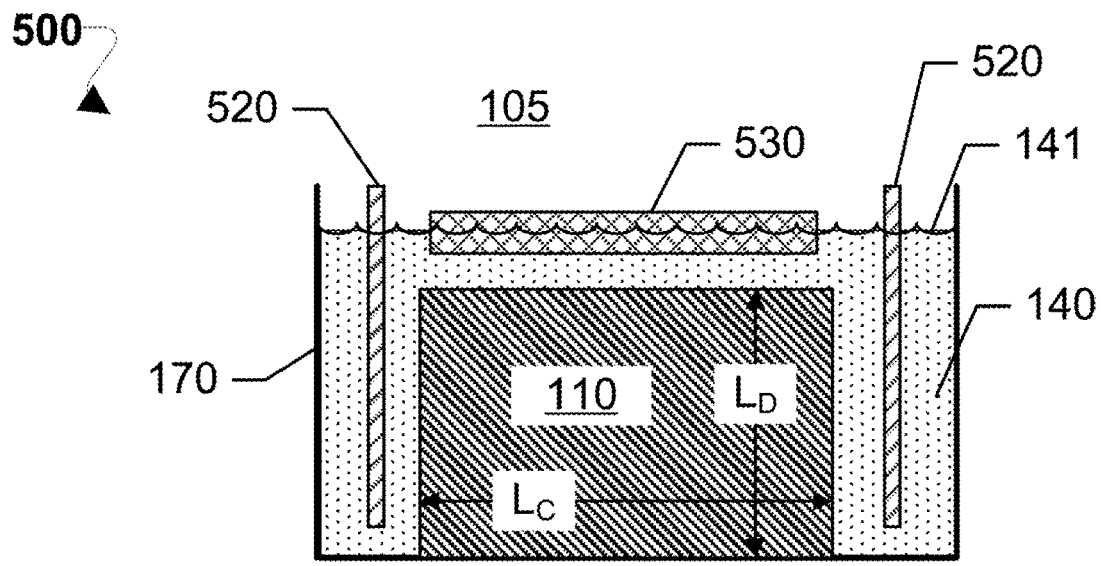
FIG. 5A illustrates a cross-sectional side view of a battery and FIG. 5B illustrates an alternate configuration, in accordance with various embodiments.
Figure 5B:
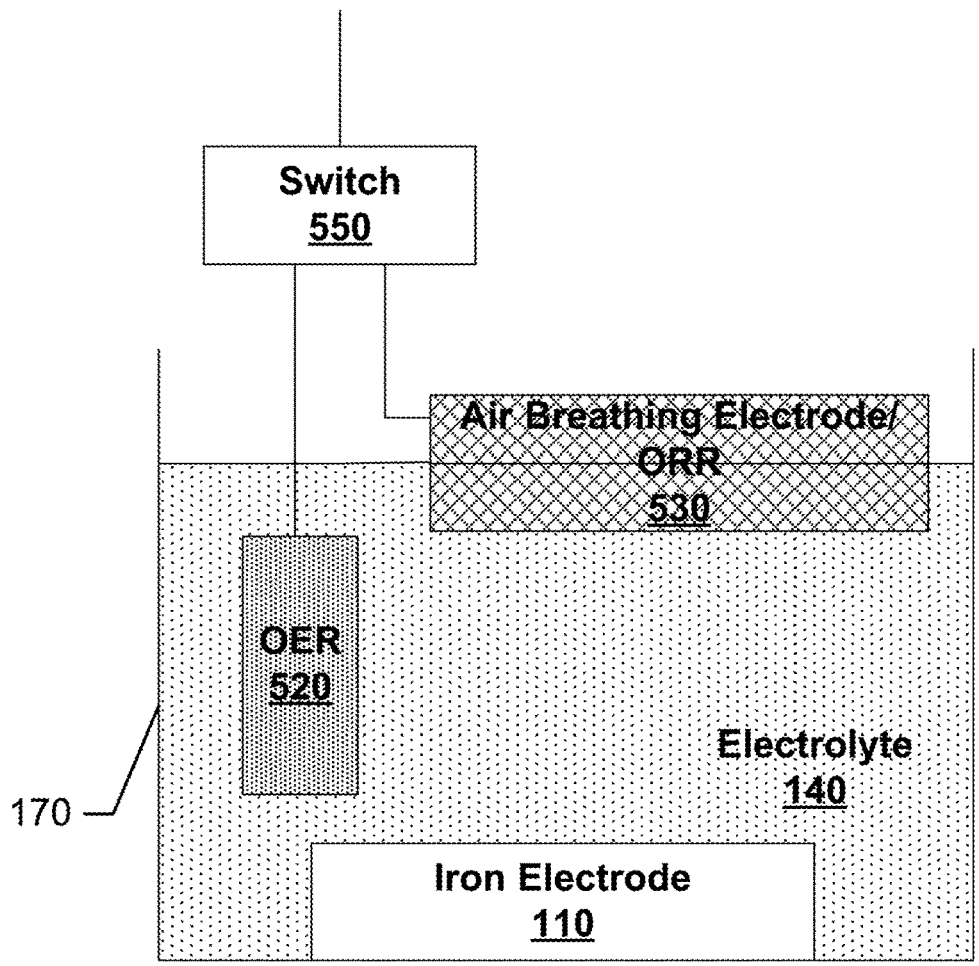

FIG. 5A illustrates a cross-sectional side view of a battery 500, in accordance with various embodiments. The battery 500 may be similar to battery 100 described above. The battery 500 may be a dual cathode battery including mechanically distinct charge and discharge cathodes, i.e., a pair of OER electrodes 520 and an ORR electrode 530. The dual cathode design may enable separation of length scales for charge and discharge. FIG. 5B illustrates an alternate configuration in which the electrodes 520, 530 are separated from one another. Referring to FIGS. 5A and 5B, the OER and ORR electrodes do not need to be co-located to one another or in electrical connection. The OER and ORR electrodes can be electrically separated by a toggle switch 550 if necessary. Separating the OER electrode electrically from the ORR electrode will prevent the ORR electrode from being exposed to high operating potentials that may damage or oxidize the ORR electrode. In such an embodiment, the OER and ORR electrodes may be comprised of different materials, which are separately optimized for the OER or ORR, respectively. The geometries of each electrode may be tailored independently to optimize the performance and cost of the OER and ORR electrodes separately. The OER and ORR electrodes do not need to embody the same physical dimensions or microstructure. The OER electrodes 520 may submerge into the electrolyte 140 extending down a length of the anode 110. The OER electrode can be immersed in the electrolyte to maximize the interfacial contact area between the OER electrode and the electrolyte. The ORR electrode 530 may float and/or be suspended at the liquid line 141 of the electrolyte 140. The ORR electrode can be positioned at a gas/liquid interface to maximize the length of triple phase boundaries (gas-solid-electrolyte boundaries) inside the electrode material. Anode 110 thickness may be bounded by the ionic or electronic and/or electrochemical kinetics. For the ionic/electronic transport limit case, Lc (L charge) may be the anode length scale normal to the OER electrodes 520 and Ld (L discharge) may be the anode length scale normal to the ORR electrode 530. Lc and Ld need not be equal. For a symmetric charge/discharge duration (at a constant $mA/cm^2$) Lc may be equal to two times Ld.

The length scales (e.g. thicknesses) of battery electrodes are determined by transport properties of the electrode (e.g. electrical conductivity, ionic conductivity), structural properties (active material volume loading, porosity, tortuosity) and operating conditions (current density, temperature, air flow rate) and are optimized to meet certain cost/performance/lifetime conditions. In certain embodiments the OER and ORR cathodes are configured to be parallel. In these cases, there is one characteristic length scale (thickness) of the electrode. A second example architecture with vertical ORR and OER electrodes embodies this kind of design. The other two length scales of the anode are determined by other considerations such as vessel size, current collection costs, heat generation, etc.

In certain other embodiments, the OER and ORR cathodes are non-parallel, or even perpendicular. In these configurations, there are two independently determined length scales. The length scale for the discharge direction is determined by the duration of discharge, while the length scale for the charge direction is determined by the duration of charge. This enables the manufacture of a metal-air battery with independently tunable charge and discharge durations by tuning the thickness of the electrode in two independent dimensions. For example, with parallel OER and ORR electrodes, with KOH electrolyte and a 300 h duration, the anode may be about 3-5 cm thick; the other two dimensions are unconstrained. With perpendicular OER and ORR electrodes, the anode may be about 3-5 cm in the direction perpendicular to the ORR electrode and about 10 cm in the dimension between the OER electrodes; the third dimension is unconstrained. This is called a "symmetric duration" configuration. In certain other embodiments, the device is designed to make the charge and discharge durations unequal; this is called an "asymmetric duration" configuration. As an example, the device may be configured such that the anode has a square cross-section of 5 cm×5 cm. In this configuration, the device has a charge duration which is, for example about 100 h while the discharge duration is about 300 h. Many other example configurations are possible for independently tunable charge and discharge durations.

In certain other embodiments, the gas phase is pressurized to support an increase in the oxygen partial pressure ($pO_2$) which provides a greater driving force for the discharge reaction. In certain other embodiments the pressure is adjustable such that the $pO_2$ may be increased for discharge and decreased for charge, thereby maximizing always the thermodynamic driving force for the desired reaction. In certain embodiments the $pO_2$ on discharging may be between 0.01 atm and 100 atm. In certain embodiments the $pO_2$ upon charging may be between 0.001 and 100 atm.

While "normal air-breathing" configurations are mechanically simple, they suffer from several disadvantages. Most specifically, because a metal-air system must be open with respect to gas mass transport, they are prone to electrolyte dry-out. As electrolyte evaporates from a cell, the liquid level moves, challenging the ability to maintain a stable triple-phase-boundary in the air cathode. Thus "normal air-breathing" designs provide a challenge for system stability. Furthermore, air electrodes with hydrophobic coatings are only able to tolerate limited pressure differentials across them before "breakthrough pressure" causes leaks across the coating. In configurations with a vertical or nearly-vertical air electrode, the gravitational hydraulic pressure head may be significant, creating a large driving force for liquid migration through the air electrode, resulting in flooding of the air electrode. Additionally, in embodiments that are secondary batteries, the oxygen evolution reaction (OER) process generates oxygen bubbles which may be trapped between the air electrode and the liquid electrolyte, drying the electrode and eliminating the triple-phase-point. Thus, the positioning of an air electrode at the air-electrolyte interface is critical, but keeping one side of a thin electrode wet and one side dry is challenging.

Figure 6:
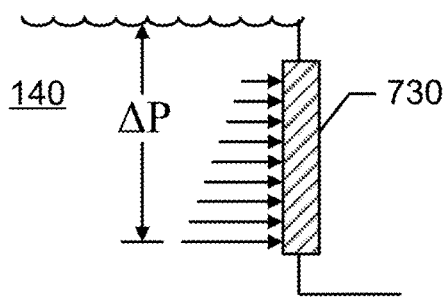
FIG. 6 illustrates a battery including a vertical ORR electrode, in accordance with various embodiments.
Figure 7A:
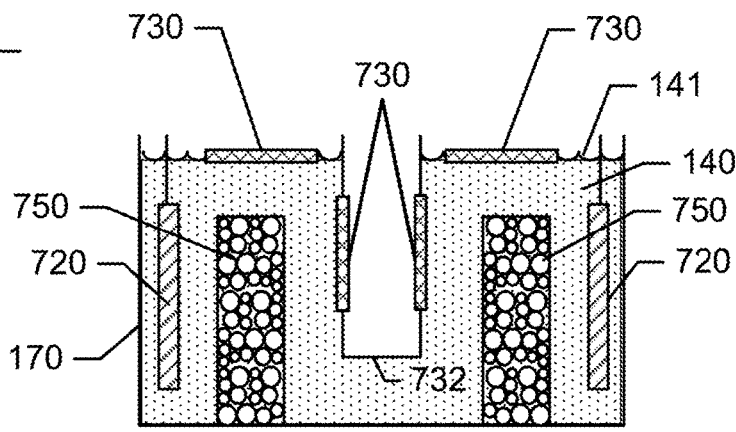
FIGS. 7A and 7B illustrate a battery including a vertical ORR electrode, in accordance with various embodiments.
Figure 7B:
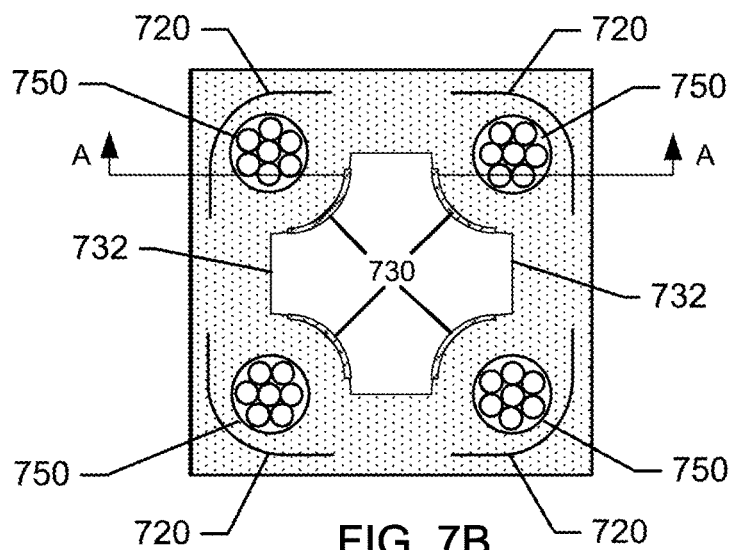

FIGS. 6, 7A, and 7B illustrate a dual cathode battery including a vertical ORR electrode 730, in accordance with various embodiments. In particular, an air-breathing cathode may be placed on top of electrolyte 140, but if more is needed to access more deeply submerged iron anode 750, the cathode may be placed vertically as long as the hydrophobic layer can withstand the pressure of the electrolyte 140. As illustrated in FIGS. 6-7B, the ORR electrode 730 is placed vertically in a concave electrode structure 732, and therefore still has access to the ambient air above the electrolyte 140. The anode in the battery of FIGS. 7A and 7B may be a stack 750, such as a stack 750 of DRI marbles and the OER electrodes 720 may be submerged in the electrolyte 140. FIG. 6 illustrates a close up view of one ORR electrode 730, FIG. 7A is a cross-sectional view at line A, and FIG. 7B is an overhead view.

Figure 8:
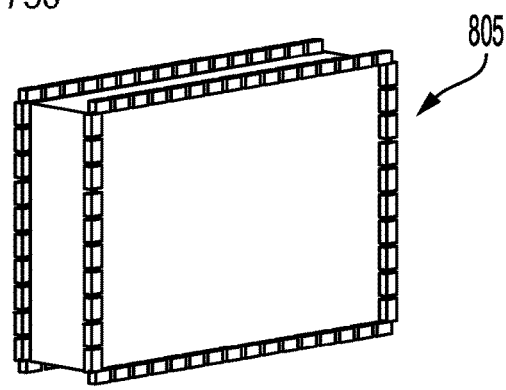
FIGS. 8 and 9B illustrate vertical and horizontal architectures, respectively, in accordance with various embodiments.
Figure 9A:
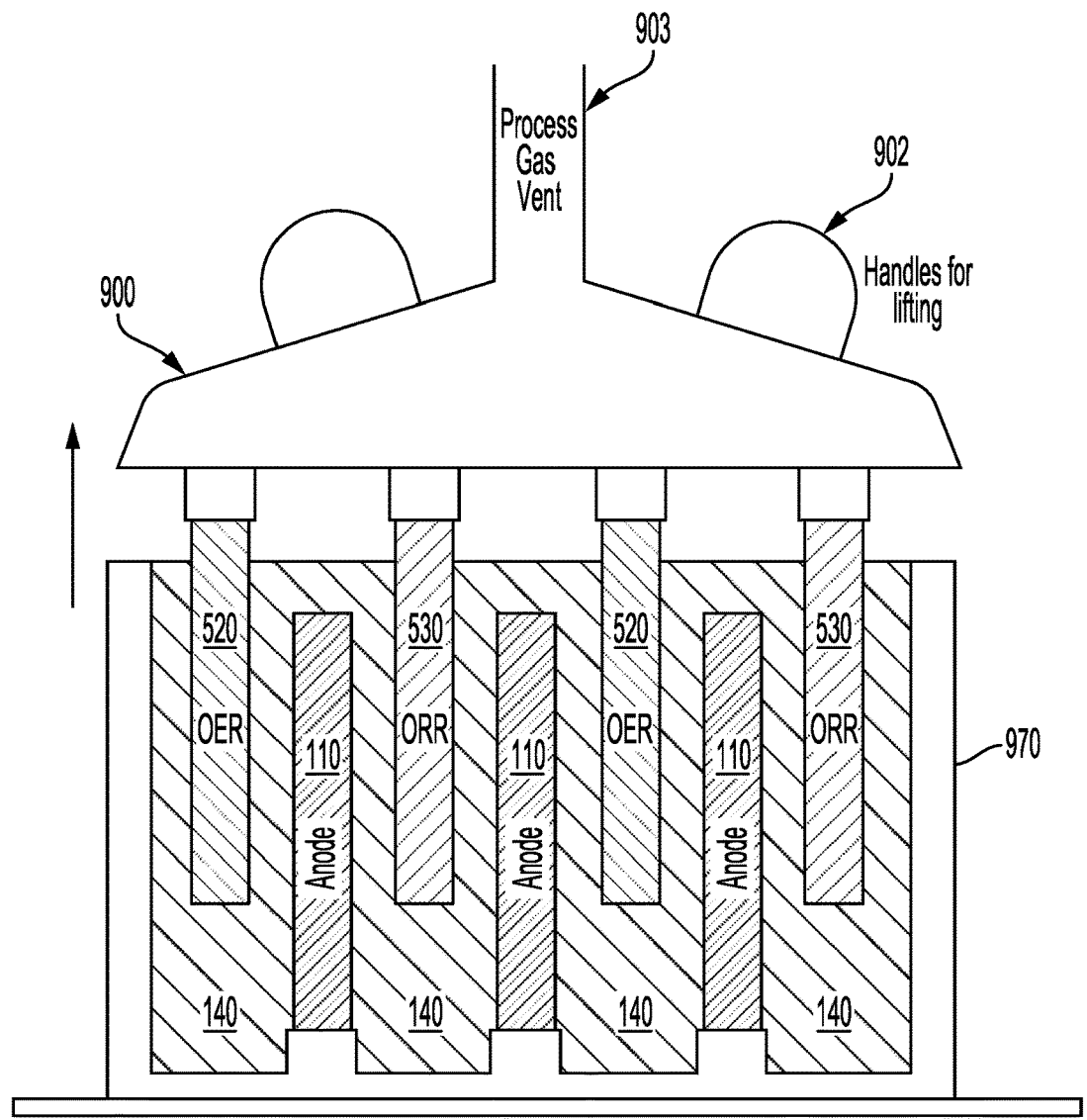
FIG. 9A illustrates an embodiment lid system for a vessel.
Figure 9B:
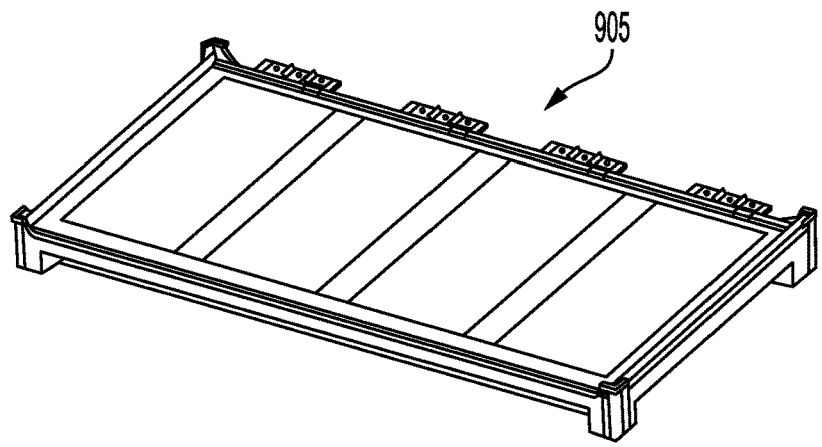

FIGS. 8 and 9B illustrate vertical 805 and horizontal 905 architectures, respectively, in accordance with various embodiments. Vertical 805 arrangements may support bubble release, reduce the risk of ORR dry out, enable ORR flooding, and may enable relatively taller cells. Vertical 805 arrangements may face challenges related to pressure-based pinhole leaks, force-based breakthrough leaks, face seals or other edge seals being needed, needing a drain to service, and many seal interfaces being present. Horizontal 905 arrangements may enable using a low number of (or no) seals, require little to no pressure withholding for the ORR electrode, and enable top-off servicing. Horizontal 905 arrangements may act as a bubble trap, may face ORR dry out or ORR flooding issues, and may require cell-to-cell stacking.

Battery systems which are comprised of a number of cells connected in series and/or parallel in a shared electrolyte bath 140, and contained in a vessel 970, an example of which is illustrated in FIG. 9A, will require several auxiliary support systems and will need to be electrically connected in series and/or parallel with neighboring devices of similar construction. This cell containing vessel 970 may also need to be protected from the external environment. The cost of installing and commissioning these devices may be required to be low to support system level economics. One solution embodiment is a multi-functional lid 902, which performs all relevant support system functions while also making DC electrical connections to neighboring reactors, and environmentally protecting the vessel 970 contents. The vessel 970 may be a simple electrolyte 140 and cell container, while the lid 902 holds more complexity as required. The functions performed by the lid 902 and the apparatus contained within the lid 902 may include air distribution, process gas venting via a vent 903, thermal management, current collection, reactor controls & sensing, and DC electrical connections. The lid may include handles 902 for lifting the lid off the vessel 970.

In an embodiment with a vertical architecture, easy access to electrodes, for instance, for servicing, may be provided by the following apparatus. A lid 900 that covers the electrolyte 140, and may perform other electrical and mechanical functions, may additionally be used for electrode support. The positive electrode assemblies, such as OER 520 or ORR 530 electrode assemblies, may hang freely or rigidly from a rack attached to the lid 900. Freely hanging electrodes allow gravity to maintain vertical alignment and hold electrode assemblies in tension rather than compression, which may be favorable for mechanical design. The electrode assemblies may be slid into slots, for instance, T-shaped slots, or hung on a rack similarly to the operation of a common filing cabinet rack. The negative electrodes may be mounted to the vessel 970, as opposed to the lid 900, in order to maintain immersion of the electrodes in electrolyte and prohibit contact with the air when the lid 900 and attached positive electrodes are lifted and removed from the vessel 970, for instance, to facilitate servicing of the positive electrode subassemblies. When the lid 900 is lifted off the vessel 970, the positive electrode assemblies are attached and individual electrode assemblies can be more easily replaced or removed for individual maintenance. This design may have the additional benefits of allowing for more electrolyte 140 flow at the bottom and sides of the reactor, for instance, to mitigate the effects of mismatched constants of thermal expansion in the materials; limiting the effects of thermal cycling on the materials; and creating a channel for continuous directional flow of electrolyte through the reactor.

A floating air electrode assembly, with tunable electrode height relative to the free liquid interface, with variable angle of the air electrode with respect to gravity, can provide a consistent gas-liquid interface requiring only slight hydrophobicity and promotes bubble flow off the electrode surface. This floating air electrode assembly naturally self-locates at the liquid-gas interface and may move to accommodate changes in electrolyte height due to evaporation, etc. This ability to accommodate changing electrolyte heights makes this device resistant to flooding and dry-out issues, maintaining the needed triple-phase point. To do this, the ORR electrode may float or be buoyant, such that it always aligns itself with the free interface and maintains the triple phase boundary. In one embodiment, the ORR electrode may use a low-density material or "float" to make it buoyant. In another embodiment, the ORR electrode or ORR electrode housing may displace electrolyte for air, using the same principle for buoyancy as a boat.

In certain embodiments, evaporation of the electrolyte from the electrochemical cell to the surrounding environment may be reduced by covering the surface of the electrolyte with inert plastic spheres. In such an embodiment, the inert plastic spheres may be comprised of a polymer, such as polypropylene or HDPE. In certain embodiments, the spheres may be solid, porous, or hollow, such that the effective density of the sphere is less than that of the electrolyte, which may enable the spheres to float on top of the electrolyte. In another embodiment, the inert spheres may reduce the rate of alkaline misting from the electrolyte to the surrounding environment.

Figure 10A:
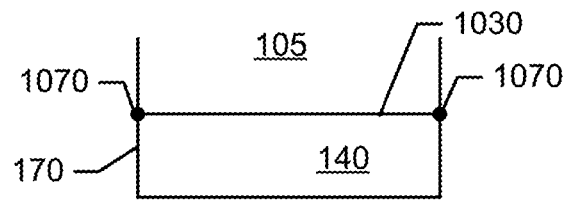
FIGS. 10A-10C illustrate flat, rippled, and wavy ORR electrode architectures, respectively, in accordance with various embodiments.
Figure 10B:
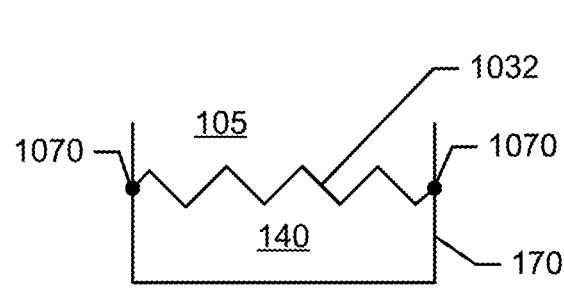
Figure 10C:
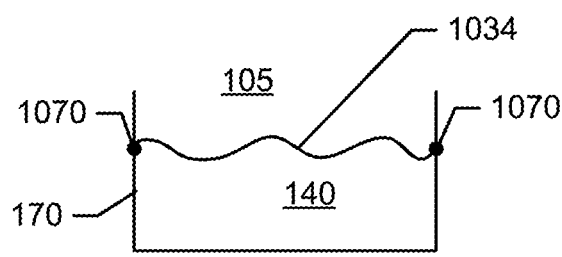

FIGS. 10A-10C illustrate flat 1030, rippled 1032, and wavy 1034 ORR electrode architectures, respectively, in accordance with various embodiments. Each of FIGS. 10A-10C illustrate the different geometry ORR electrodes 1030, 1032, 1034 attached to the housing 170 by seals 1070. To maximize the packing density and energy density of the system, the air-breathing electrode may be mechanically rippled 1034 or folded 1032 to increase the area of triple-phase boundaries, while retaining a natural air-breathing architecture. In such embodiments, the ORR electrode 1032, 1034 must be able to withstand a minor hydraulic pressure head (relative to a vertical orientation), but many of the benefits of a vertical ORR electrode (bubble tolerance) are retained. The electrodes 1030, 1032, and 1034 may have the same foot-print (i.e., straight line length from seal 1070 to seal 1070), but electrodes 1032 and 1034 may have greater surface area in contact with the electrolyte 140 than electrode 1030. The different path lengths of the electrodes 1032 and 1034 may result in more triple phase boundary points for the electrodes 1032 and 1034 than electrode 1030.

Flooding of the ORR electrode reduces oxygen access leading to lower efficiency operation. A self-bailing system may be designed for horizontal air-breathing ORR electrodes, to let the electrolyte or water build-up be passively removed from the air-breathing surface.

In some system configurations, the air-breathing ORR electrode may float on the surface of the electrolyte to maintain the triple phase boundary. The electrode will need to self-locate at the free liquid surface which will prove to be difficult for current collection. In some embodiments, springs and/or other shapes of current collecting materials may provide current and mobility to the electrode.

In certain embodiments, the housing 170 is made from a polymer such as polyethylene, high-density polyethylene (HDPE), ultra-high molecular weight polyethylene (UHMW), polypropylene, or other polymers. In certain other embodiments the housing 170 is made from a metal such as nickel, steel, anodized aluminum, nickel coated steel, nickel coated aluminum or other metal. In certain embodiments, when the housing is made from a metal, the negative electrode is placed in electrical communication with the housing, making a so-called "can-negative" design. In certain embodiments, metallic housings or portions of housings allow for electrical continuity between stacked cells, making for gravity-driven series or parallel connections.

Figure 11:
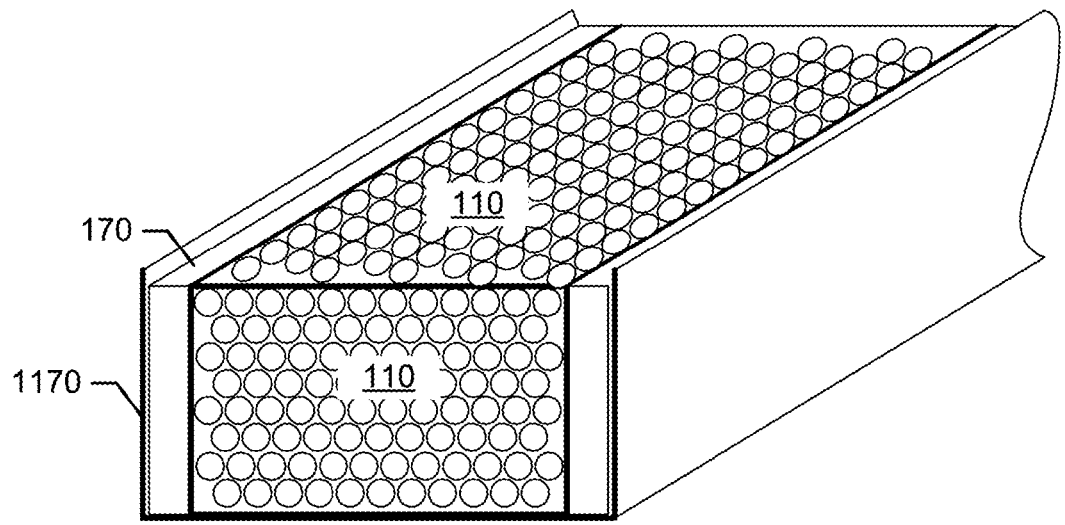
FIG. 11 illustrates a battery with the can-negative and a trough, in accordance with various embodiments.

FIG. 11 illustrates a battery with the can-negative and a trough, in accordance with various embodiments. In certain configurations of this embodiment, the housing 170 may act as a current collector for the anode 110. This metal is sufficiently stiff to contain the entirety of the active materials within the cell, and is thick enough to conduct current with low resistive losses, but is kept thin enough to keep costs reasonable. Sufficient insulation 1170 may be needed on the outside of this cell for safety reasons, but externally-conductive surfaces may allow for electrical contact between cells.

In a system with two air electrodes instead of one bifunctional air electrode, each air electrode may be optimized independent of the other to get the best performance, including but not limited to the material and embodiment of each. For example, to optimize the embodiment of each the OER and ORR electrodes, the size of each electrode may be determined based on comparing performance and cost for each independent of the other. The two cathodes do not have to be co-located or adjacent to one another. In certain embodiments, the OER electrode (charge cathode) is fully immersed in the liquid electrolyte to maximize the interfacial area for reaction, while the ORR electrode is positioned along the gas-liquid interface to maximize the amount of triple phase boundary. The two cathodes may be electrically connected at all times, electrically isolated at all times, or connected through a switching device to allow for dynamic adjustment to the electrical configuration.

In certain embodiments, there may be multiple cells contained in a single housing, which may be ionically isolated from one another by a dividing wall which may be electrically insulating.

Figure 12A:
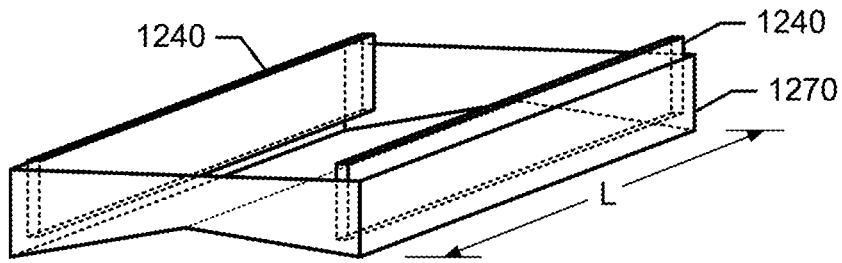
FIGS. 12A-12F illustrate dished-cell architecture for providing mechanical integrity, in accordance with various embodiments.
Figure 12B:
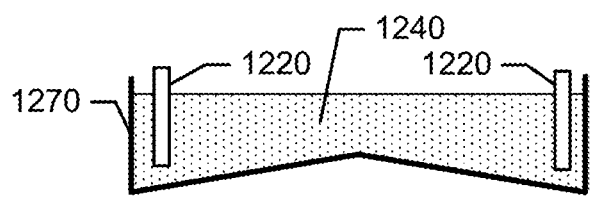
Figure 12C:
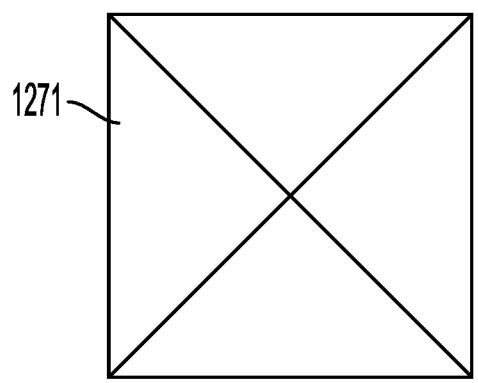
Figure 12E:
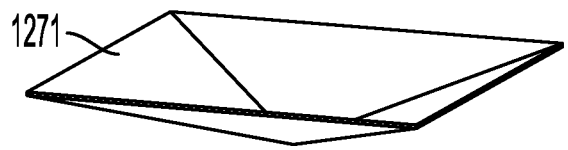
Figure 12D:
Figure 12F:
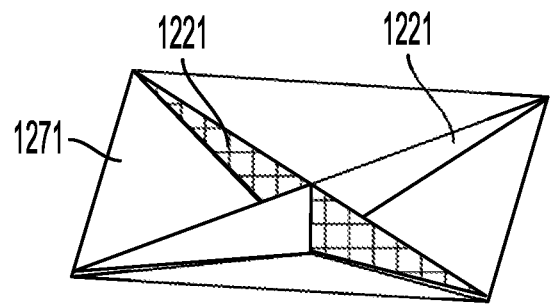

In various embodiments, the container is lengthened in one dimension, similar to a trough or gutter. In certain embodiments the bottom surface is dished to provide additional mechanical integrity. FIGS. 12A-12F illustrate dished-cell architecture for providing mechanical integrity, in accordance with various embodiments. FIGS. 12A and 12B illustrate perspective and front views, respectively, of a container 1270 lengthened in one-dimension L to form a trough with an inverse-vee shaped cross-section viewed from the front view (i.e., FIG. 12B). The container 1270 may hold a liquid electrolyte 1240 with OER electrodes 1220 submerged or partially submerged therein. FIGS. 12C-12E illustrate top, side, and perspective views, respectively, of a vee shaped container 1271. FIG. 12F illustrates a perspective view of the vee shaped container 1271 of FIG. 12C-12E with OER electrodes 1221 extending vertically along the creases (i.e., bends) of the container.

Figure 13:
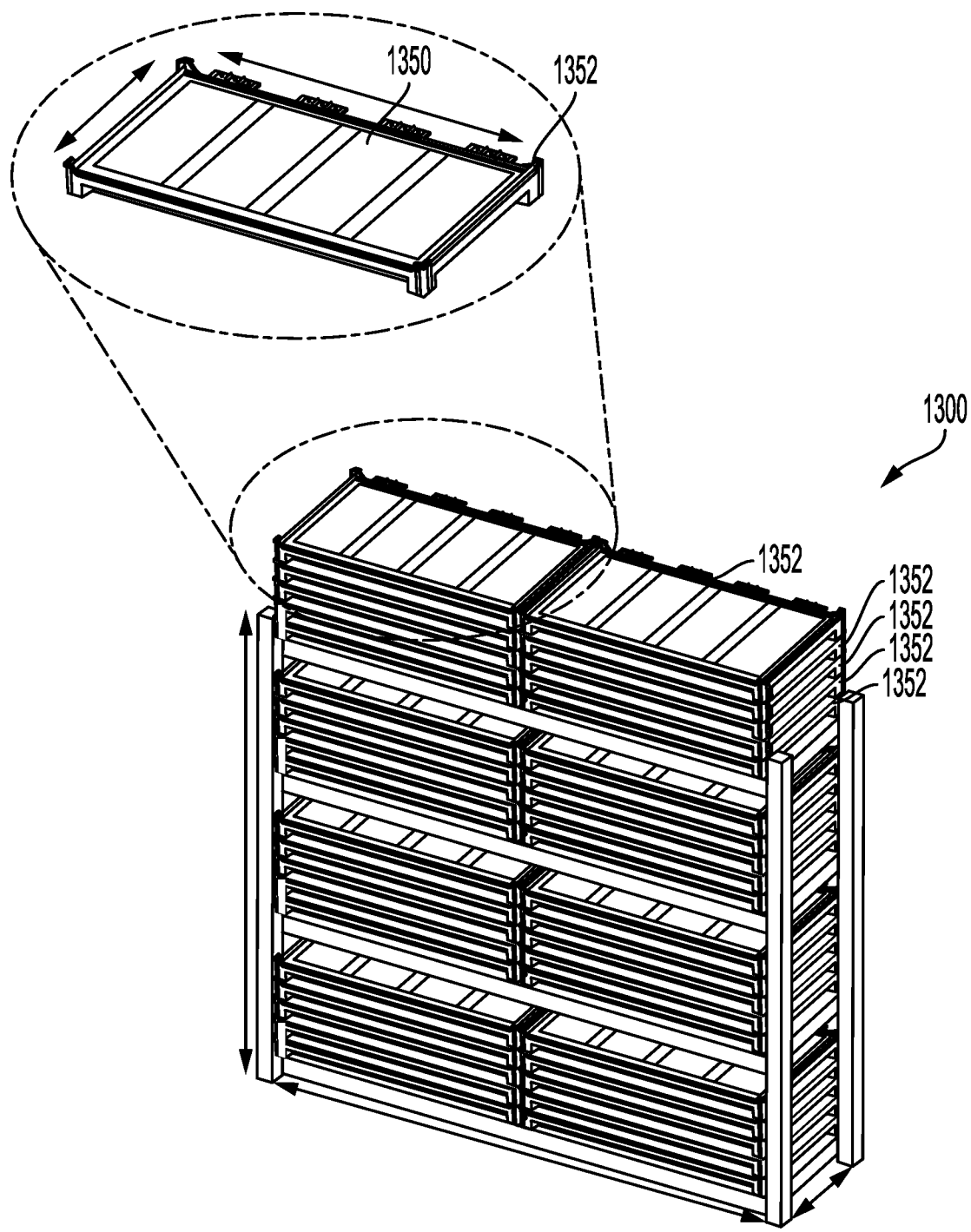
FIG. 13 illustrates a stackable architecture in accordance with various embodiments.

FIG. 13 illustrates a stackable architecture in accordance with various embodiments. In certain embodiments there are multiple cells 1350 contained in a single housing 1352, which are ionically isolated from one another by a dividing wall which is electrically insulating. Each cell 1350 may be designed with an ORR electrode on top, and OER electrode around the edges (like a bed skirt) but there are multiple cells 1350 per container/housing 1352. The cells 1350 inside may be all connected ionically (permeating electrolyte) or may be hydraulically/ionically separated. The housings 1352 may be stacked on one another to form a module 1300. For example, FIG. 13 illustrates a module 1300 with 40 housings 1352 therein.

Figure 14:
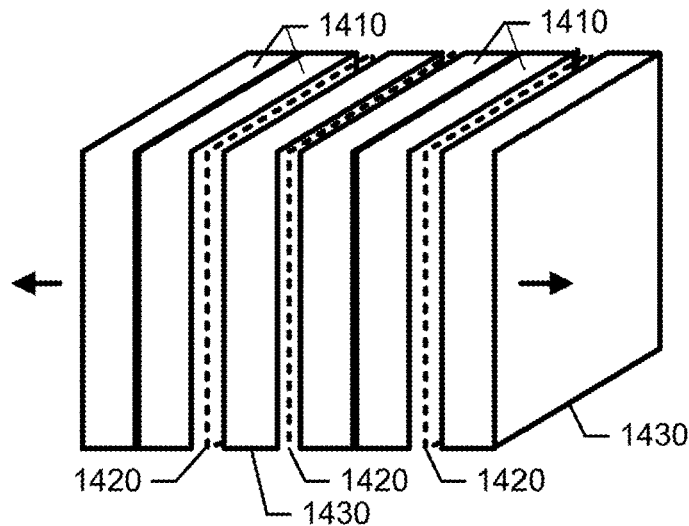
FIG. 14 illustrates an inverse air-breathing architecture in accordance with various embodiments.

FIG. 14 illustrates an inverse air-breathing architecture in accordance with various embodiments. FIG. 14 illustrates an "inverse air breathing design" in which the ORR electrode blocks 1430 may be boxes of ORR electrodes, which are internally filled with air. The anodes 1410 are sandwiched together and the OER electrodes 1420 separate the ORR electrodes 1430 from the anodes 1410. The whole unit is flooded with liquid electrolyte.

Figure 15:
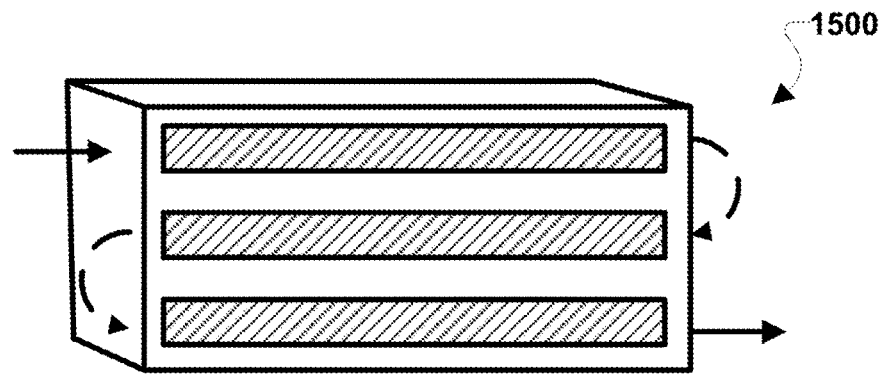
FIG. 15 illustrates an inverse air breathing ORR electrode assembly in accordance with various embodiments.

FIG. 15 illustrates an inverse air breathing ORR electrode assembly 1500 in accordance with various embodiments. The assembly 1500 may be used as the ORR electrode block 1430 of FIG. 14. The hatched areas are regions of the ORR electrode, while the unshaded areas may be structural support. Air is supplied to the inner volume of the "box" and liquid electrolyte may surround the assembly 1500.

Figure 16:
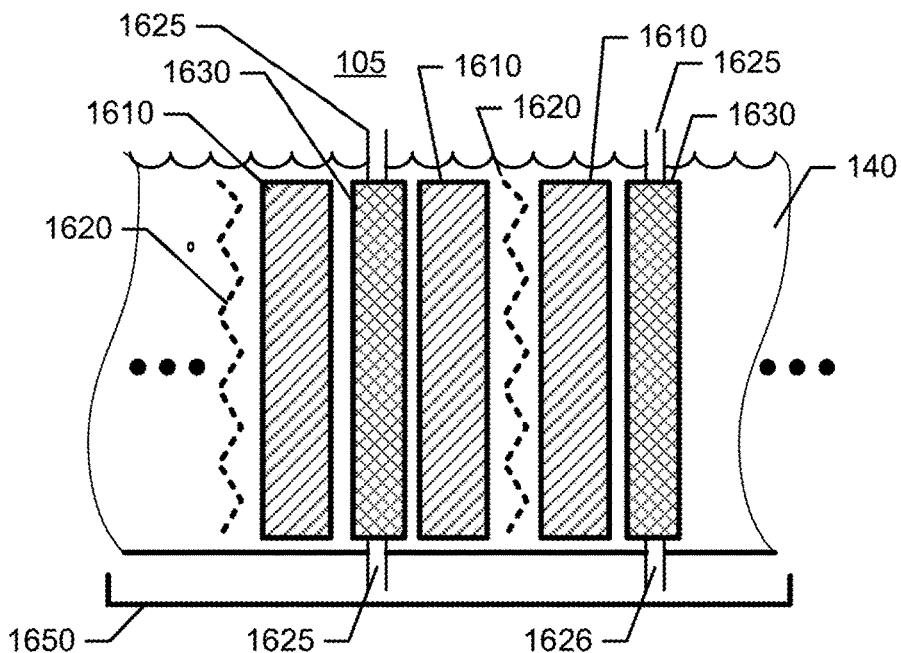
FIG. 16 illustrates another inverse air breathing ORR electrode assembly in accordance with various embodiments.

FIG. 16 illustrates another inverse air breathing ORR electrode assembly in accordance with various embodiments. The assembly may include anodes 1610, ORR electrode boxes 1625, and OER electrodes 1620. The sealing of the inverse air breathing ORR box 1625 does not have to be complete, i.e., the bottom may be open. This has advantages that if the ORR electrode leaks, the liquid electrolyte 140 may be flowed back into the overall electrolyte reservoir 1650. Air lines 1625 may provide air to the ORR box 1625.

The natural air breathing embodiments may have several important limitations. In cases where the ORR electrode is vertical, the height of a cell is limited by the hydraulic pressure head on the ORR electrode (i.e. the electrode must also act as a structural element) such that leaking to the external environment does not occur. Conversely, for a horizontal ORR configuration, the cell height is limited by the anode thickness, which for 100 h may be around 3-5 cm and for 300 h may be about 4-6 cm. Thus, to achieve a high system level energy density (kWh/m$^2$ or kW/m$^2$) many multiples of the core mechanical repeat unit must be stacked, with headspace allowed for gas delivery to cells.

In certain embodiments, it is therefore advantageous to submerge the ORR electrode below the liquid level of a cell. In these embodiments, the triple-phase boundary is generated by forced delivery of air (oxygen) to the ORR electrode, which is positioned under the liquid level. This presents several advantages. First, the ORR electrode is normally wetted, which mitigates the risk of dry out and salt crusting on the electrode. Secondly, leaking through the electrode may be purely internal to the cell and does not result in leakage of electrolyte to the external environment. Third, the depth of a cell may be significantly greater (the height dimension of a primary housing).

Figure 17:
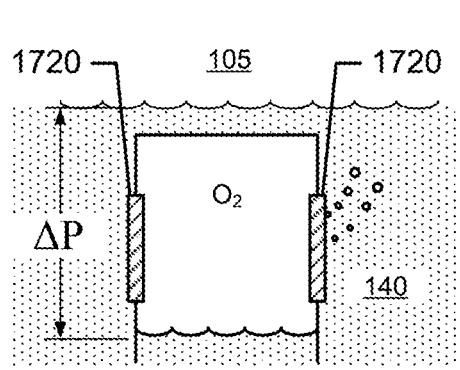
FIGS. 17 and 18 illustrate air-breathing electrode submerged with a convex oxygen-pocket structure, in accordance with various embodiments.
Figure 18:
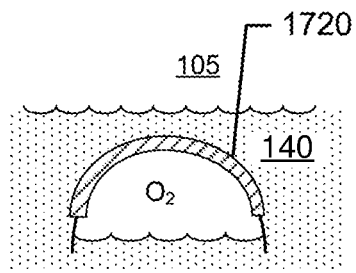

FIGS. 17 and 18 illustrate air-breathing electrodes 1720 submerged with a convex oxygen-pocket structure, in accordance with various embodiments. The air-breathing electrode 1720 may be completely submerged and placed vertically in a convex electrode structure, and therefore may maintain a continuous 'oxygen pocket'. As the oxygen gets depleted, it needs to be replenished via bubbling or constant pressure. The hydrophobic layer may be configured to withstand the pressure of gas escaping the pocket.

Figure 19A:
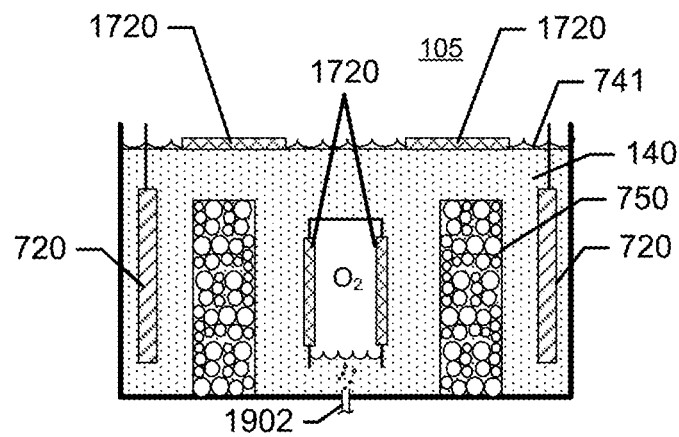
FIGS. 19A and 19B illustrate side elevation and top views, respectively, of another inverse air-breathing battery design, in accordance with various embodiments.
Figure 19B:
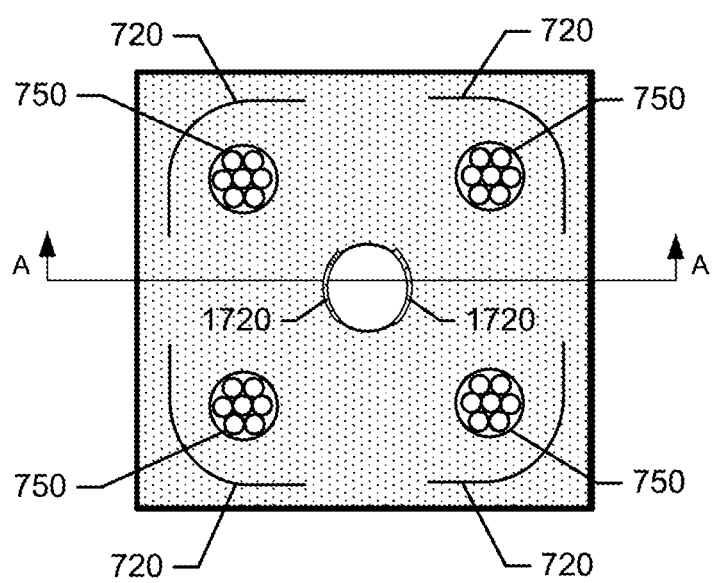

FIGS. 19A and 19B illustrate side elevation and top views, respectively, of another inverse air-breathing design, in accordance with various embodiments. The battery illustrated in FIGS. 19A and 19B is similar to the battery illustrated in FIGS. 7A and 7B. In the battery illustrated in FIGS. 19A and 19B the curved (concave down) ORR sheet may trap air below the electrode. The ORR electrode 1720 may be fed by a bubbler 1902 or other air source. An advantage of using submerged ORR electrode 1720 fed with an underwater bubbler, is that any crust formation may be 'washed' away by electrolyte 140 during subsequent charge half-cycle.

In one embodiment, this air may be sealed in an air chamber such that the air only touches solid surfaces. In another embodiment, the air forms a bubble such that at least one side of the bubble touches the air electrode, and another side forms a gas-liquid interface with the electrolyte. In either embodiment, air volumes may be stacked vertically to allow for vertical growth of cells.

In one embodiment, the electrode may have tall, sealed walls, but an unsealed bottom. Pressurized air is supplied to the interior volume, as controlled by a pressure regulator at the outlet, an outlet port located near the bottom of the volume, or through other means. Any leaking through the ORR electrode may be accommodated by the open bottom, exposed to the electrolyte. The positive pressure within the volume may help resist leaking through the electrode.

Figure 20A:
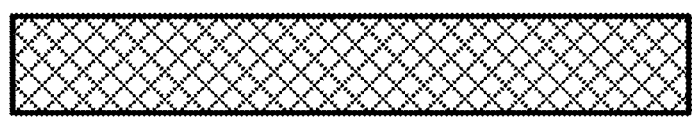
FIGS. 20A-23 illustrate tubular ORR electrode assemblies, in accordance with various embodiments.
Figure 20B:
Figure 20C:
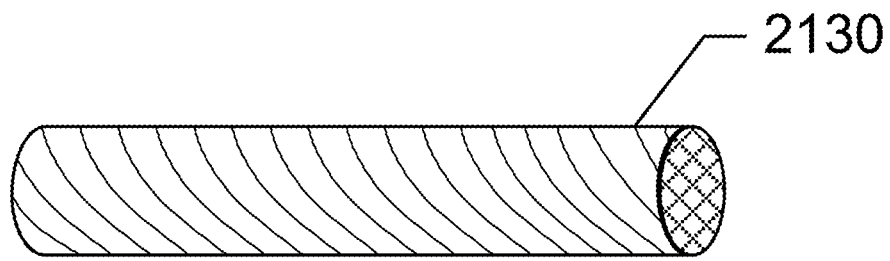

FIGS. 20A-23 illustrate tubular ORR assemblies, in accordance with various embodiments. In one embodiment, the electrode may have a tube-like shape 2130 as illustrated in FIG. 20C. This electrode may be made of a sheeted electrode as shown in FIG. 20A that is self-sealed by spiral-welding (e.g., FIG. 20B and FIG. 22A), edge-welding (FIG. 22B or FIG. 22D with a seal 2200 at the joints), sealed with a mounting body 2202 or external housing (FIG. 22C). The tube-shape 2130 may be circular, an oval or teardrop shape, or be a polygon. As shown in FIG. 22E, the electrode may be extruded into a pre-shaped geometry and joined, for example, by welding, to one or more solid current collectors 2212, [4]. The connection to current collectors may be at the top of the tube only (e.g., 2211 to 2212), or at the top and bottom (e.g., 2213 to 2214). A planar surface may be formed into a series of tubes by joining single sections to one another by this method, as illustrated in FIG. 22E elements 2215 and 2216. An additional sealant may be applied before or after joining electrodes to current collectors or bus bars. This sealant may be a hot melt sealant that is introduced internally into the air electrode in solid form 2217, or coated onto the current collector 2217a before joining and melted after or during joining with the current collector to coat the internal joint surface 2218. The tube may be fixtured horizontally (FIG. 23) or vertically (FIGS. 21A, 21B, 21C), and may have its ends sealed such that they are liquid tight, or may have its ends outside the electrolyte, such that the end seals do not have to be liquid-tight.

Figure 21A:
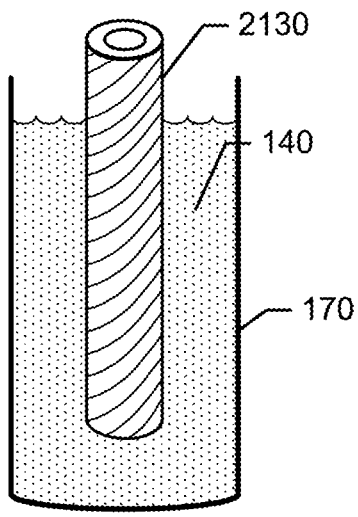
Figure 21B:
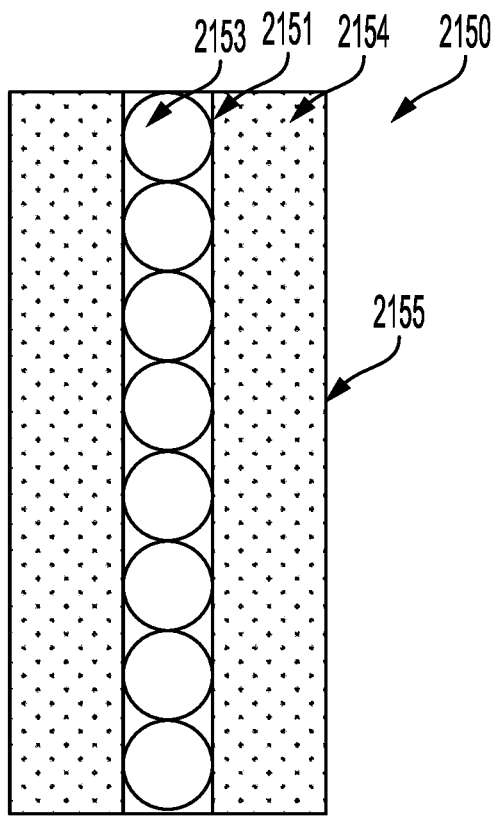
Figure 21C:
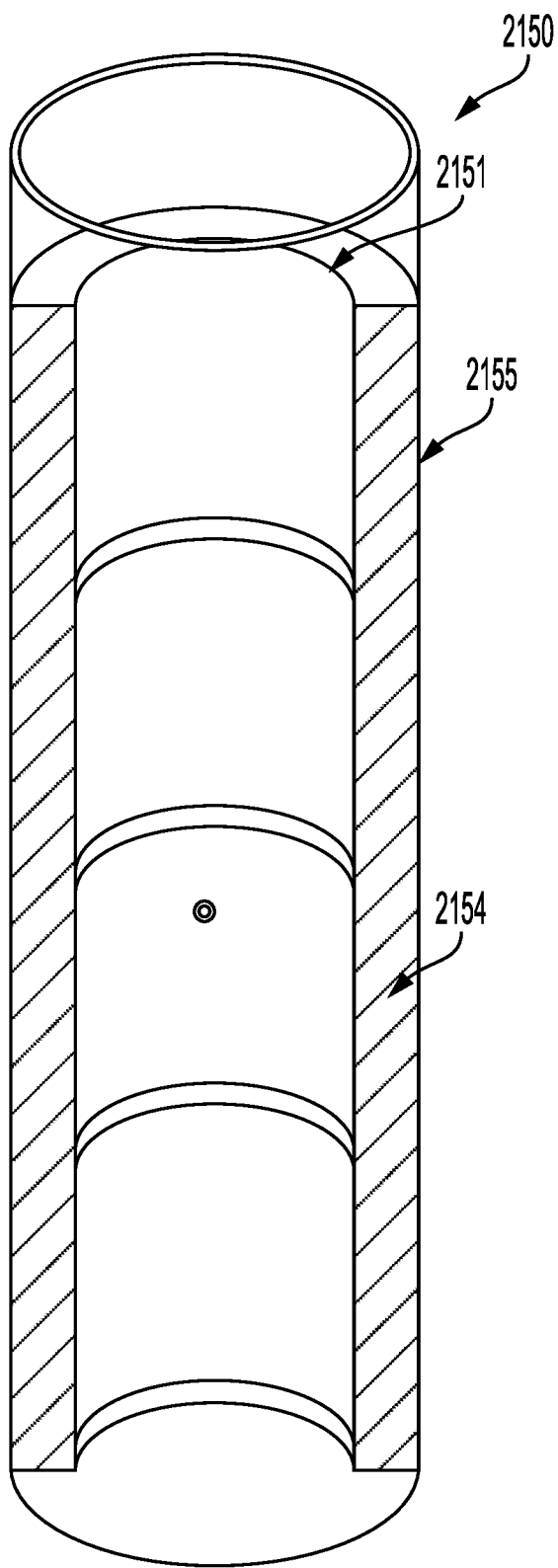
Figure 22A:
Figure 22B:
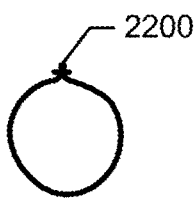
Figure 22C:
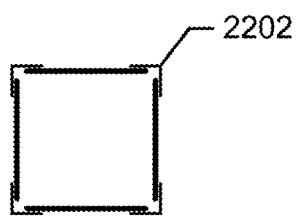
Figure 22D:
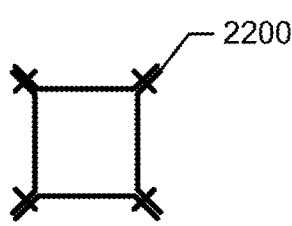
Figure 22E:
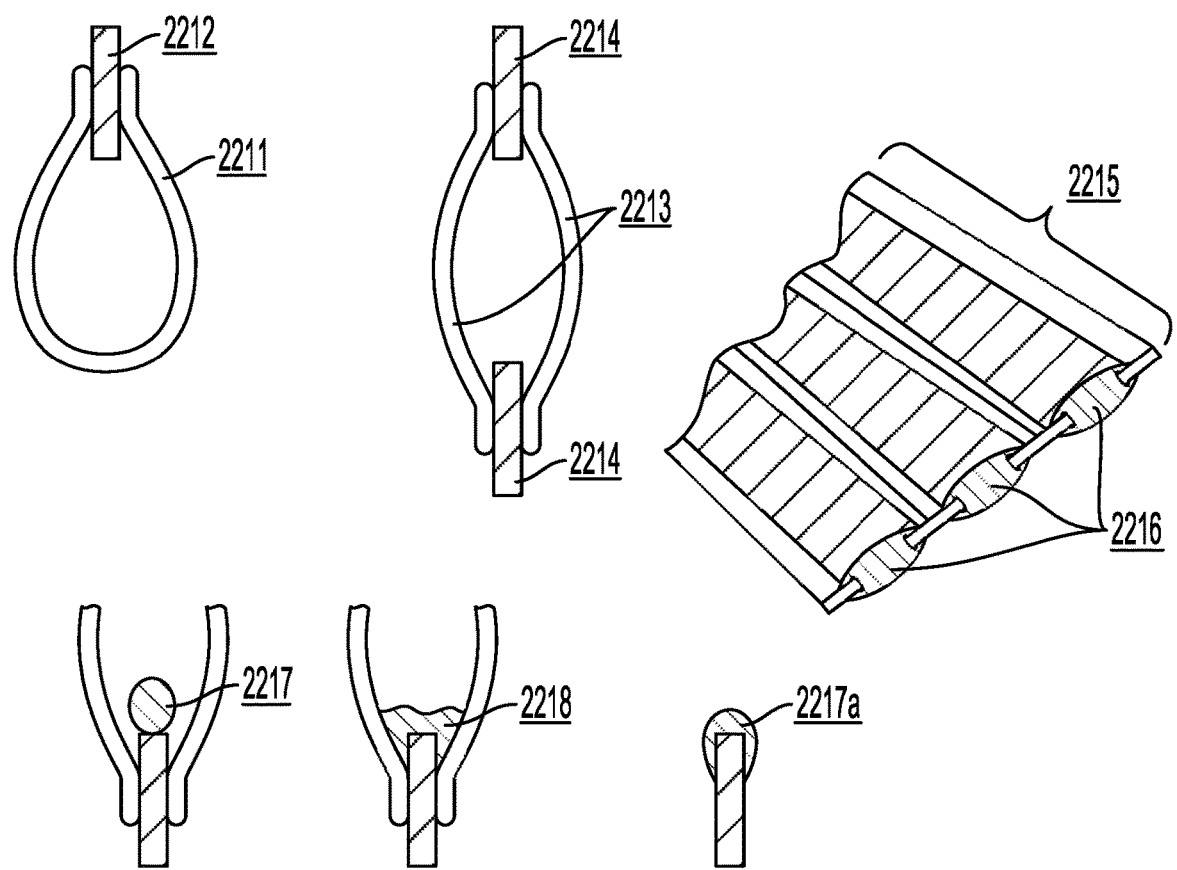
Figure 23:
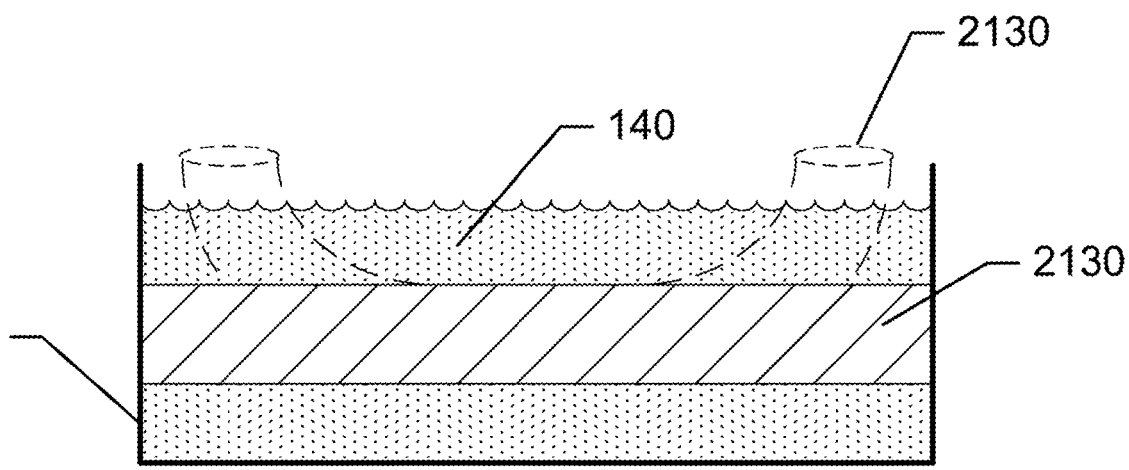

As illustrated in FIGS. 21B and 21C, in certain embodiments, a cylindrical cell 2150 architecture may allow for various anode forms to complete an electrochemical cell with a powder or sheeted cathode 2152. The anode 2153 forms the center of the cylindrical cell 2150, located by a cylindrical "retainer" feature 2151 consisting of a semipermeable separator and a structural frame/locating feature. Either powder or pellets can form the anode 2153. The cathode 2154 is a powder/granulated material which is filled around the anode 2153. The cathode 2154 may also be a sheet that is rolled into a tube. Current is collected from the anode through an electrically isolated lid, which seals and compresses the cell 2150. Current is collected from the cathode by the outer cylinder 2155 of the cell 2150.

Figure 24:
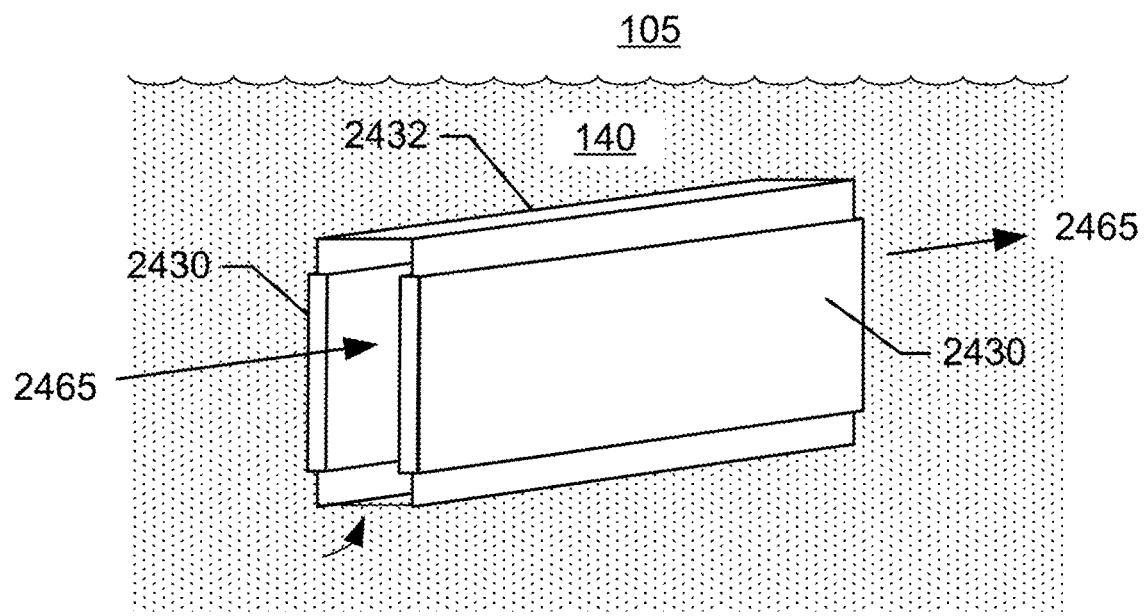
FIG. 24 illustrates an open-at-bottom inverse air breathing ORR electrode design, in accordance with various embodiments.

FIG. 24 illustrates an open-at-bottom inverse air breathing ORR electrode design, in accordance with various embodiments. Positive pressure may be applied to the air-breathing side of an air-breathing electrode, reducing the pressure-differential across the electrode such that it doesn't have to hold pressure. The ORR electrode 2430 walls may be supported in a frame 2432 and air 2465 may be flowed through the center of the frame 2432 and ORR electrodes 2430. The open bottom may enable liquid electrolyte 140 an outlet.

In configurations requiring air delivery to an air electrode, active surface area is of high value. Power-producing components, such as air electrodes, must be utilized fully to amortize their cost. To maximize the efficacy of these components, air delivery may be optimized in geometries and reactor layouts designed for high utilization. In this embodiment, cylindrical or other-shaped tubes provide a pathway for air and an interface with active materials in an external shell. Active material thicknesses and gas flow are tuned for performance optimization. Valuable surface areas are made most efficient by controlling gas pathways and gas flow to maximize performance.

Figure 25A:
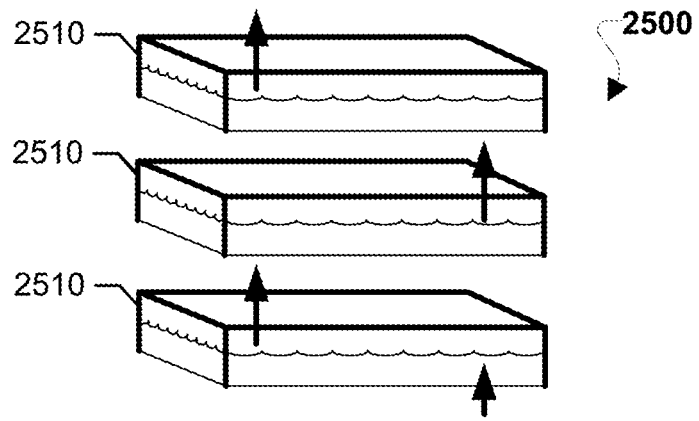
FIGS. 25A-25B illustrate aspects of column designs, in accordance with various embodiments.
Figure 25B:
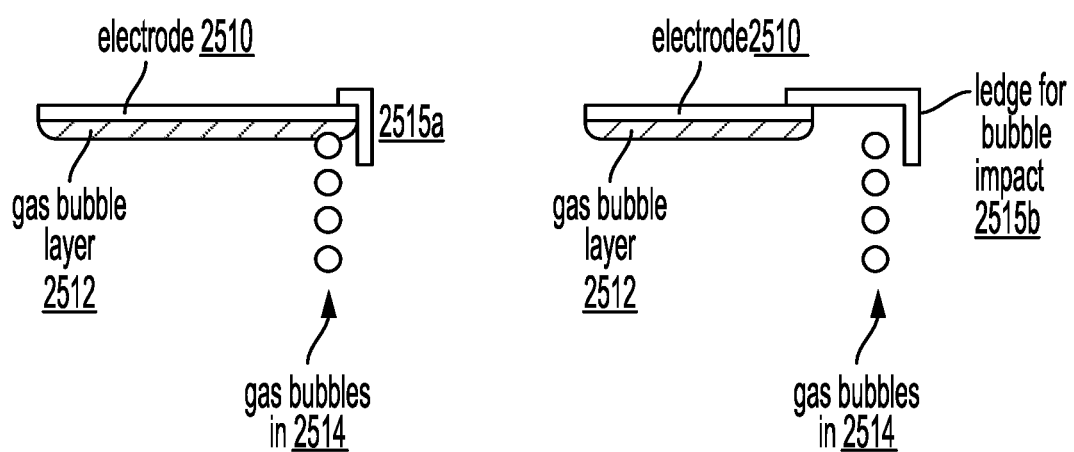

FIG. 25A illustrates a distillation column design, in accordance with various embodiments. FIG. 25A shows a stack 2500 of three layers of stacked core ORR electrodes 2510. Air/gas/oxygen may move from one layer to the next (upward). As illustrated in FIG. 25B, each electrode 2510 layer may exhibit and extended features 2515a or 2515b, such as a ledge, lop, corner, or landing platform, etc., to capture gas bubbles 2514 and prevent them from rising to the next layer above. FIG. 25B illustrates the trapping bubbles 2514 with such extended features 2515a or 2515b may improve gas bubble collection into a gas bubble layer 2512 under layers of ORR electrode 2510, thereby improving air utilization rates.

Figure 26A:
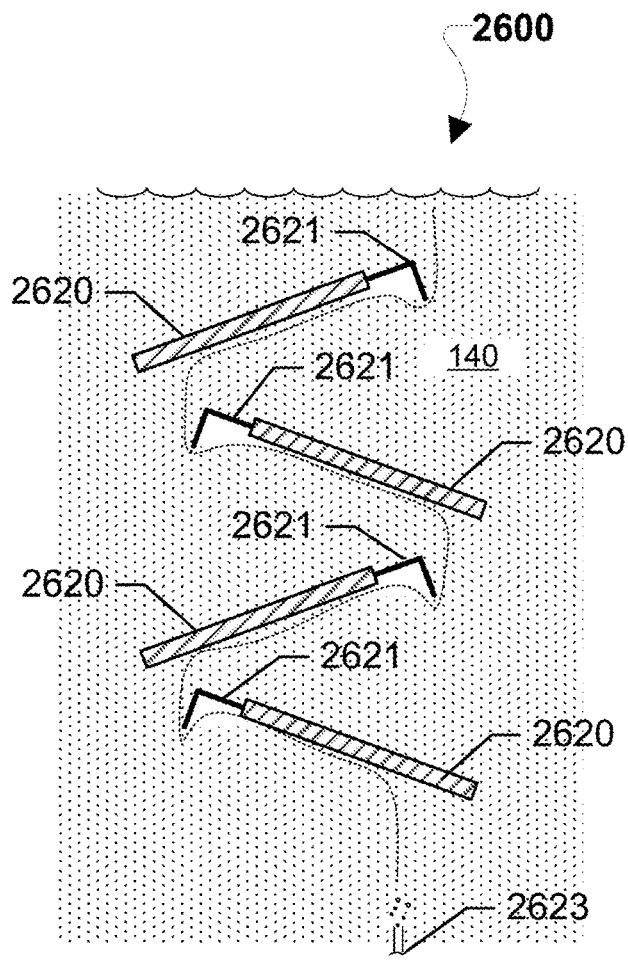
FIGS. 26A-B illustrate alternative aspects of column designs, in accordance with various embodiments.

FIG. 26A illustrates an alternative distillation column design, in accordance with various embodiments. The stack 2600 of ORR electrodes 2620 may be angled. Gas is bubbled up through the electrolyte 140 to the stack 2600. Each ORR electrode 2620 may be extended by a baffle 2621. The baffles 2621 may enable the resident time of the bubbles to be sufficient residence time of the gas on the electrode 2620 to get reaction; i.e. without baffles, the bubbles just bounce off.

Figure 26B:
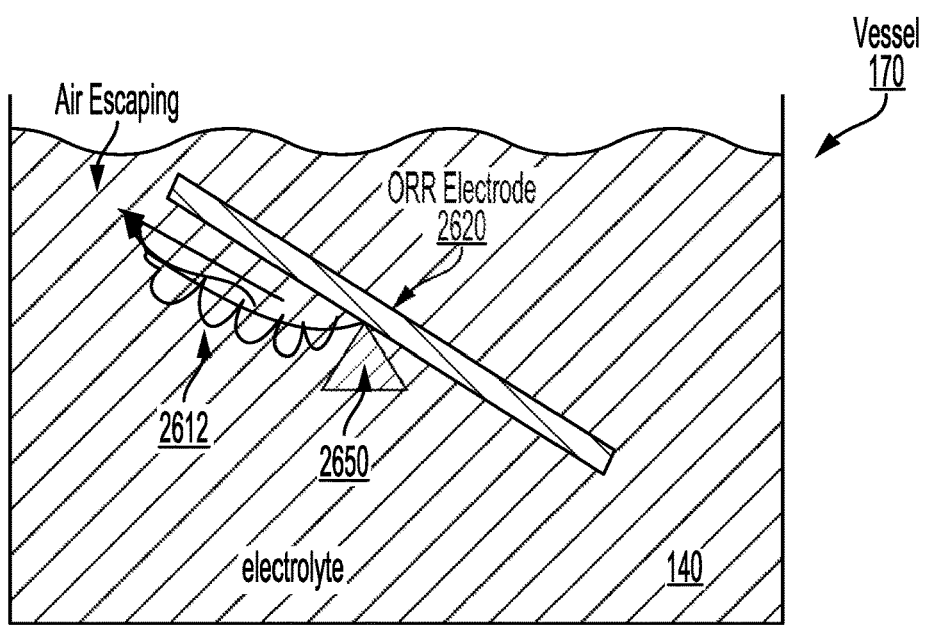

As illustrated in FIG. 26B, retaining a uniform sheath of air (or "air blanket") 2612 beneath a submerged ORR electrode 2620 for sufficiently long residence times to allow oxygen gas to react with the ORR electrode 2620 may be challenging. In some embodiments, the ORR electrode 2620 will be rinsed with electrolyte 140, purging the gas, to rinse away hydroxide or carbonate salt crystals that may form on the ORR electrode 2620. In certain embodiments, the ORR electrode 2620 may be mechanically fixed to a pivot 2650 in the center of the ORR electrode 2620, enabling the ORR electrode 2620 to rock or tilt back-and-forth. The rocking motion of the ORR electrode 2620 may enable the upward release of gas and subsequent flooding with electrolyte 140 to rinse away salt crystals. The ORR rocking would engage and periodically rinse the ORR electrode 2620. In some embodiments, the rocking motion may permit some air bubble retention under the air electrode, maintaining electrochemical functionality on the section of the ORR electrode 2620 that retains an air bubble.

Figure 27:
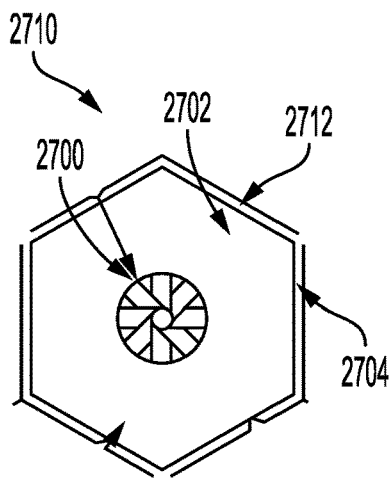
FIGS. 27-34 illustrate further stacked core ORR electrode configurations, in accordance with various embodiments
Figure 28:
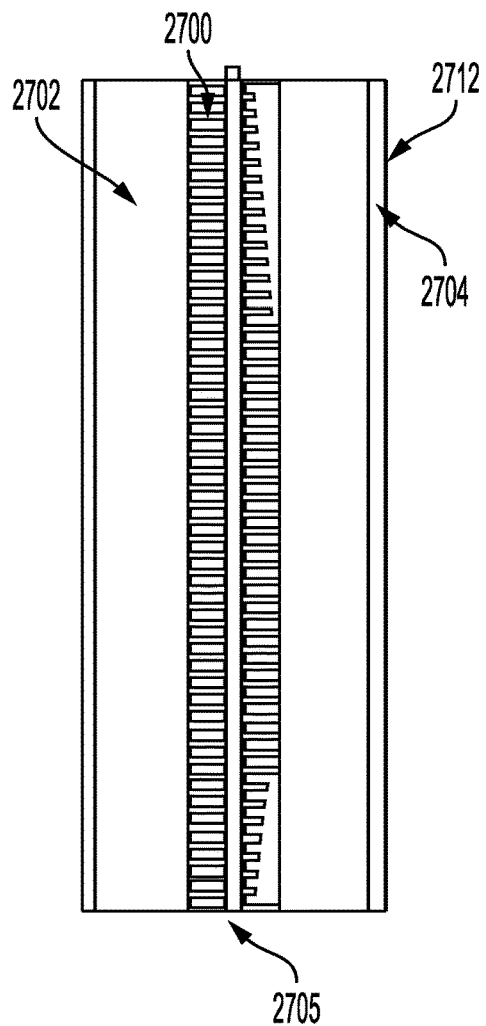
Figure 29:
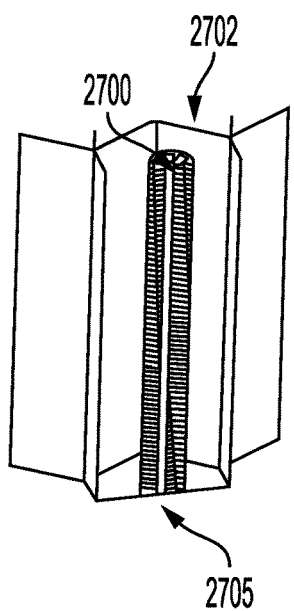
Figure 30:
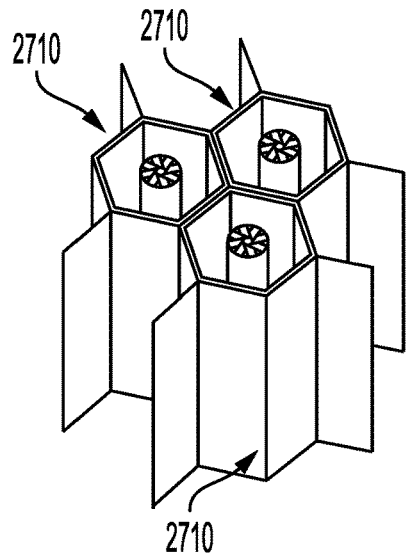
Figure 31:
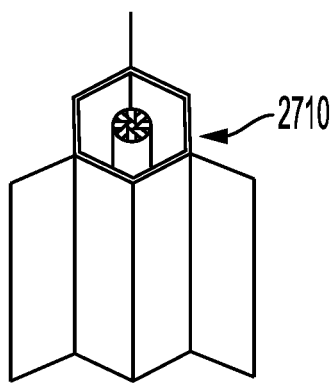
Figure 32:
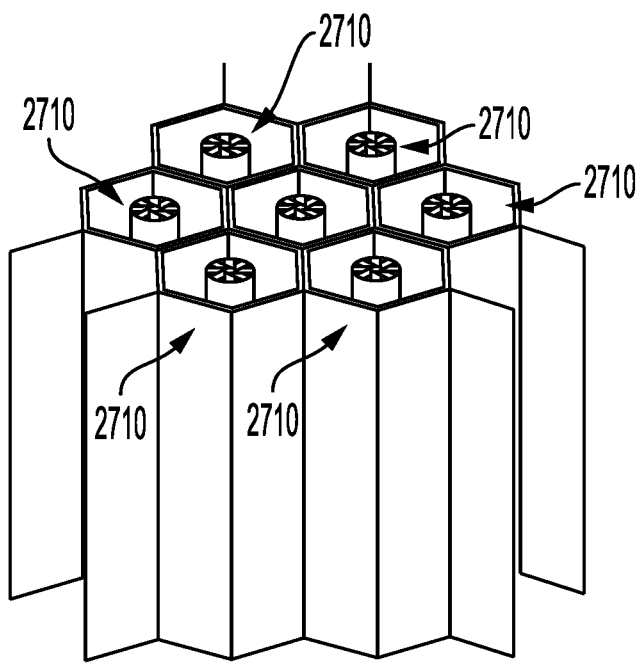
Figure 33:
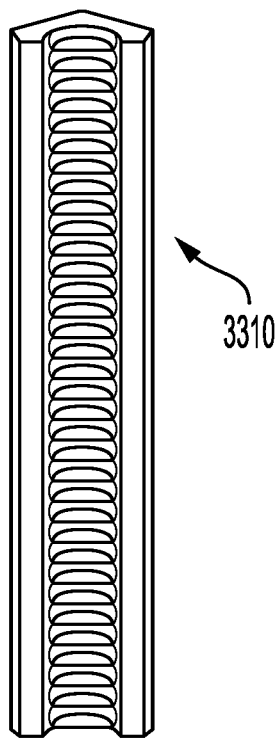
Figure 34:
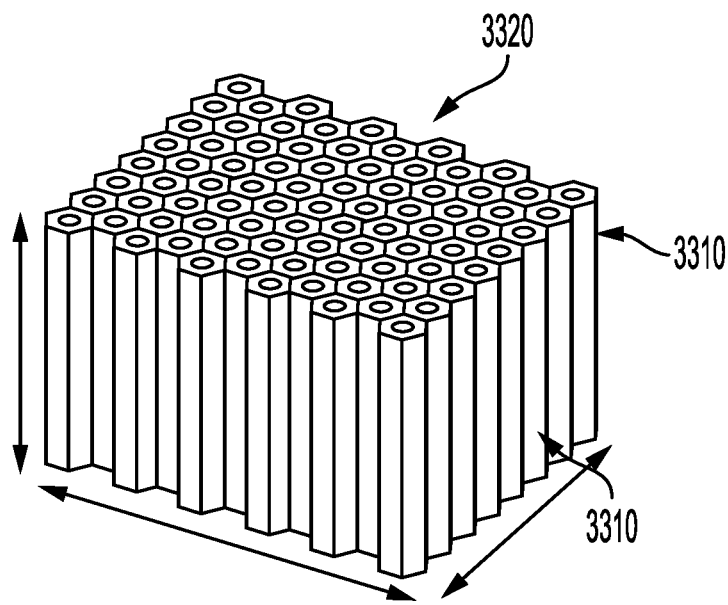

FIGS. 27-34 illustrate further stacked core ORR electrode configurations, in accordance with various embodiments. FIG. 27 illustrates a coaxial design of the cells 2710. In some embodiments, the cells are tubes configured to be arranged vertically together in an array. FIG. 27 is an overhead view of one cell 2710. FIGS. 28 and 29 are cross-section views of one cell 2710. FIG. 30 is a view of an array of cells 2710. FIG. 31 illustrates a single cell 2710. FIG. 32 illustrates an array of cells 2710. FIG. 33 illustrates an alternative configuration of a cell 3310 and FIG. 34 illustrates an alternative array 3320 of cells 3310. Each cell 2700, may include a submerged cylindrical ORR electrode core 2700 surrounded by a hexagonal tube filled with anode material 2702, such as DRI marbles. A porous anode current collector 2704 may surround the anode material 2702 and the OER electrode 2712 mesh may be outside the anode current collector 2704. The anode current collector may be multifunctional, for instance, if placed through the center of the anode bed. It may provide structural support to the bed, which the anode material may be mounted to or compressed against. It may also aid in locating the anode within the cell, separating adjacent cells, or stacking voltage. The stacks of cells are submerged in a pool of electrolyte 140 and air may be fed up through the ORR array via a submerged air bubbler 2705.

Figure 35A:
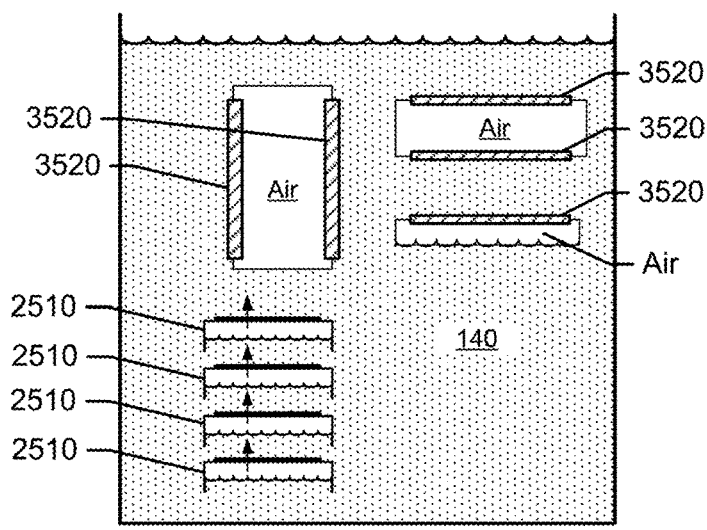
FIGS. 35A-35C illustrate aspects of stacked core ORR electrode configurations, in accordance with various embodiments.
Figure 35B:
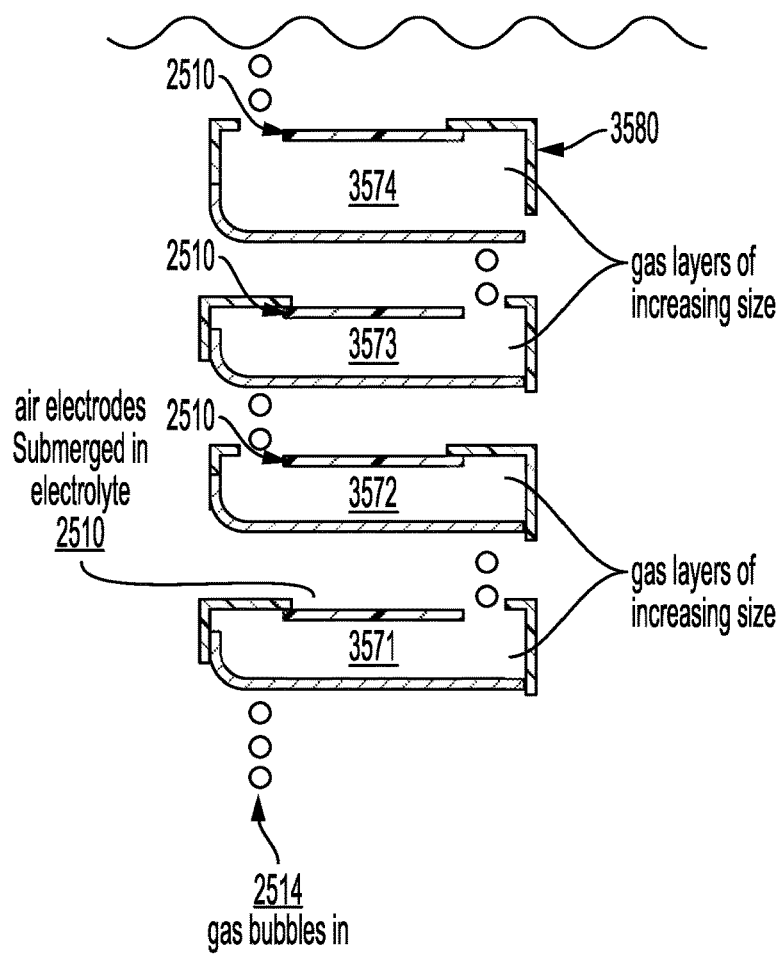

FIG. 35A illustrates another stacked core ORR electrode configuration, in accordance with various embodiments. As illustrated in FIG. 35A, different sealed volumes of air and ORR electrodes 3520 and 2510 may be arranged together in the electrolyte 140. As illustrated in FIG. 35B, in certain embodiments, the thickness of the air bubble 3571, 3572, 3573, 3574 underneath the ORR electrodes 2510 may be different. For example as illustrated in FIG. 35B where air bubbles or layers 3571 under the ORR electrodes 2510 may increase from smallest 3571 to largest 3574. The ORR electrodes 2510 may be supported in brackets 3580 such that some air escapes out of each support and bubbles flow up to the next larger/higher air bubble 3571 or layer. Increasing the air bubble thickness may increase the residence time of oxygen gas under a particular ORR layer, increasing the air utilization at that layer. Varying or increasing the air bubble thickness may improve bubble flow. Increasing the air bubble thickness as the vertical height in the stacked core increases may increase the overall air utilization in the stacked core ORR electrode embodiment.

Figure 35C:
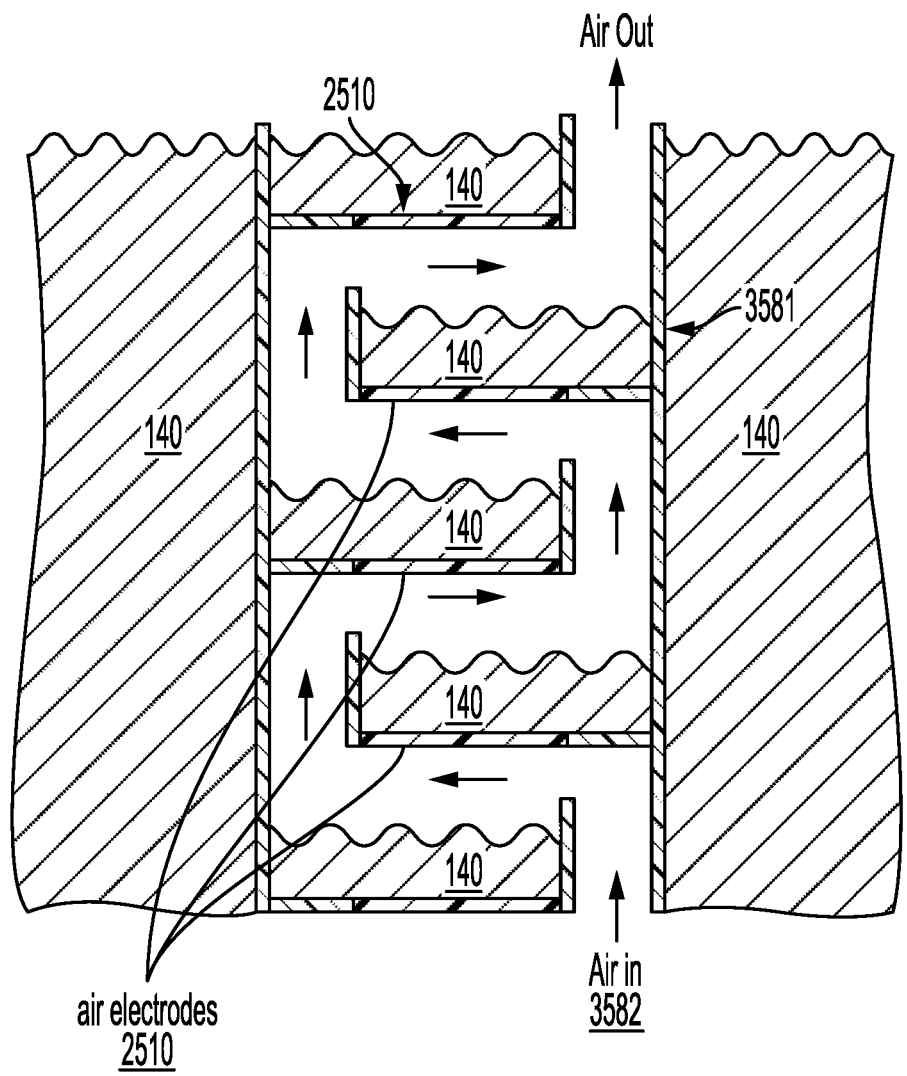

As illustrated in FIG. 35C, in certain embodiments, the air 3582 flowing through the stacked core ORR electrode 2510 takes the form of a continuous sheath of air flowing through the ORR column, such that each pocket of air trapped beneath an ORR electrode is connected in series with the other gas pockets. The continuous air passage may be formed by the bracket 381 supporting the ORR electrodes 2510A continuous sheath of air may reduce impacts of discontinuous bubble flow on ORR electrode durability, including electrolyte splashing or salt crusting, especially on the air side of the ORR electrode. Reducing salt crusting may increase the effective electrochemical active area throughout the lifetime of the ORR electrode. In one embodiment, the continuous air sheath is accomplished using tubes that act as the gas outlet for one air pocket, and insert the gas into the next gas pocket, preventing gas bubble impact and electrolyte splashing. Containing the gas in a continuous sheath may also prevent gas from escaping horizontally from the column of ORR electrode layers.

Figure 36A:
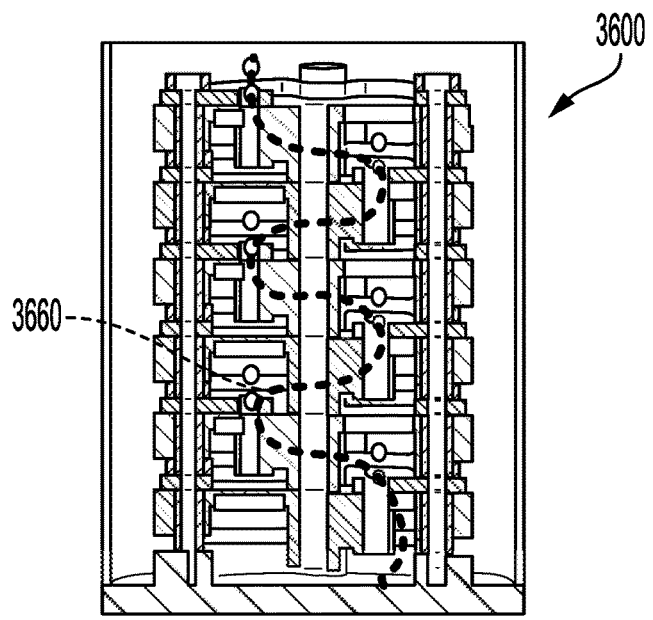
FIG. 36A-36B illustrate aspects of stacked core ORR electrode configurations, in accordance with various embodiments.

FIG. 36A illustrates another stacked core ORR electrode configuration 3600, in accordance with various embodiments. The dashed-white line 3660 running through the assembly 3600 demonstrates movement of air from one layer to the next and the formation of "air blankets" on the underside of electrodes.

Figure 36B:
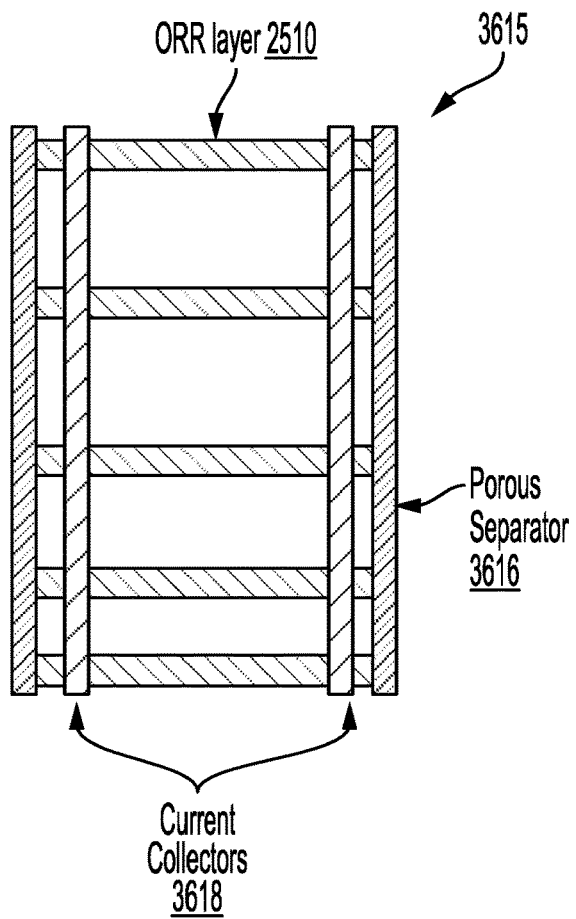

As illustrated in FIG. 36B, in certain embodiments, a stacked core ORR electrode configuration 3615 may be wrapped in a porous separator material 3616, with pore sizes ranging from 1 μm to 1 cm. The porous separator 3616 may prevent gas bubbles from escaping horizontally out of the column Preventing gas bubbles from escaping horizontally may increase air utilization and prevent self-discharge of an adjacent metal anode due to contact of the anode with oxygen gas. FIG. 36B also shows example placement of the ORR layers 2510 and current collectors 3618.

Figure 37:
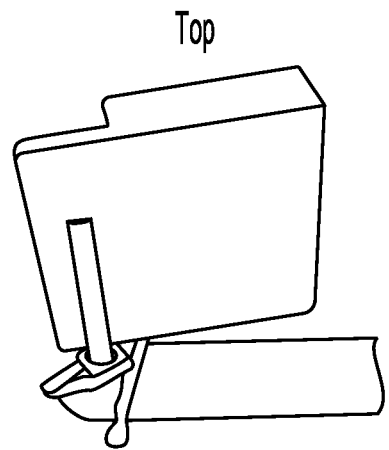
FIGS. 37-43 illustrate the impact of applying various degrees of air pressure on an air sparging electrode, in accordance with various embodiments.
Figure 38:
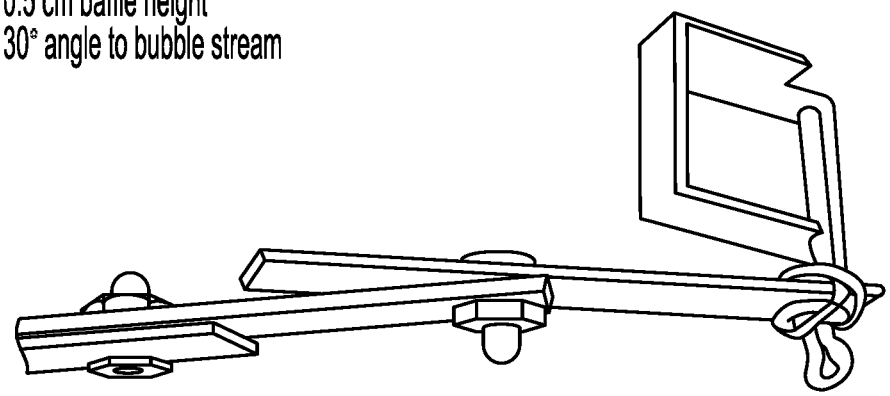
Figure 39:
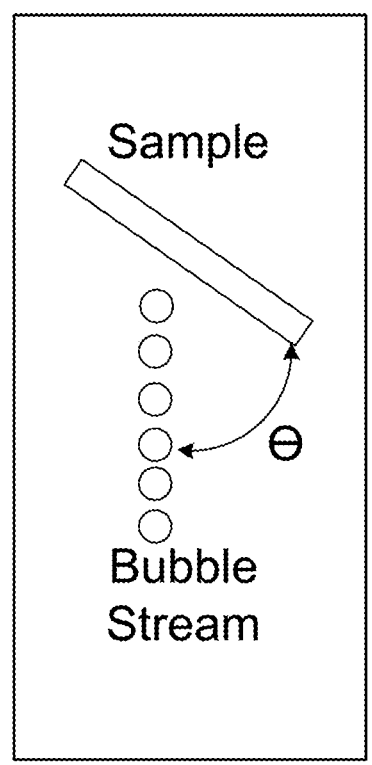
Figure 40:
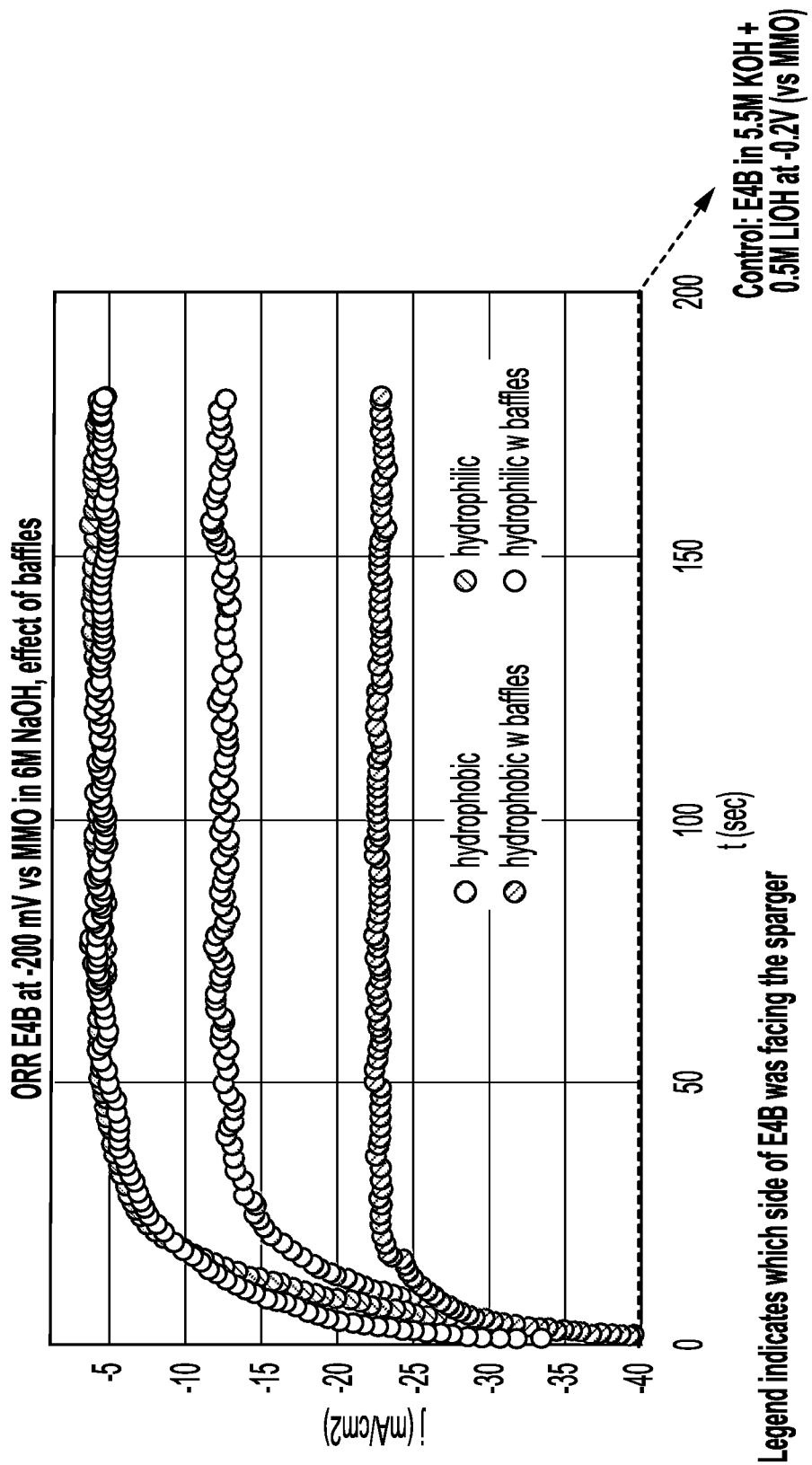
Figure 41:
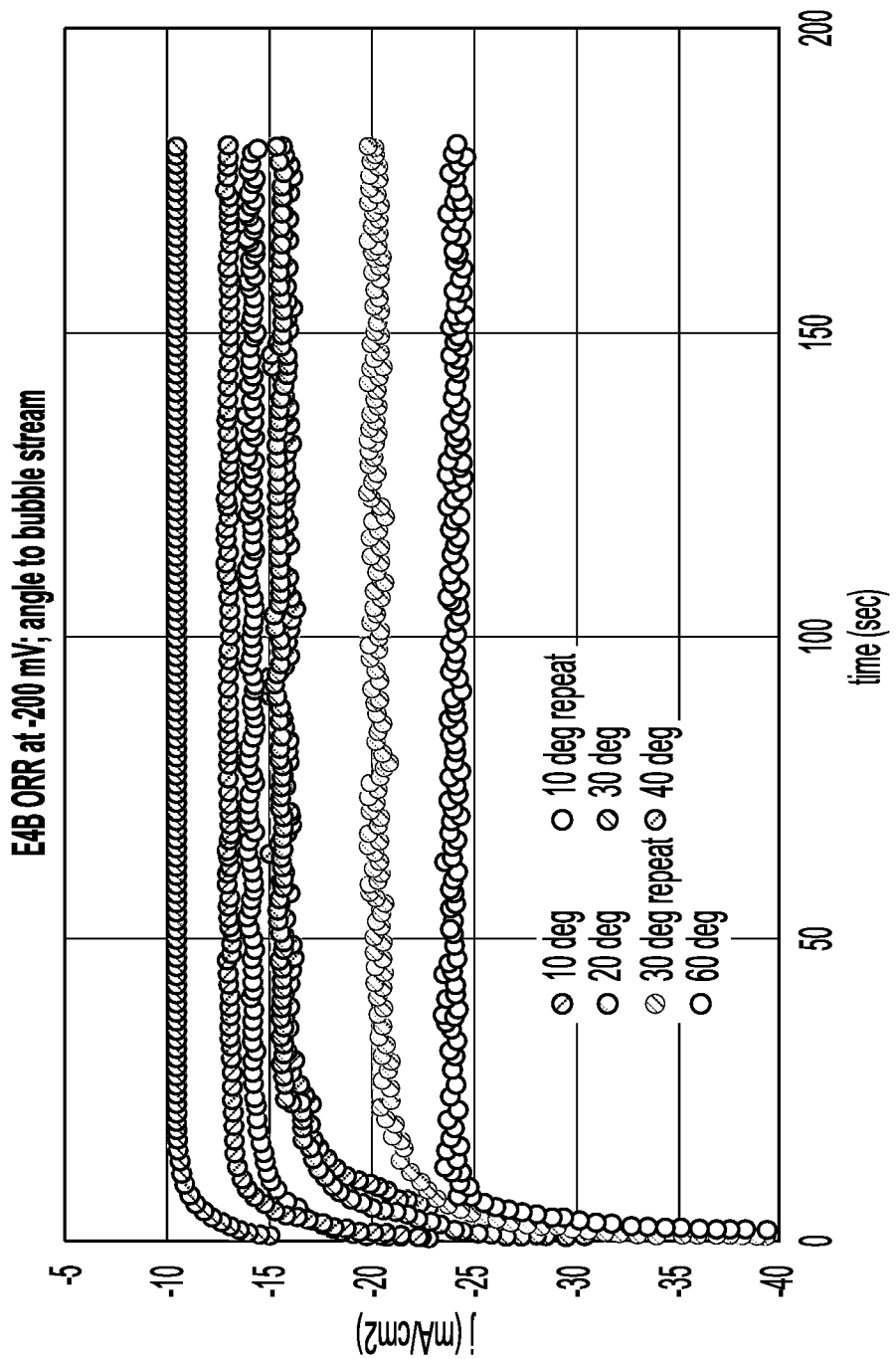
Figure 42:
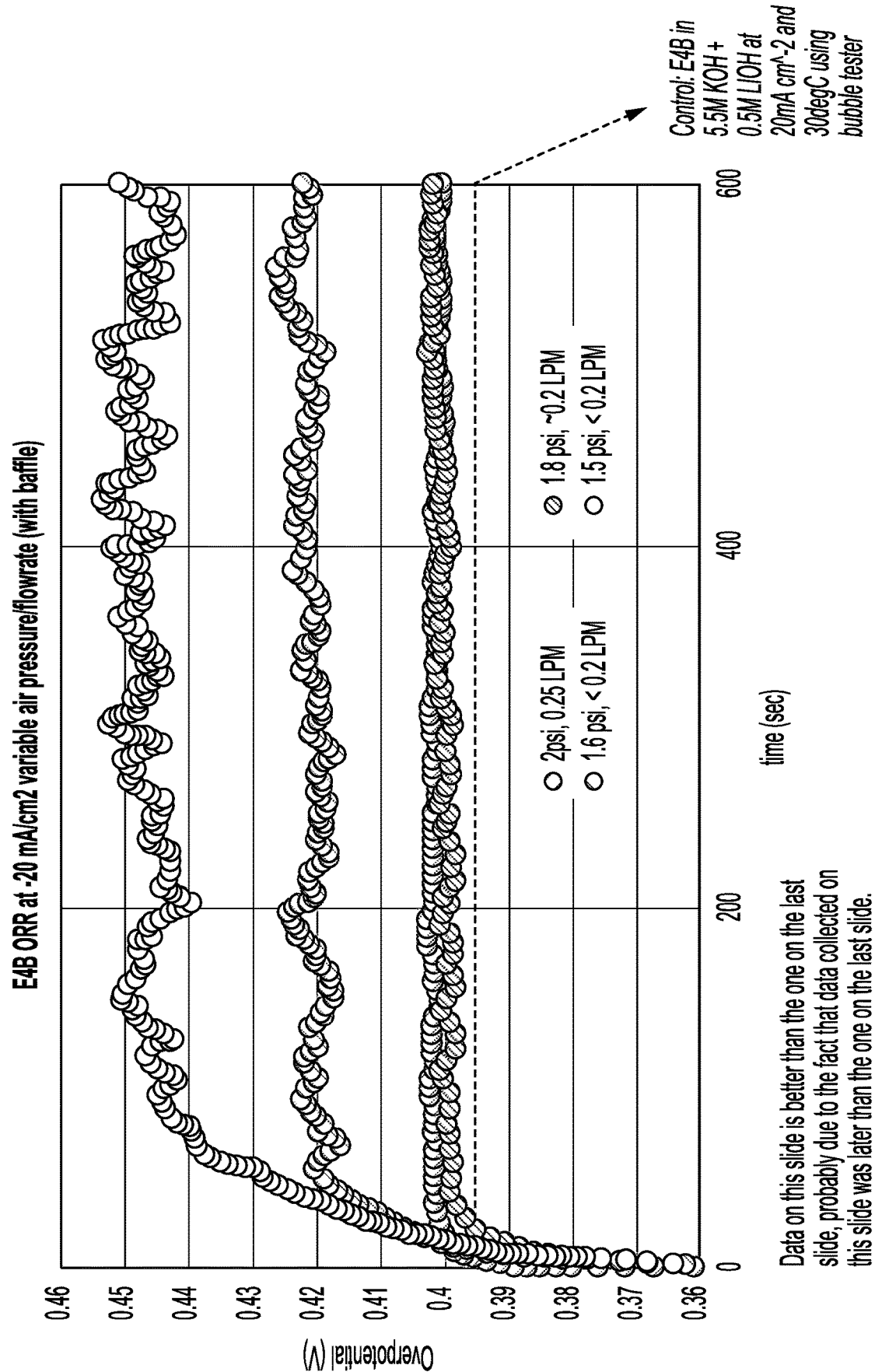
Figure 43:
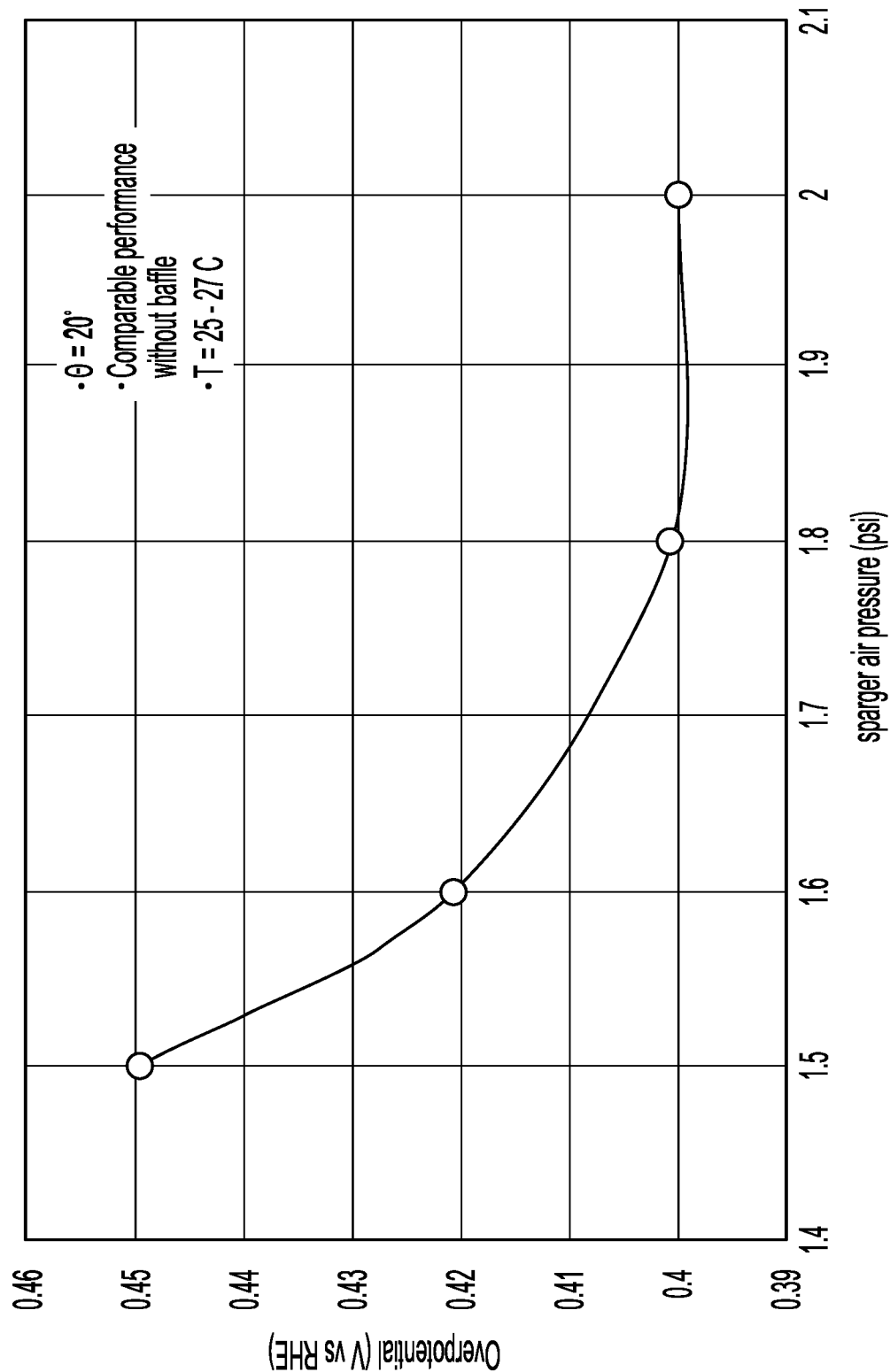

FIGS. 37-43 illustrate the impact of applying various degrees of air pressure on an air sparging electrode, in accordance with various embodiments. Air sparging may enhance the performance in immersed ORR electrodes over saturated with dissolved oxygen. In various embodiments, oxygen may be brought into the cell via bubbling, sparging, or other similar means. Oxygen reduction reaction electrodes require a supply of oxygen which may typically be provided by ambient air. The requirement for exposure to oxygen on one face, liquid electrolyte on a second face presents challenges for sealing and clearing of residual gas bubbles. The air-breathing electrode may be submerged with geometry that allows it to capture an air bubble. The air bubble provides oxygen and is replenished by air provided to the assembly. The assembly may be repeated vertically, allowing the air to cascade from lower levels to those above. Air bubbles may easily bounce off or not stick to submerged air electrodes, meaning there is insufficient time for the reaction to occur before they move away. In one embodiment, a mechanical lip or baffle may be used to keep the bubble in residence on the air electrode for a longer period of time. If membrane ORR electrodes are stacked in an alternating fashion, with the hydrophobic side down, and air is fed through the volumetric containment, air will flow and create a pocket on the hydrophobic side, while leaving electrolyte on the hydrophilic sides. Putting holes in the membrane layers will further enhance this flow through the reactor. In one embodiment, the air electrode and/or supporting housing may be configured such that it forms a helix (such as an augur, corkscrew, or spiral-staircase shape). This class of shapes would allow for upwards flow of air or cascade of bubbles on the catalytic layer of the ORR electrode. FIGS. 37 and 38 illustrate top and bottom views of a sample holder used for conducting sparging ORR electrode experiments. FIG. 39 illustrates the relationship between bubble stream and the angling of the sample in experiments performed using the sample holder. FIGS. 40-43 are graphs illustrating the results of those experiments.

Figure 44:
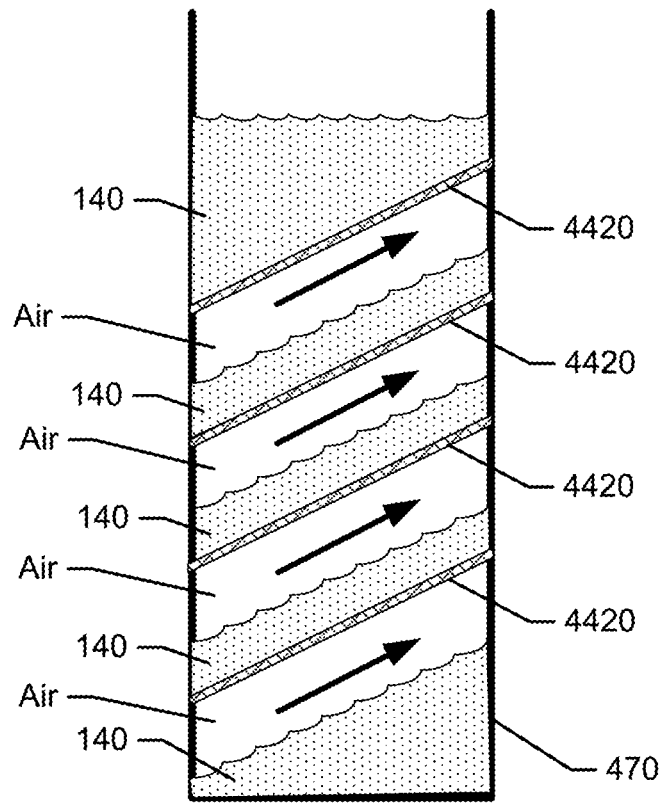
FIG. 44 illustrates an auger-type ORR electrode design, in accordance with various embodiments.

FIG. 44 illustrates an auger-type ORR electrode 4420 design, in accordance with various embodiments. The air electrode 420 and/or supporting housing 470 may be configured such that it forms a helix (such as an augur, corkscrew, or spiral-staircase shape). This class of shapes may allow for upwards flow of air or cascade of bubbles on the catalytic layer of the ORR electrode 4420.

Air-breathing oxygen reduction reaction (ORR) electrodes must be supplied with oxygen while being exposed to electrolyte. Locating this solid-gas-liquid triple-phase boundary may be complicated on an ORR electrode that can't hold large differential pressures, etc. Furthermore, to allow for vertical growth of cells, it is advantageous to locate this triple-phase point below the top surface of free electrolyte. Inverted cups trap pockets of air, which supply oxygen to the hydrophobic underside of two-dimensional (2D) or sheeted ORR electrodes. The top surface of this electrode is wetted by the surrounding electrolyte. Gas is supplied at a flow rate adequate to replenish oxygen depleted by ORR at the electrode. These cups may be embodied in a circular geometry, as has been previously disclosed. However, these circular embodiments lead to annular electrode arrangements, resulting in changing current densities, dead spaces between cells, or geometry inflexibility. "Lengthening" the ORR cup to an elongated "tray" and stacking these trays in a vertical, thick "plate" would allow for rectilinear cell geometries. ORR "plates" are flanked by anode "plates," which are again flanked by OER "plates," and so on. These planar geometries allow for constant current densities, high utilization of volume, and massively smaller part counts and fewer assembly steps.

In another embodiment, a highly automated, angle controllable array of air sparged electrodes may be used to increase the residence time of bubbles on the air electrode.

Figure 45:
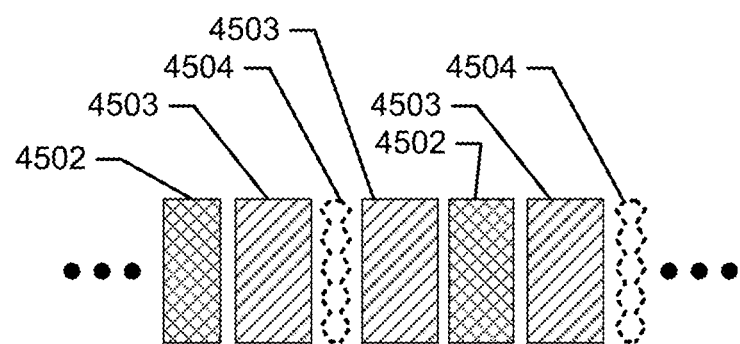

FIGS. 45-47B illustrate various rectilinear ORR electrode 4620 configurations, in accordance with various embodiments. FIG. 45 shows the arrangement of ORR electrode blocks 4502, anode material blocks 4503, and OER electrode blocks 4504 according to an embodiment. The ORR electrode blocks 4502 may include rectilinear stacks of ORR electrodes, such as ORR electrodes 4620 of FIGS. 46-47B. FIG. 46A illustrates a side view. FIG. 46B illustrates an end view. FIG. 47A illustrates a side view of air flow. FIG. 47B illustrates a top view. The ORR electrode 4620 may be a parallel plate supported in a frame 4621 having an air inlet 4622 on one side and an air outlet 4623 on the other. Air may flow across the ORR electrodes 4620 and move up the stack through the electrolyte 140.

Figure 48:
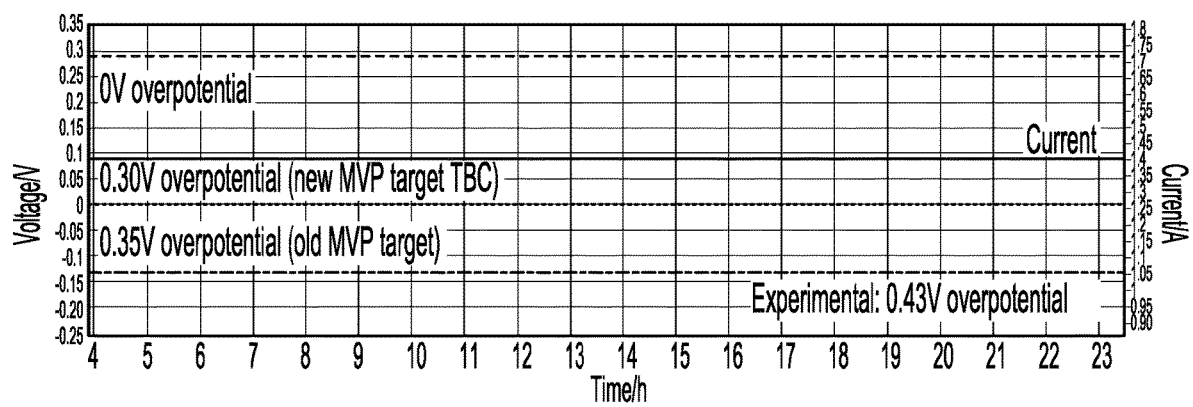
FIGS. 48-49 illustrate a chart and snorkel cup design, in accordance with various embodiments.
Figure 49:
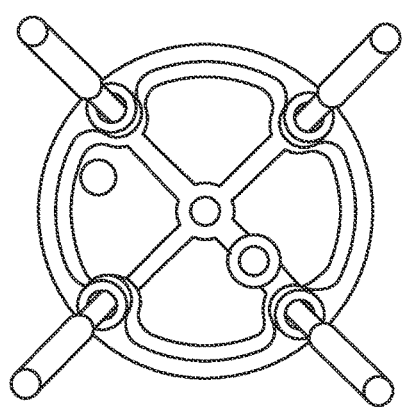

FIGS. 48-49 illustrate a chart and snorkel cup design, in accordance with various embodiments.

Figure 50:
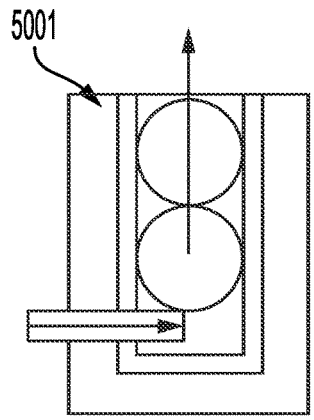
FIG. 50 illustrates a cross-section side elevation view of a test tube design, in accordance with various embodiments.

FIG. 50 illustrates a cross-section side elevation view of a test tube design, in accordance with various embodiments. A submerged oxygen reduction electrode 5001 (e.g., a hydrophilic porous electrode) which is provided an air supply 5002 may require significant pressurization of the provided air to overcome fluid pressure. Geometry of the submerged air path may be controlled to provide a channel of mixed air/electrolyte which leads to ambient atmosphere. This mixed phase channel reduces the pressure required to provide air to the submersed electrode.

Air-breathing electrodes have a finite tolerance to holding liquid pressure, for example in a vertical electrode configuration where the air-breathing electrode acts as a wall retaining the hydrostatic pressure of the electrolyte. In one embodiment, the electrolyte is retained with a separator that may be nanoporous. The electrolyte may start to leak past the separator and into a very narrow gap between the separator and the air-breathing electrode. There may be an outlet at the bottom of the electrode for electrolyte to flow out of the gap and into the next cell. This slow flow would enact less pressure on the air-breathing electrode than the hydrostatic force of the electrolyte. In another embodiment, the separator is placed directly on the electrolyte side of the air-breathing electrode to reduce the pressure-differential across the air-breathing electrode through surface tension or other pressure-reducing mechanisms. The thickness or porosity of the separator may vary with depth, for example getting thicker at the bottom where the hydrostatic pressure on the air-breathing electrode "wall" would be greatest. In another embodiment, the air-breathing electrode has staged pressure relief points where the electrolyte is allowed to flow and leak, resetting the hydrostatic pressure of the electrolyte to atmospheric pressure. In another embodiment, the air-breathing electrode is self-healing, such as a cork-like material, where small pin-holes or leak points reseal themselves when wetted by the liquid electrolyte. In another embodiment, an electrolyte additive is used to seal small pin-holes or leak points such as platelets.

In various embodiments, battery (e.g., battery 100) may include three electrodes, an anode (e.g., 110) and a dual cathode (e.g., cathode 120 constituted in two parts, such as a first cathode, and a second cathode). The electrodes may have finite useful lifetimes, and may be mechanically replaceable. For example, the anode may be replaced seasonally. The first cathode may be divided into two portions, a first portion having a hydrophilic surface and a second portion having a hydrophobic surface. For example, the hydrophobic surface may have a polytetrafluorethylene (PTFE) (e.g., Teflon®) hydrophobic surface. For example, the second portion may be a microporous layer (MPL) of polytetrafluorethylene (PTFE) and high surface area carbon while the first portion may be carbon fiber partially coated with PTFE. As another example, the second portion may be a MPL of PTFE and carbon black and the first portion may be PTFE, of approximately 33% by weight. As a further example, the second portion may be an MPL of 23% by weight PTFE and 77% by weight carbon black and the first portion may be a low loading MPL. The anode may be an iron (Fe) electrode or an iron-alloy (Fe-alloy) electrode (e.g., FeAl, FeZn, FeMg, etc.). The second cathode may have a hydrophilic surface. The second cathode may have a metal substrate, such as carbon (C), titanium (Ti), steel, etc., coated with nickel (Ni). Electrolyte (e.g., electrolyte 140) may be disposed between the three electrodes. The electrolyte may be infiltrated into one or more of the three electrodes.

In certain embodiments in which a basic (high-pH) electrolyte is used, carbon dioxide ($CO_2$) exposure to, and dissolving in, the volume of liquid electrolyte 140 may cause pH changes in the electrolyte, changes in the electrolyte's ionic conductivity, and the precipitation of carbonate solids in the electrolyte may clog pores in the air electrode 120 and/or metal electrode 110. To address carbon dioxide and/or carbonate ion ($CO_3^{2-}$) build-up in the volume of liquid electrolyte 140, scrubbing or filtration may be used to treat the volume of liquid electrolyte 140 and remove carbon dioxide and/or carbonate. As an example, a filter unit may be used to scrub or filter carbon dioxide and/or carbonate from the volume of liquid electrolyte 140. As one example, the filter unit may include a pump to circulate electrolyte through a filter to remove carbon dioxide and/or carbonate out of the volume of liquid electrolyte 140. The carbon dioxide may be vented to the air 105. Alternatively, the carbon dioxide and/or carbonate may be trapped in the filter unit and the filter unit may be replaced periodically. For example, the filter unit may contain a chemical reagent or scrubber that reacts strongly with carbon dioxide and/or carbonate to bind and trap the unwanted species. For example, a gas-phase filter may use sodium hydroxide (NaOH), lithium hydroxide (LiOH), potassium hydroxide (KOH), calcium hydroxide ($Ca(OH)_2$), magnesium hydroxide ($Mg(OH)_2$), barium hydroxide ($Ba(OH)_2$) or a mixture of these reagents to trap carbon dioxide chemically before it reaches the cell. Alternatively, the filter unit may flow through electrolyte which has dissolved carbon dioxide and/or carbonate and expose this electrolyte to a reactive medium that binds and/or reacts with carbonate ions to remove them from the solution. For example, if the electrolyte is primarily potassium hydroxide, the filter may contain solid calcium hydroxide. The solubility of calcium carbonate is much lower than the solubility of potassium carbonate, so the dissolved carbonate will react with the calcium hydroxide to form calcium carbonate which will precipitate from the electrolyte and accumulate in the filter unit. The filter unit may be periodically replaced or refreshed or refurbished to restore it. The filter unit may run at various intervals, such as intervals matched to the carbon dioxide diffusion rate into the cell, to filter out carbon dioxide and/or carbonate from the volume of liquid electrolyte 140. This may maintain the volume of liquid electrolyte 140 with a sufficiently low carbon dioxide and/or carbonate levels to prevent or mitigate the pH changes in the electrolyte, changes in the electrolyte's ionic conductivity, and/or the precipitation of carbonate solids in the electrolyte.

In one embodiment, a $CO_2$ scrubbing reactor is created where air is pumped through an electrolyte bath containing one or more concentrated alkali hydroxide salts (i.e., NaOH). In this particular embodiment, the reactor is designed such that the total pressure drop through the reactor is low, but the gas residence time is increased by creating long winding channels with a positive vertical slope. Baffles, ribs, ridges, or similar may be added to improve convective mixing in the reactor. This permits a small energy loss while maximizing $CO_2$ removal from the air.

In some embodiments, carbon dioxide and/or carbonate ion ($CO_3^{2-}$) build-up in the liquid electrolyte of any of the battery designs herein is mitigated or prevented by use of an enclosure that is sealed or partially sealed so as to prevent or limit access of gaseous $CO_2$ from the ambient atmosphere to the liquid electrolyte. For example, the batteries described herein may have an enclosure wherein a port, vent, or one-way valve allows gases generated within the enclosure to escape but limits exposure of the interior of the battery to atmospheric $CO_2$. In some embodiments, said one-way valve is a liquid-containing airlock, bubbler, or trap of a design similar to that commonly used in the making of beer and wine.

Iron anode materials generate bubbles of gas due to chemical reactions at the anode. These bubbles may interfere with other components of an electrochemical cell. In one embodiment, a spacer or fixture is used to position a bubble-generating electrode above other parts that may be sensitive to bubbles. The bubble path then does not come into contact with the bubble sensitive parts, because bubbles travel upward in liquid. In general, this approach locates components that generate upward-traveling products, such as gas bubbles in a liquid, above the components that are sensitive through those products. Similarly, components that generate downward-traveling products, such as precipitates, may be located underneath other components that are sensitive to those products.

A charged metal electrode in an electrolyte may self-discharge. For example, a reduced iron (Fe) electrode in an alkaline solution will self-discharge according to the spontaneous reaction $Fe+2H_2O \leftrightarrows Fe(OH)_2+H_2$. In an open metal-air battery (i.e., an unsealed battery), such as an iron-air (Fe-air) battery, it is possible to provide for removing a metal electrode from the electrolyte to prevent self-discharge of the metal electrode. In various embodiments, a pump may pump liquid electrolyte into and out of a vessel of a battery such that the metal electrode is submerged in the liquid electrolyte when the liquid electrolyte is pumped into the vessel and the metal electrode is removed from the liquid electrolyte when the liquid electrolyte is pumped out of the vessel. In various embodiments, a gas filled bladder may be inflated and deflated to displace the liquid electrolyte such that the metal electrode is submerged in the liquid electrolyte when the gas bladder is inflated and the metal electrode is removed from the liquid electrolyte when the gas bladder is deflated. In various embodiments, one or more lifting systems may raise and lower the metal electrode out of and into the liquid electrolyte. Removing the metal electrode from the electrolyte may prevent self-discharge of the metal electrode.

Figure 51:
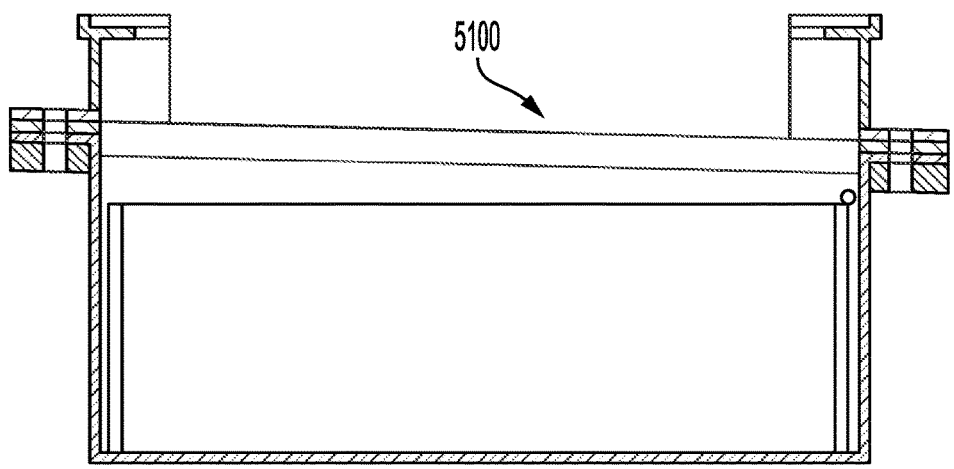
FIG. 51 illustrates a cross-section side elevation view of a variation on the angle of repose of an ORR electrode, in accordance with various embodiments.

FIG. 51 illustrates a cross-section side elevation view of a variation on the angle of repose of an ORR electrode 5100, in accordance with various embodiments. In some system configurations with air-breathing electrodes, it is useful to place the air-breathing electrode at the gas-liquid boundary. However, the gas-liquid boundary may vary in angle and height from cell to cell. In one embodiment, the air-breathing electrode 5100 may have a rippled surface to account for angle and height variances between cells. In another embodiment, the air electrode is a volumetric sponge type electrode that is thick enough to account for angle and height variances between cells.

Two problems that arise with a stagnant electrolyte are the formation of bubbles and the creation of a pH gradient during both charge and discharge. Bubbles may not escape from the electrolyte and may become stuck on the electrodes, leading to a performance decay. A pH gradient in the electrolyte may also lead to performance decay or corrosion of the electrodes. One solution to both the issue of bubbles and a pH gradient may be to circulate electrolyte at a low flow rate, such as less than 1 mL/min/cm$^2$. This flow of electrolyte may provide convenient or even automatic bubble management by making it easier for bubbles to escape. Additionally, flowing electrolyte may provide pH control so that a gradient does not form.

As discussed above, in various embodiments, a battery (e.g., battery 100) may include three electrodes, an anode (e.g., 110) and a dual cathode (e.g., cathode 120 constituted in two parts, such as a first cathode, and a second cathode). In a recharge mode of operation, the level of electrolyte (e.g., electrolyte 140) may be reduced to expose the second cathode to air. The level of the electrolyte in the battery may be controlled by pumps, valves, and/or other systems to transition the level of the electrolyte to flood or not flood the second cathode in the discharge and recharge modes, respectively. In the recharge mode, a dry hydrogen oxidation reaction (HOR) may occur at the second cathode and a two-phase oxygen evolution reaction (OER) may occur at the first cathode. When the anode is an Fe anode, hydrogen ($H_2$) bubbles may be created by the anode in the recharge mode in a parasitic process. The hydrogen ($H_2$) bubbles may be oxidized (i.e., electrons recaptured) at the second cathode. The two cathodes may have different positive potentials with regard to the anode in the recharge mode, such as 0.1V and 1.5V, respectively, while the anode may be at −0.5V. This may keep the second cathode at a more favorable 0.1V potential as it oxidizes hydrogen ($H_2$) bubbles produced by the anode.

In low-cost energy storage systems, using current collection metals with high conductivity per unit cost, such as copper, would be advantageous. However, some of these low-cost current collectors, such as copper, are not stable in alkaline aqueous electrolytes. To keep the current collector separate from the electrolyte, the air-breathing electrode may have a structure that wicks the electrolyte into it to promote the necessary triple phase boundary distribution while preventing the electrolyte from touching the current collector.

The current collector is one of the most expensive components in the architecture, even when using low-cost metals, such as stainless steel. Taking advantage of the spherical shape and the high electrical conductivity of DRI pellets, a cost-effective conical current collection strategy may be applied for DRI marble-based anode. As shown WHERE, the "active" current collector (or current collection coating) on the bottom of the cone accounts for a small portion of the conical marble enclosure; gravity of the self-aligned DRI marbles near the "conductive wall" serve as the "compression force" to ensure good electrical contact between the DRI marbles and the current collectors. The optimal current collection in terms of electrical resistance and cost may be achieved by optimizing the thickness of the current collector, the height of the current collector, the cone angle, and the size distribution of DRI marbles.

Electrochemical energy storage systems may need to employ electrode switching. To switch between electrodes requires some sort of switching mechanism. While this may be done with electronics, these electronics must survive in a harsh chemical environment, must be dependable over the lifetime of the system, and may have significant costs. Mechanical switching of electrical pathways may be a more robust, reliable, and chemical environment-tolerant solution. Switching of a mechanical contact, such as a relay or light switch, may be employed as cells are ready to switch between charging or discharging modes. These switches may need to employ flexible electrical connections or conductors, but this is standard practice in other areas.

The magnetic properties of DRI may be used in assembling the anode bed. This special property of Fe increases the design space of the electrode and architecture. For example, a permanent magnet may be used as part of the current collector (above or underneath the current collector) to provide extra pressure on the pellet bed. A magnet may be used to align the pellets so that pellets can be aligned and a string of pellets may be produced.

Figure 52:
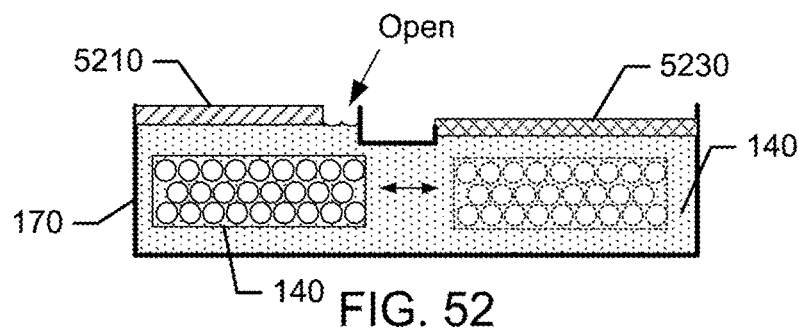
FIG. 52 illustrates a movable anode design, in accordance with various embodiments.

In some embodiments, the anode may be moveable between cathode zones. For example, as illustrated in FIG. 52, an anode 110, such as a bed of DRI pellets, may move in the electrolyte 140 inside the housing 170 from a first position to a second position. One position may be under a first cathode 5230 and the second position may be under a second cathode 5210. For example, the first cathode 5230 may be an OER electrode and the second cathode 5210 may be an ORR electrode. The housing 170 may include an opening at the ORR electrode 5210 position. Depending on the operating mode of the battery, the anode 110 may be moved back and forth to position under the appropriate cathode type 5230, 5210.

Alkaline iron electrode batteries operate best with certain additives in the electrolyte and/or cell in general. For example, sulfur aids in de-passivation of iron electrodes, but is consumed by the battery. Sulfur consumption contributes to a fade in capacity over many cycles. A delivery system is therefore needed to replenish sulfur supplies in order to maintain battery performance. One embodiment of such a system may be a pump that delivers sulfur-bearing liquid to the battery cell. Another embodiment may be a dry hopper that delivers polysulfide salts to a closed or open battery cell.

Electrolyte additives may have a range of solubilities, and some may have the most beneficial effect when they are intimately mixed with the solid electrode. In certain embodiments, the electrode may be pelletized, or comprised of multiple pellet-shaped sub-units. One method of additive delivery may be to make pellets that contain additives or pellets comprised entirely of additives. Such additives may be FeS or $FeS_2$. Other pellets may be comprised mostly of other active material(s). The different types of pellets may be mixed to create a blended electrode.

Migration of gas bubbles, electrolyte constituents, or solids from one part of the energy storage system to another through the electrolyte may be undesirable. A low-cost porous separator with sufficient chemical and mechanical compatibility may be used to prevent such migration. In one embodiment, it is possible to use ultra low-cost separators such as Polybenzimidazole separator and polypropylene separator (e.g. Celgard 3501) between the anode and cathode(s) of the energy storage system. Both separators show sufficient chemical and mechanical compatibility with the system of interest.

A metal-air battery system may be designed such that oxygen gas evolved during the charging process is captured and stored. This oxygen gas may then be directed to the ORR electrode during discharge of the metal-air battery. Collecting and reusing the oxygen gas may improve overall system efficiency and may also improve rate capability of the ORR electrode. The oxygen gas may be stored in tanks, head space, or balloons. This system-level approach may be applied to zinc-air, iron-air, aluminum-air, or lithium-air batteries.

The ORR electrode efficiency increases with oxygen concentration. Therefore, it is preferable to harvest the oxygen generated during OER for later use during ORR. Storage of oxygen may be achieved through a combination of: inflatable gas reservoirs, gas compression, gas adsorption and oxygen liquefaction, followed by delivery of that oxygen to the ORR electrode during discharge.

Figure 53A:
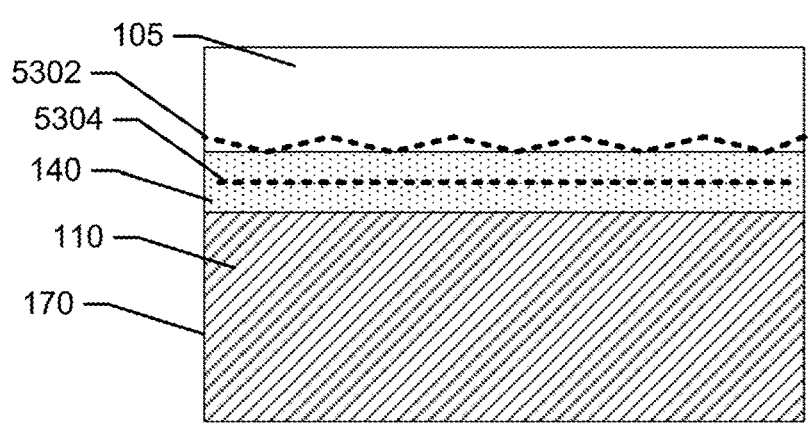
FIGS. 53A and 53B illustrate a cross-sectional side elevation view and a top view, respectively, of a battery, in accordance with various embodiments.
Figure 53B:
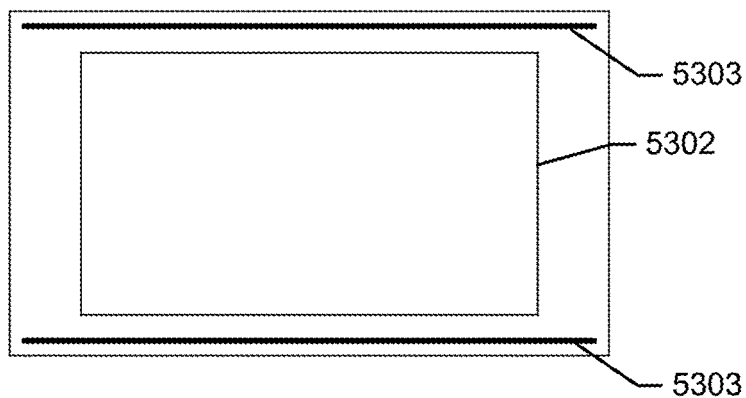

FIGS. 53A and 53B illustrate a cross-sectional side elevation view and a top view, respectively, of a battery, in accordance with various embodiments. The battery may include an ORR electrode 5302 located at the liquid/gas interface where the electrolyte 140 meets the air 105. The ORR electrode 5302 may float on the electrolyte 140 (i.e., be passively self-locating at the interface) or be rigidly supported at the liquid/gas interface. The battery may include an optional separator 5304 to keep air from reaching the anode 110 (e.g., a metal electrode).

Figure 54:
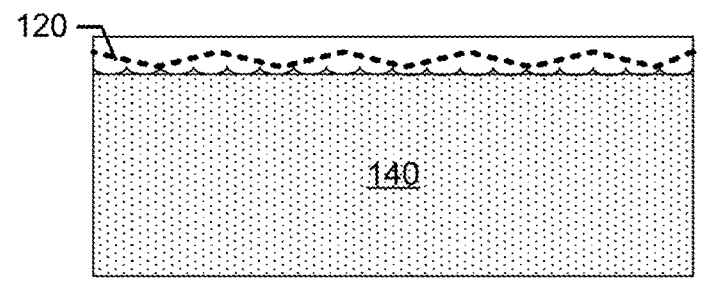
FIG. 54 illustrates a cross-sectional side elevation view of an air-breathing electrode, in accordance with various embodiments.
Figure 55:
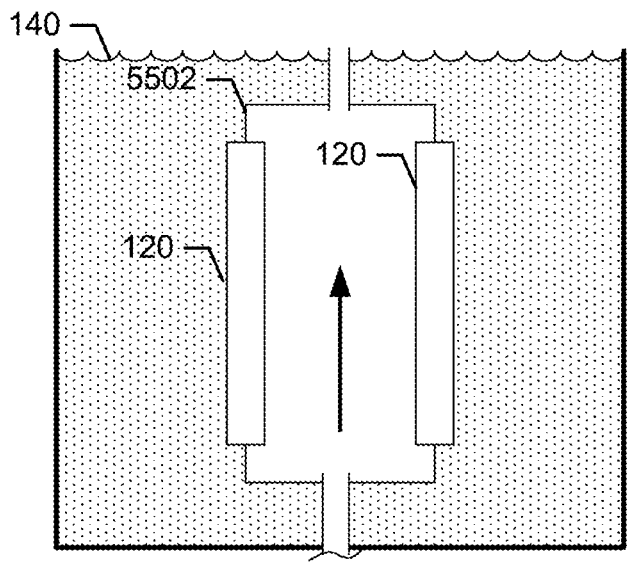
FIG. 55 illustrates a cross-sectional side elevation view of an inverse air-breathing electrode, which submerges the electrode, in accordance with various embodiments.]

FIG. 54 illustrates a cross-sectional side elevation view of an air-breathing electrode (e.g., cathode 120), in accordance with various embodiments. In "normal" configurations, when the cathode 120 is an air breathing electrode (e.g., an ORR electrode), the cathode may rest at the surface of the electrolyte 140. In an "inverse" air breathing configuration as shown in FIG. 55, the cathode 120 may be submerged in the electrolyte 140 below the liquid level of the electrolyte 140. In such "inverse" configurations, the cathode 120 may be supported by a sealed vessel 5502. The volume inside the sealed vessel 5502 may have air pushed into/through it to provide air to the cathode 120 when the cathode 120 is an air breathing electrode (e.g., an ORR electrode). The cathode 120 may be submerged in the electrolyte 140, but the air and the sealed vessel 5502 frame may ensure the cathode 120 is at the triple phase boundary. In various embodiments, to enable a stable triple phase boundary for the ORR reaction, air must be delivered to this surface in an efficient and cost effective manner.

Figure 56:
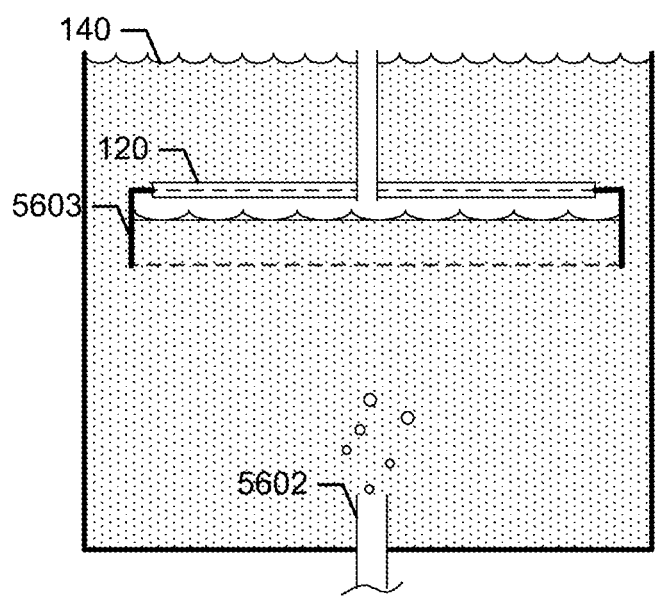
FIG. 56 illustrates a cross-sectional side elevation view of a sparged air electrode, in accordance with various embodiments.
Figure 57:
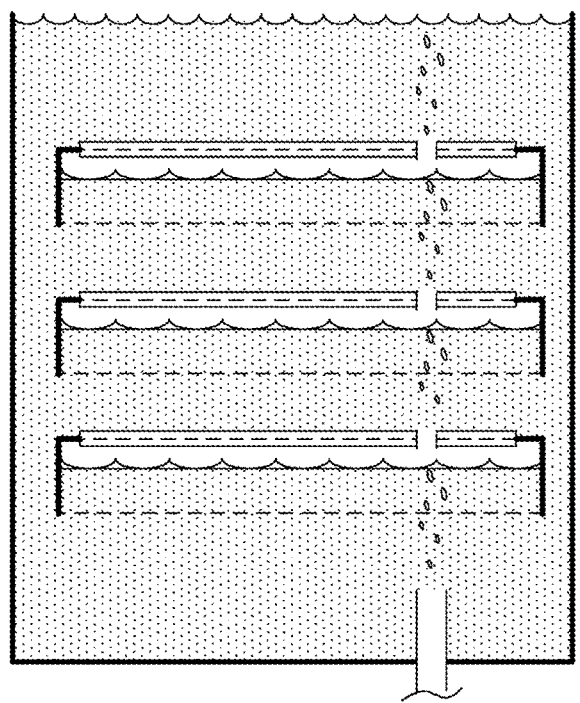
FIG. 57 illustrates a cross-sectional side elevation view of stacked sparged air electrode assemblies, in accordance with various embodiments.
Figure 58:
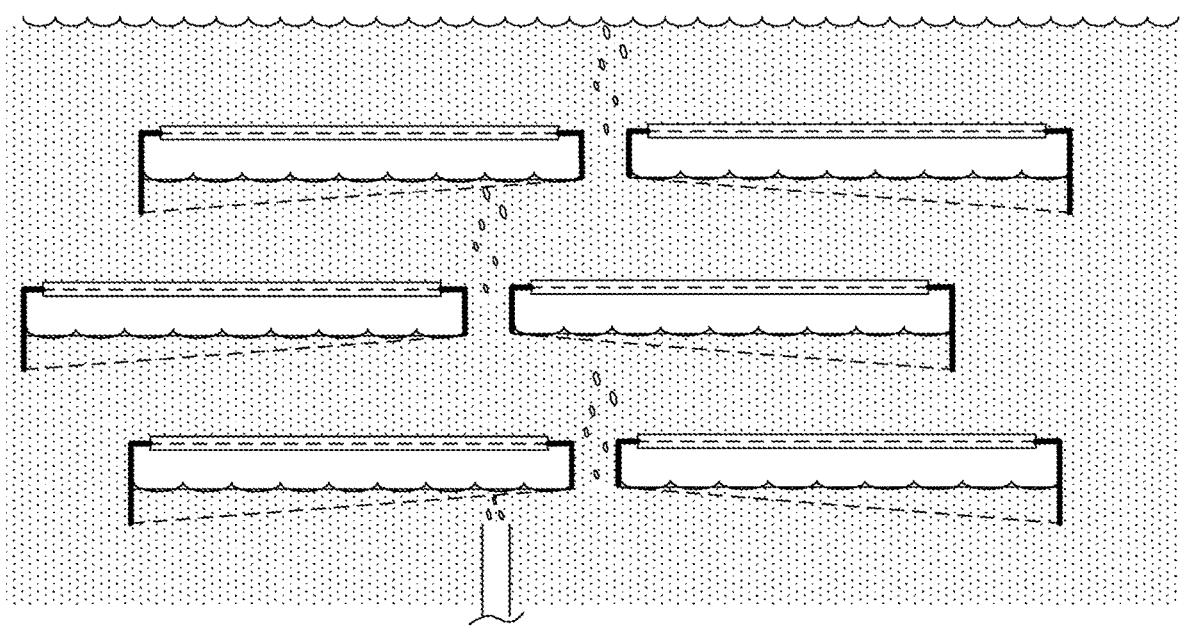
FIG. 58 illustrates a cross-sectional side elevation view of stacked and staggered sparged air electrode assemblies, in accordance with various embodiments.

FIG. 56 illustrates a cross-sectional side elevation view of a sparged air electrode (another example of an "inverse" configuration), in accordance with various embodiments. The sparged air configuration may place the cathode 120 (e.g., an air breathing electrode such as an ORR electrode) at the triple phase boundary by pumping air into the electrolyte 140 from a bubbler 5602. The frame 5603, such as a frame with baffles, supporting the cathode 120 may be submerged in the electrolyte 140. However, the air bubbles on the underside of the cathode 120 from the bubbler 5602 may locally create the triple phase boundary. The bubbles build up a reservoir of gas behind the ORR electrode even though the ORR electrode is below the electrolyte 140 liquid level. FIG. 57 illustrates a cross-sectional side elevation view of stacked sparged air electrode assemblies of FIG. 56, in accordance with various embodiments. FIG. 58 illustrates a cross-sectional side elevation view of stacked and staggered sparged air electrode assemblies of FIG. 56, in accordance with various embodiments. In FIG. 57 the sparged assemblies are stacked directly over one another with air passages in between to provide a bubble leak path. In FIG. 58, the sparged assemblies are offset from one another (i.e., staggered) and the gaps in the assemblies move the bubbles therebetween.

In any unsealed ORR architecture, such as the architectures illustrated in FIGS. 56, 57, and 58, the pressure of the air delivered must be at least $\rho*g*h$, where h extends from the top of the electrolyte 140 to the air inlet surface of the bubbler 5602, regardless of air flow rate from the bubbler 5602. In comparison, by sealing the surface of the triple phase boundary such is in the submerged configuration of FIG. 55, the pressure required to deliver air and enable this electrochemical reaction can be much lower than that of an unsealed triple phase boundary (e.g., of FIGS. 56, 57, and 58). This reduced air pressure (e.g., a low pressure (LP) air requirement) in vertically sealed ORR configurations, such as that of FIG. 55, can reduce auxiliary power loads required to pump air if the pressure is much lower in comparison to the higher pressure needed for an unsealed triple phase boundary (e.g., of FIGS. 56, 57, and 58).

Figure 59:
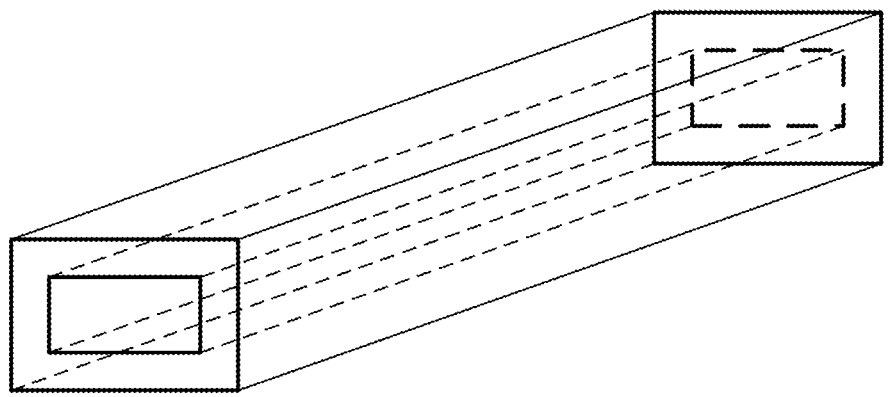
FIG. 59 illustrates a perspective view of a rectangular tube style ORR electrode design, in accordance with various embodiments.
Figure 60:
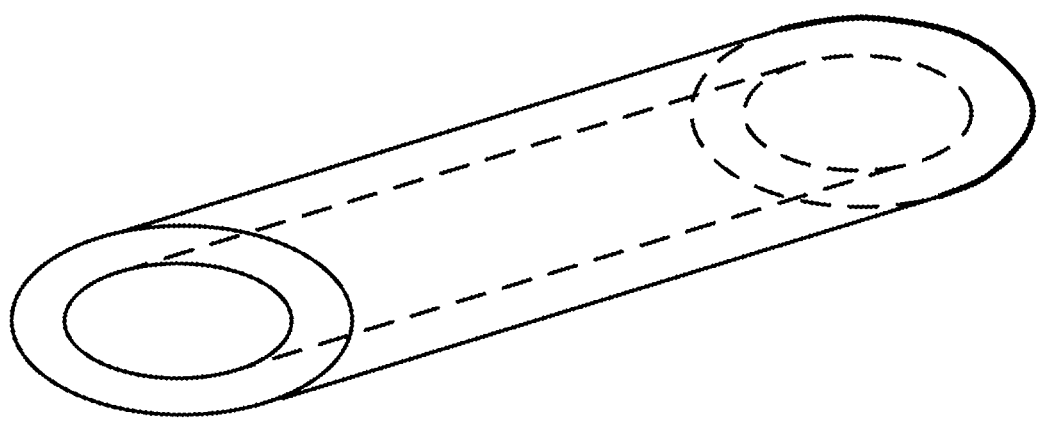
FIG. 60 illustrates a perspective view of a cylindrical tube style ORR electrode design, in accordance with various embodiments.
Figure 61:
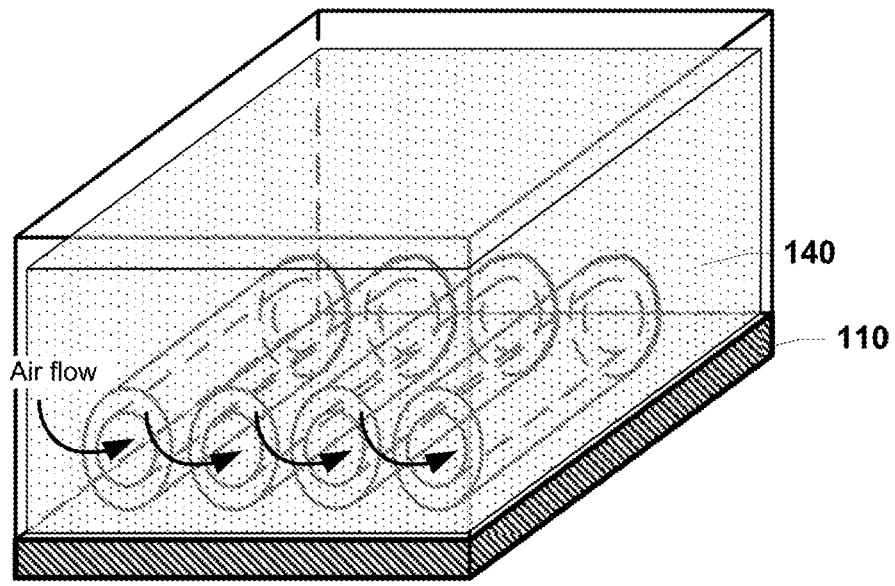
FIG. 61 illustrates a perspective view of an array of cylindrical tube style ORR electrodes in a vessel, in accordance with various embodiments.
Figure 62:
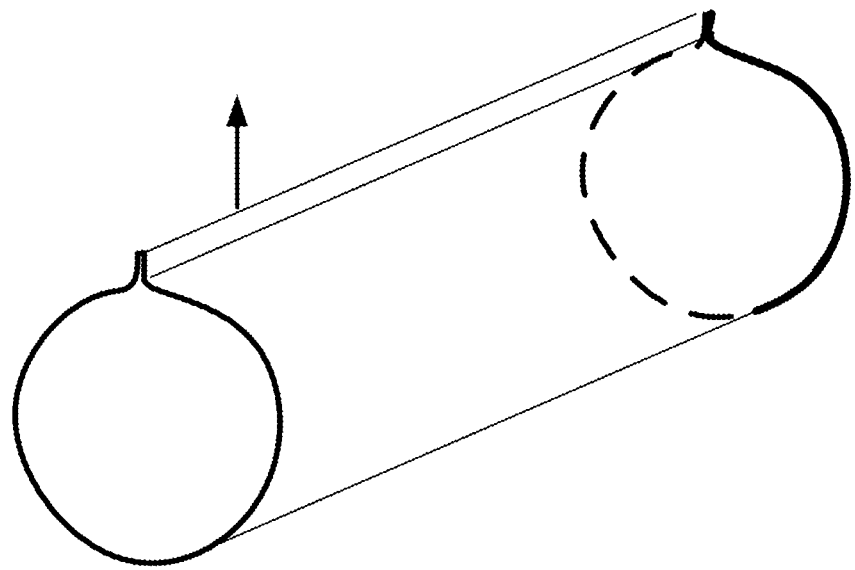
FIG. 62 illustrates a perspective view of a cylindrical tube style ORR electrode design formed from a wrapped single sheet with a vertical seam, in accordance with various embodiments.

The inverse air breathing electrodes may be formed in many different shapes, as illustrated in FIGS. 59-62. FIG. 59 illustrates a perspective view of a rectangular tube style ORR electrode design, in accordance with various embodiments. The rectangular design may provide four outer faces and four inner faces of the tube. In some embodiments, all the faces may be ORR electrodes or a subset of the faces may be ORR electrodes. FIG. 60 illustrates another circular tubular design. The tubular ORR electrode may be a single extended tube or may be a spiralized tube made from a wrapped sheet of ORR materials. As illustrated in FIG. 61, an array of tubes may be arranged in a single vessel supporting the electrolyte 140 and anode 110. Air may be passed through the tubes. The number and arrangement of the tubes may vary in various embodiments. FIG. 62 illustrates that a tube may be formed from a pinched sheet of ORR electrode material in various embodiments. The sheet may be curved on itself and sealed at the top end.

Air bubbles on submerged horizontal electrodes tend to exhibit chaotic slug flow. Various embodiments may provide ramp and hole array air flow regulation for submerged electrodes. In various embodiments, a ramp and hole array may minimize the energy barrier for bubbles to escape through holes in electrode retaining cups, encouraging continuous flow patterns and separation of an air pocket into small bubbles for layer to layer transfer. Gas and bubble flow management in horizontally oriented ORR electrodes is difficult. Various embodiments provide for flowing air through horizontally stacked ORR electrodes at each individual layer to enable more facile air control.

One of the main limitations to producing a long-lasting bifunctional air electrode may be that the carbon substrates typically found as the catalyst support for the Oxygen Reduction Reaction (ORR) cathode are not stable at the potentials seen at the Oxygen Evolution Reaction (OER) cathode. In order to make a long-lasting electrode the two cathodes should be electronically separable.

Figure 63A:
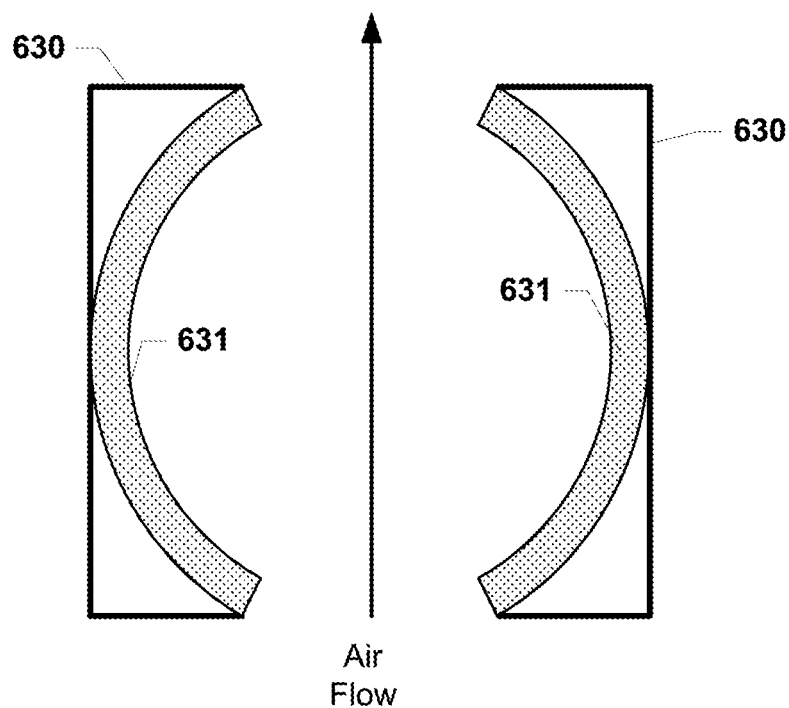
FIGS. 63A and 63B illustrate an embodiment rigid OER cathode and flexible ORR cathode.
Figure 63B:
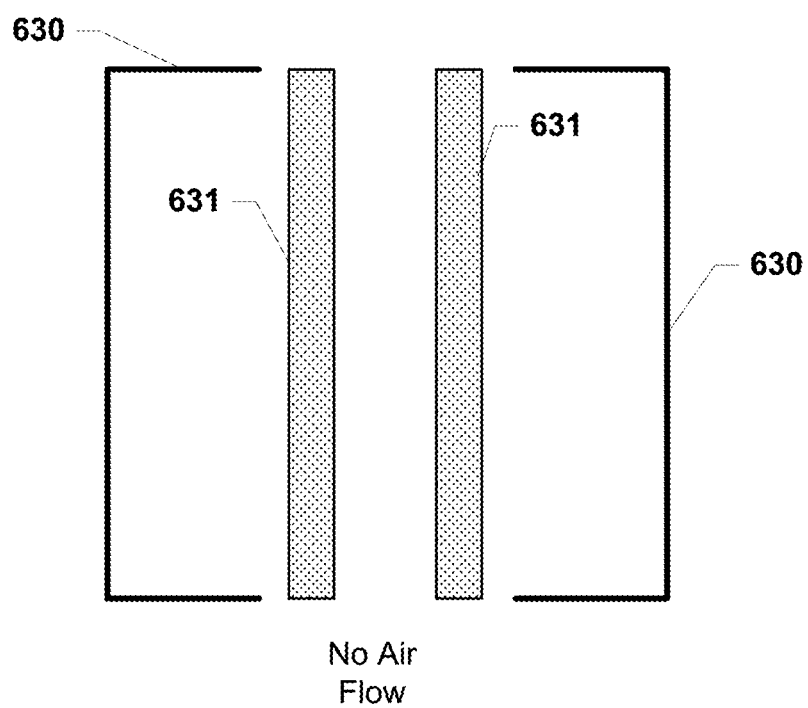

Various embodiments may provide a mechanical mechanism relying on a rigid OER electrode and a flexible ORR electrode configured to make the OER electrode and the ORR electrode electronically separable as illustrated in FIGS. 63A and 63B. In some embodiments, the flexible ORR cathode 631 may be placed within a rigid metallic OER cathode 630. The ORR cathode 631 forms its own air pocket with air fed inside it. In this manner the ORR cathode 631 forms an ORR cavity. When air is supplied to the ORR cavity, the ORR cathode 631 expands against the OER cathode 630 electronically connecting it to the load as illustrated in FIG. 63A. When air flow is shut off, hydrodynamic forces of the electrolyte push the ORR cathode 631 off of the OER cathode 630, thereby keeping the ORR cathode 631 and the OER cathode 630 separated.

When the ORR electrode floods, loss of the triple phase boundary means failure of the ORR electrode. Various embodiments may include providing a drain valve at the bottom of the ORR chamber allowing for removal of excess electrolyte. The removal of excess electrolyte via the drain valve may prevent the failure of the ORR electrode due to loss of the triple phase boundary.

ORR electrodes require electrolyte on one side and gaseous oxygen, which may be in the form of air, on the other side. In a deep electrolyte volume, the pressure of electrolyte on the electrode at the bottom will differ significantly from the pressure at the top. A single sheet of sheeted electrodes may not be optimal for this pressure gradient.

Figure 64:
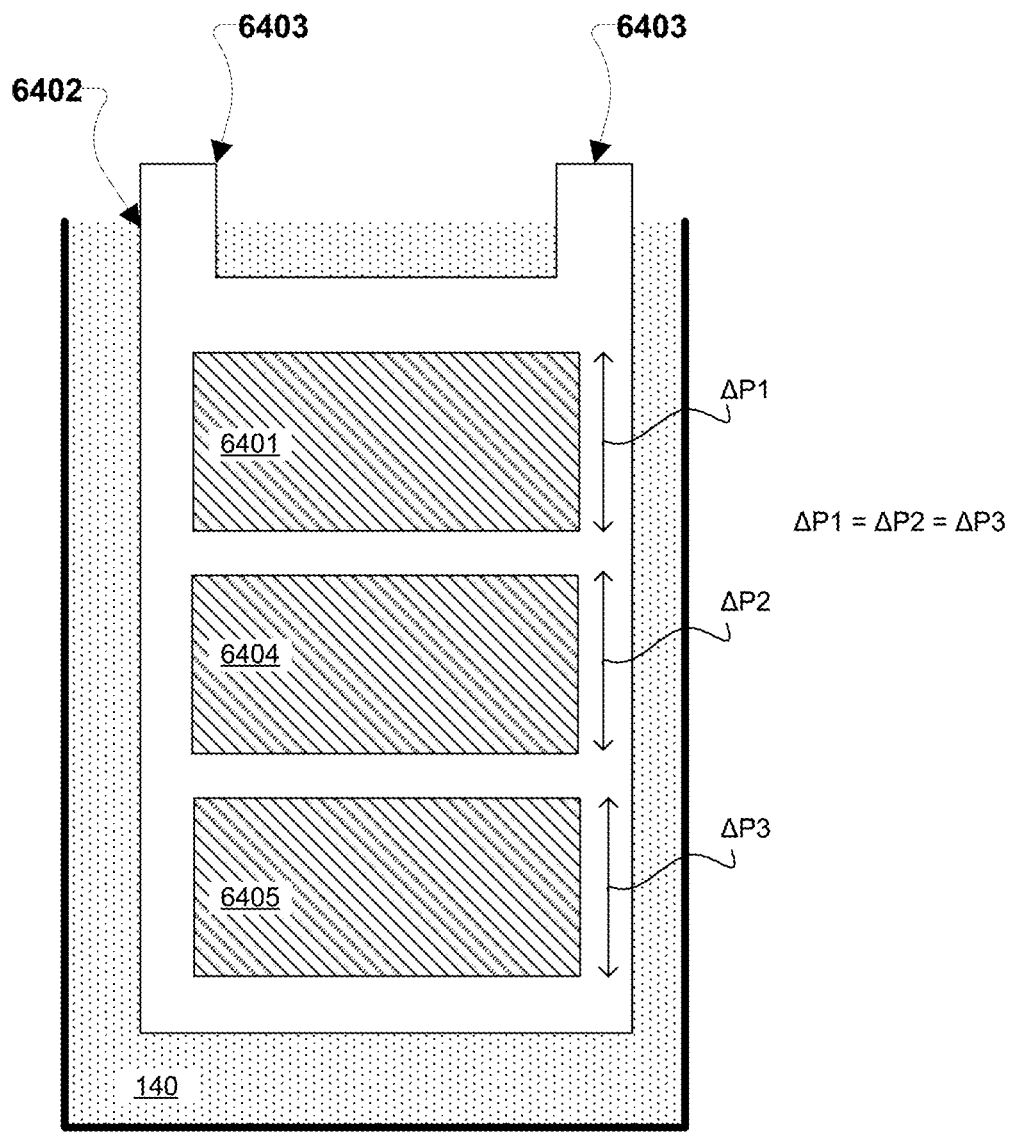
FIG. 64 illustrates a stacked ORR electrode configuration according to various embodiments.

In various embodiments, a vertical dimension of a continuous electrolyte depth may be segmented into smaller sections, with each section having its own ORR electrode. FIG. 64 illustrates an example of such a stacked ORR electrode 6401, 6404, 6405 configuration. Each of the electrodes 6401, 6404, 6405 may be ORR electrodes tuned to different operating pressures. Each of the electrodes 6401, 6404, 6405 may be customized for the pressure that respective electrode 6401, 6404, 6405 will operate at in the electrolyte 140. The electrodes 6401, 6404, 6405 may be horizontal strips of ORR sheet electrode supported in a vertical plane by a current collector 6402, such that the electrodes 6401, 6404, 6405 are stacked on top of each other such that the vertical pressure variation across each electrode 6401, 6404, 6405 is minimized and each height electrode can be optimized for its designated height. Current collection and sealing accommodate multiple strips. The current collector 6402 may include current collection tabs 6403. The change in pressure across the electrodes 6401, 6404, 6405 may be the same. While FIG. 63 illustrates three stacked electrodes 6401, 6404, 6405, more or less stacked electrodes may be used in various embodiments, with each electrode tuned based on its respective depth and thereby experienced pressure in the electrolyte 140.

Figure 65:
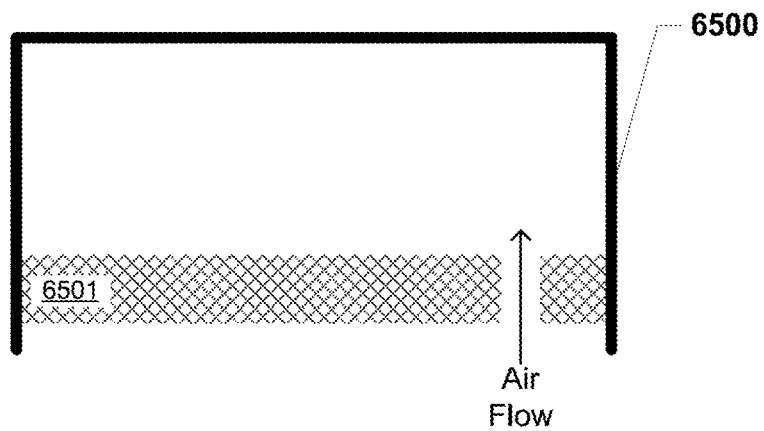
FIG. 65 illustrates an ORR electrode including a porous separator according to various embodiments.

A horizontal position for an ORR electrode may be of benefit in an iron-air cell. However, air must be trapped underneath the ORR electrode to enable the ORR reaction. FIG. 65 illustrates an ORR electrode 6500 including a porous separator 6501 according to various embodiments. Various embodiments may include a porous separator 6501 supported underneath the ORR electrode 6500, which allows air in but traps the air until a certain pressure is reached (i.e., the pressure above which air is forced through the porous separator 6501). The ORR electrode 6500 including a porous separator 6501 design is then pressure-tolerant as the air simply escapes through the separator 6501.

Figure 66A:
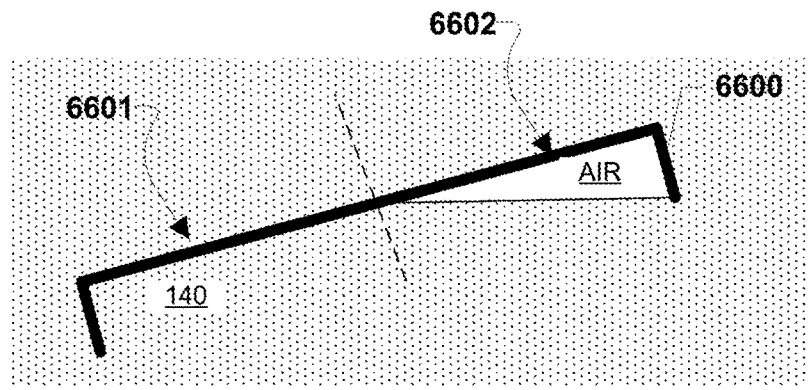
FIG. 66A illustrates a horizontal ORR electrode out of level with the electrolyte.

A horizontal cathode based system is sensitive to the level of the ORR electrode. If the electrode is not supported such that the ORR electrode plane is level to the electrolyte, it is possible that the amount of active area exposed to the air may be reduced. For example, FIG. 66A illustrates a horizontal ORR electrode 6600 out of level with the electrolyte 140 such that air is not fully trapped under all portions of the ORR electrode 6600. Rather, because the submerged ORR electrode 6600 is not level, air is only trapped under one portion 6602 of the ORR electrode 6600 and no air is exposed to the other portion 6601. As such, the air exposed portion 6602 may be an active portion, while the other portion 6601 is inactive. Maintaining the ORR electrode 6600 is a level position may ensure the full electrode 6600 (i.e., both portions 6601 and 6602) may be exposed to air and be active portions. Various embodiments may provide level assemblies for ORR electrodes, such as stacks of horizontal ORR electrodes 6611. Decreasing overall width of ORR electrodes may improve this angular tolerance.

Figure 66B:
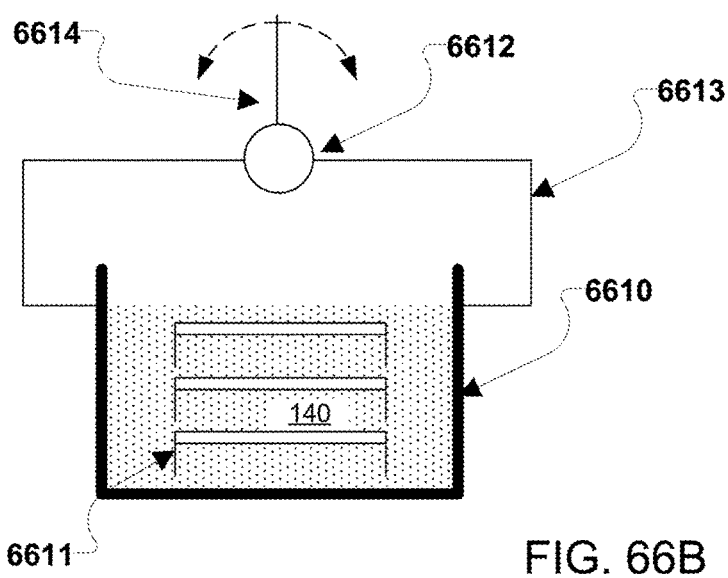
FIGS. 66B-66E illustrate example passive and active level control systems according to various embodiments.
Figure 66C:
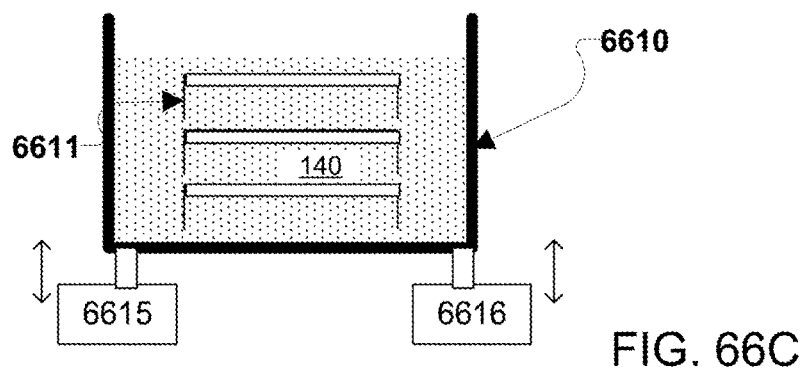
Figure 66D:
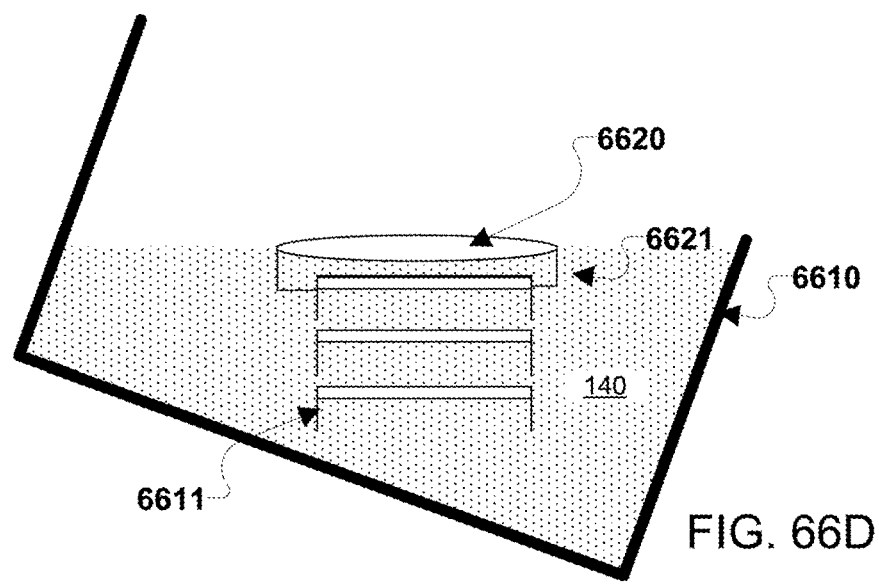
Figure 66E:
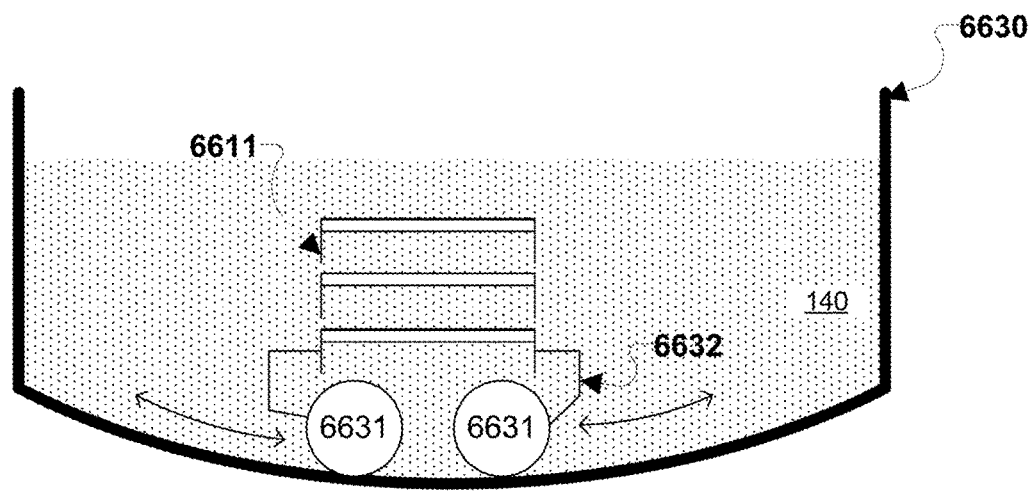

FIGS. 66B-66E illustrate example passive and active level control systems according to various embodiments. FIG. 66B illustrates an ORR electrode support system that is a passive hanging control system. FIG. 66C illustrates an ORR electrode support system that is an active actuated control system. FIG. 66D illustrates an ORR electrode support system that is a passive buoyant control system. FIG. 66E illustrates an ORR electrode support system that is a passive rolling control system.

In the hanging control system of FIG. 66B, the housing 6610 supporting the electrolyte 140 and stack of horizontal ORR electrodes 6111 may be coupled to support arms 6613 connected to an articulating joint 6612 that is suspended from a support rod 6614. The support rod 6614 may suspend the support arms 6613, articulating joint 6612 and housing 6610 supporting the electrolyte 140 and stack of horizontal ORR electrodes 6111 freely in space. The articulating joint 6612 may be configured to provide independent movement of the support arms 613 relative to the support rod 6614 such that as the overall system to which the support rod 6614 may be affixed moves (e.g., is out of level), the support arms 6613 and housing 6610 supporting the electrolyte 140 and stack of horizontal ORR electrodes 6111 remain level due to the force of gravity acting on them.

In the active actuated control system of FIG. 66C, the housing 6610 supporting the electrolyte 140 and stack of horizontal ORR electrodes 6111 may be arranged over a series of actuators 6615, 6616, such as jacks. The actuators 6615 and 6616 may be independently controlled to raise and/or lower corners of the housing 6610 such that the housing 6610 remains level.

In the passive buoyant control system of FIG. 66D, the housing 6610 supporting the electrolyte 140 and stack of horizontal ORR electrodes 6111 may move freely, but the stack of horizontal ORR electrodes 6111 may be supported by arms 6621 connected to a float 6620 (e.g., a hollow plastic float, foam float, etc.). The float 6620 may ride on the surface of the electrolyte 140 and maintain the stack of horizontal ORR electrodes 6111 in a level position even though the housing 6610 may shift position.

In the passive rolling control system of FIG. 66E, the housing 6630 supporting the electrolyte 140 and stack of horizontal ORR electrodes 6111 may be curved at the bottom. The housing 6630 may move freely, but the stack of horizontal ORR electrodes 6111 may be supported by arms 6632 connected to wheels (or rollers) 6631 that freely travel along the curved bottom of the housing 6630. As the housing 6630 moves, the wheels 6631 may enable gravity to push the stack of horizontal ORR electrodes 6111 to the lowest point of the curved bottom of the housing 6630 and thereby keep the stack of horizontal ORR electrodes 6111 level.

Necessity of air delivery to an ORR electrode may be cause for unfavorably large spacing in between cathode and anode electrodes which may lead to an increase in ionic resistance between the ORR and anode electrodes. By spacing electrode assemblies at an angle instead of vertically, various embodiments may be able to simultaneously maximize utilization of vessel volume and decrease anode to ORR electrode spacing. Placing electrodes at an angle (i.e., other than vertically) may allow for continuously connected anode beds or non-continuous anodes.

Figure 67A:
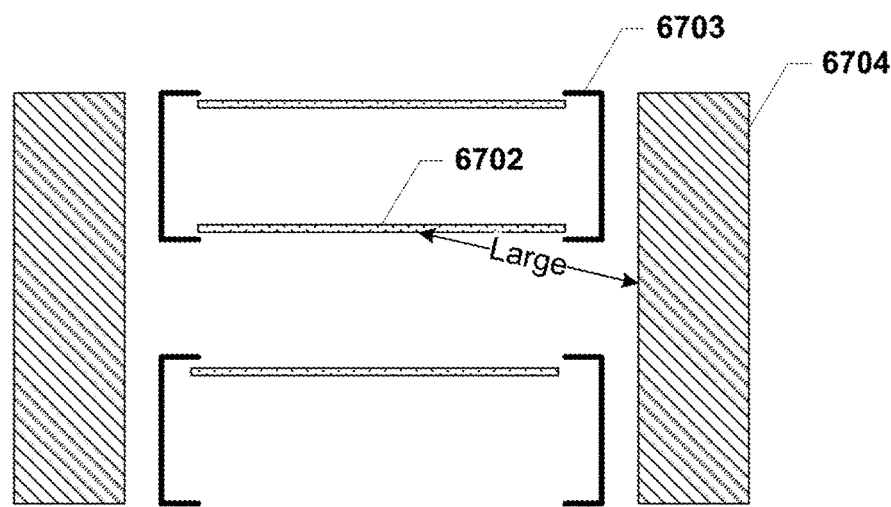
FIG. 67A illustrates a vertically aligned electrode assembly.

FIG. 67A illustrates a vertically aligned electrode assembly including vertical anodes 6704 outboard of the cathode housing 6703 supporting the ORR electrodes 6702. The spacing between the surfaces of the ORR electrodes 6702 and surfaces of the anodes 6704 may be relatively large.

Figure 67B:
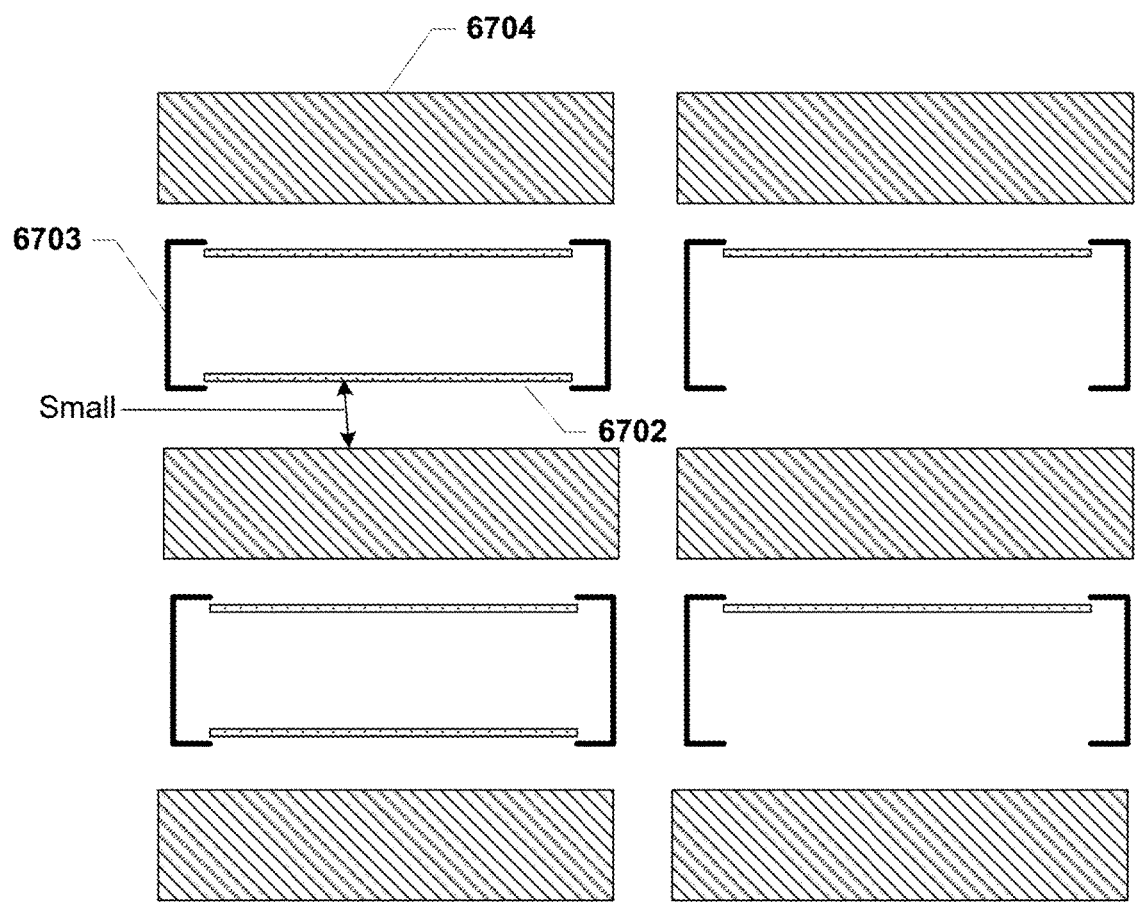
FIGS. 67B and 67C illustrate various embodiment interdigitated electrode assemblies.
Figure 67C:
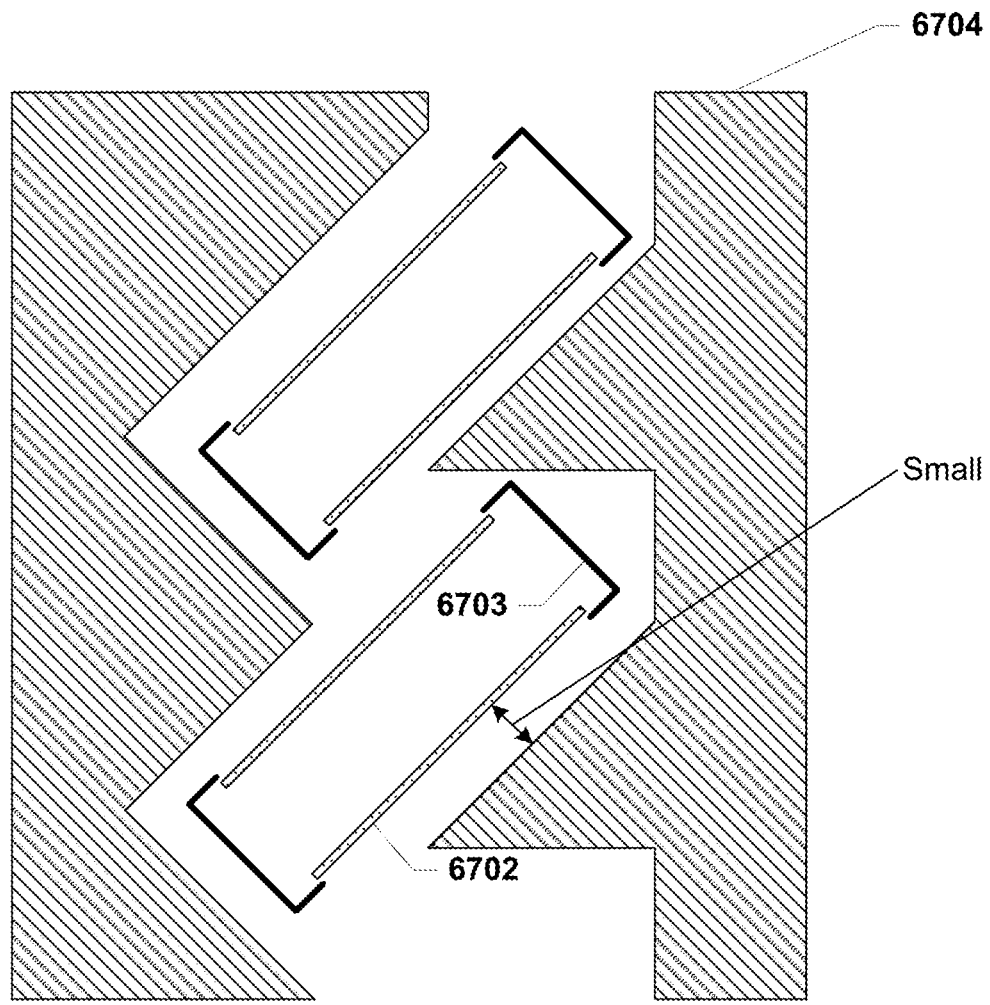

FIGS. 67B and 67C illustrate various embodiment interdigitated electrode assemblies. FIG. 67B illustrates a non-continuous configuration in which the anodes 6704 are arranged between the cathode housings 6703 such that the spacing between the surfaces of the ORR electrodes 6702 and surfaces of the anodes 6704 may be relatively small. FIG. 67C illustrates a continuous configuration in which the anodes 6704 are angled and including angled protrusions that extend toward the cathode housings 6703. The cathode housings 6703 are angled between the anodes 6704 such that the spacing between the surfaces of the ORR electrodes 6702 and surfaces of the anodes 6704 may be relatively small.

Figure 68:
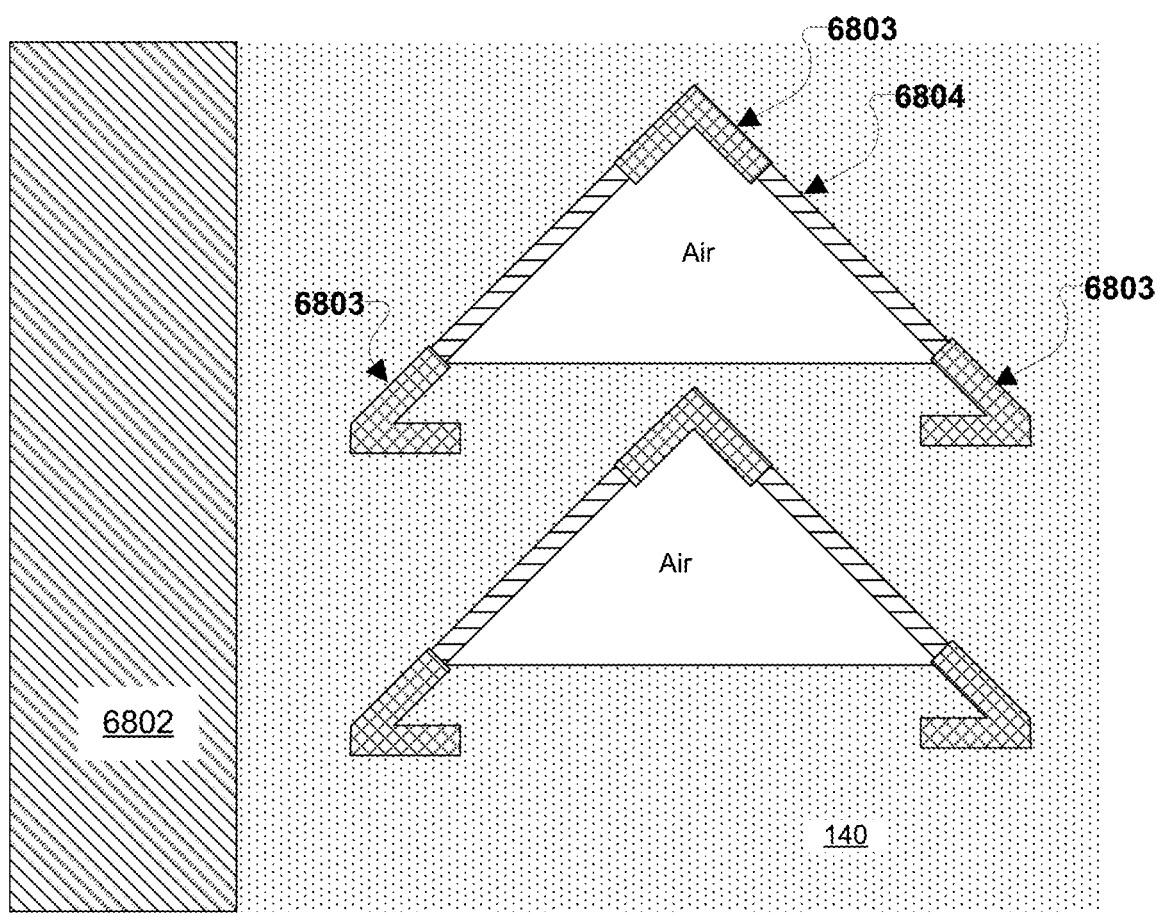
FIG. 68 illustrates an embodiment dual ORR and OER electrode configuration in which the OER electrodes are bent to create a gas pocket volume for the ORR electrodes.

FIG. 68 illustrates an embodiment dual ORR and OER electrode configuration in which the OER electrodes 6803 are bent to create a gas pocket volume for the ORR electrodes 6804. The configuration of FIG. 68 may provide an electrode with a more direct ion path from the anode 6802 to the cathode. Also, the configuration of FIG. 68 may provide a gas volume which is more defined, slightly deeper and less sensitive to angle. As illustrated in FIG. 68, the OER electrode 6803 may be folded lengthwise to create a triangular cross section as the ORR electrodes 6804 extend from the OER electrode 6803. This triangular cross section may be configured such that the area under the triangle is dedicated to air volume.

Figure 69A:
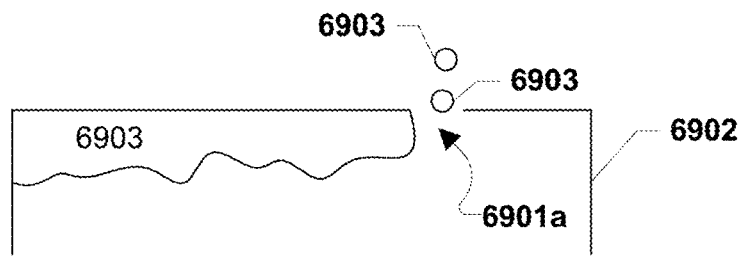
FIGS. 69A-N illustrate example bubble control approaches according to various embodiments.
Figure 69B:
Figure 69C:
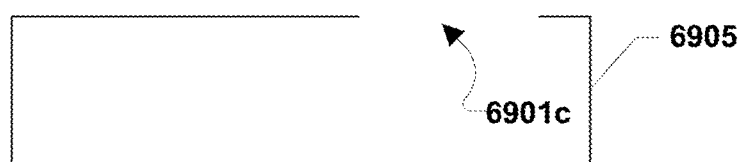
Figure 69D:
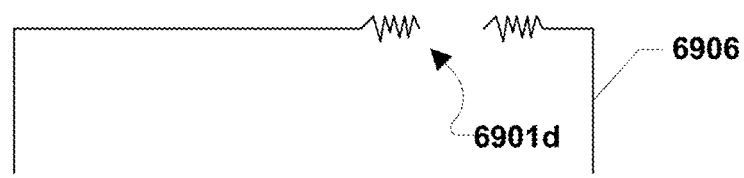
Figure 69E:
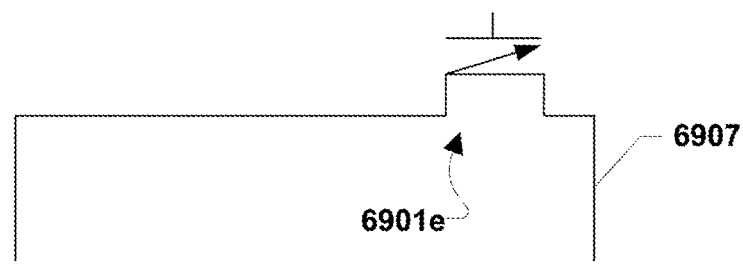
Figure 69F:
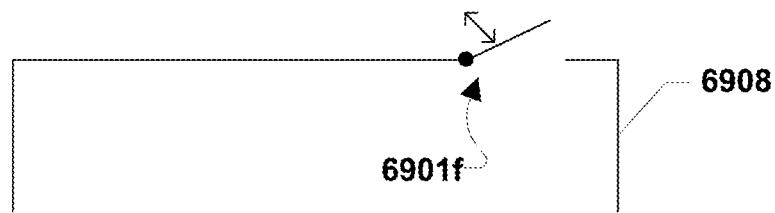
Figure 69G:
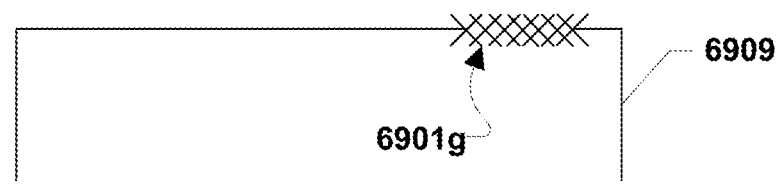
Figure 69H:
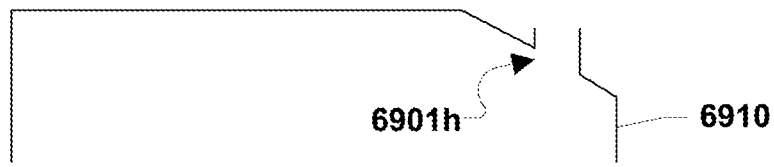
Figure 69I:
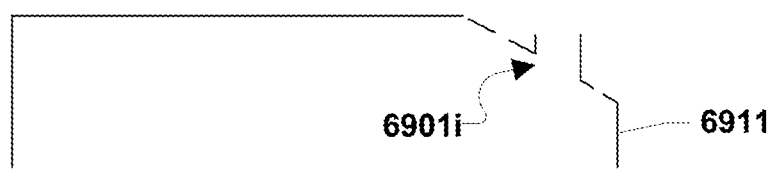
Figure 69J:
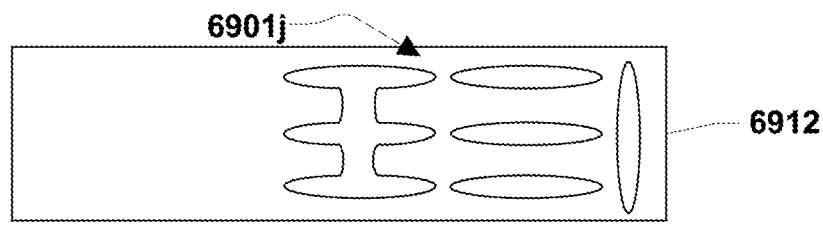
Figure 69K:
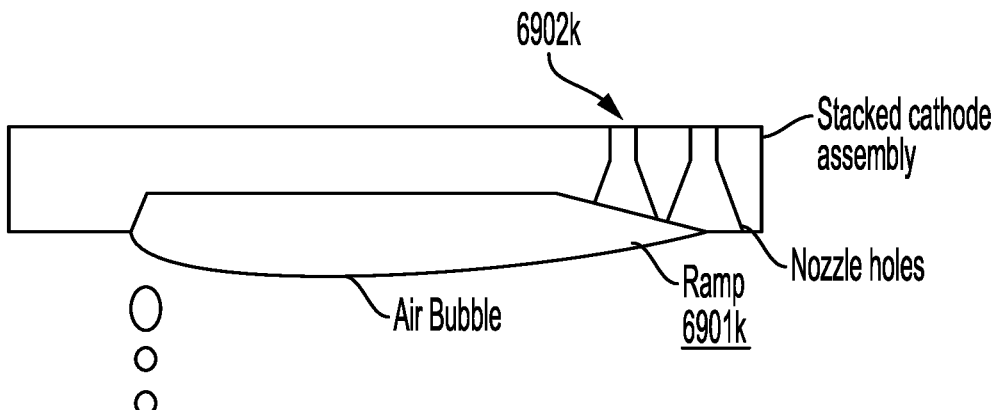
Figure 69L:
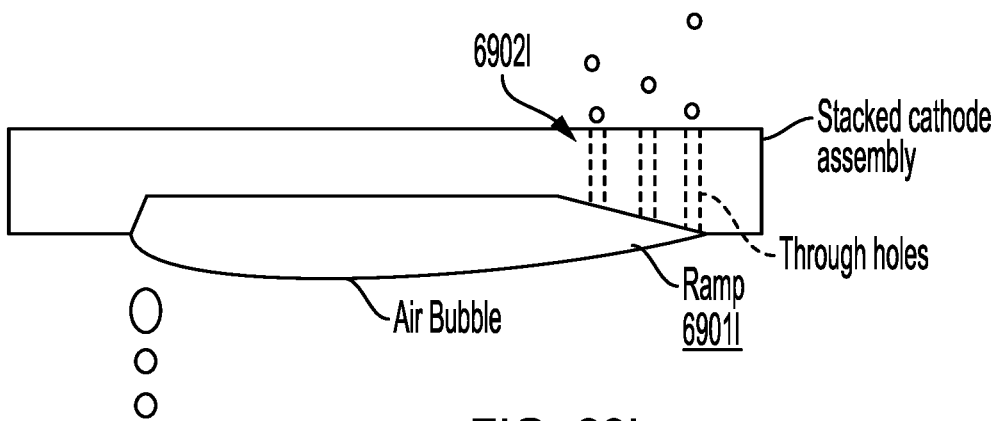
Figure 69M:
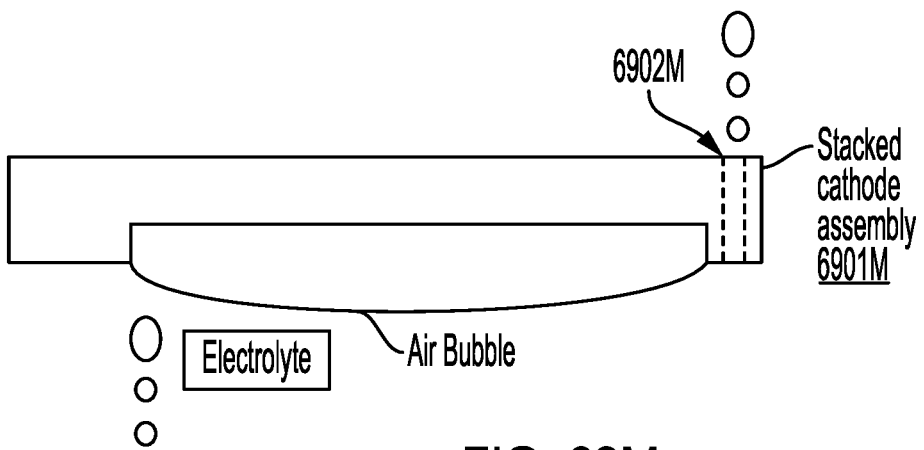
Figure 69N:
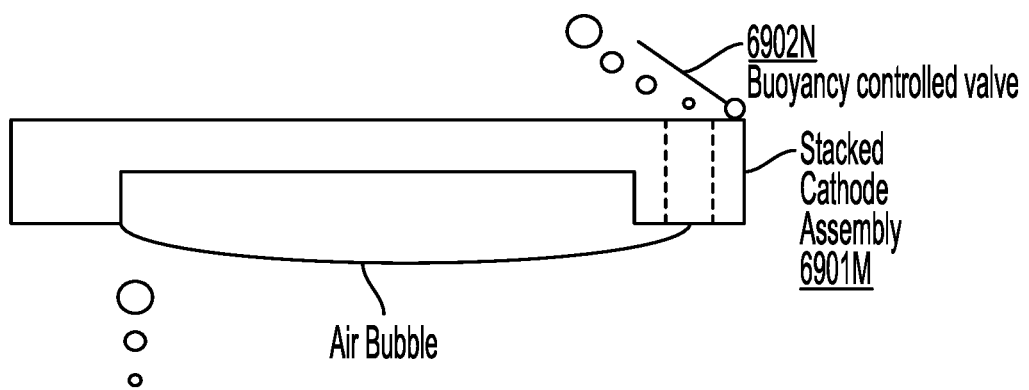

Various embodiments may include a battery configuration in which an unsealed gas bubble may be present underneath the ORR electrode. In such configurations it may be important to control the flow and path of the bubbles under the ORR electrode in order to provide adequate flow, and keep bubbles from contacting other electrodes in the path out of the reaction vessel of the battery (e.g., the reactor). Various embodiment methods may be used to control bubble flow/path(s) including an exit hole in the ORR electrode, a ramp, a combination of a ramp and exit holes, multiple exit holes, different hole sizes, nozzle-shaped holes, local surface roughening features, a check valve exit, a flap vale exit, a buoyancy control valve, a sponge/mesh exit, and/or a slot/non-round exit geometry. FIGS. 69A-N illustrate example bubble control approaches according to various embodiments. FIG. 69A illustrates an ORR electrode 6902 configured such that an exit hole 6901a is present in the ORR electrode 6902 to allow bubbles of gas 6903 to escape through the ORR electrode 6902. FIG. 69A may serve as a baseline configuration for discussing the other configurations illustrated in FIGS. 69B-69N. FIG. 69B illustrates an ORR electrode 6904 configured such that multiple exit holes 6901b is present in the ORR electrode 6904 to allow bubbles of gas to escape through the ORR electrode 6904. FIG. 69C illustrates an ORR electrode 6905 configured such that a relatively large exit hole 6901c (such as in comparison to a smaller hole 6901a in FIG. 69A) is present in the ORR electrode 6905 to allow bubbles of gas to escape through the ORR electrode 6905. FIG. 69D illustrates an ORR electrode 6906 configured such that local surface roughening features are present at an exit hole 6901d edge present in the ORR electrode 6906 to allow bubbles of gas to escape through the ORR electrode 6906. FIG. 69E illustrates an ORR electrode 6907 configured such that a check valve exit 6901e is present in the ORR electrode 6907 to allow bubbles of gas to escape through the ORR electrode 6907. FIG. 69F illustrates an ORR electrode 6908 configured such that a flap valve exit 6901f is present in the ORR electrode 6908 to allow bubbles of gas to escape through the ORR electrode 6908. FIG. 69G illustrates an ORR electrode 6909 configured such that a sponge/mesh exit 6901g is present in the ORR electrode 6909 to allow bubbles of gas to escape through the ORR electrode 6909. FIG. 69H illustrates an ORR electrode 6910 configured such that ramp exit 6901h is present in the ORR electrode 6910 to allow bubbles of gas to escape through the ORR electrode 6910. FIG. 69I illustrates an ORR electrode 6911 configured such that ramp exit with holes in the ramp portion 6901i is present in the ORR electrode 6911 to allow bubbles of gas to escape through the ORR electrode 6911. FIG. 69J is a top view of an ORR electrode 6912 configured such that the exits 6901j present in the ORR electrode 6912 to allow bubbles of gas to escape through the ORR electrode 6912 have a slotted/non-rounded geometries. FIG. 69K-69N show combinations of and additions to the features enumerated above. FIG. 69K illustrates a ramp exit 6901k as in FIG. 69H combined with nozzle-shaped exit holes. FIG. 69L illustrates a ramp exit 69011 as in FIG. 69H with multiple exit holes 69021 as in FIG. 69B, where the diameter of the holes may be engineered to provide bubble release at the desired air pressure. FIG. 69M illustrates the placement of exit holes 6902M on a stepped feature 6901M such that the air pocket does not release until it has grown over the step. FIG. 69N illustrates the combination of the stepped feature 6901N as in FIG. 69M with the buoyancy controlled valve 6902N as in FIG. 69E.

During operation, gas bubbles passing vertically through ORR layers may result in discontinuous current response of the ORR, yielding current or voltage spikes, due to the rapid introduction of gas with higher $O_2$ content at a given layer in the stacked core design. In certain embodiments, the power output from the reactor may be smoothed by passing the electric power through a rectifier, which may reduce the intensity of power spikes coming from the reactor. In such an embodiment, the surrounding electrical systems may become more tolerant of gas bubbles yielding inconsistent electrochemical reaction rates inside the stacked core ORR electrode.

Figure 70A:
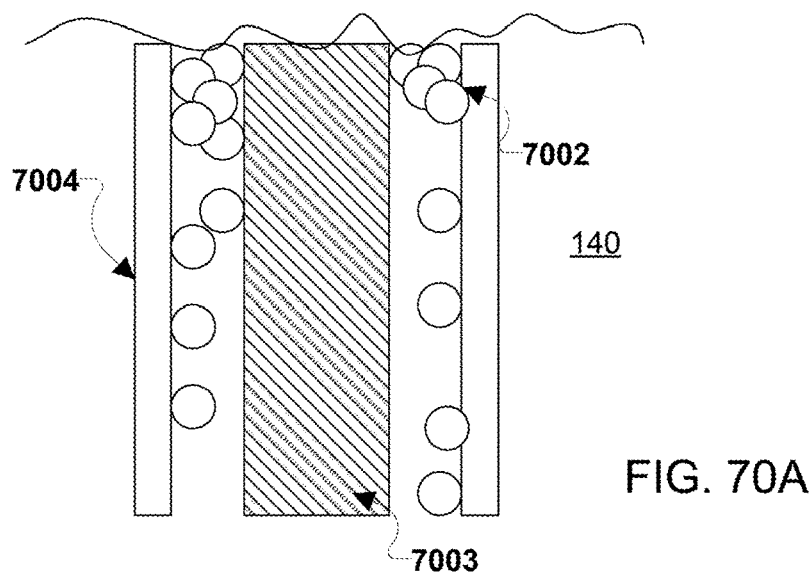
FIGS. 70A-C illustrates an OER and separator configurations.
Figure 70B:
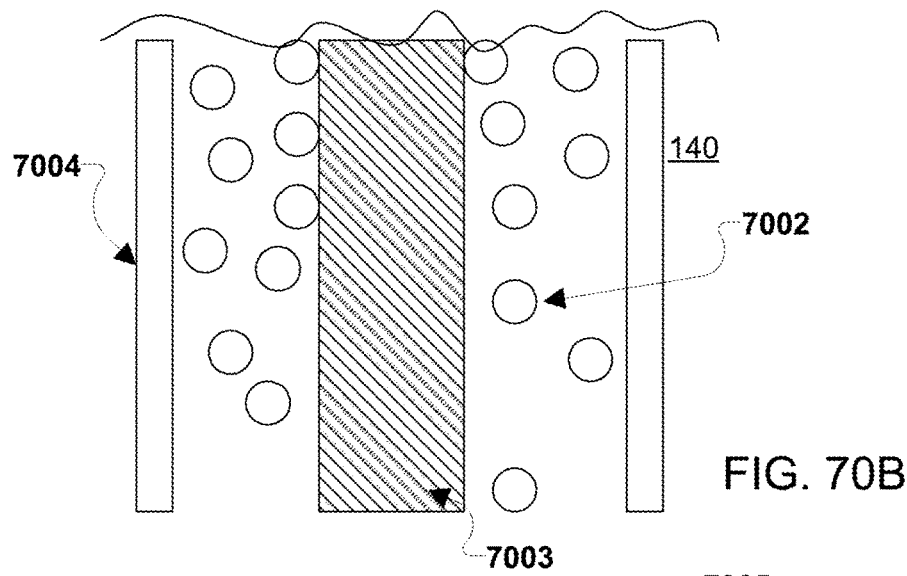
Figure 70C:
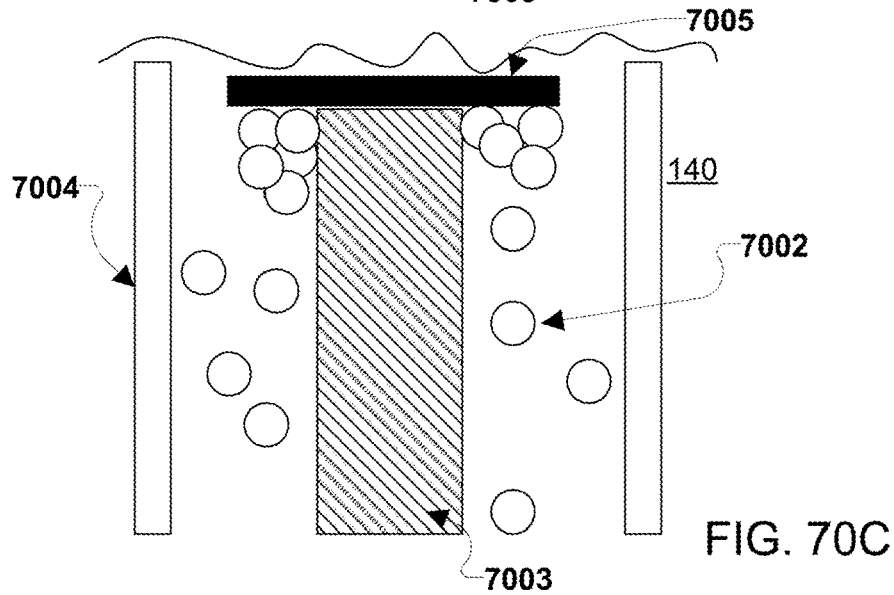

During operation, OER electrodes release oxygen from the surface of the substrate and catalyst. If a porous separator is too close to the surface of the gas emission, the alkaline aqueous electrolyte loses contact with the surface of the electrode and renders it unable to operate. An optimal separator spacing requirement will allow bubbles to escape the surface and pores of an OER electrode, but allow for electrolyte to be in adequate contact to continue delivering ions to this surface and facilitate the OER reaction. For example, FIG. 70A illustrates a suboptimal spacing in which bubbles 7002 generated by the OER 7003 accumulate at the electrolyte 140 surface and stick to the separator 7004. For example, FIG. 70B illustrates an optimal spacing in which the separator 7004 is farther from the OER 7003 and the bubbles 7002 generated by the OER 7003 are free to rise and pop at the electrolyte 140 surface. Additionally, the mechanical hardware, such as housing 7005 in FIG. 70C, holding the OER electrode 7003 should not prevent bubbles 7002 escaping to the free surface of the electrolyte 140 contrary to the suboptimal configuration shown in FIG. 70C. In the suboptimal configuration shown in FIG. 70C bubbles 7002 accumulate under the housing 7005 such that the OER electrode 7003 is not exposed to electrolyte 140.

Figure 71A:
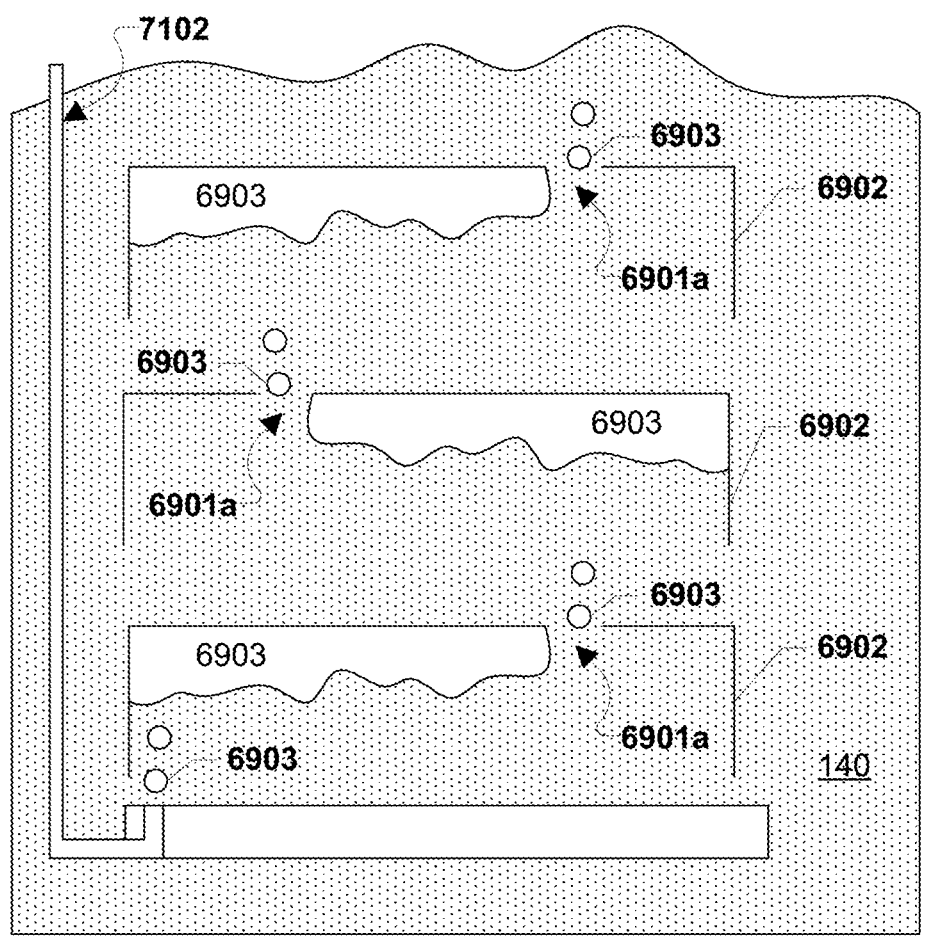
FIGS. 71A and 71B illustrate embodiment gas manifold configurations.
Figure 72A:
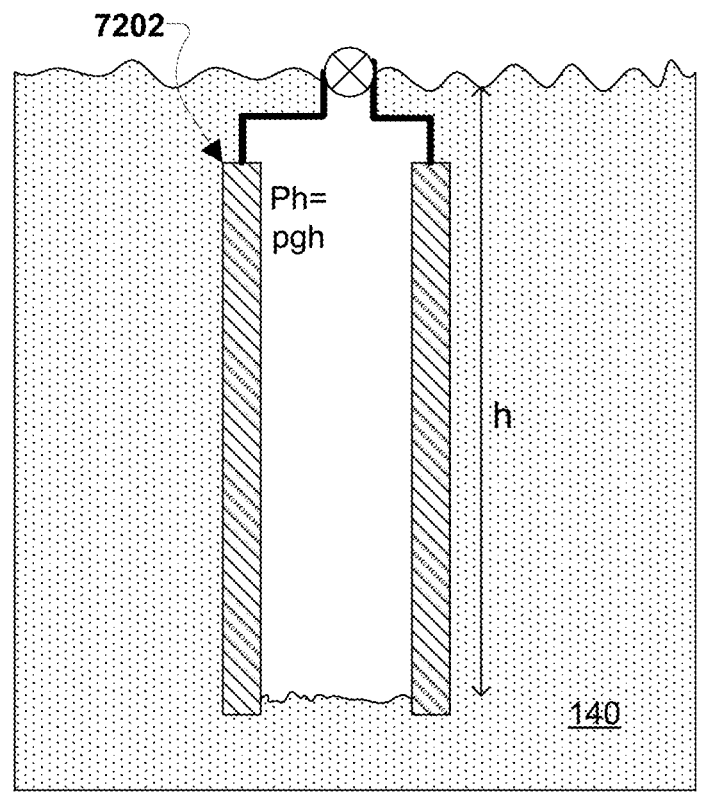
FIG. 72A illustrates an unsealed vertical submerged cathode according to an embodiment.
Figure 72B:
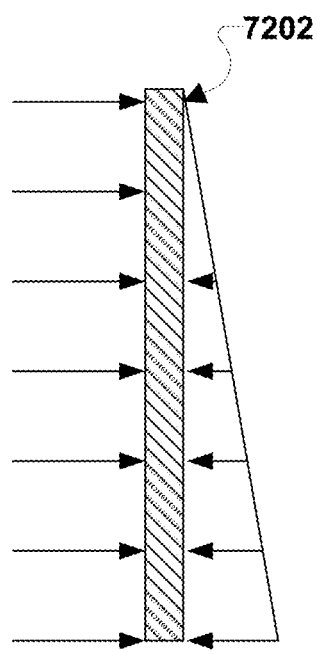
FIG. 72B illustrates the pressure differential for the cathode of FIG. 72A.
Figure 72C:
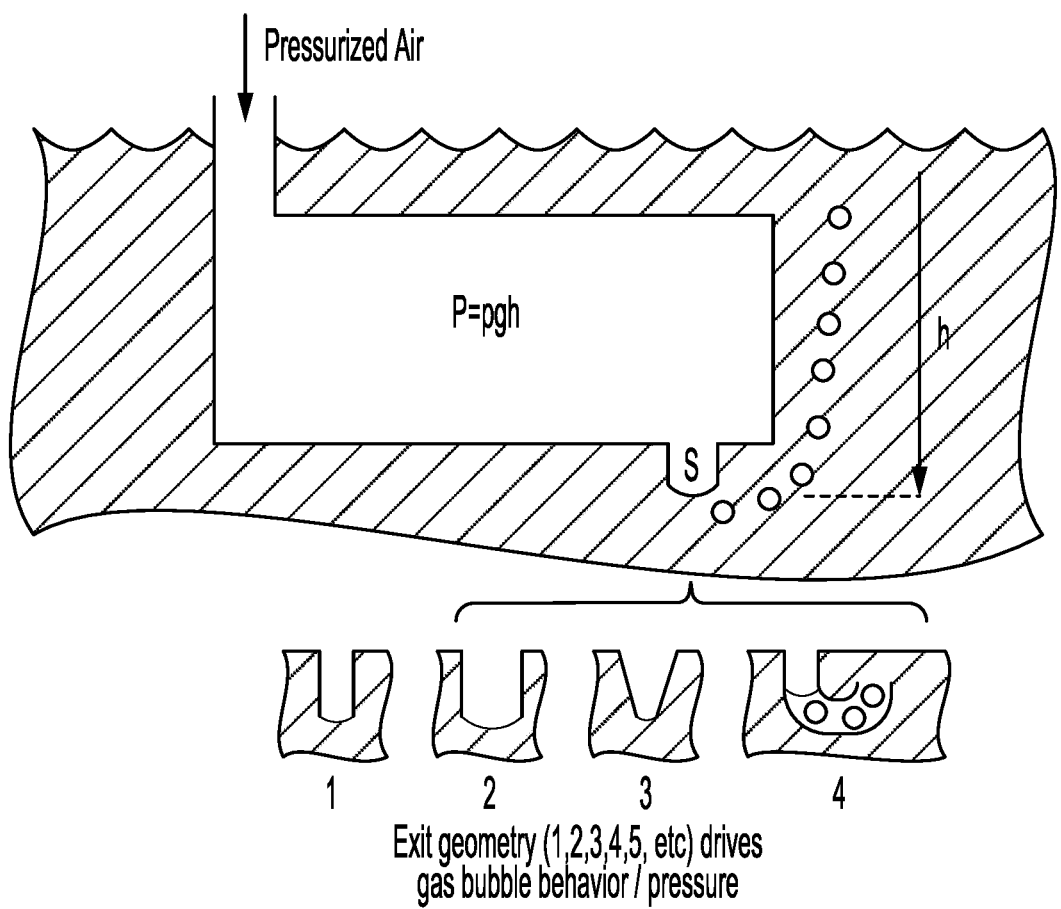
FIGS. 72C and 72D illustrates methods for controlling the air pressure in the chamber of FIG. 72A or another unsealed air chamber.
Figure 72D:
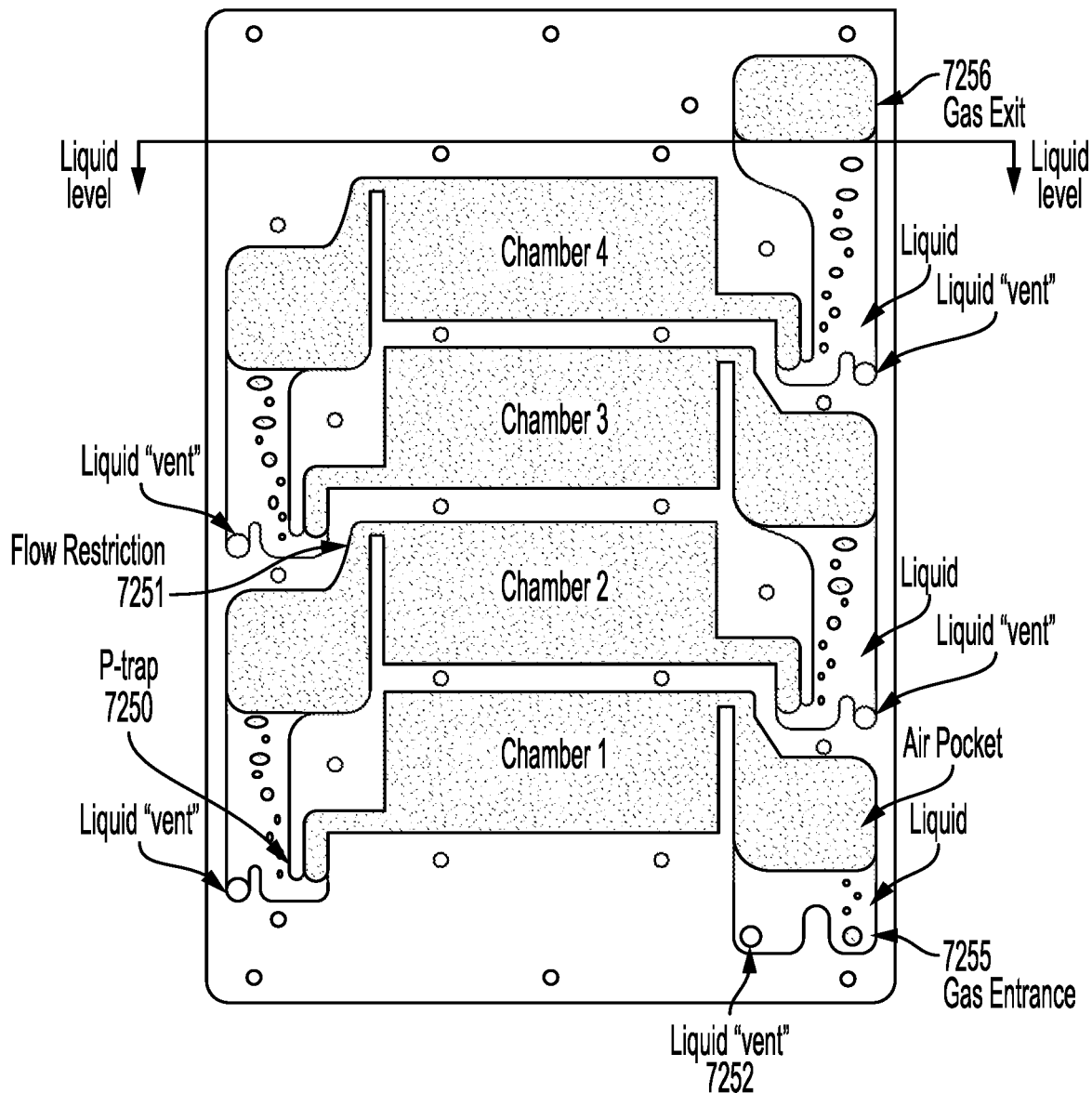

In a multi-layer ORR electrode stack, each layer needs air supplied to the ORR electrodes. As such, provisions must be made to transport air to each layer of the stack. In some embodiments, one common inlet and having the gas cascade from layer to layer in a cross-wise vertical fashion may be used. For example, FIG. 71A illustrates a single manifold 7102 feeding gas 6903 to a lowest ORR electrode 6902 in the stack and the gas 6903 bubbling up through further layers through offset exit holes 6901*a* in the ORR electrodes. FIG. 72D illustrates air cascading from layer to layer by utilizing a Plumbers trap (P-trap) feature 7250 to maintain a liquid-air seal at the outlet of each ORR chamber, chambers 1-4. As gas is bubbled into each air chamber from the gas inlet 7255 to the gas exit 7256, the liquid level at each chamber is lowered until a bubble escapes from the P-trap section 7250 of the chamber. Gas is then captured by the inlet manifold (without allowing gas to escape from the housing) of the ORR chamber above the previous ORR chamber. After each P-trap, a port (or liquid vent 7252) is required to allow for communication between the electrolyte external to the manifold and on the interior of the manifold. This port allows for the gas bubble to equalize in pressure as it ascends vertically from one ORR chamber to the next. These ports must be positioned such that a gas bubble cannot exit through the port into the exterior electrolyte. A flow restriction 7251 can be added in the gas path to slow erratic air flow rates between ORR chambers. The flow restriction 7251 can be engineered to create uniform gas flows between all chambers.

Figure 71B:
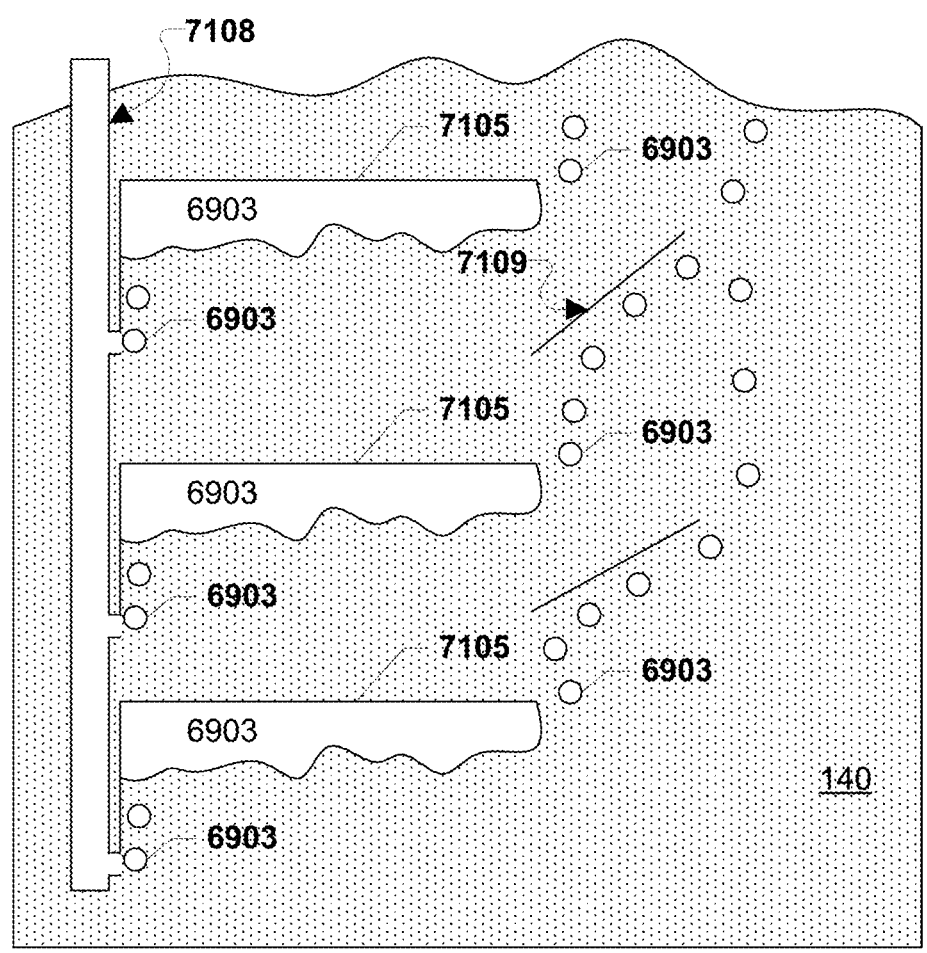

In some embodiments, a common gas manifold may distribute gas to each layer of the ORR stack. Providing a unique air delivery to each layer allows for more fine control in flow rate and gas velocity to each layer. FIG. 71B illustrates a manifold 7108 providing gas 6903 to each ORR electrode 7105 individually. Baffles or channels 7109 may deflect the bubbles up and away from the next ORR electrode 7105 layer as the bubbles rise through the electrolyte 140.

Various embodiments may provide an unsealed vertical ORR cathode. For example, FIG. 72A illustrates an unsealed vertical submerged ORR cathode 7202 according to an embodiment. Triple-phase boundary must be maintained on an ORR electrode. Sealed chambers with ORR walls and internal gas volumes can achieve this, but conventional ORR electrodes are known to leak, and leaked electrolyte can fill up the internal volume of this chamber. Additionally, flooding a leaking ORR electrode with electrolyte may reverse leaking issues, but this may be hard to do in a sealed chamber. A tall-walled, internally-sealed chamber with an open bottom may provide benefits of a sealed and unsealed ORR mechanical embodiment. Tall, semi-sealed walls with an internally pressurized gas volume provide oxygen to the ORR electrode. An open bottom provides a path for leaked electrolyte to escape the chamber. Internal pressure may aid in reducing electrolyte leaking through the ORR electrode. The unsealed vertical submerged ORR cathode 7202 may keep the electrodes parallel to one another for better electrochemical performance The interior of the unsealed vertical submerged ORR cathode 7202 cavity may be automatically pressure regulated by the bottom of the cavity being open to the electrolyte. In another embodiment, air may be directed to the ORR electrode via a plumber's trap or a flow field to direct the air across the ORR electrode. The same design features may be used to cascade the air flow across multiple sections of ORR electrode that are mechanically separated. The unsealed vertical submerged ORR cathode 7202 may be leak resistant due to the pressure differential between the cavity internally and the electrolyte 410 external to the cavity. For example, FIG. 72B illustrates the pressure differential between the pressure in the electrolyte 410 and the internal cavity of the unsealed vertical submerged ORR cathode 7202 as the unsealed vertical submerged ORR cathode 7202 extends deeper into the electrolyte 410. Specifically, the pressure in the cavity may be constant through the depth (or height h) of the unsealed vertical submerged ORR cathode 7202 while the pressure of the electrolyte 410 increases with depth. The unsealed vertical submerged ORR cathode 7202 may be flood resistant due to the open bottom. The internal pressure (Ph) of the unsealed vertical submerged ORR cathode 7202 may be set to the pressure of the electrolyte 410 at the depth of the opening of the unsealed vertical submerged ORR cathode 7202 (i.e., the height (h) the unsealed vertical submerged ORR cathode 7202 extends from the surface of the electrolyte 410). The pressure of the electrolyte 410 at the depth of the opening may be equal to the density of the electrolyte ($\rho$) times gravity (g (e.g., 9.8 m/s$^2$)) times the height (h). Thus, Ph may equal $\rho*g*h$. In some embodiments, air bubbles/flow may flow out of the bottom of the unsealed vertical submerged ORR cathode 7202 into the electrolyte 410. In some embodiments, pressure equilibration with the electrolyte is mediated through a port through which air can escape as bubbles. Example are illustrated in FIG. 72C. The size and shape of this port can control the pressure needed to exit a chamber, therefore setting the pressure within the chamber. This pressure control also serves to control volumetric flow. This can also be performed with local geometry around the port. A downward-pointing u-bend, for example, can form a local geometry like a "plumber's trap" through which gas must overcome a small hydrostatic head to escape the chamber. The length, area, and shape of this plumber's trap or other geometry can tune the gas flow characteristics to satisfaction. The gas may exit into the electrolyte of the cell, or through a tube connected to another liquid volume, where the relevant port size and shape are those at the end of the tube.

In various embodiments, the unsealed vertical submerged ORR cathode may be characterized by one face that has delivered air through cascading chambers on the air side. The ORR cathode may have an embedded current collector that extends horizontally out from either side of the electrode. To seal the exposed mesh from contacting the electrolyte, the assembly may contain vertical sealant strips that isolate the current collector from the rest of the electrolyte. The isolated region may be comprised of pieces of plastic that form a clamshell or crimp around the mesh with electrically conductive mechanisms to connect the current collectors.

Cathode orientation (whether vertical or horizontal) with respect to the anode could lead to hard electrical shorts during assembly and operation. In various embodiments, the risk of electrical shorts during assembly and operation may be reduced by the use of a thin sheet of a polymer material, porous or solid, to electrically insulate current collectors and/or active materials from one another. For example, plastic may be disposed between the electrodes to keep the electrodes from shorting. In some embodiments, the ORR housing may act as an insulator to prevent shorts. The use of thin polymer sheets and/or insulating housings may reduce the overall width of the electrode assemblies because physical space separating the electrodes may be reduced.

Figure 73:
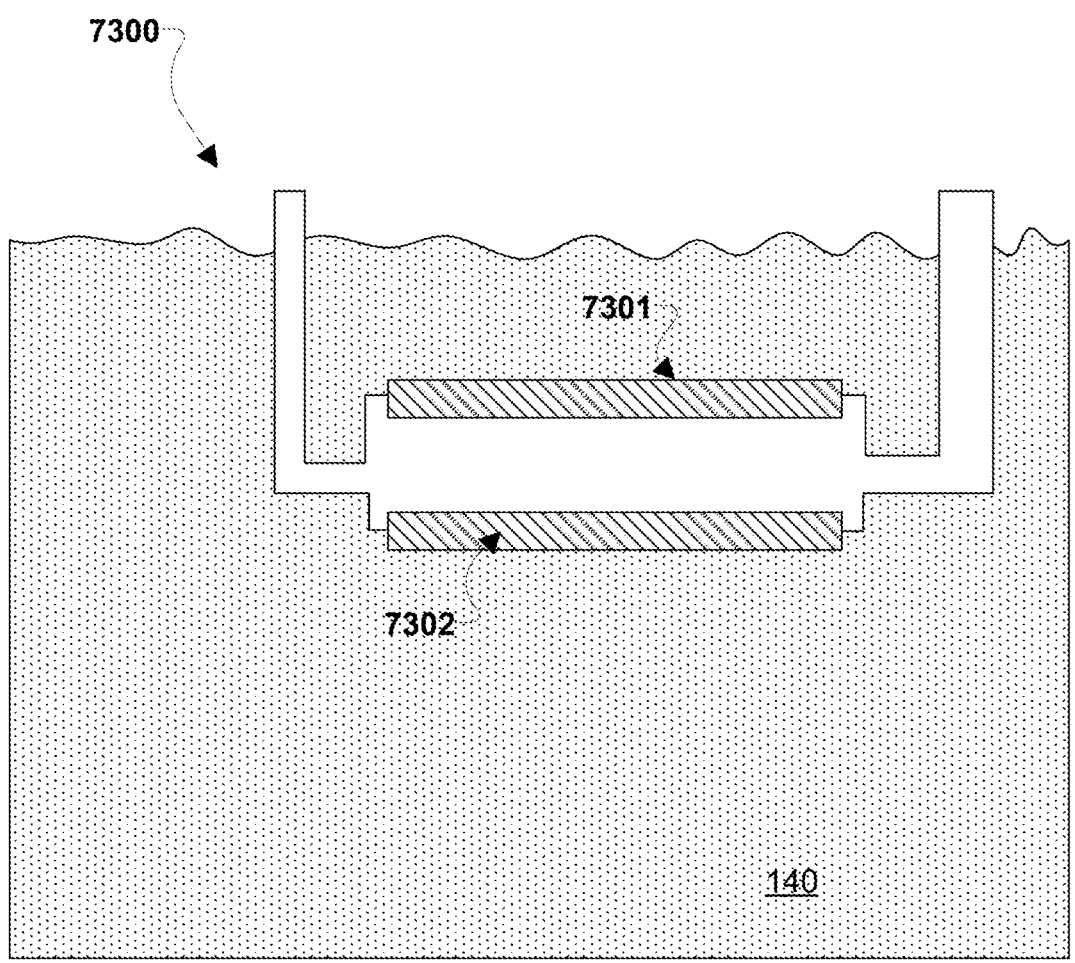
FIG. 73 illustrates an embodiment sealed horizontal submerged electrode.

Various embodiments may include a sealed horizontal submerged electrode. A sealed horizontal submerged electrode may include up to two horizontal sealed electrodes with a sealed air cavity therebetween. Many of these assemblies may be stacked together. A benefit of a sealed horizontal submerged electrode solution may be that the electrode will be under a uniform pressure across the entire area, thus providing a uniform pressure differential across the electrode. FIG. 73 illustrates an example sealed horizontal submerged electrode 7300 including a first ORR electrode 7301 and a second ORR electrode 7302. In some embodiments, the sealed horizontal submerged electrode may only include a top ORR electrode, such as just ORR electrode 7301. In some embodiments, the sealed horizontal submerged electrode may include side ORR electrodes.

Figure 74A:
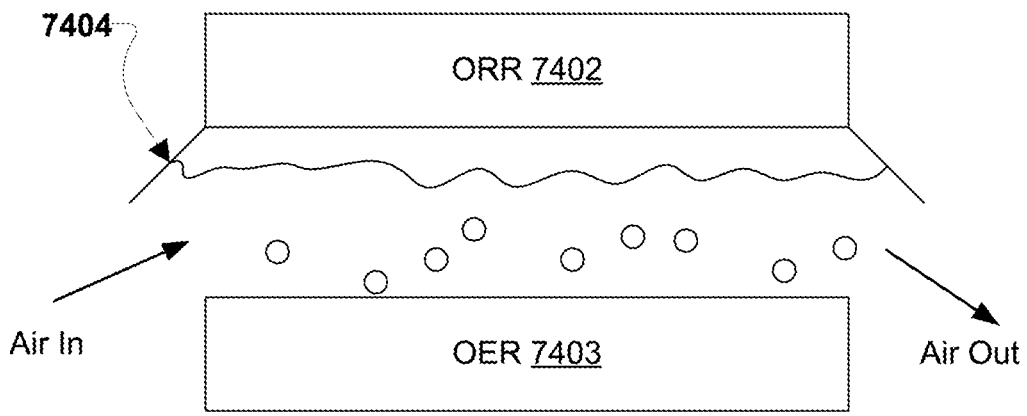
FIGS. 74A and 74B illustrate embodiment co-located ORR and OER electrode configurations.
Figure 74B:
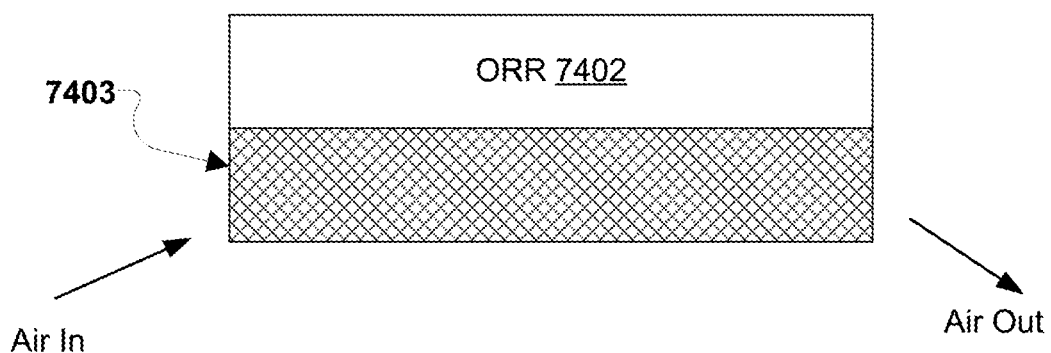

FIGS. 74A and 74B illustrate embodiment co-located ORR electrode 7402 and OER electrode 7403 configurations. An ORR electrode 7402 needs oxygen (e.g., oxygen contained in air) delivered to it. In an electrochemical system that uses both an ORR 7402 and OER electrode 7403, the OER electrode 7403 may produce oxygen that the ORR electrode 7402 can use. In various embodiments, layers of ORR electrodes 7402 may be placed horizontally with OER electrode 7403 material underneath them, so that oxygen produced by the OER electrode 7403, which may be in the form of bubbles, is trapped underneath the ORR electrode 7402. For example, FIG. 74A illustrates one such configuration in which the ORR electrode 7402 is spaced apart from and above the OER electrode 7403. The distance between the electrodes 7402 and 7403 may vary. Trapping of oxygen may be aided by other features, such as a skirt 7404 extending from the ORR electrode 7402 or the ORR electrode 7402 being formed as an inverted cup. FIG. 74B illustrates another embodiment configuration in which the OER electrode 7403 is porous and in contact with the ORR electrode 7402. Supplemental gas (e.g., air) may be supplied either through the OER electrode 7403, in the case of a porous electrode, or around the electrode 7403 into the chamber underneath the ORR electrode 7402. In various embodiments, the OER electrode 7403 may be located very close to the gas-diffusion side of the ORR electrode 7402, even touching the ORR electrode 7402.

Figure 75:
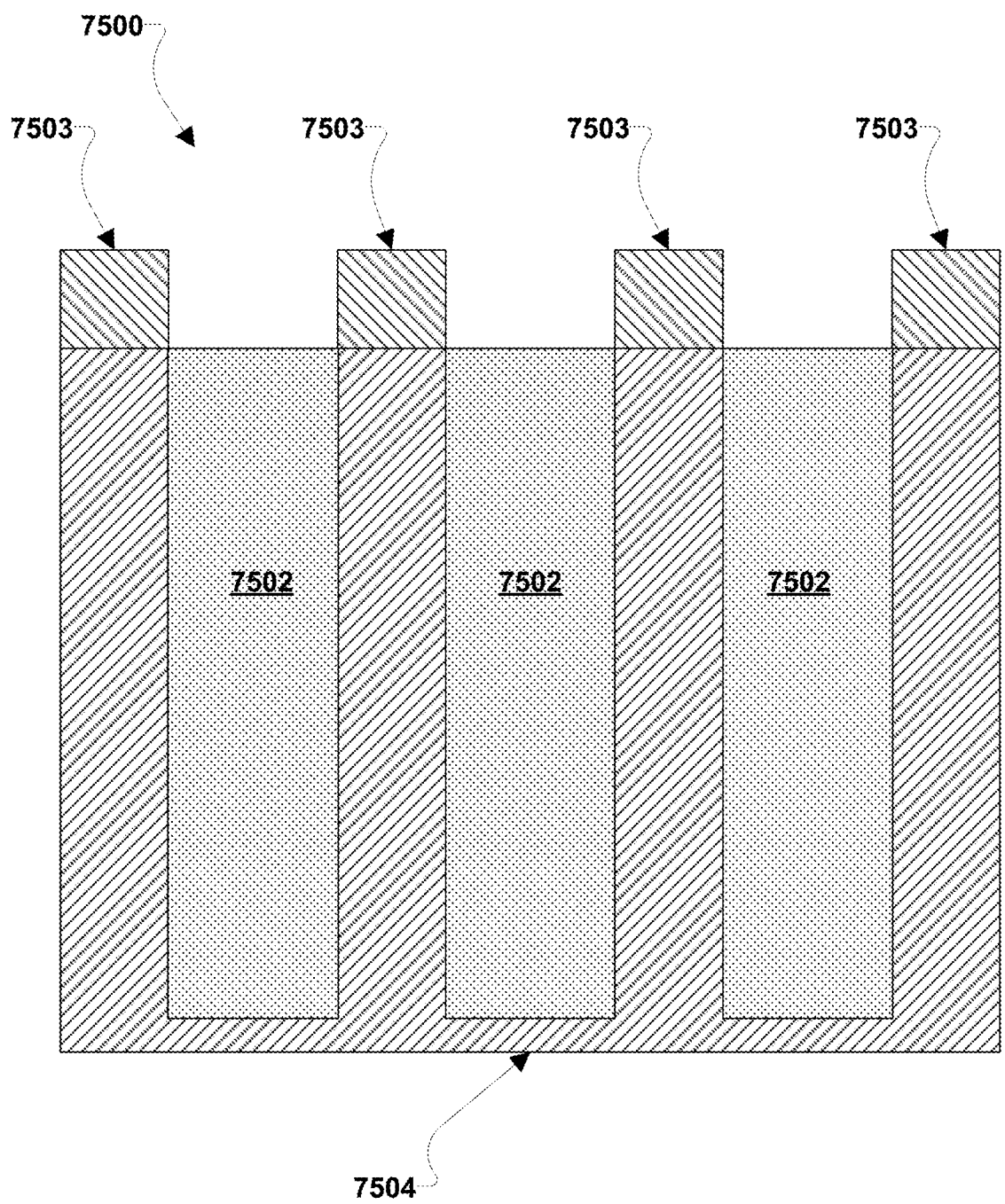
FIG. 75 illustrates a packaging configuration of ORR electrodes according to an embodiment.

FIG. 75 illustrates a packaging configuration 7500 of ORR electrodes 7502 according to an embodiment. The ORR electrodes 7502 may be packaged into a large format configuration via an overmolding process. The configuration 7500 may include multiple narrow ORR electrode sheets 7502 and current collector strips 7503, overmolded together by a plastic or epoxy 7504 to become a self-supporting structure. Overmolding or other sealing methods (epoxy, etc.) allow for sealing and integration of subassembly components in a single step with low part count. The benefits of the configuration 7500 may include low part counts, low assembly time, very thin geometries to get high energy densities, and providing flexibility to changes in architecture geometry.

Figure 76A:
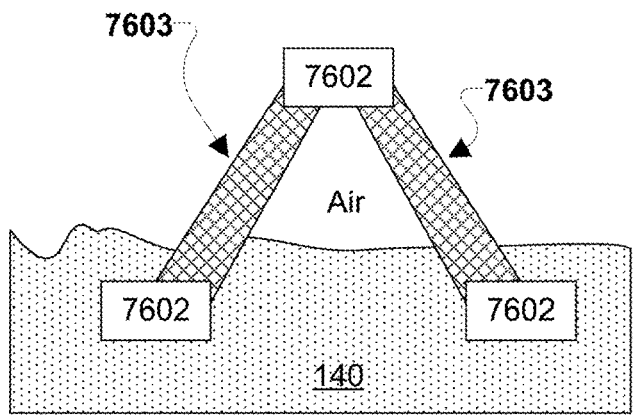
FIGS. 76A-76D illustrate cross-sectional views of various embodiment concave horizontal ORR electrodes.
Figure 76B:
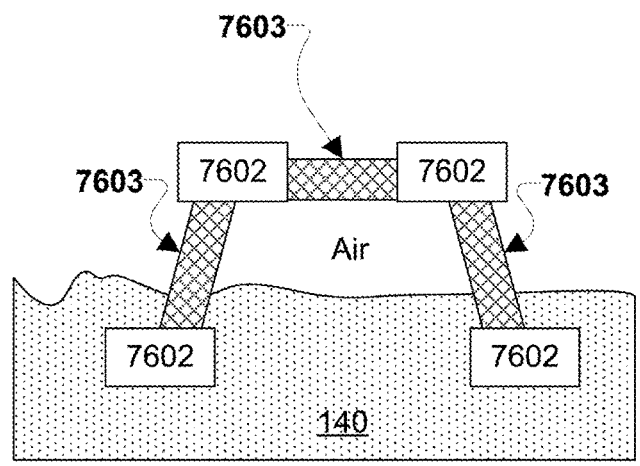
Figure 76C:
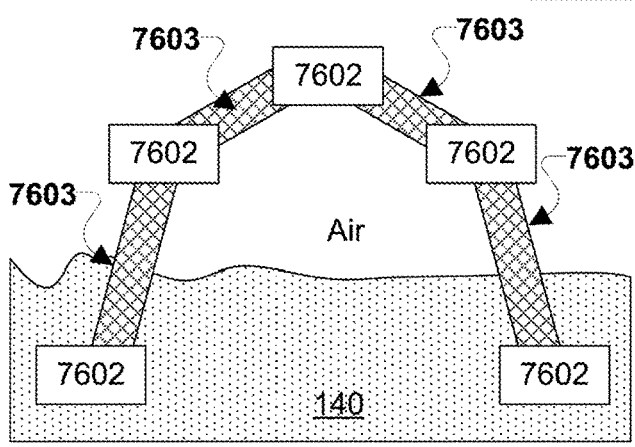
Figure 76D:
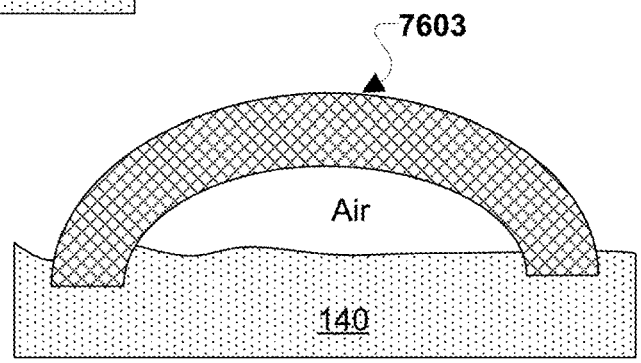

FIGS. 76A-76D illustrate cross-sectional views of various embodiment concave horizontal ORR electrodes. As illustrated in FIGS. 76A-76D, sheets of ORR electrode 7603 may be connected by junctions with current collectors 7602, or stretched over current collectors, and shaped into a shape approximating a semicircle or other generally concave form (e.g., an a-frame, etc.), with the diameter facing down, to trap air underneath the surface of the ORR electrode between the ORR electrode and the electrolyte 140. The semi-circle-approximating shape may have 3, 4, or 5 or more vertices. In various embodiments, current collectors 7602 may be present at each vertex. FIG. 76A illustrates an ORR electrode including ORR electrode sheets 7603 formed as cross members connected together in an a-frame cross sectional configuration and having three current collectors 7602, one at each end of the ORR electrode sheets 7603 and one in between the ORR electrode sheets 7603. FIG. 76B illustrates an ORR electrode including ORR electrode sheets 7603 formed as cross members connected together in a generally semicircular configuration and having four current collectors 7602, one at each end of the ORR electrode sheets 7603 and two in between the ORR electrode sheets 7603. FIG. 76C illustrates an ORR electrode including ORR electrode sheets 7603 formed as cross members connected together in a generally semicircular configuration and having five current collectors 7602, one at each end of the ORR electrode sheets 7603 and three in between the ORR electrode sheets 7603. FIG. 76D illustrates an ORR electrode including ORR electrode sheets 7603 formed as cross members connected together in a generally semicircular configuration as a half-tube.

Figure 77A:
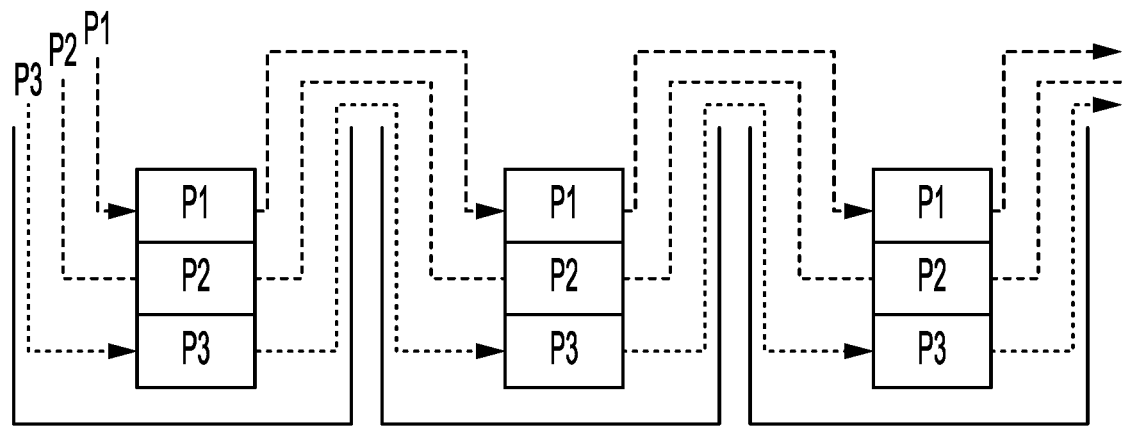
FIGS. 77A, 77B, and 77C illustrate a comparison of different pressurized air chamber configurations to balance electrolyte pressure at an ORR electrode.
Figure 77B:
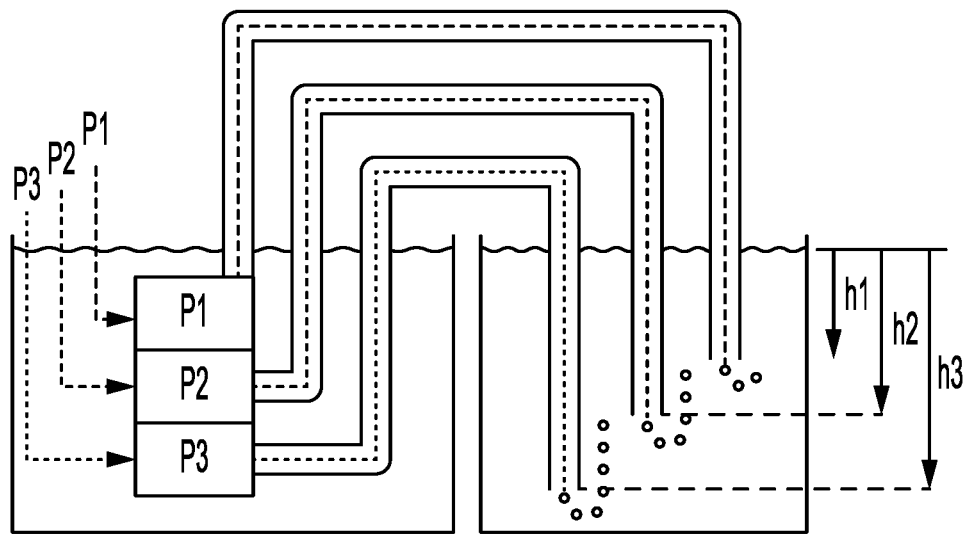
Figure 77C:
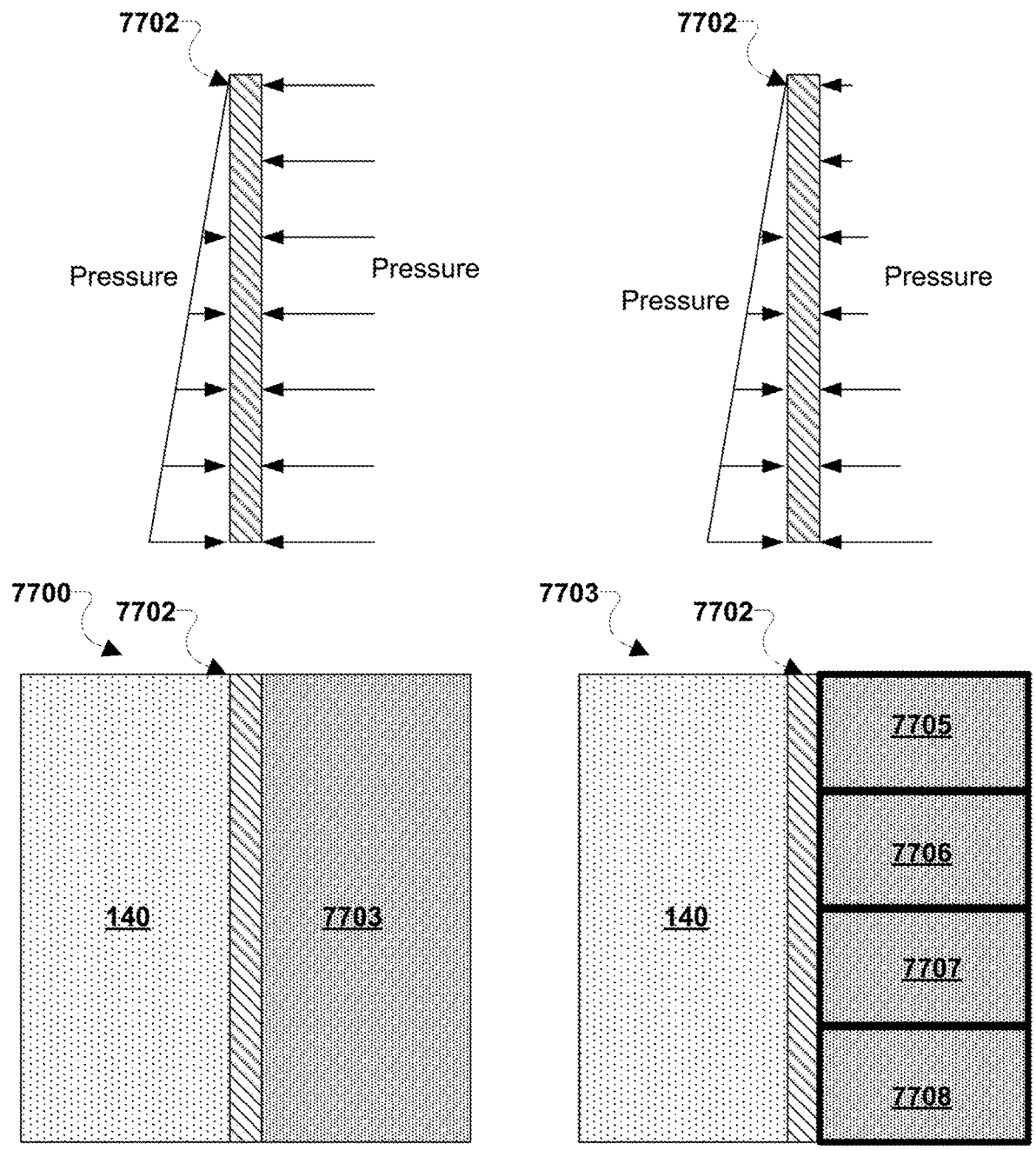

FIG. 77C illustrates a comparison of different pressurized air chamber configurations 7700 and 7703 to balance electrolyte 140 pressure at an ORR electrode 7702. Imbalance of pressure on opposite sides of the ORR electrode 7702 can result in stress or leaking or a movement of the triple phase boundary through the thickness of a porous ORR electrode 7702. The use of gas chambers, such as one gas chamber 7703 illustrated on the left side of FIG. 77 or multiple gas chambers, such as four gas chambers 7705, 7706, 7707, and 7708 illustrated on the right side of FIG. 77, along the ORR air chamber can allow for adjustable pressures to balance the pressure from the electrolyte 140. This can be done using compressed air, oxygen, CO2 free air or a combination of any of these and may be at varying humidity. This may just balance pressures, or on the air side pressure may be slightly elevated at each point to prevent electrolyte 140 from leaking into the air chamber. These chambers in single electrodes may share air with chambers of the same electrolyte depth in other, separate electrodes as illustrated in FIG. 77A where each chamber P1, P2, and P3 respectively share air with one another. These pressures may be achieved by exhausting chambers, such as 7705, 7706, 7707, 7708 into their local electrolyte, driving their gas pressure to the pressure experienced near the chamber, or into a separate liquid chamber at specific depths to match hydrostatic pressure with set lengths of tubing as shown in FIG. 77B where tube lengths h1, h2, and h3 are associated with respective chambers P1, P2, and P3. Control of gas chamber pressure by utilization of a second vessel's hydrostatic pressure can keep the gas stream separate from the electrolyte, minimizing carbonation and oxygenation effects.

FIGS. 78A-85C illustrate aspects of an unsealed, horizontal, submerged ORR electrode and reactor designs according to various embodiments. An unsealed, horizontal, submerged ORR electrode and reactor may also be referred to as a UHS reactor. In some embodiments, a UHS reactor architecture may be configured to be installed in a repeating anode—cathode—anode—cathode array, with the number of repeat units and exact dimensions varying in various embodiments. A UHS reactor may include current collectors fabricated from sheet metal, which can be stamped, punched, rolled, formed, crimped, welded. Material of current collectors may include nickel plated carbon steel or any other suitable material. Various embodiments UHS reactor designs may allow anode or cathode removal without significant disassembly. In various embodiments, cathode may be a vertical sandwich of ORR/ORR layers. Plastics used in the UHS reactor may include polypropylene, HDPE, and/or XLPE (Cross linked polyethylene (PE)) which may be favorable for instances which require creep resistance. The plastics may be used in parts generated by injection molding, extrusion, hot plate welding, blow/roto vacuum molding, and/or in any other suitable manner for a selected plastic type.

Figure 78A:
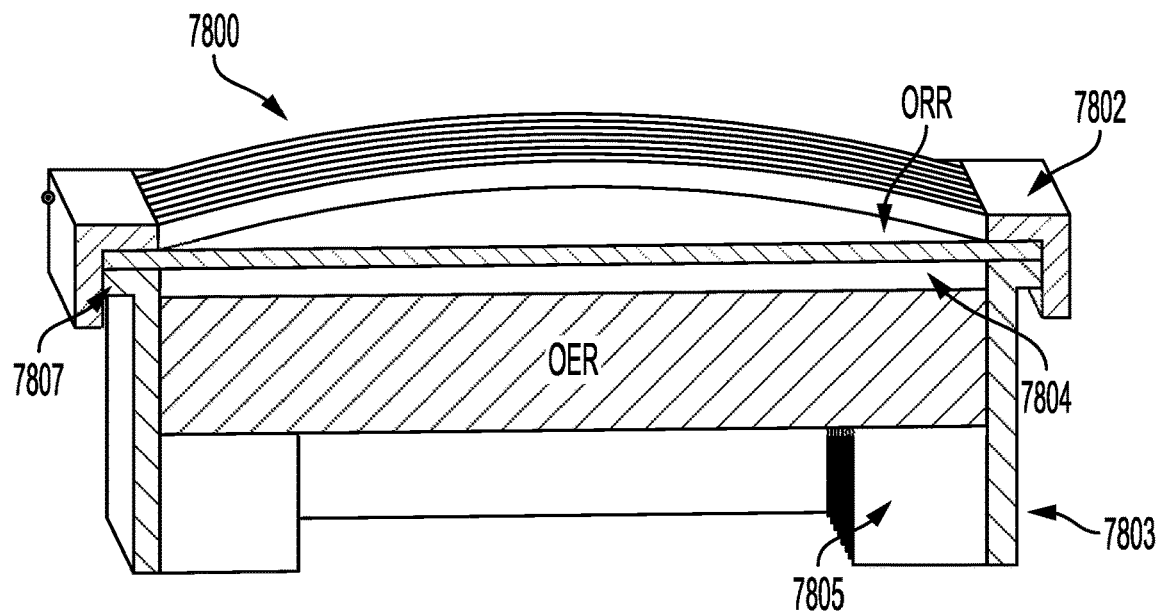
FIGS. 78A-85C illustrate aspects of an unsealed, horizontal, submerged ORR electrode and reactor designs according to various embodiments.
Figure 78B:
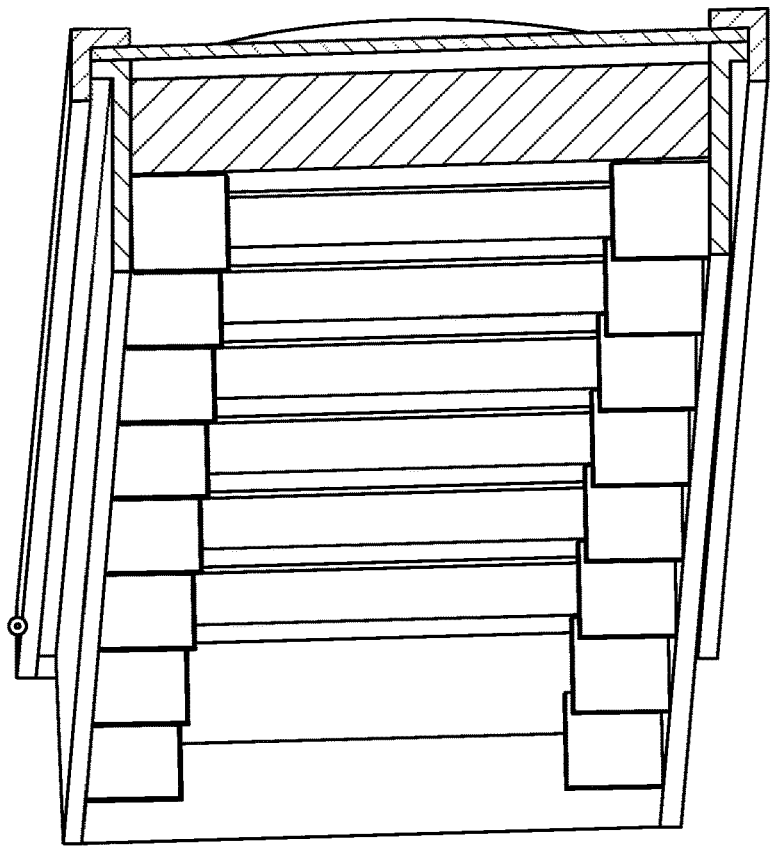
Figure 78C:
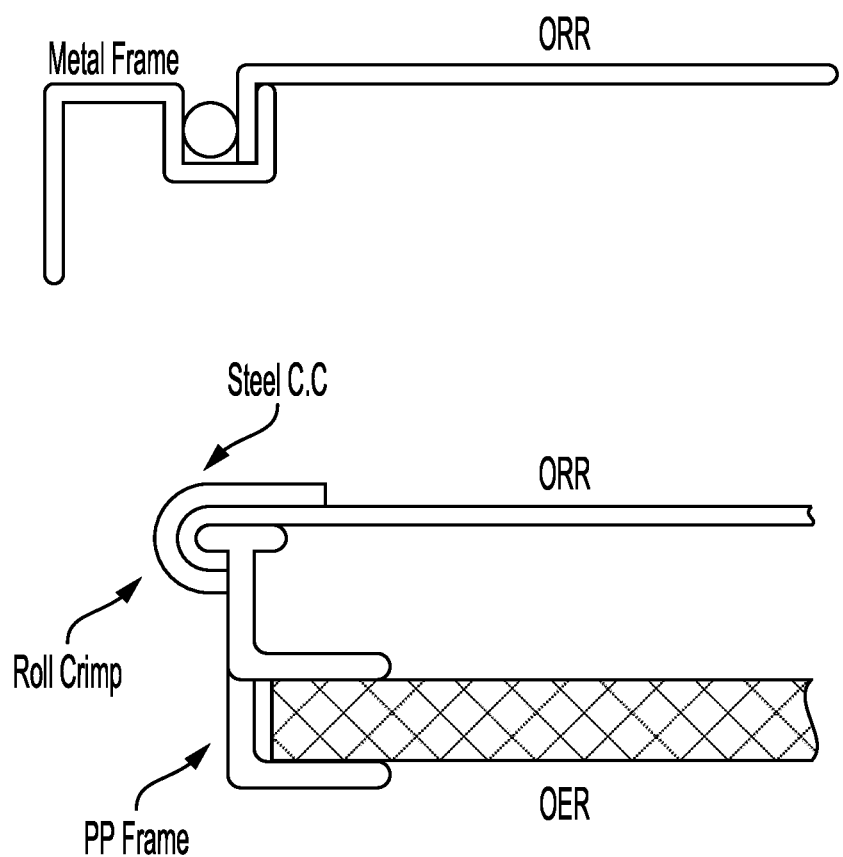

FIGS. 78A-78C illustrate a UHS configuration according to an embodiment. In the configuration of FIGS. 78A-78C, the UHS may include an ORR electrode having a roll crimp 7807 sealing the ORR to the ORR current collector 7802. The UHS may have a bowed frame 7800, an injection molded frame 7803, and the OER may be constrained by the top ribs 7804 and bottom ribs 7805. The roll crimp 7807 may seal the ORR to the ORR current collector 7802. The ORR current collector 7802 may be a stamped ORR current collector 7802. FIG. 78B illustrates an underside view of the UHS of FIG. 78A. FIG. 78C illustrates example crimp configurations suitable for use with the UHS of FIGS. 78A and 78B.

Figure 79A:
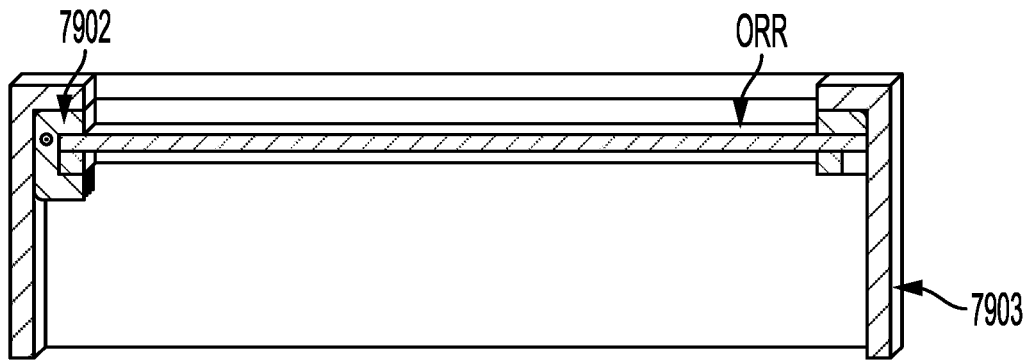
Figure 79B:
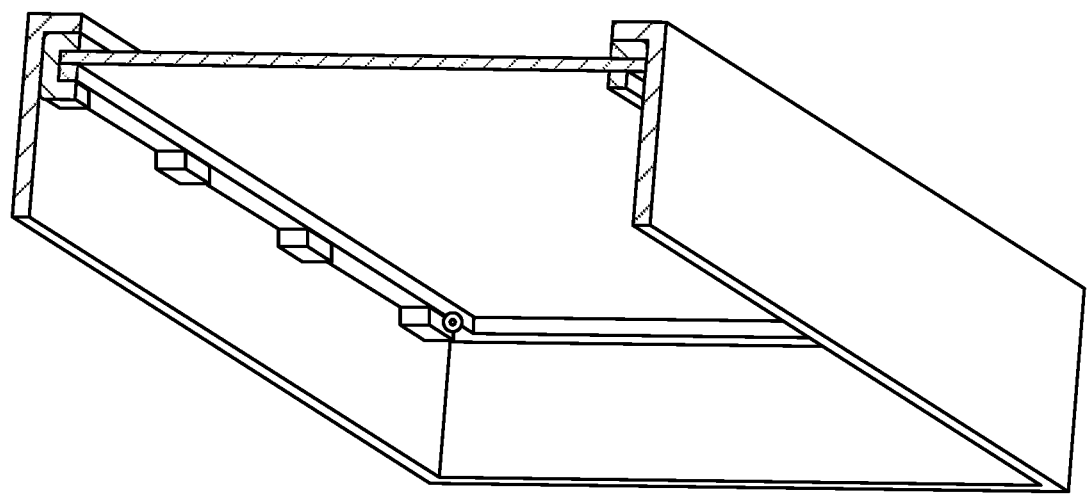
Figure 79C:
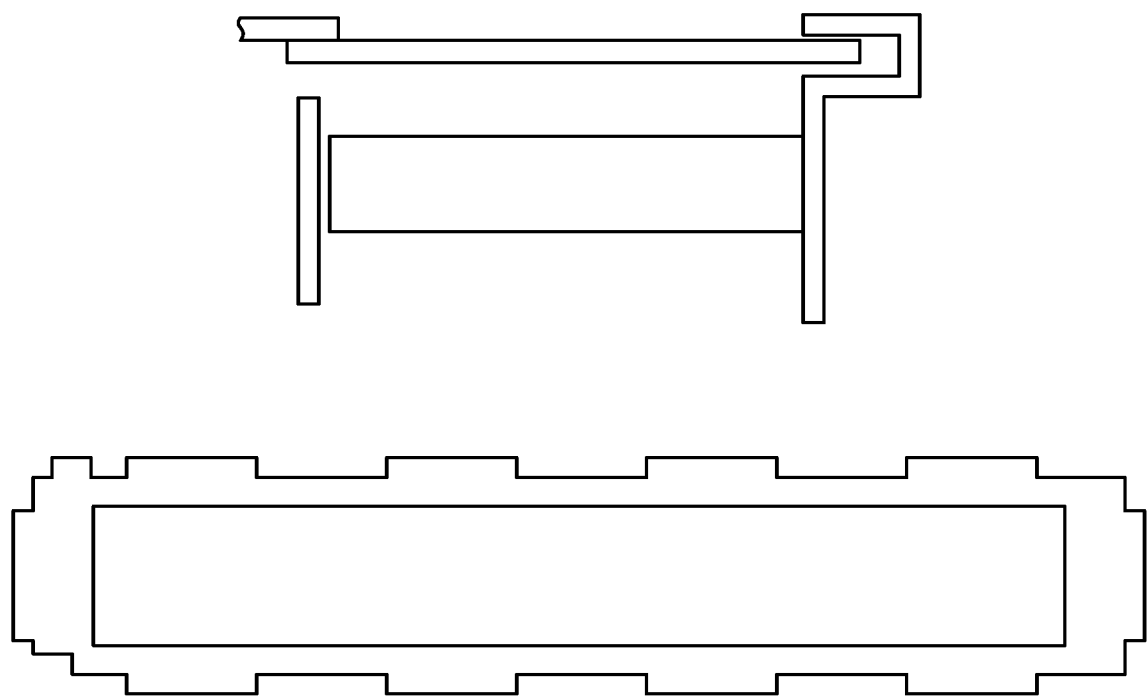

FIGS. 79A-79C illustrate a UHS configuration according to another embodiment in which the ORR current collector 7902 is stacked. In the configuration of FIGS. 79A-79C, the UHS may include an ORR electrode stacked in a crimped ORR current collector 7902. The UHS may have an injection molded frame 7903, and the OER may be constrained by the top ribs and bottom ribs of the frame. A roll crimp of the ORR current collector 7902 may seal the ORR to the ORR current collector 7902. The ORR current collector 7902 may be a stamped ORR current collector 7902. FIG. 79B illustrates an underside view of the UHS of FIG. 79A. FIG. 79C illustrates example crimp and spacing configurations suitable for use with the UHS of FIGS. 79A and 79B.

Figure 80A:
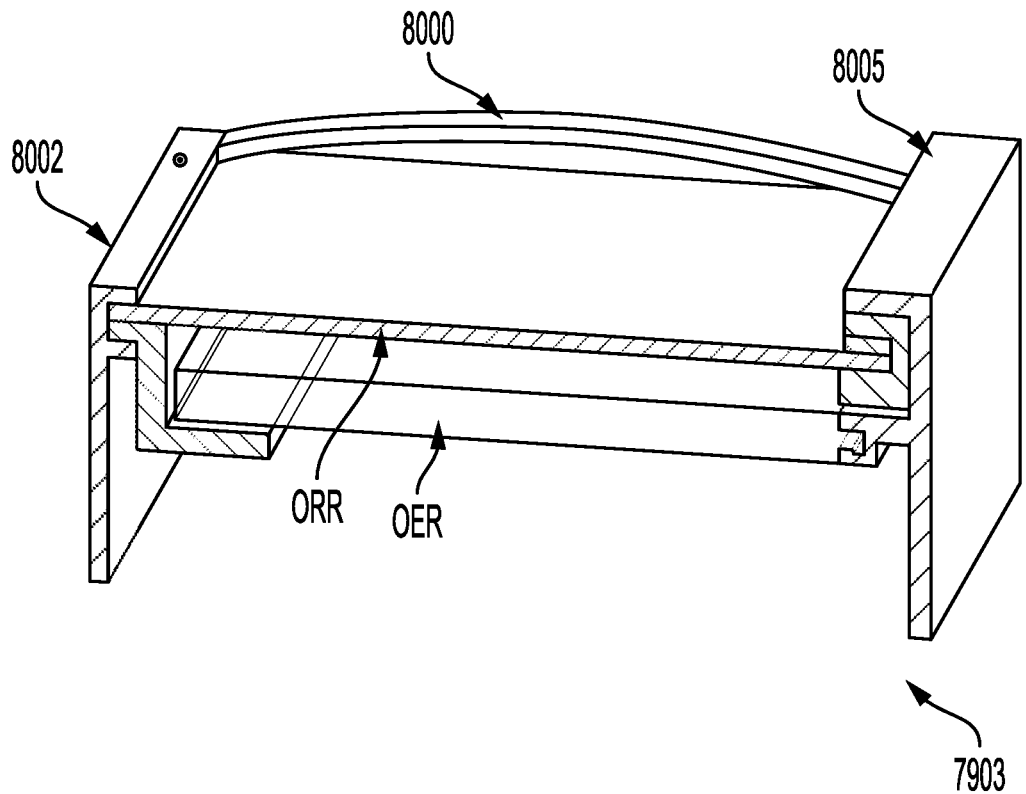
Figure 80B:
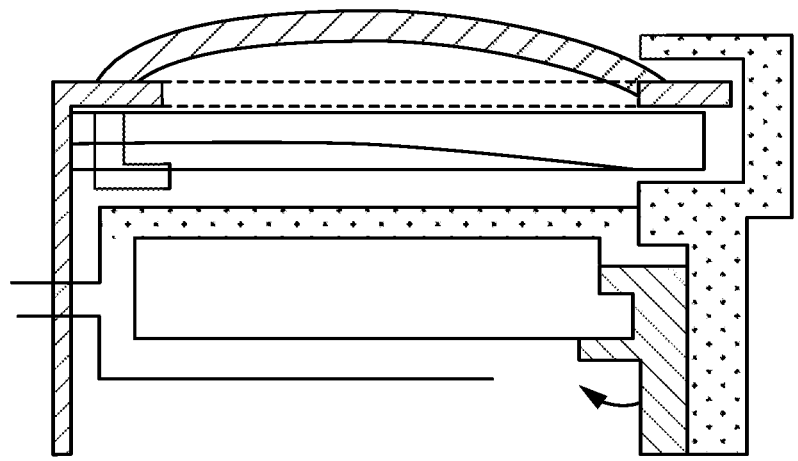

FIGS. 80A-80B illustrate a UHS configuration according to another embodiment in which the UHS has an asymmetric current collector frame. In the configuration of FIGS. 80A-80B, the UHS may include an ORR electrode stacked in a crimped ORR current collector 8002. The roll crimp seals the ORR to the ORR current collector 8002. The UHS may include a bowed frame 8000. Similarly, a roll formed OER current collector 8005 may be crimped to the OER electrode. The UHS may have an extruded molded frame.

Figure 81A:
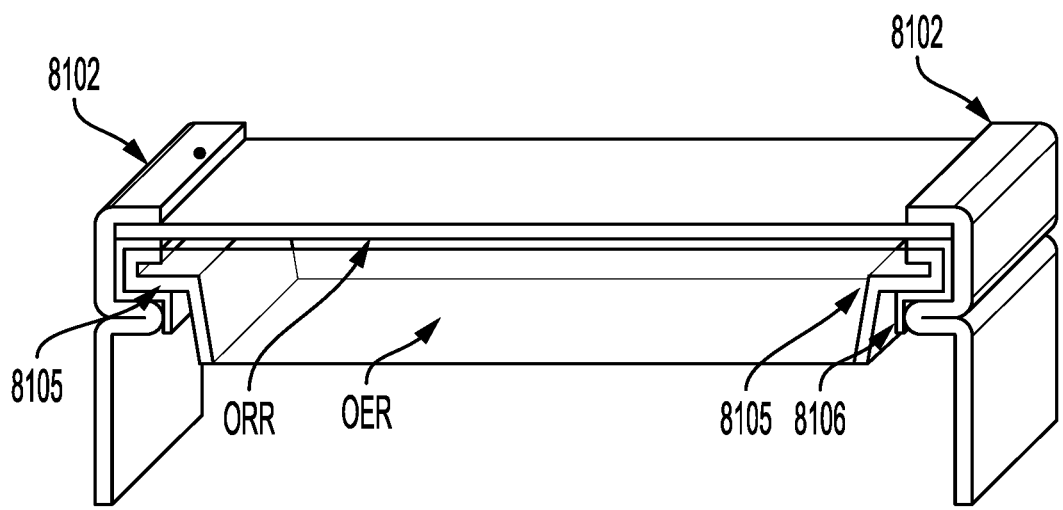
Figure 81B:
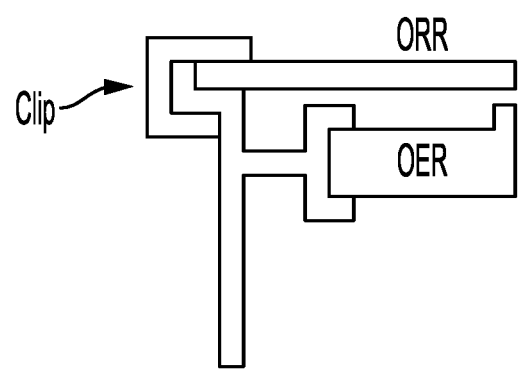
Figure 82:
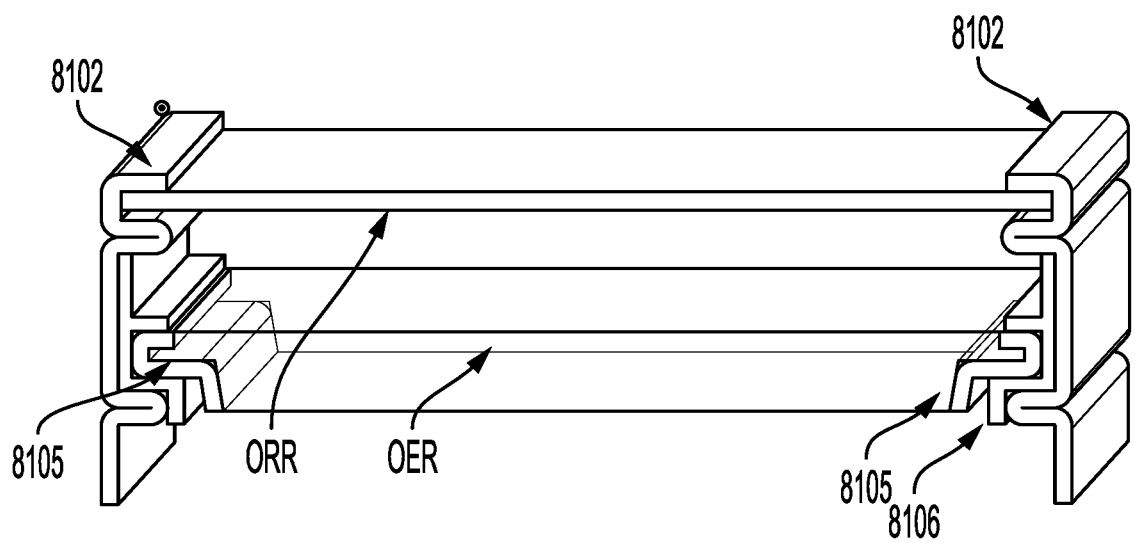
Figure 83A:
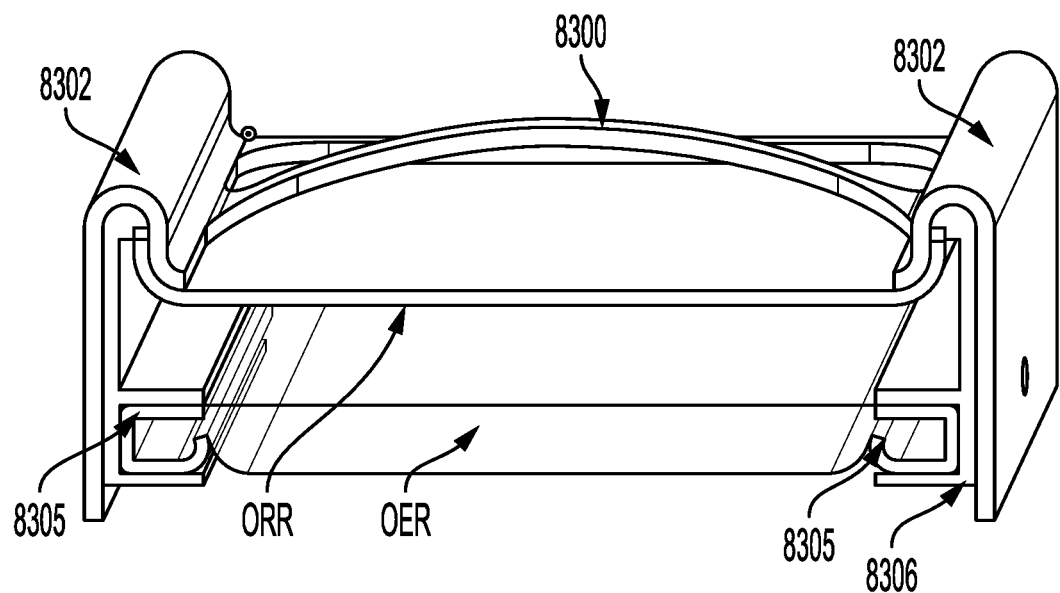
Figure 83B:
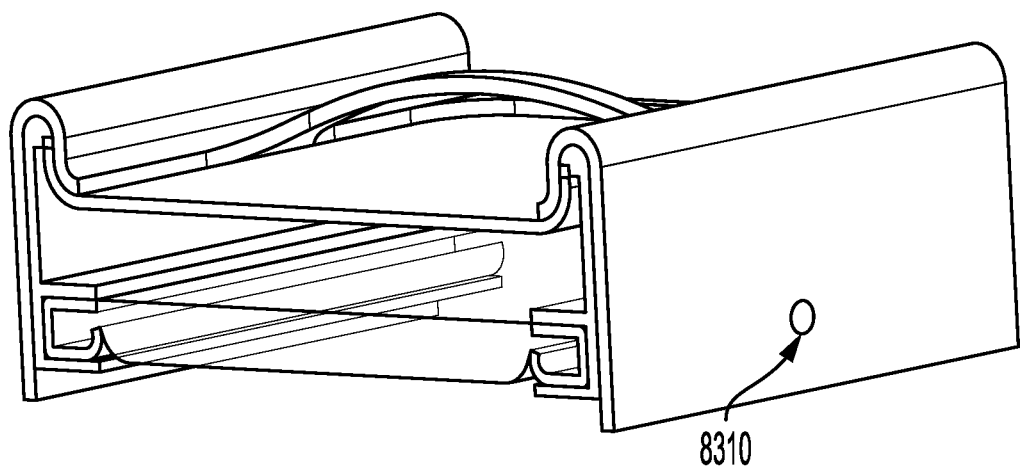
Figure 83C:
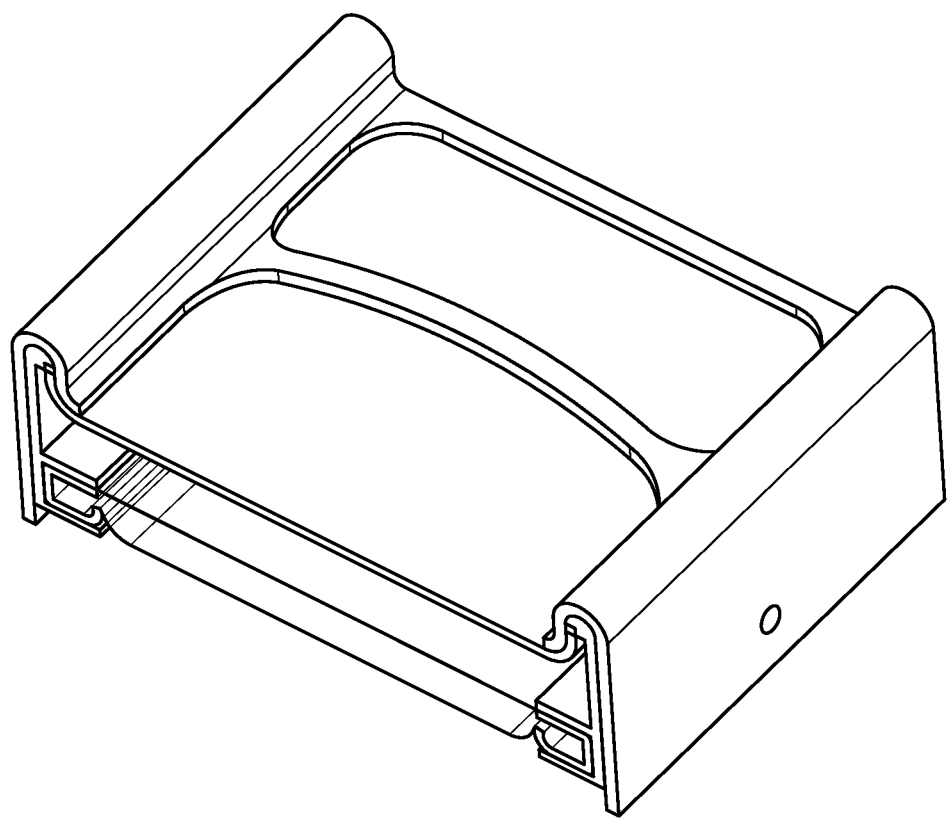
Figure 83D:
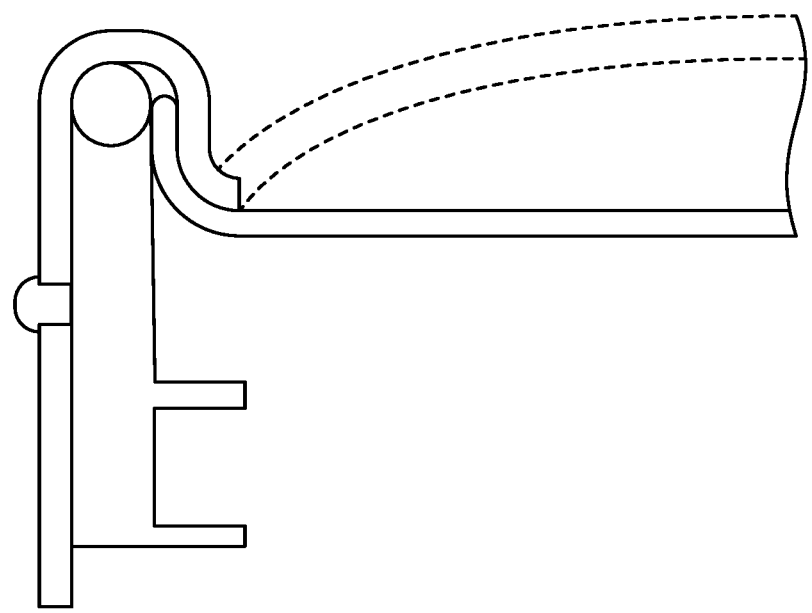

FIGS. 81A-81B illustrate a UHS configuration according to another embodiment. In the configuration of FIGS. 81A-81B, the UHS may include an ORR electrode stacked in a crimped ORR current collector 8102. The roll crimp seals the ORR to the ORR current collector 8102. Similarly, an OER current collector 8005 may be crimped to the OER. The OER current collector 8105 may be located inboard of the ORR current collector 8102 and an insulator 8106, such as a polypropylene insulator, etc., may separate the collectors 8105 and 8102. FIG. 82 illustrates a different configuration of the UHS illustrated in FIGS. 81A-81B in which the OER is separated further from the ORR by spacing of the crimps in the collectors 8105 and 8102 and the sizing of the insulator 8106.

FIGS. 83A-83D illustrate a UHS configuration according to another embodiment. In the configuration of FIGS. 83A-83D, the UHS may include an ORR electrode stacked in a wedge rolled and crimped ORR current collector 8302. The wedge and roll crimp seals the ORR to the ORR current collector 8302. The ORR current collector 8302 may be stamped or rolled, and for example may be formed from XPLE. Similarly, a OER current collector 8305 may be crimped to the OER. The OER current collector 8305 may be located inboard of the ORR current collector 8302 and an insulator 8306, such as a polypropylene insulator, etc., may form an interior bracket/wedge that may support the OER current collector 8305 and may separate the collectors 8305 and 8302. The UHS may include a snap fit 8310 for assembly pre-crimp. The UHS may have a bowed frame 8300.

Figure 84:
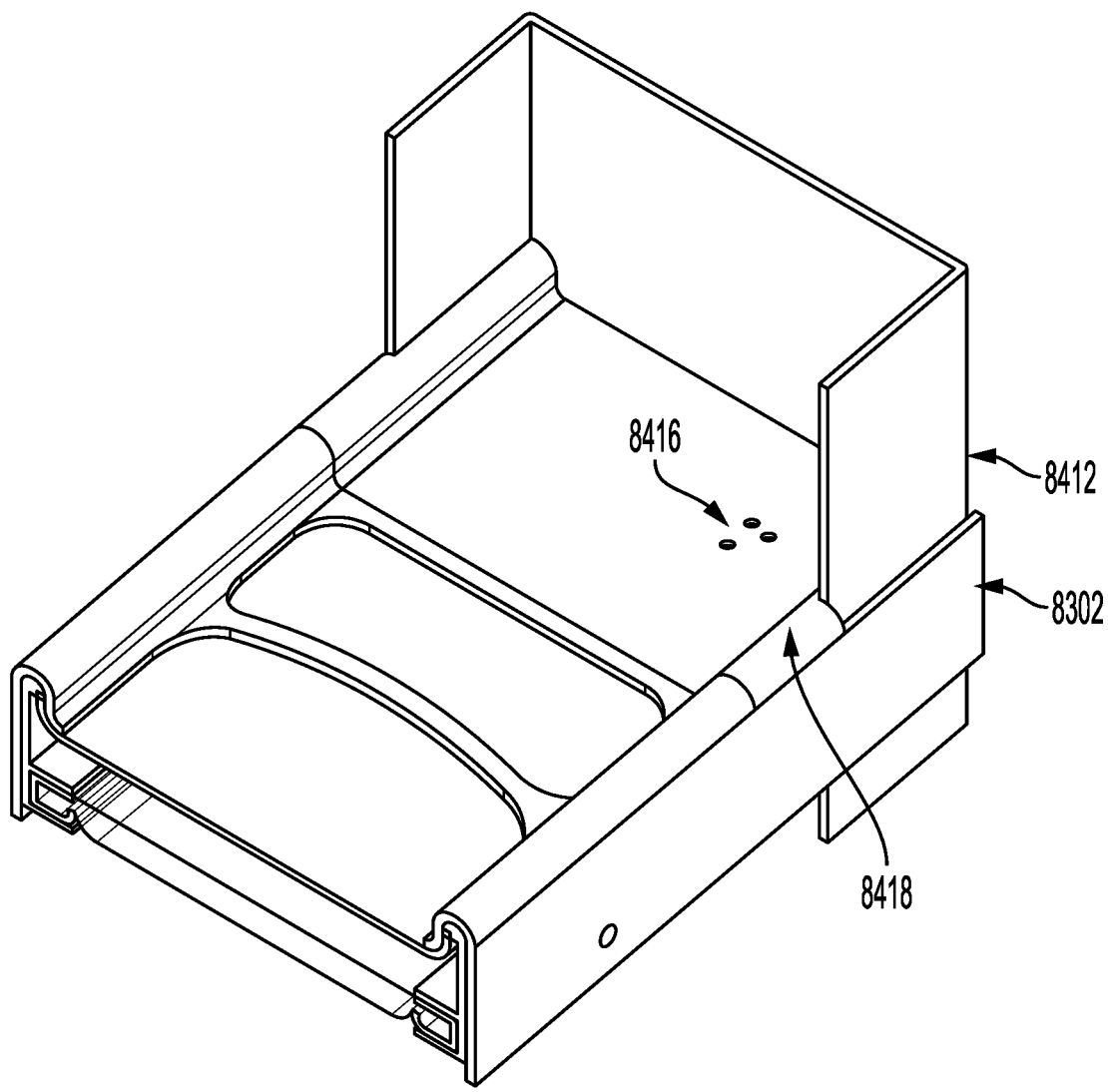

FIG. 84 illustrates an end condition (or cap) for the UHS of FIGS. 83A-83D in which the ORR current collector 8302 may be welded to a vertical bus bar 8412. The end condition (or cap) may include an extruded OER/ORR insulator bracket wedge 8418 which may include a series of holes 8416 therein for air management.

Figure 85A:
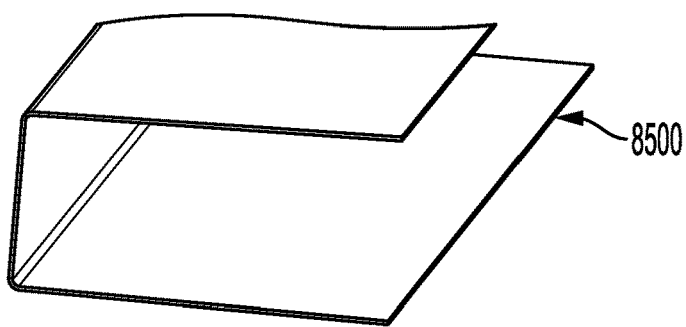
Figure 85B:
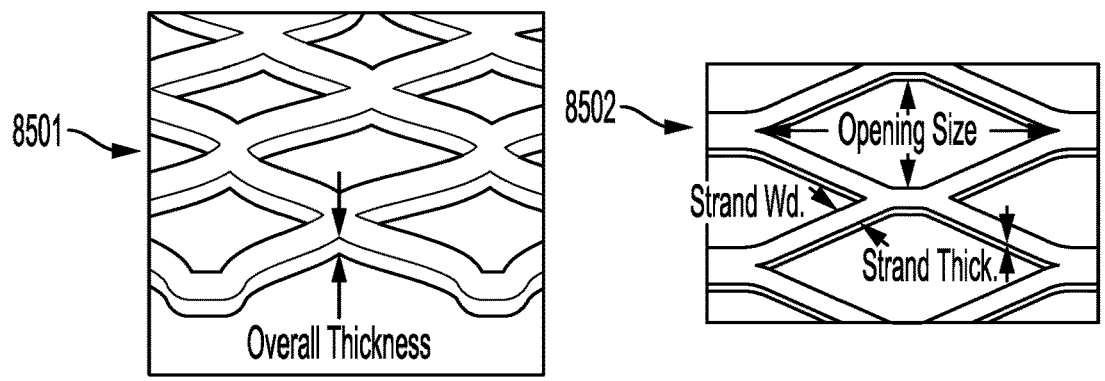
Figure 85C:
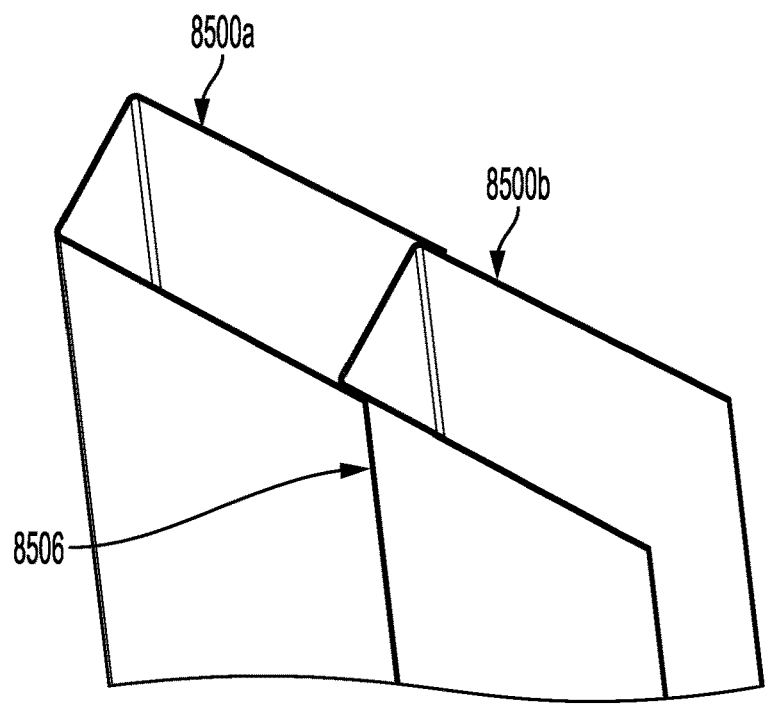

FIGS. 85A-85C illustrate an anode configuration for a UHS according to various embodiments. The anode may be formed from anode sections 8500 formed as folded panels a portion of which is shown in FIG. 85A. The panels may be solid panels, perforated panels, and/or expanded panels, such as expanded panel having portions 8501 or 8502 of FIG. 85B. In some embodiments, anode sections, such as sections 8500$a$ and 8500$b$, may be filled and then compressed together and welded together. For example, a first section 8500$a$ may be filled and the second section 8500$b$ may compress that first section 8500$a$. The sections 8500$a$ and 8500$b$ may be welded and a weld seam 8506 (or spot weld) may hold the sections 8500$a$ and 8500$b$ together. The process may be repeated with other anode sections until the anode is fully stacked.

Figure 86A:
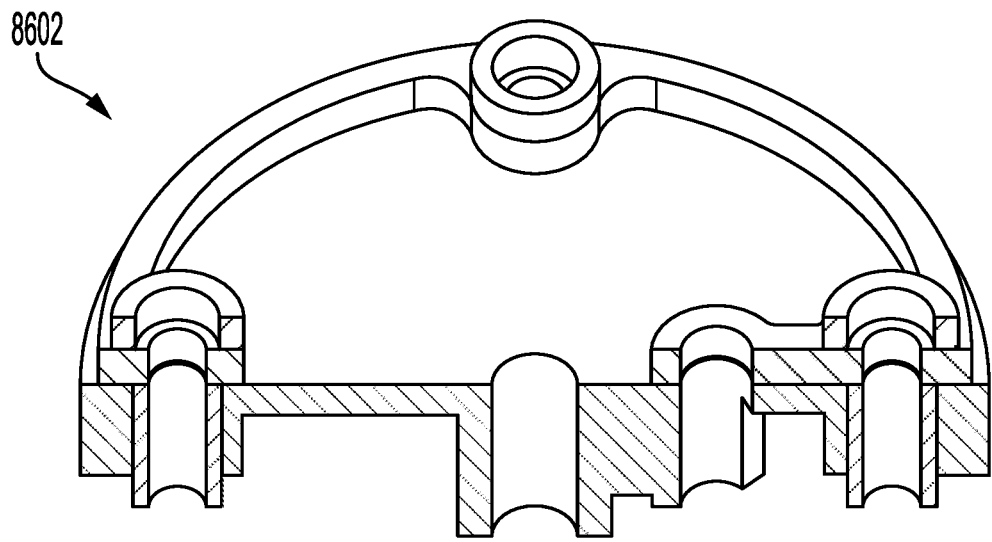
FIGS. 86A-87C illustrate embodiment bubble flow features in a UHS reactor and embodiment UHS reactor configurations.
Figure 86B:
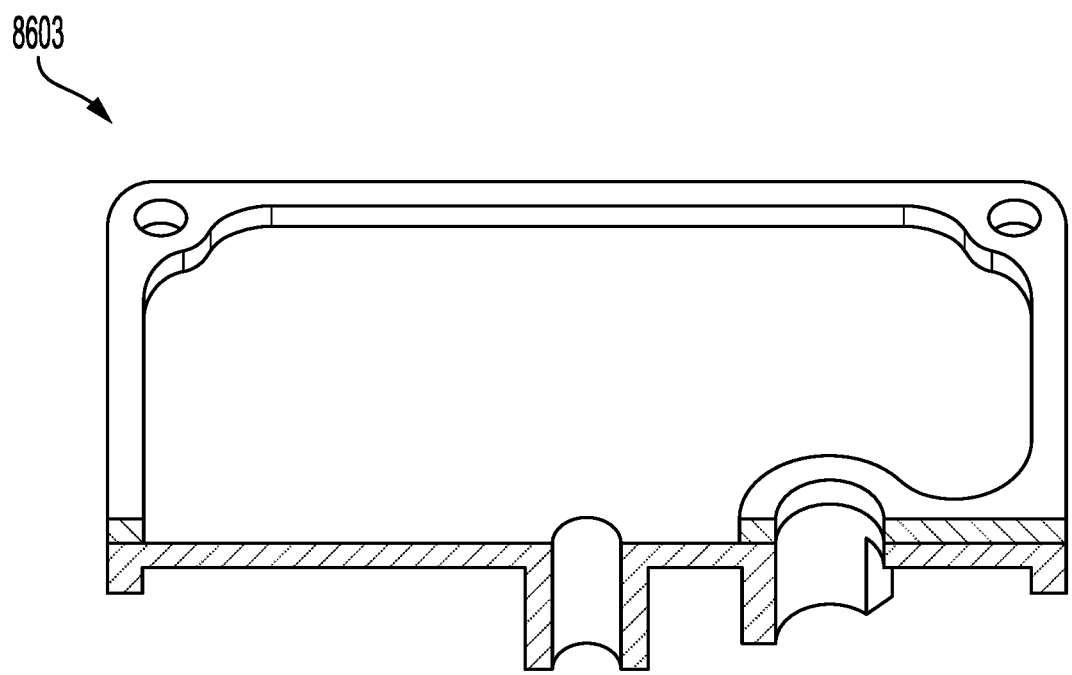
Figure 86C:
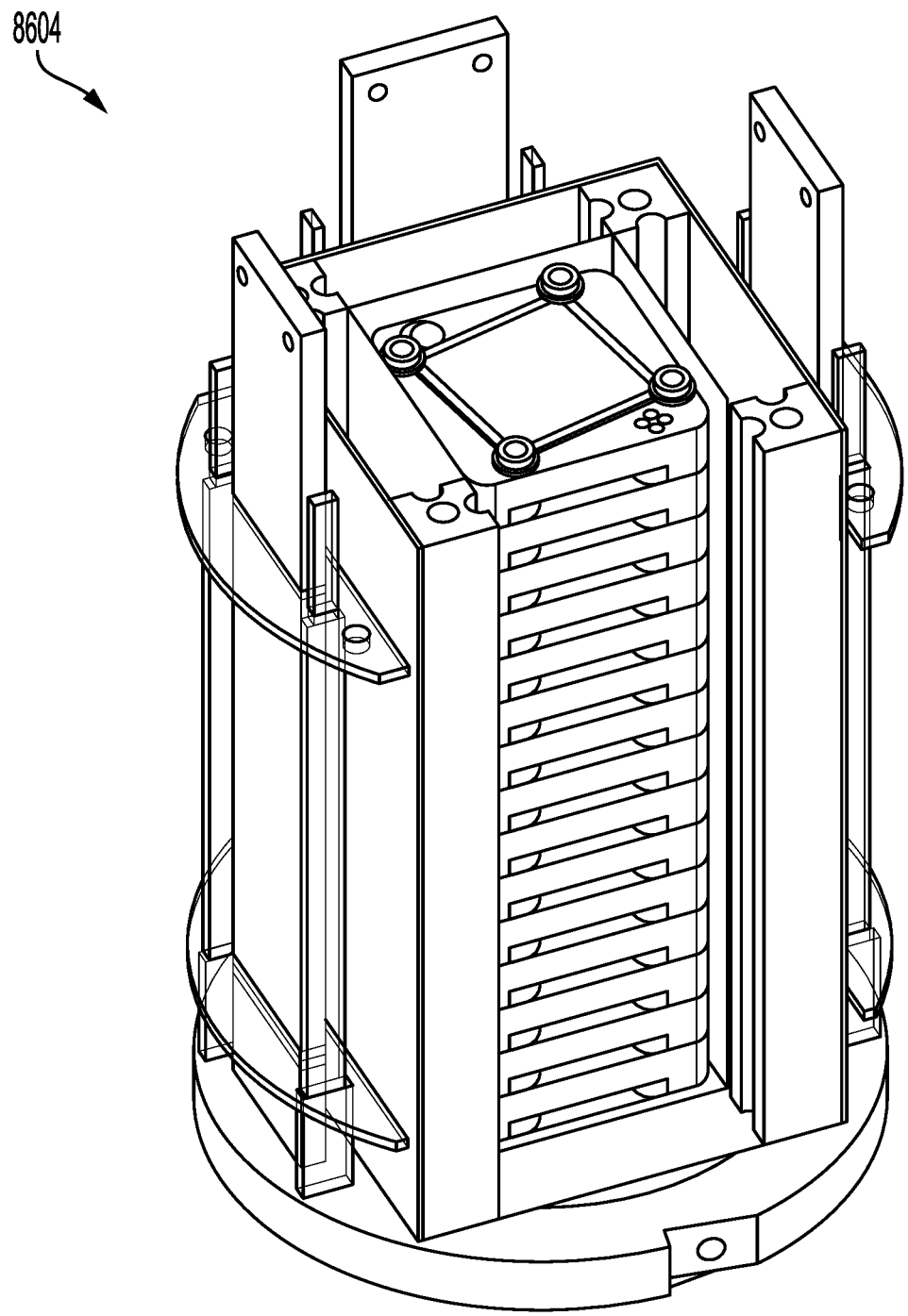
Figure 86D:
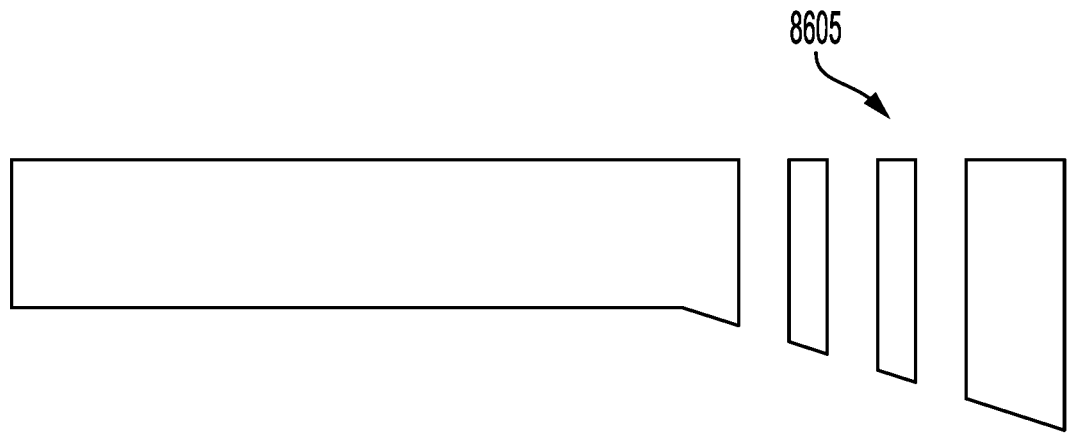
Figure 86E:
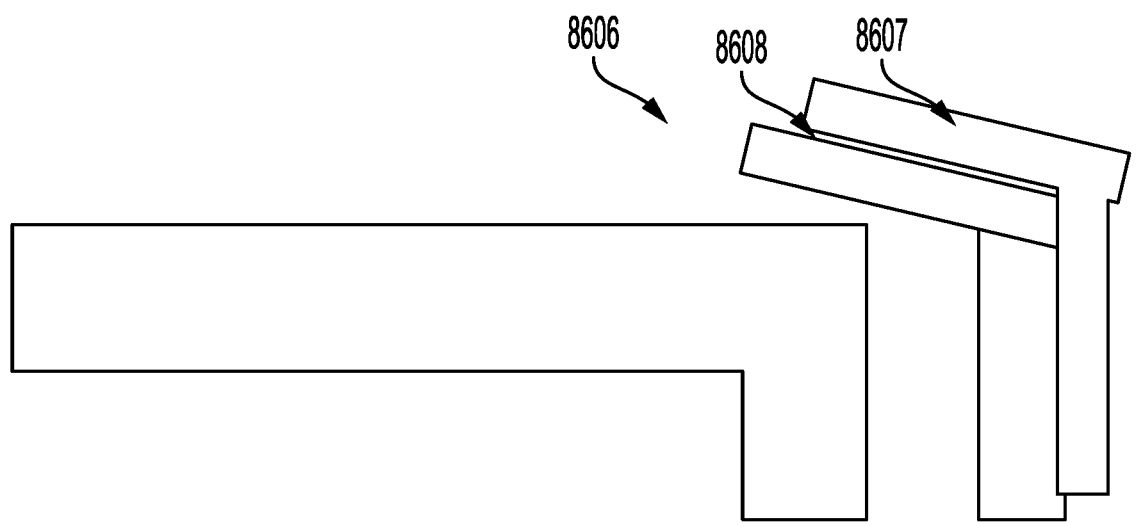
Figure 87A:
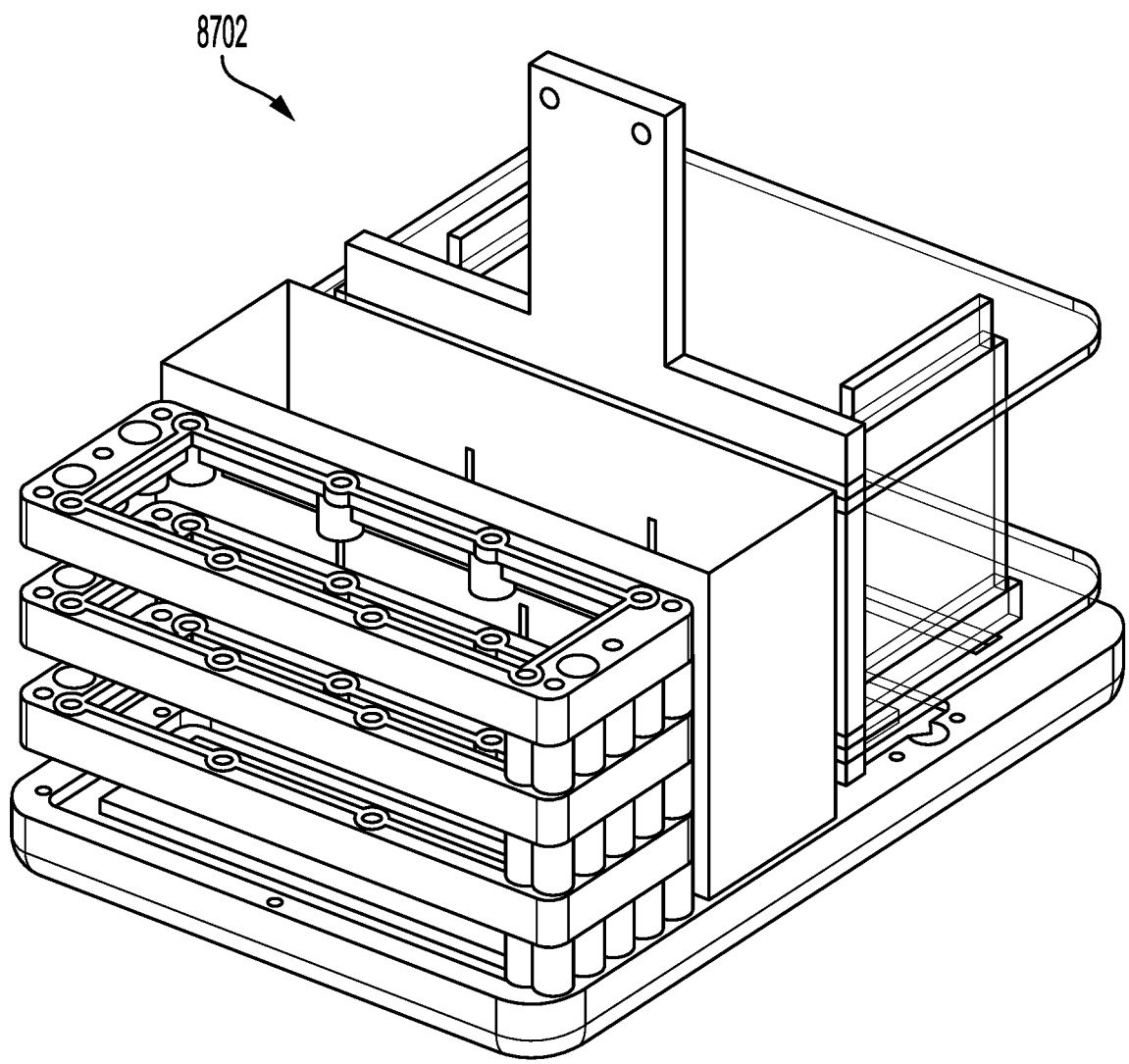
Figure 87B:
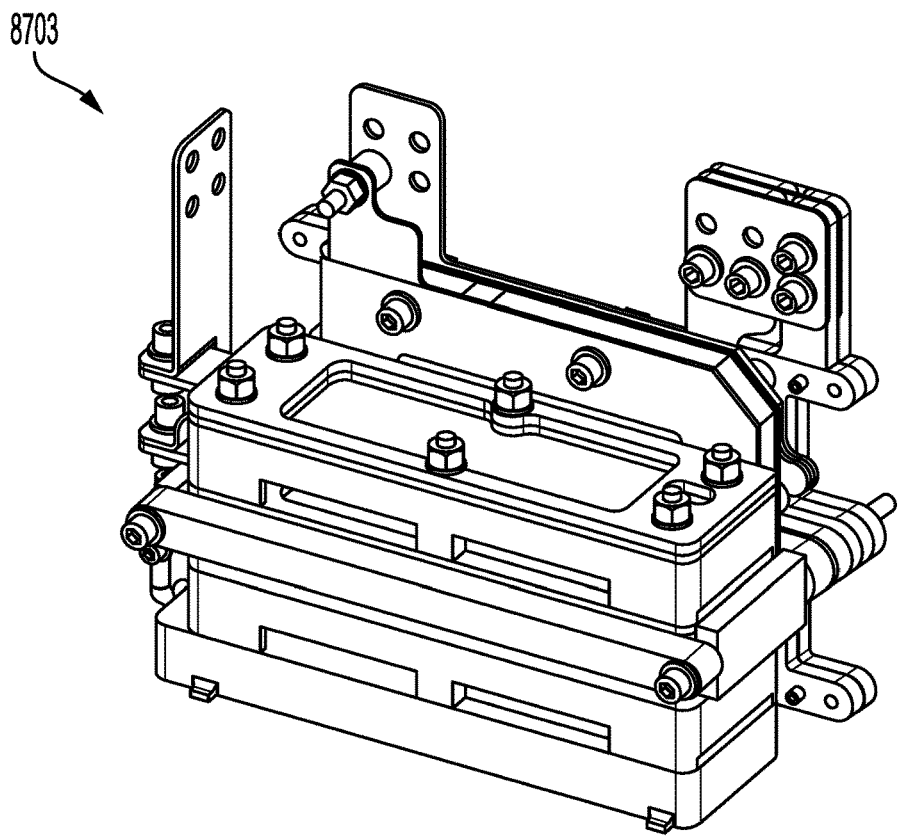
Figure 87C:
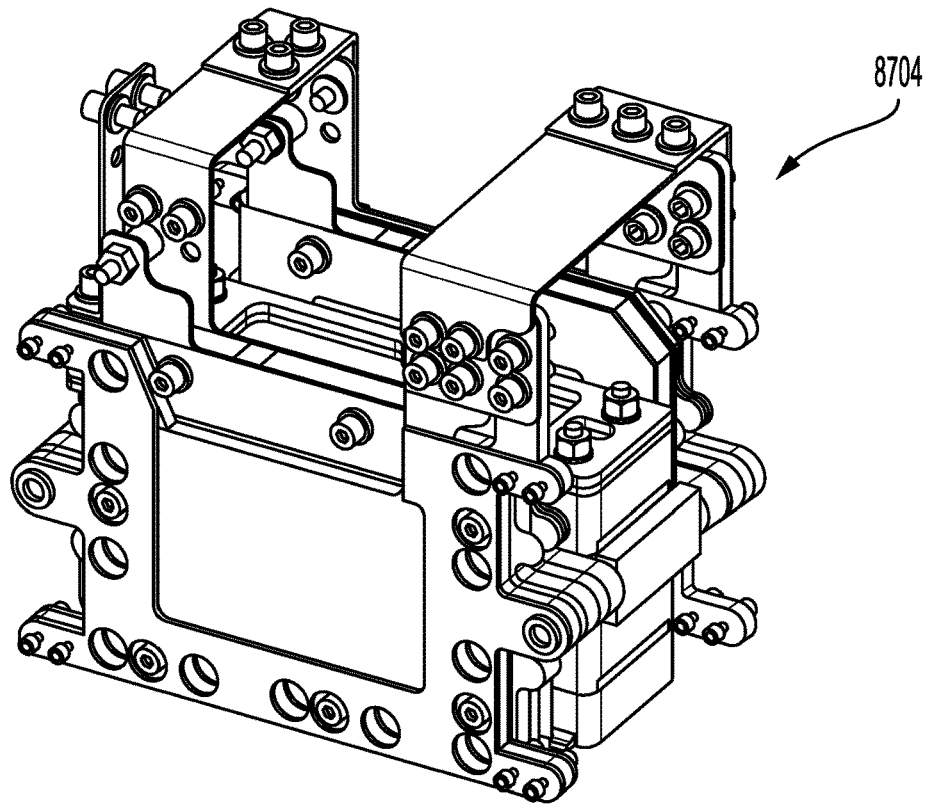

FIGS. 86A-87B illustrate embodiment bubble flow features in a UHS reactor and embodiment UHS reactor configurations. FIG. 86A illustrates a violent bubble flow design 8602. FIG. 86B illustrates a violent bubble flow design 8603. FIG. 86C illustrates a stacked core type reactor 8604 in which bubbles escape out the side of the stack. FIG. 86D illustrates a UHS grid 8605 in which holes, such as 4 deep 5 wide $\frac{1}{16}$ inch holes, are drilled into a ramp edge of the cup. FIG. 86E illustrates a UHS flap valve 8606 in which a low carbon steel mesh 8607 is coupled to a Teflon mesh 8608 over an opening in the UHS cup. FIG. 87A illustrates a rectilinear design 8702 of a UHS, including a custom anode. FIG. 87B illustrates a design for an assembly 8703 of a rectilinear design with standard subscale anode. FIG. 87C illustrates a design for an assembly 8704 of a matched symmetry design.

Figure 88A:
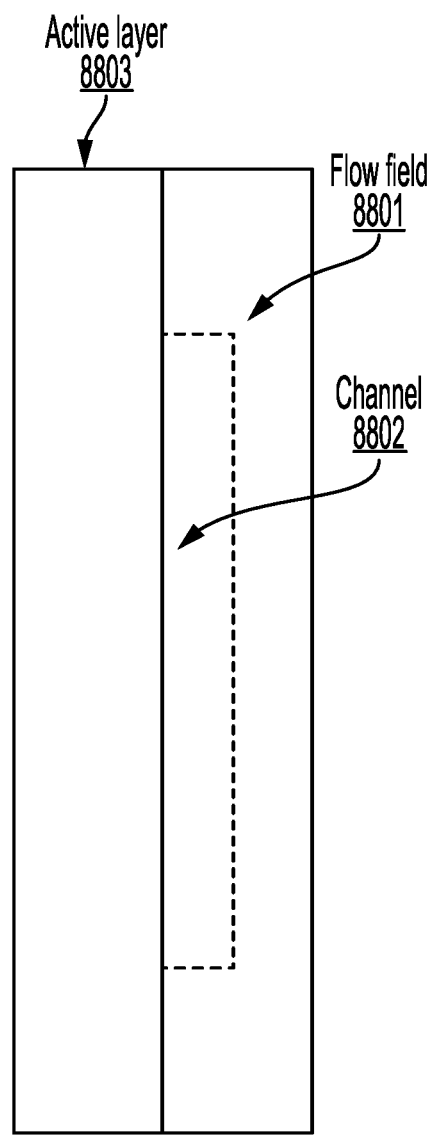
FIGS. 88A-88S illustrate aspects of an example sealed vertical submerged ORR electrode according to various embodiments, including flow fields which may be used in those embodiments.
Figure 88B:
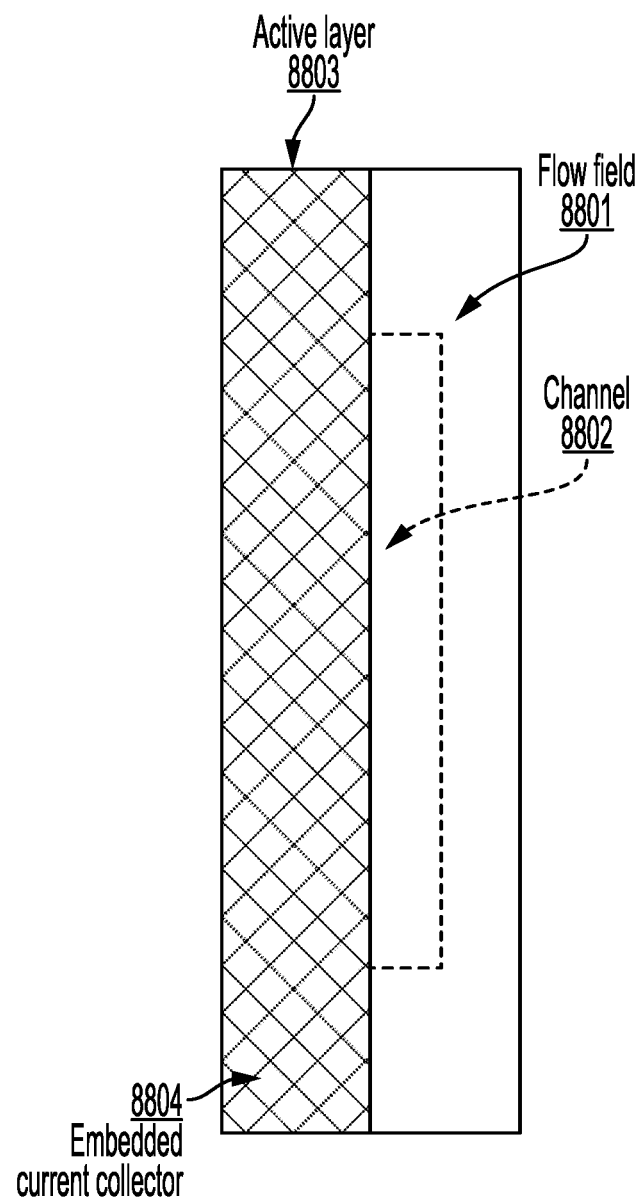
Figure 88C:
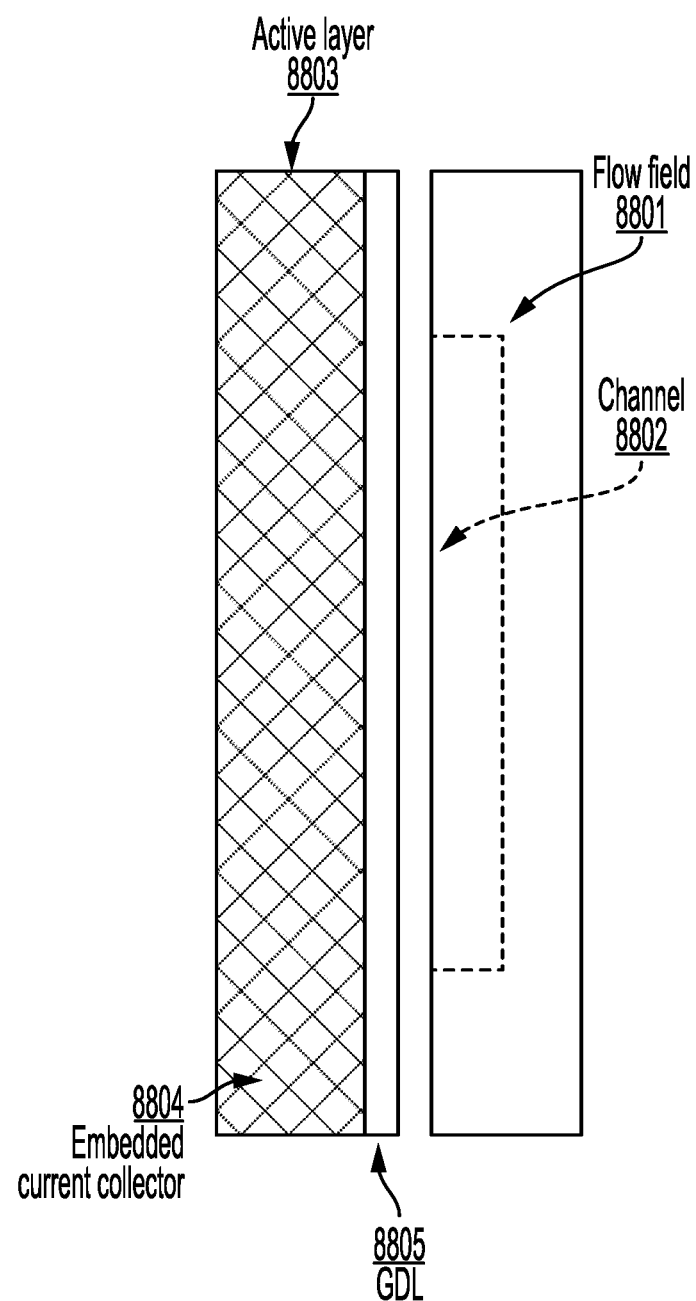
Figure 88D:
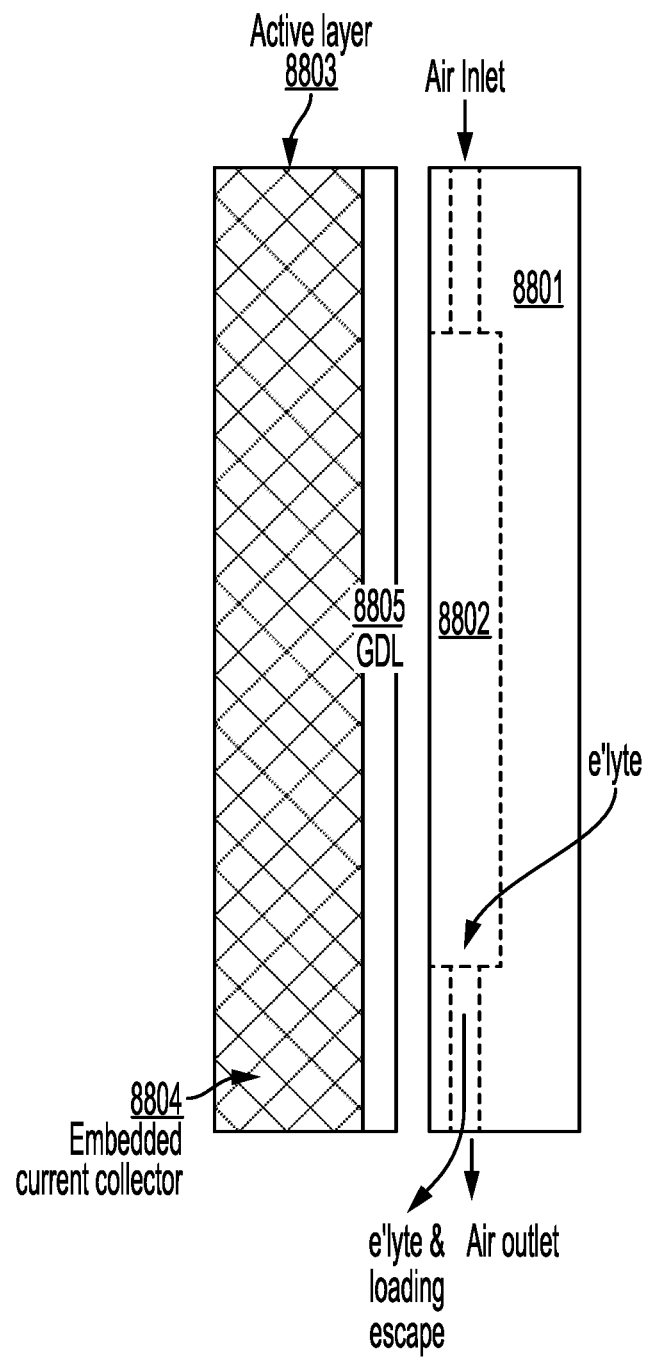
Figure 88E:
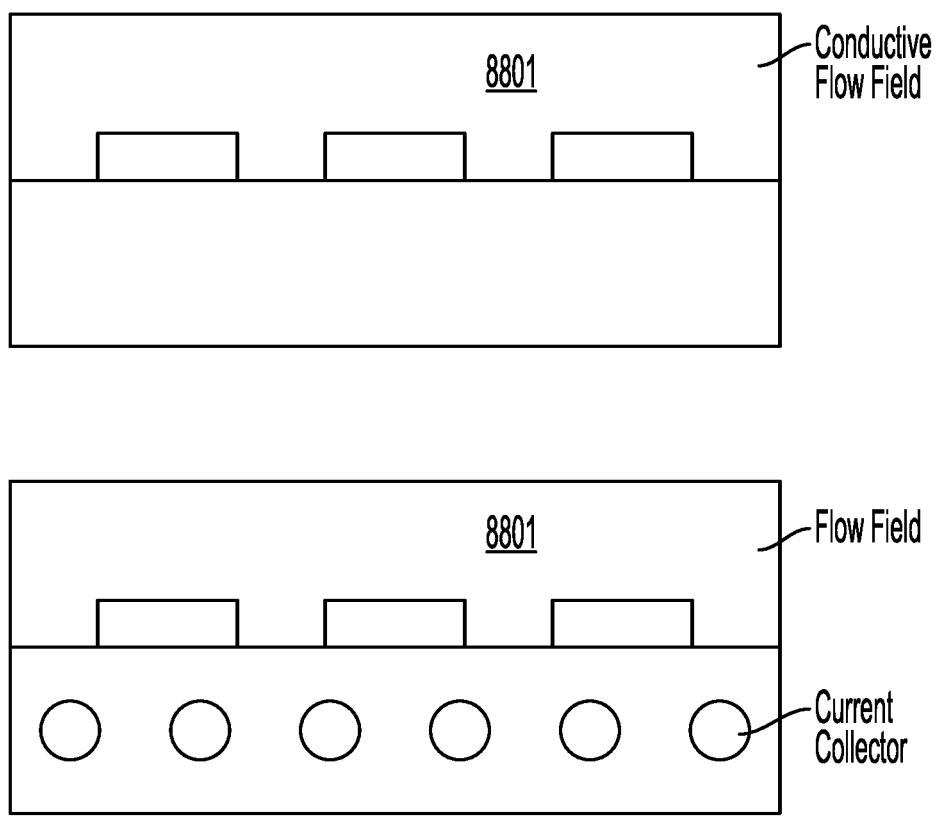
Figure 88F:
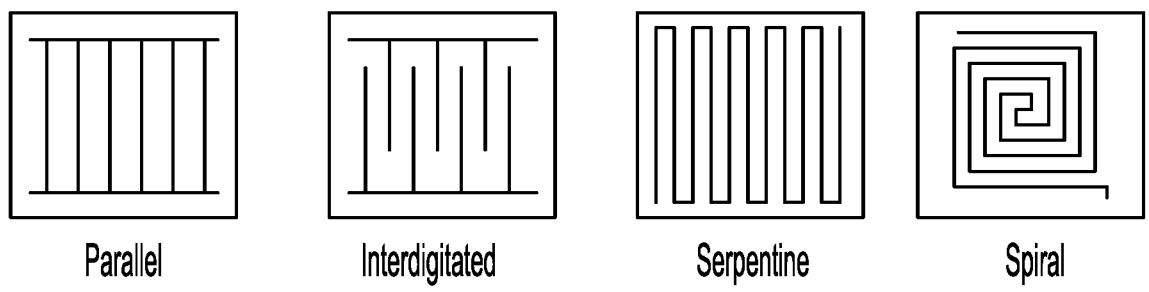
Figure 88F:
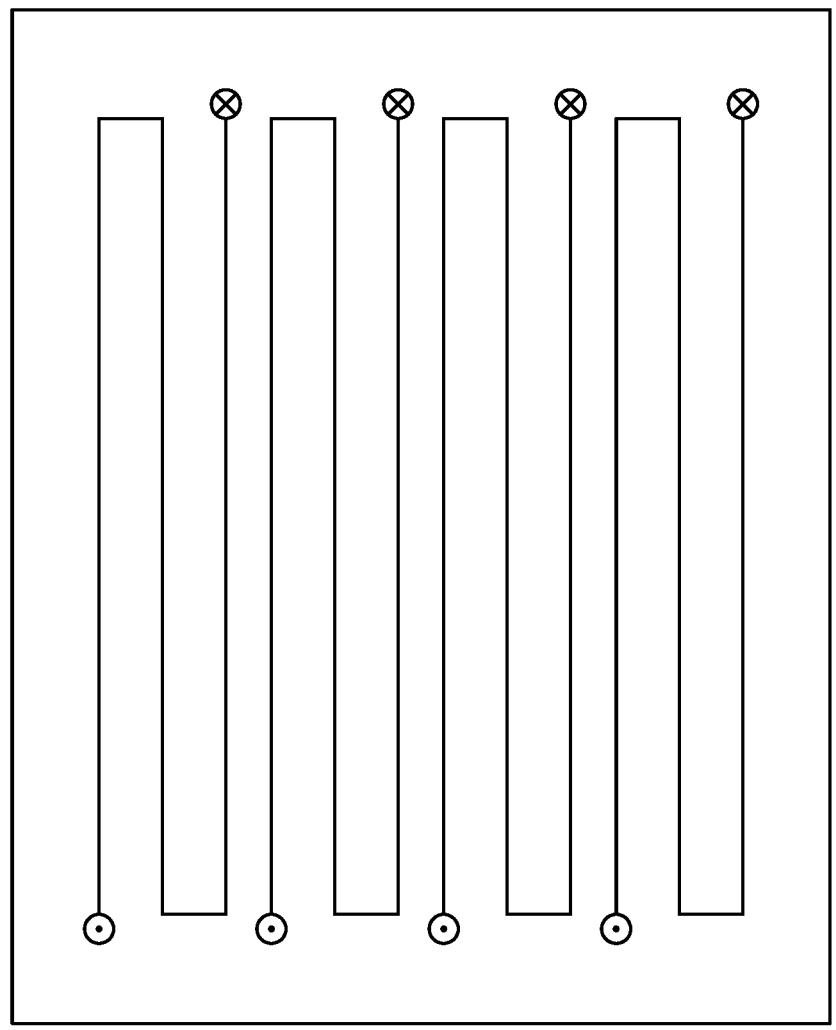
Figure 88G:
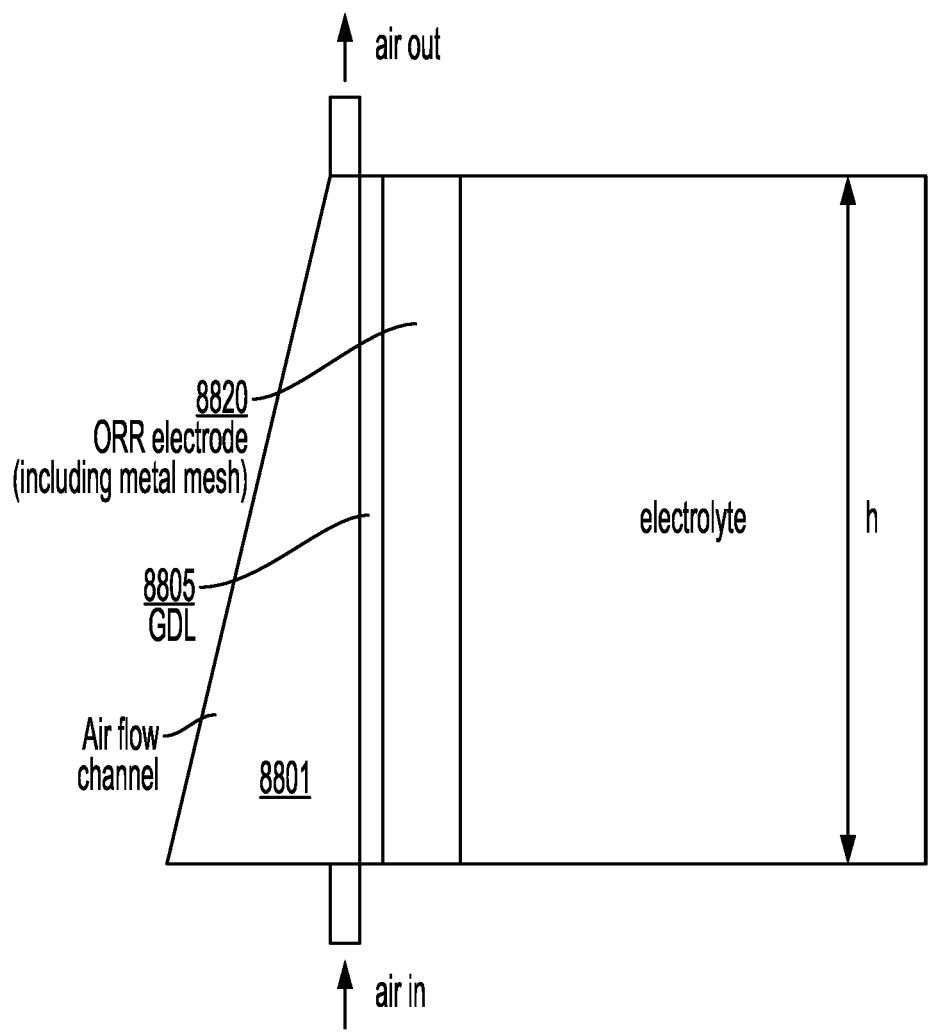
Figure 88H:
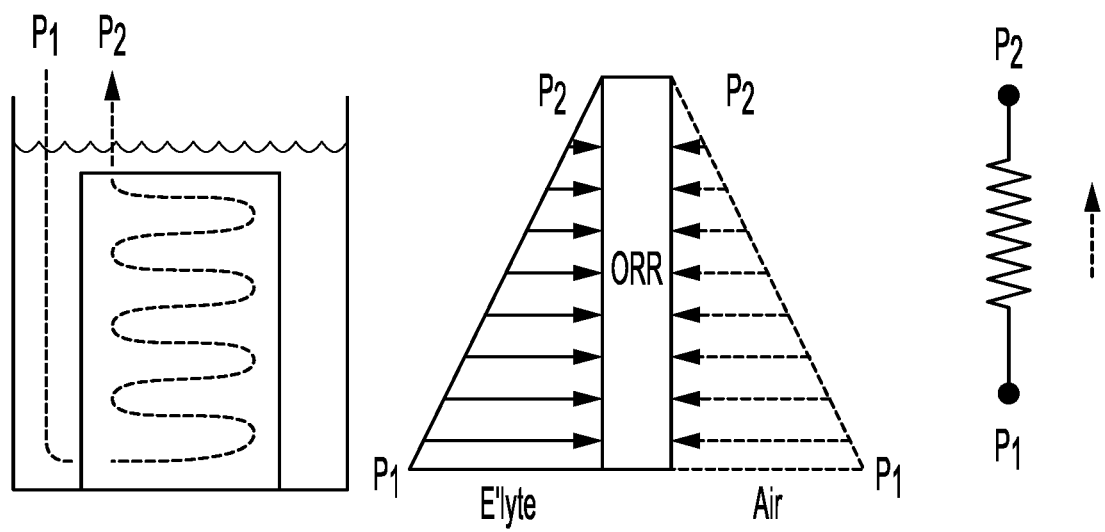
Figure 88I:
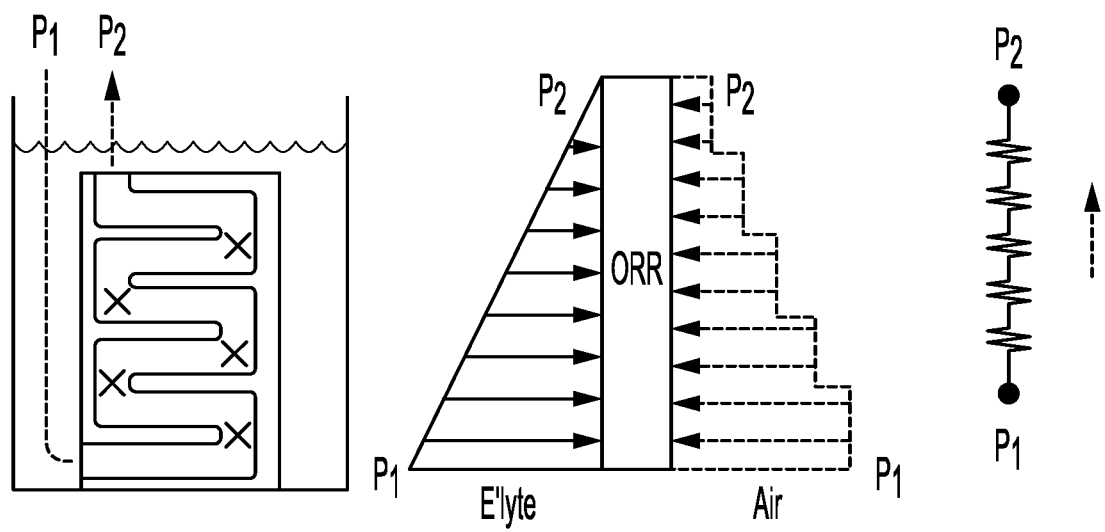
Figure 88J:
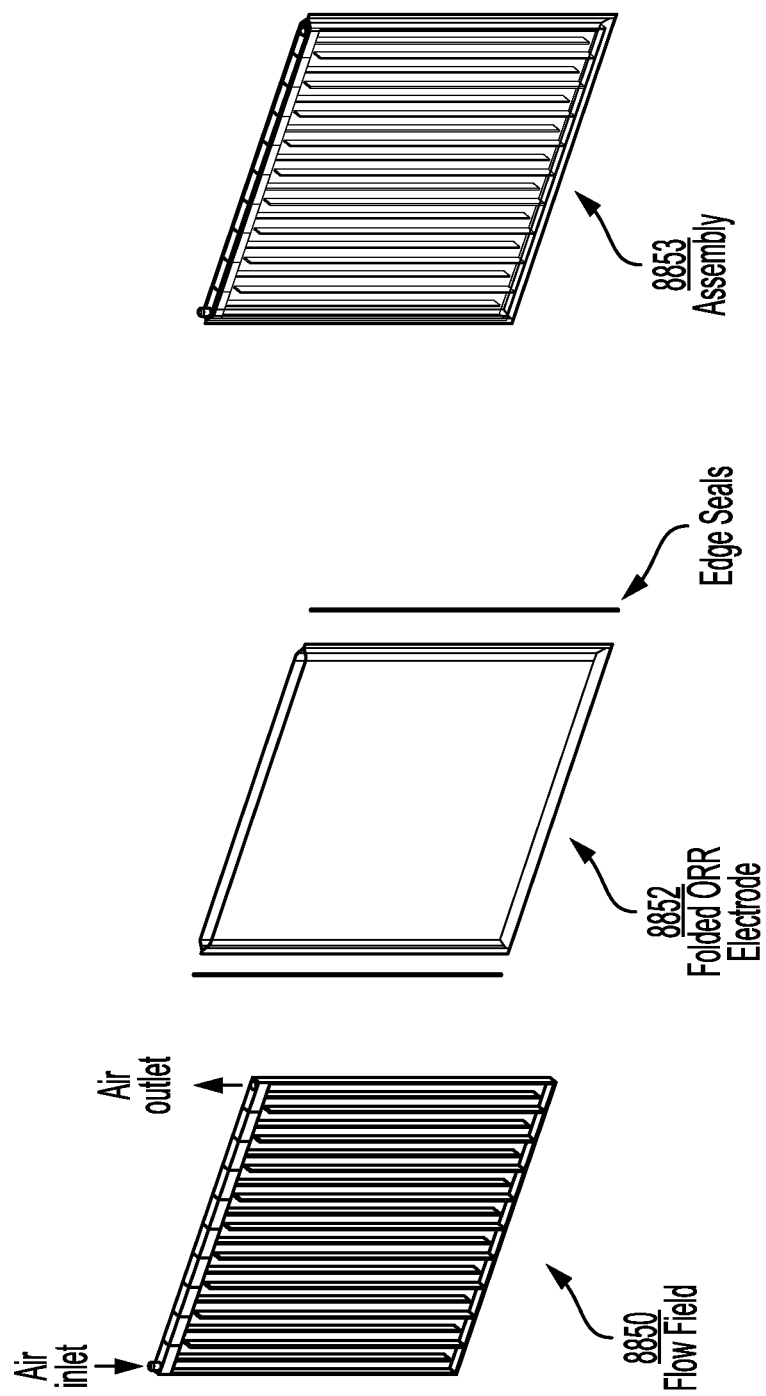
Figure 88K:
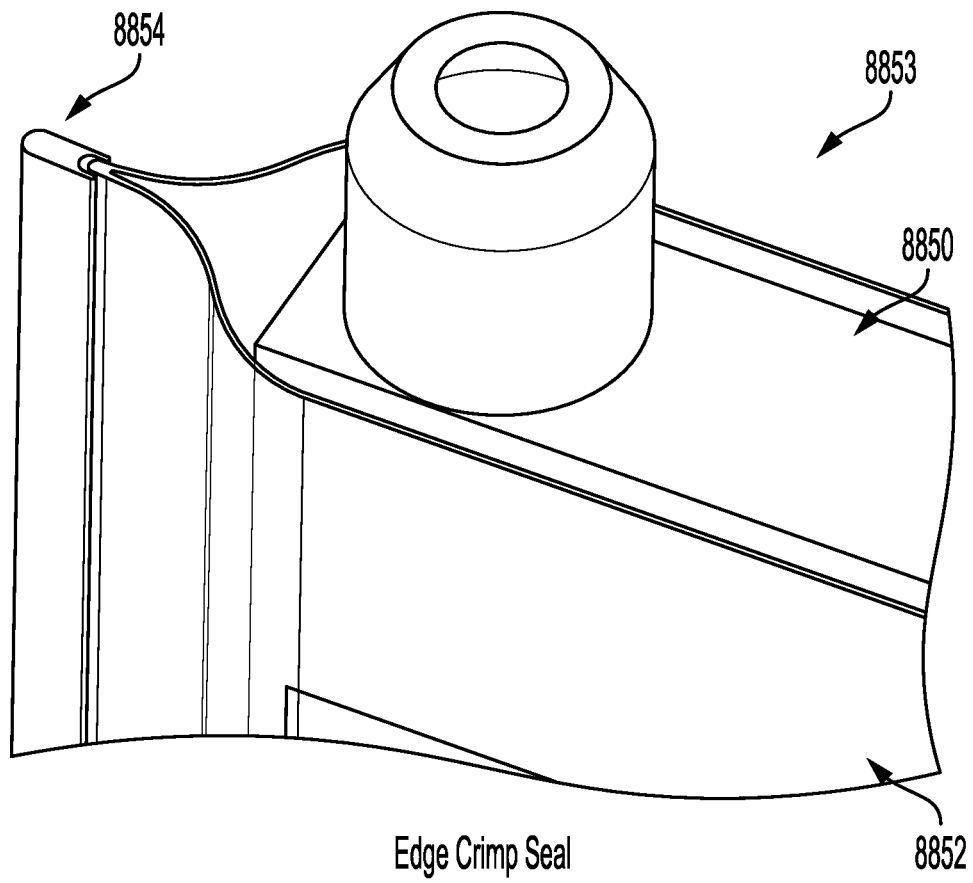
Figure 88L:
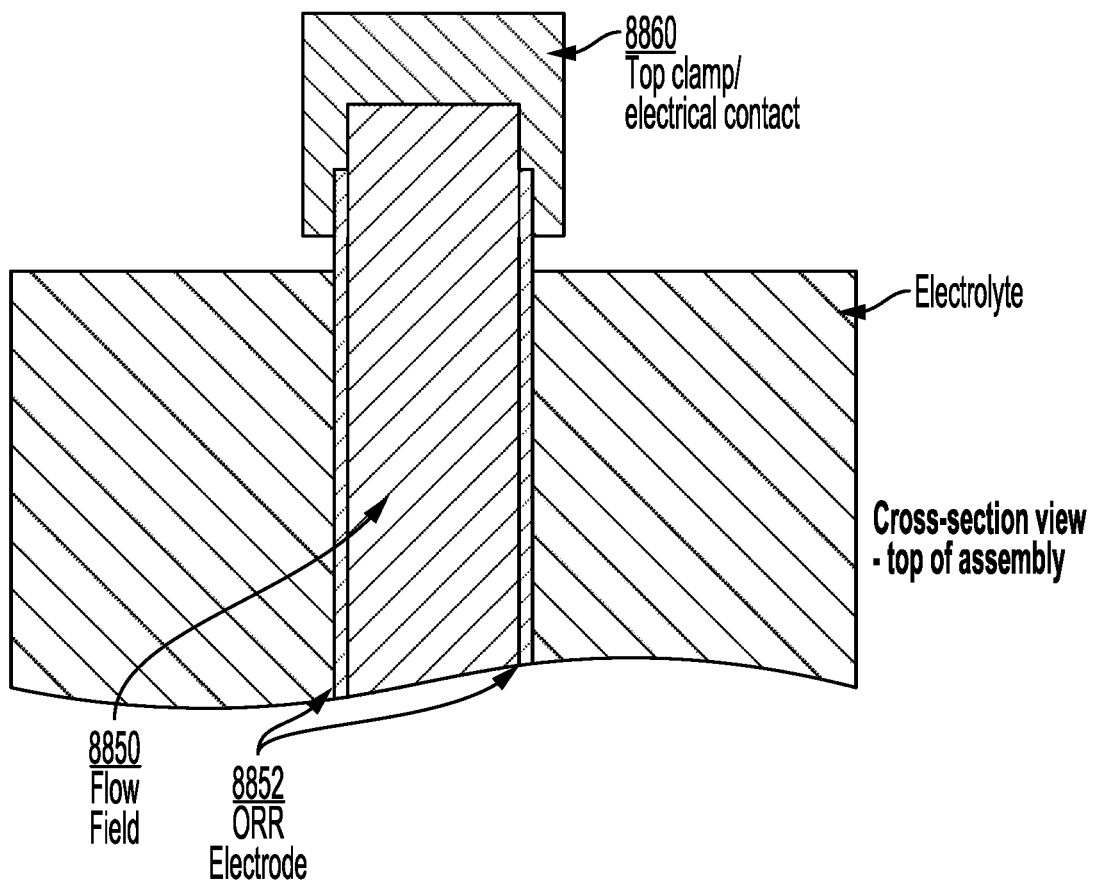
Figure 88M:
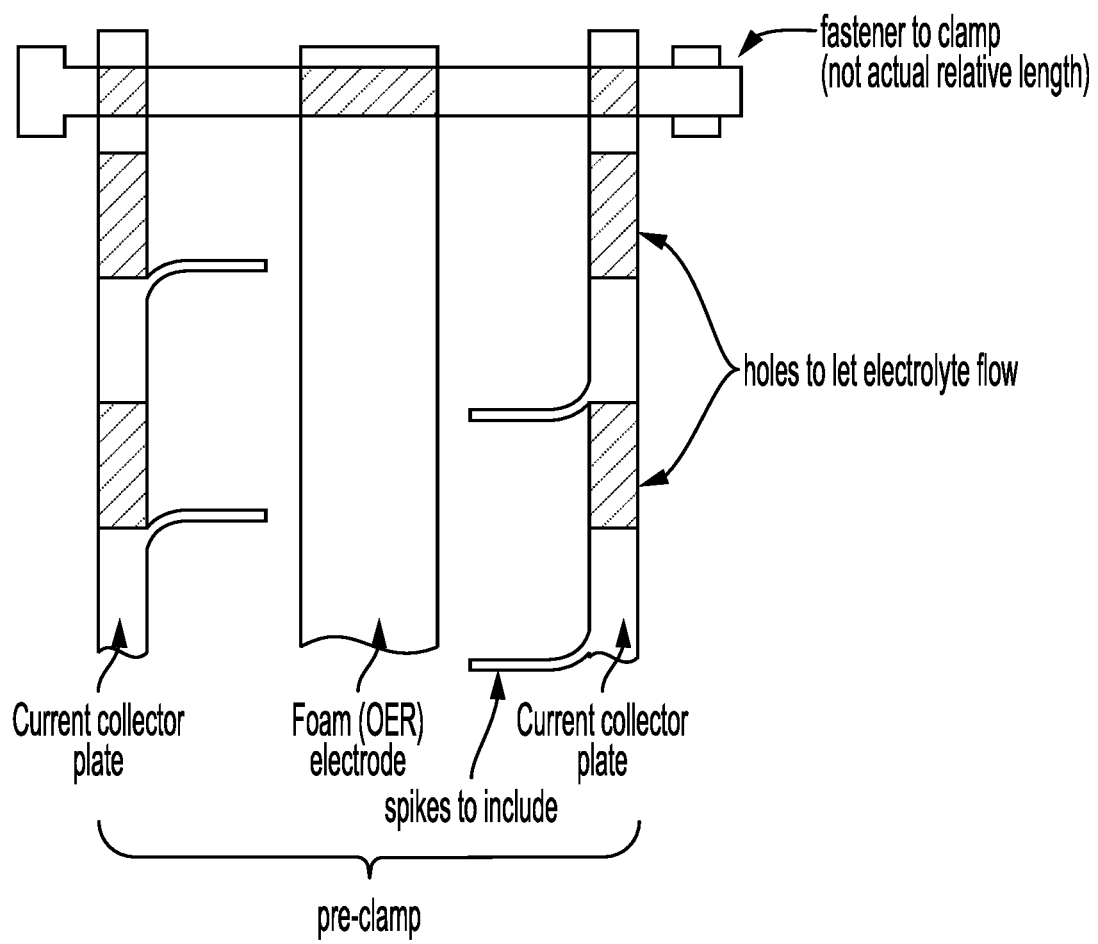
Figure 88N:
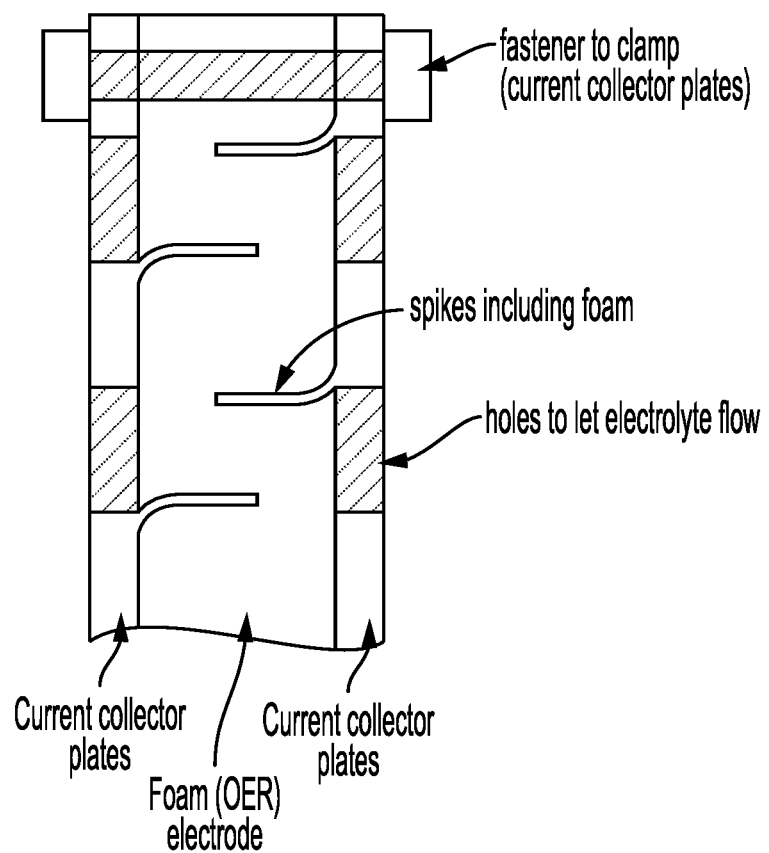
Figure 88O:
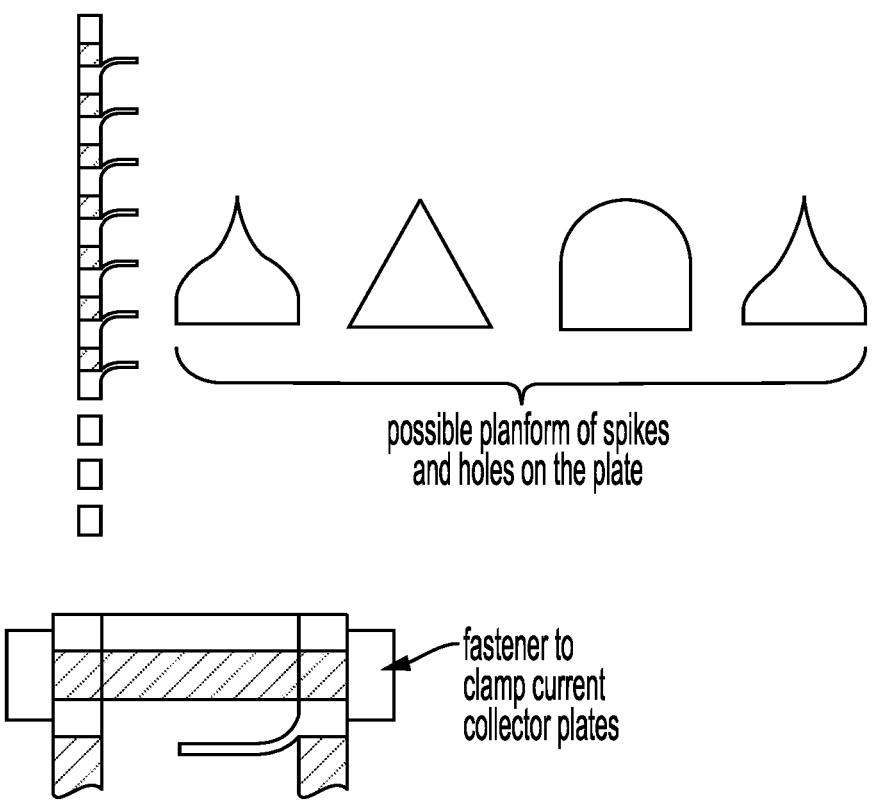
Figure 88P:
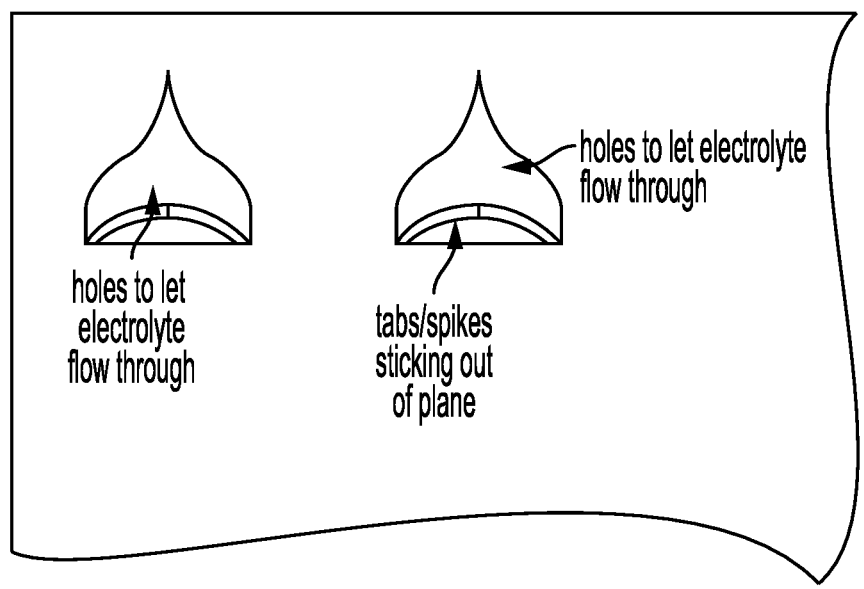
Figure 88Q:
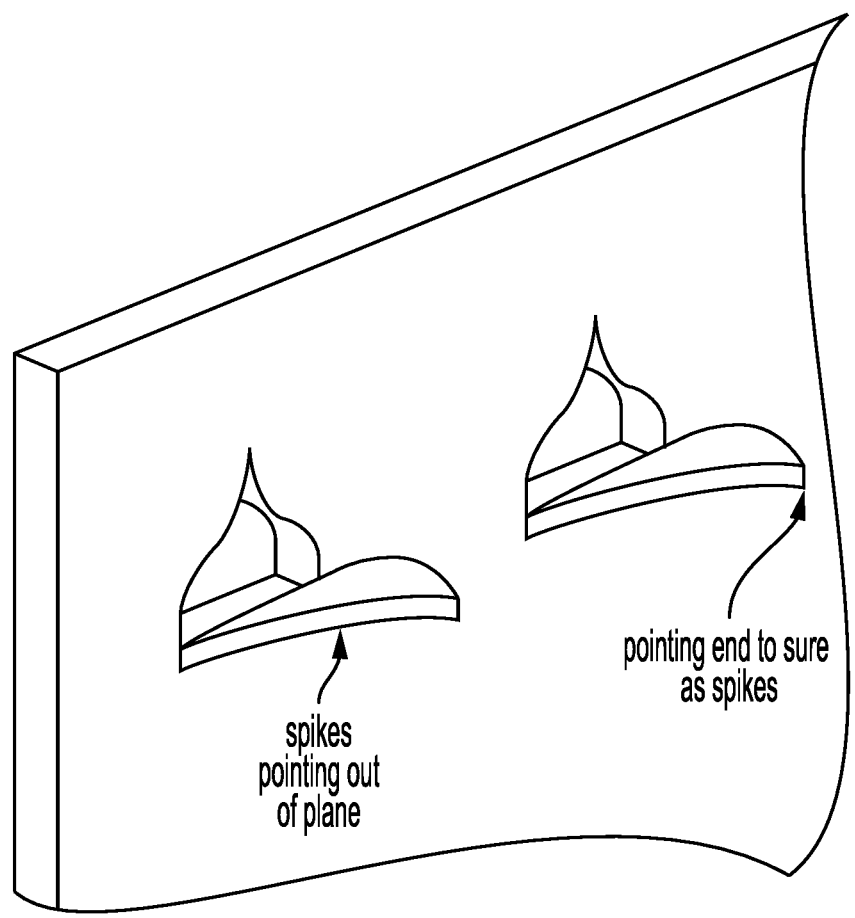
Figure 88R:
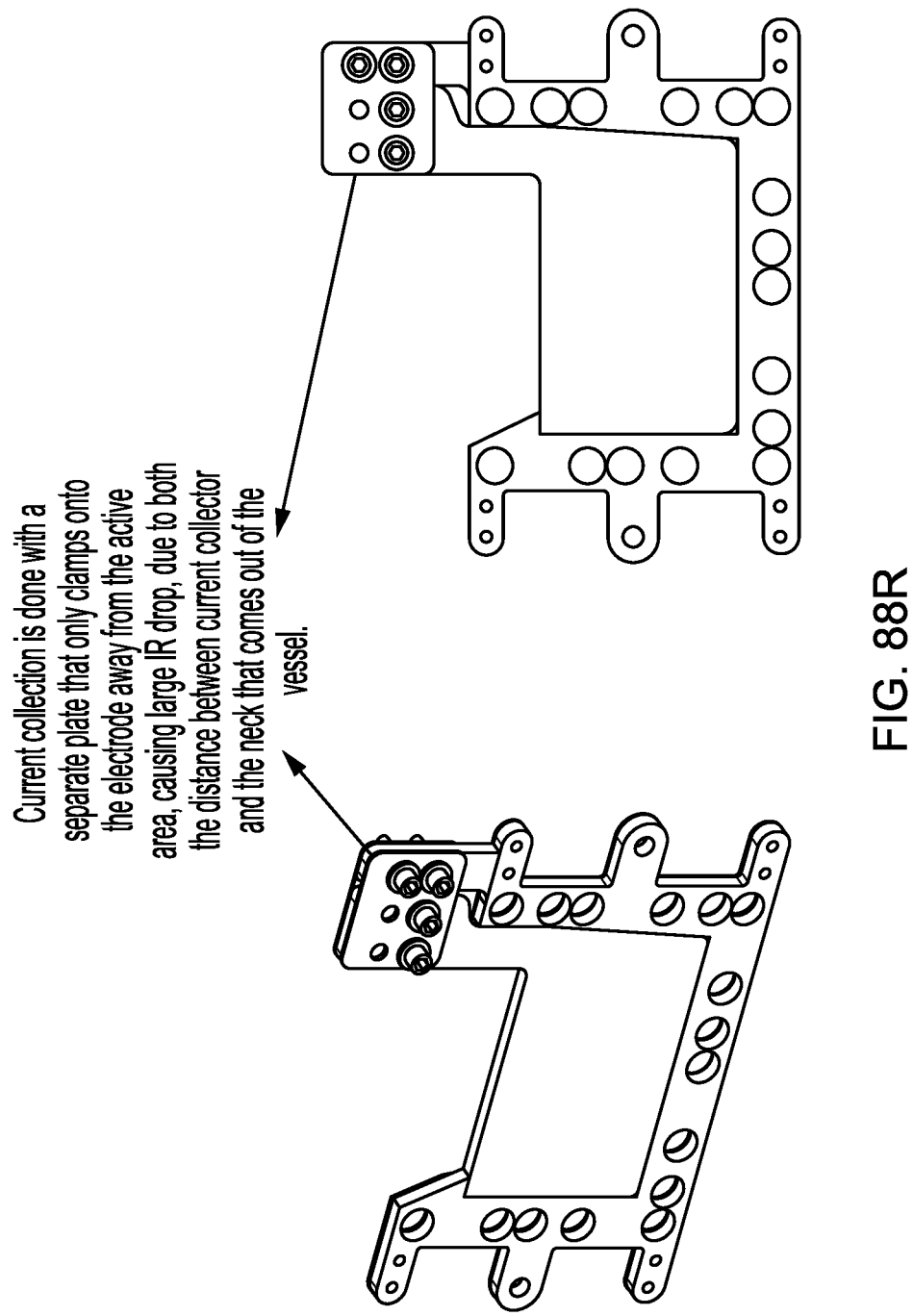
Figure 88S:
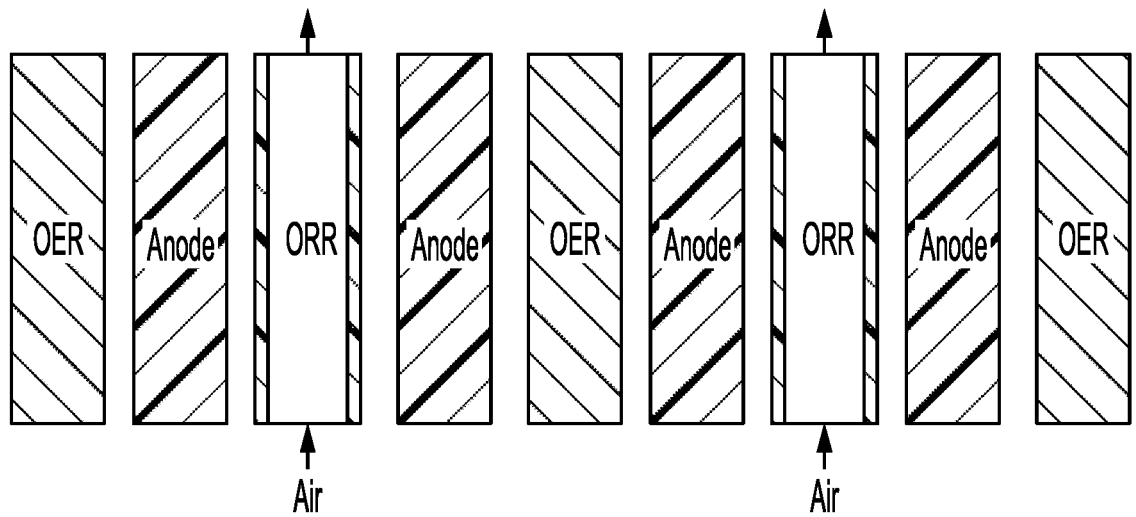
Figure 88S:
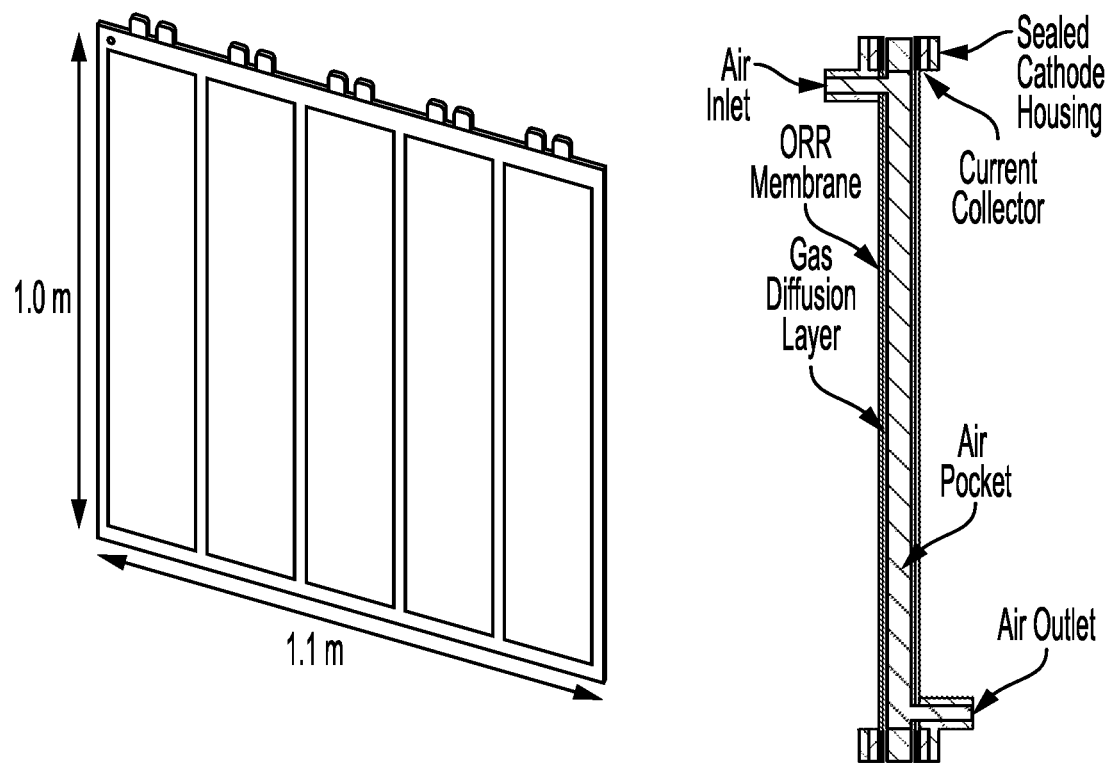

FIG. 88S illustrates aspects of an example sealed vertical submerged (SVS) ORR electrode according to various embodiments. As illustrated at the top of FIG. 88S, SVS repeat units may include an OER, anode, ORR, anode pattern repeated linearly through the assembly. An example ORR membrane assembly is illustrated, and an example of the interaction between the air inlet, air outlet, and ORR membrane is illustrated as well.

In various embodiments, the sealed vertical submerged (SVS) ORR electrode may be combined with a flow field, which directs air or oxygen gas flow from a manifold to the sheet of ORR electrode. FIGS. 88A-88E illustrate example aspects of such embodiment SVS ORR electrode configurations. The flow field 8801 may be comprised of a plastic (e.g., polypropylene, HDPE) or a metal (e.g., steel, nickel). The flow field 8801 may also serve as a current collector and/or may include an embedded current collector 8804. The flow field may be compressed against the ORR electrode 8820 to enable direct delivery of gas from air flow channels 8801 to the ORR electrode. The flow field may both collect current and direct air flow. The flow field 8801 may be comprised of both a metal and a plastic insulating material. The flow field 8801 may be placed against the hydrophobic coating side of a sheeted ORR electrode. The flow field 8801 may be comprised of a series of channels 8802 that are 0.1 mm to 5 cm wide and 0.1 mm to 1 cm deep. The flow field 8801 may include a gas diffusion layer (GDL) 8805. As illustrated in FIG. 88FA, the flow channels may take the form of a parallel, interdigitated, serpentine, or spiral geometric pattern. In certain embodiments, the flow channels in the flow field may exhibit an elliptical cross section that permits small landing contacts between the ORR electrode and the flow field, which may enable high flow velocities at low pressure drop. The flow field may permit control of the airflow across and/or into the ORR electrode, with various design patterns to target different operating powers and various flooding mitigation. The flow field may permit for the use of a broader array of ORR electrode design to be used, especially regarding oxygen transport through the thickness of the ORR electrode and into the catalyst layer. In certain embodiments, an electrically conductive flow field may allow for the use of an air electrode with no embedded current collector. For use in systems with alkaline electrolytes, a conductive flow field could be comprised of carbon, graphite, nickel, or nickel-plated steel.

Serpentine flow fields allow the reactant gas to have a long residence time in the electrochemical system, which may aid in increasing the air utilization (or decreasing stoich). Serpentine flow fields, however, are known to exhibit large pressure drops due to the presence of a thin, winding gas delivery channel. As illustrated in FIG. 88FB, in certain embodiments, breaking the serpentine channel into multiple segments may enable co-optimization of air utilization and pressure drop. The serpentine flow channel may be broken into segments, with multiple inlet and outlet gas delivery points located along larger inlet and outlet manifolds. The number of connected serpentine segments may be adjusted in the design to optimize air utilization and pressure drop. More connected serpentine segments may yield higher air utilization and higher pressure drop, while fewer connected serpentine segments may yield lower air utilization and lower pressure drop.

In certain embodiments, the flow channels in the flow field may be tapered, which may regulate the air pressure inside the air flow channel 8810. FIG. 88G illustrates a tapered air flow channel. The tapered flow channels may constrict air flow as air passes from the inlet (bottom of the cell) to the outlet (top of the cell) of the flow field by imposing higher pressure drop. In certain embodiments, the air volumetric flow rate is held constant, and the resulting increased gas pressure inside the flow channel may counterbalance the hydraulic pressure at the bottom of the cell. As illustrated in FIG. 88H, in certain embodiments, the geometry of the flow field, such as the width of channels, their organization as serpentine, interdigitated, etc., is used to modify pressure along the air path within a single subassembly, causing a gradient of pressures in a desired pattern. This pattern may match the surrounding hydrostatic pressure across the electrode depth. For example, the highest pressure air can enter the bottom of the chamber, where surrounding electrolyte pressure is highest. As the gas travels upward through the flow field, resistance in the flow field, akin to pipe friction, will reduce the air pressure. If flow field resistances are designed to reduce pressure in the gas stream at an appropriate rate, this can be designed to match the smaller electrolyte pressures seen moving upward in the vessel, maintaining constant across-electrode pressure gradients. Pressure-reducing geometry features, such as orifices, may also be used to modify pressure along the air flow path within an ORR electrode subassembly as illustrated in FIG. 88I. In certain embodiments, there may be only one large flow cavity behind the ORR electrode. In additional embodiments, there may be multiple flow channels directing gas flow behind the ORR electrode. The tapered air flow channel may be economically produced by an additive manufacturing technique, such as 3D printing. The tapered air flow channel may also be produced by extrusion or injection molding.

As illustrated in FIGS. 88J-L, in various embodiments, the sealed vertical submerged (SVS) ORR electrode may be comprised of a sheet/film air electrode assembly. The air electrode 8853 may be comprised of a single sheet of electrode material 8852 that has been folded onto itself around a mechanically defined air flow field 8850 and sealed or crimped at the two resulting vertical edges by the edge crimp seal 8854. In such an embodiment, the assembly may create a closed serpentine, tortuous path for air delivery to the electrode structure interior, effectively creating a pouch-like assembly which can be submerged into the electrolyte bath of a metal-air battery. The hydrostatic pressure of the electrolyte may partially, or in full, hold the assembly together. In certain embodiments, the assembly is established in such a way that the interior chamber is hydraulically isolated from the exterior electrolyte, such that air flows through the interior of the assembly and reacts with electrolyte controllably wetted to the exterior surface of the electrode material. In certain embodiments, the air electrode material may be of sufficient mechanical strength and integrity to withstand being folded on itself and sealed at the edges. In certain embodiments, the assembly may be comprised of an additional top seal 8860, aided by a crimp structure, clamshell with fasteners, adhesive, or gasket material. In certain embodiments, the additional top seal may include a heat stake or ultrasonic weld. The top seal 8860 may also act as the electrical contact to the ORR electrode material. In certain embodiments, the electrode material may have high in-plane electrical conductivity, such that a flow field made of electrically conductive material may act in place of an electrical current collector which would otherwise be embedded in the ORR electrode material.

The current collector design for a vertically oriented OER electrode, comprised of metal foam or a porous sintered metal plate, may be susceptible to large resistive losses (i.e., iR-drop). Mechanical failure of the section of the OER electrode that mechanically mates with its current collector may also occur. Both the incidences of large resistive loss and mechanical failure may become more prevalent as the geometric size of the reactor and the electrode increases. As illustrated in FIGS. 88M-88Q, in some embodiments, the OER current collector design may include small spikes that are cut and died perpendicularly out of plane of the plate. The current collector may be clamped onto the OER electrode with the spikes intruding the OER electrode to provide larger contact area with the foam, while having a porous structure to permit electrolyte flow through it. In another embodiment, the current collector may be mechanically mated to the OER electrode by bolting two metal plates to either side of the OER electrode as illustrated in FIG. 88R.

In such an embodiment, the two plates may compress and close the porosity of the OER electrode in the clamped area, which may subsequently reduce contact resistances between the OER electrode and the current collector. In another embodiment, a metal or plastic spacer may be introduced between the metal current collector plates to limit the maximum allowable strain on the OER electrode.

Figure 89:
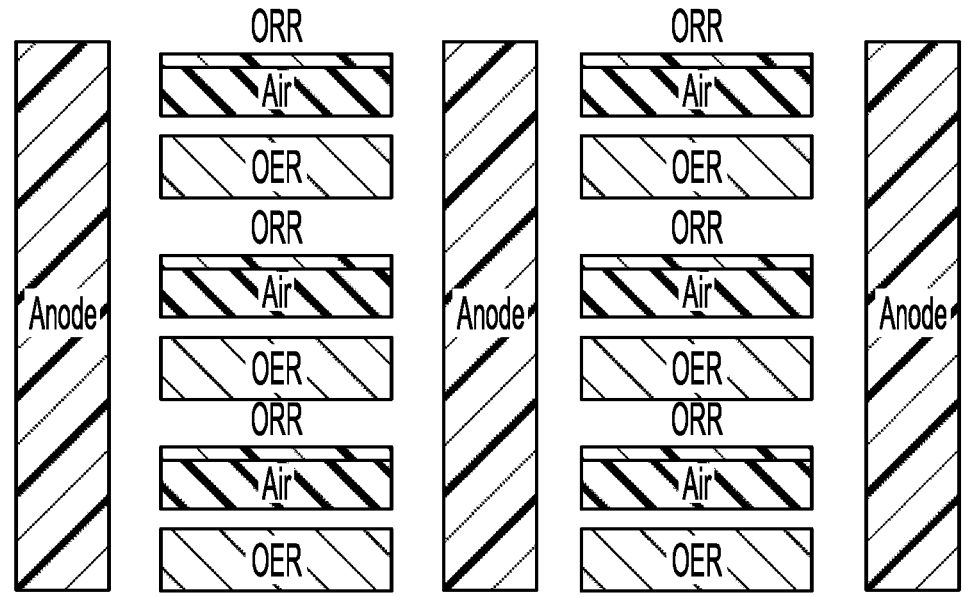
FIG. 89 illustrates aspects of an example unsealed horizontal submerged ORR electrode according to various embodiments.
Figure 89:
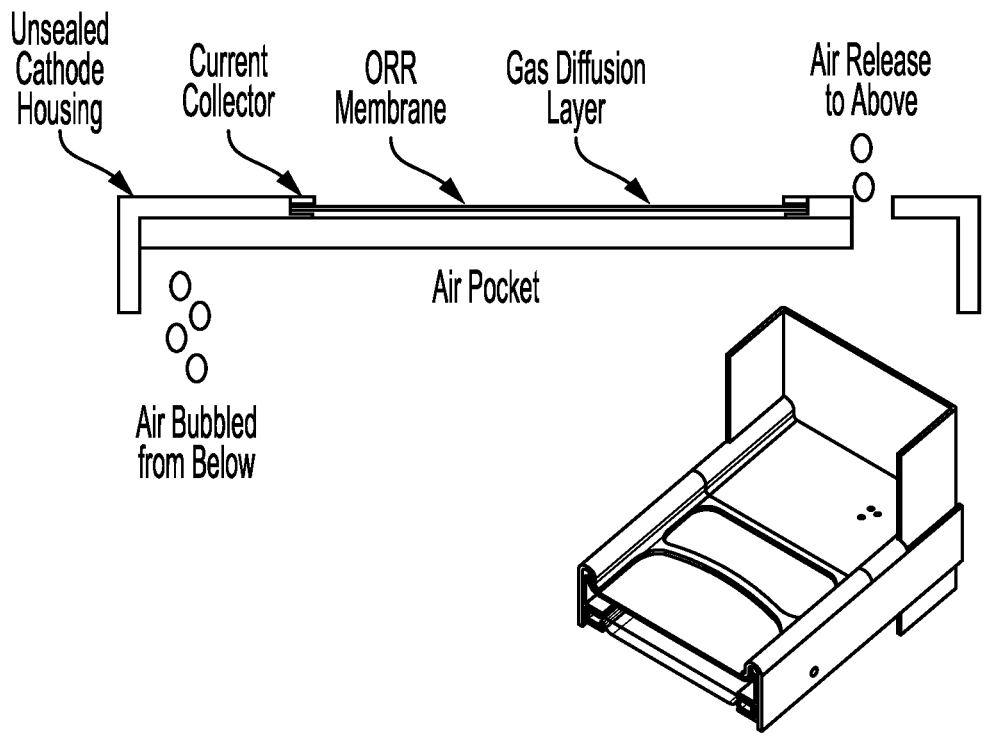
Figure 90:
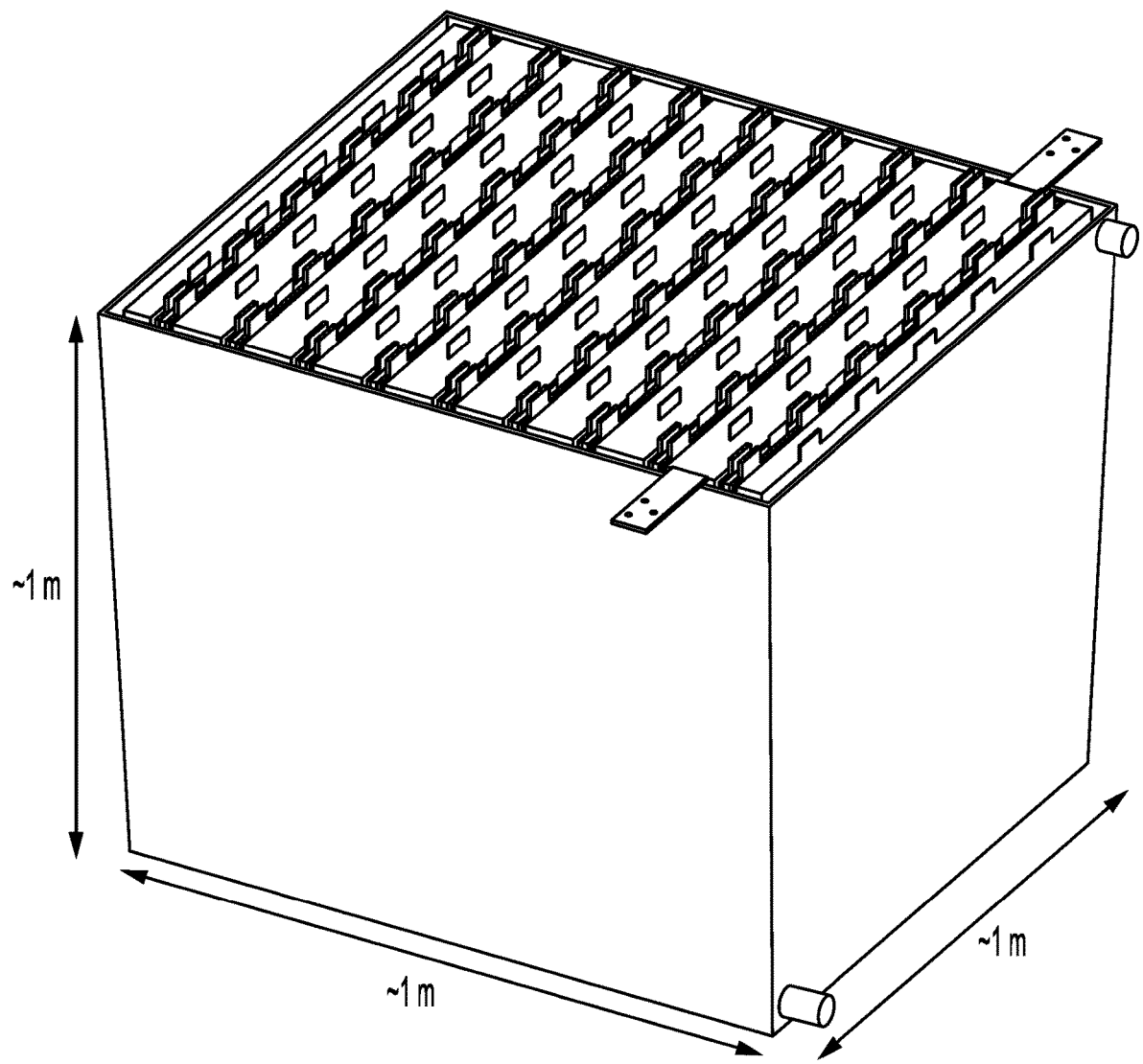
FIG. 90 illustrates an example vessel of repeating ORR electrode assemblies.

FIG. 89 illustrates aspects of an example unsealed horizontal submerged (UHS) ORR electrode according to various embodiments. As illustrated at the top of FIG. 89, the ORR and OER electrode pairs may be separated by air and arranged on top of one another with the columns or ORR and OER electrodes separated by anode structures. The bottom of FIG. 89 illustrates a cut-away view of the UHS ORR electrode. FIG. 90 illustrates an example vessel of repeating ORR electrode assemblies. The vessel of FIG. 90 may include either the SVS type electrode assemblies, such as those of FIG. 88, or the UHS electrode assemblies, such as those of FIG. 89. Both the SVS and UHS ORR electrode assemblies are amenable to repeating electrode assemblies (in parallel connection) in the same vessel types.

Figure 91A:
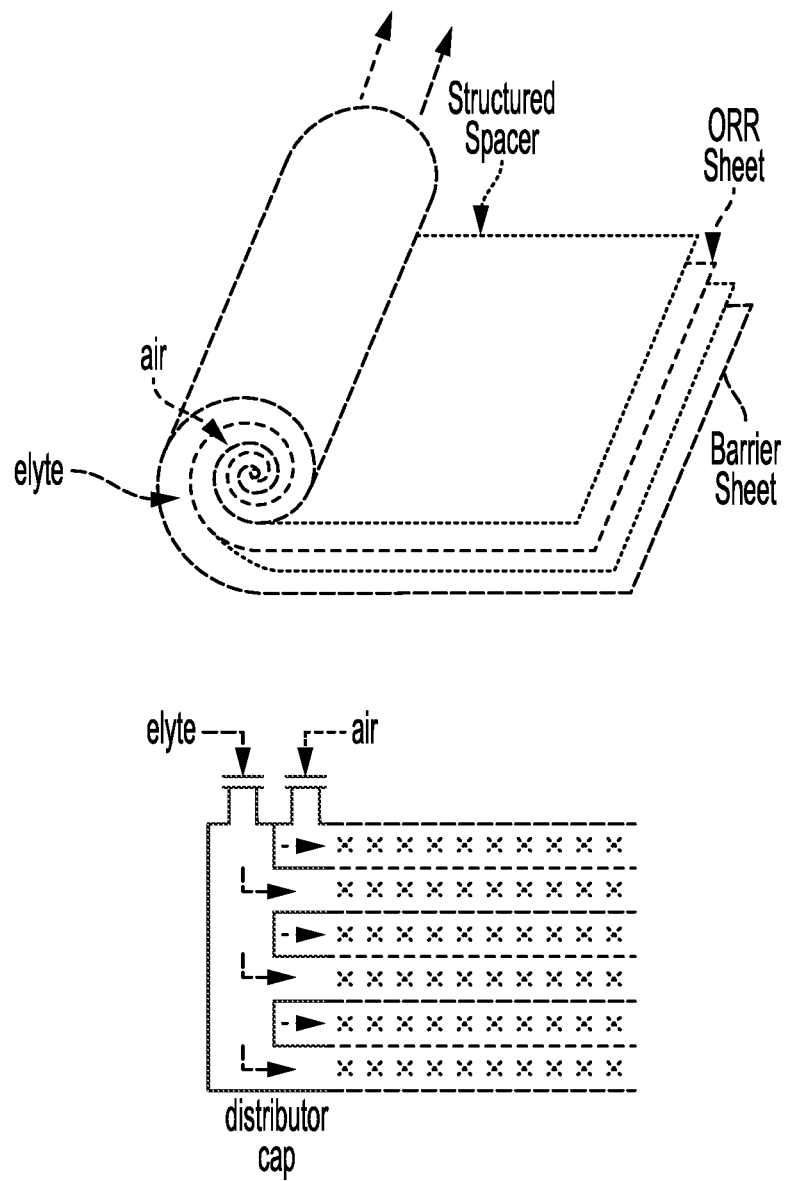
FIGS. 91A, 91B, and 91C illustrate an example of pressure gradient alleviation of a sealed ORR electrode according to various embodiments.
Figure 91B:
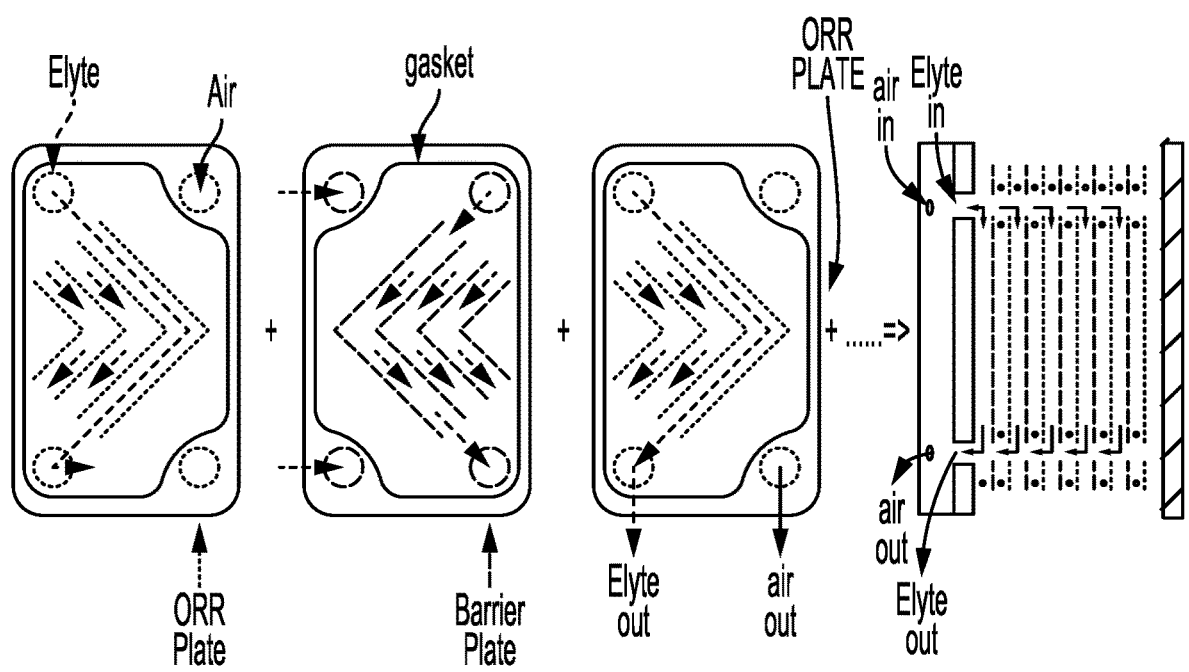
Figure 91C:
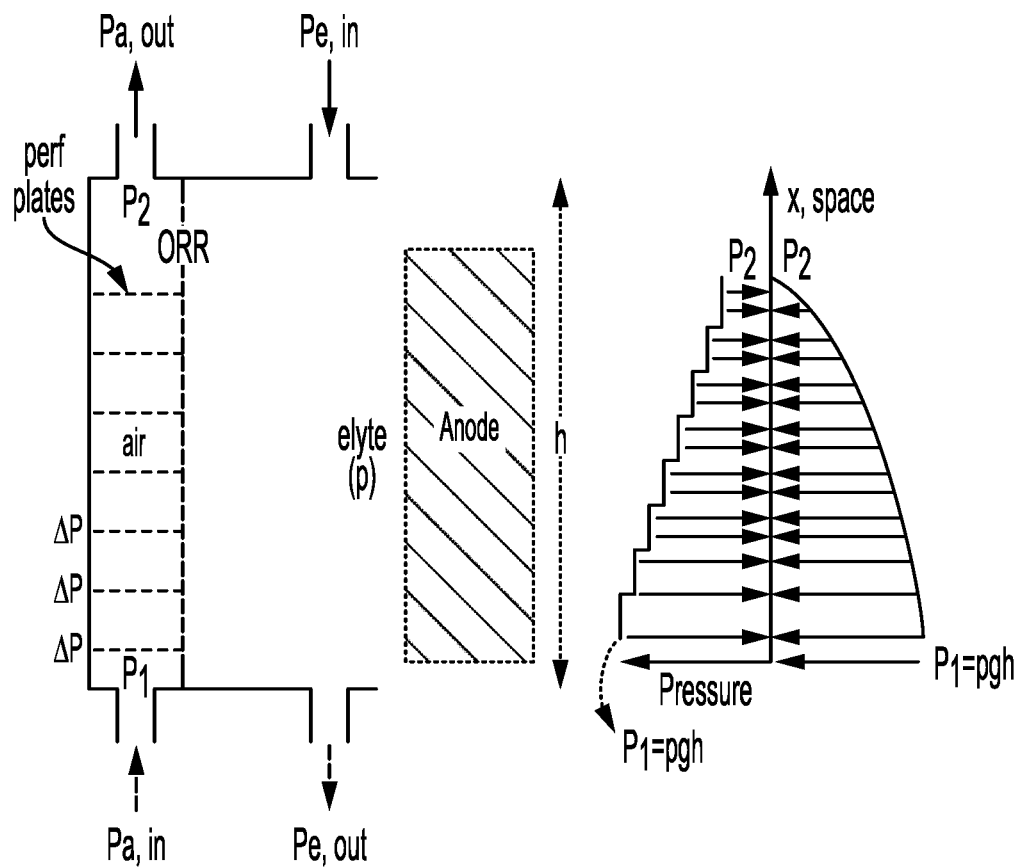

FIG. 91C illustrates an example of pressure gradient alleviation of a sealed ORR electrode according to various embodiments. Poorly distributed pressure may damage or cause premature aging of an ORR electrode due to physical or electrochemical aging mechanisms. To keep a stable and constant pressure gradient across the triple phase boundary of the ORR electrode an air distribution manifold, percolator, series of orifices, and/or perforated plate system can be used to change the air pressure at different depths. FIG. 91 illustrates such a perforated plate system and the pressure gradients over the height of the ORR electrode.

The ORR electrode may be designed as a component to be introduced to a metal-air battery assembly, such that its mechanical structure resembles a plate and frame heat exchanger, with alternating ORR plates and inactive barrier plates as illustrated in FIG. 91B. In such an embodiment, one fluid is electrolyte and the other fluid is air. In another embodiment, the ORR electrode assembly may be designed to resemble a spiral wound membrane filter cartridge, with alternating ORR layers and inactive barrier layers, where one fluid is electrolyte and the other fluid is air as illustrated in FIG. 91A. In another embodiment, the ORR electrode assembly may resemble a spiral-wound heat exchanger, with alternating ORR plates and inactive barrier plates, where one fluid is electrolyte and the other fluid is air.

Figure 92:
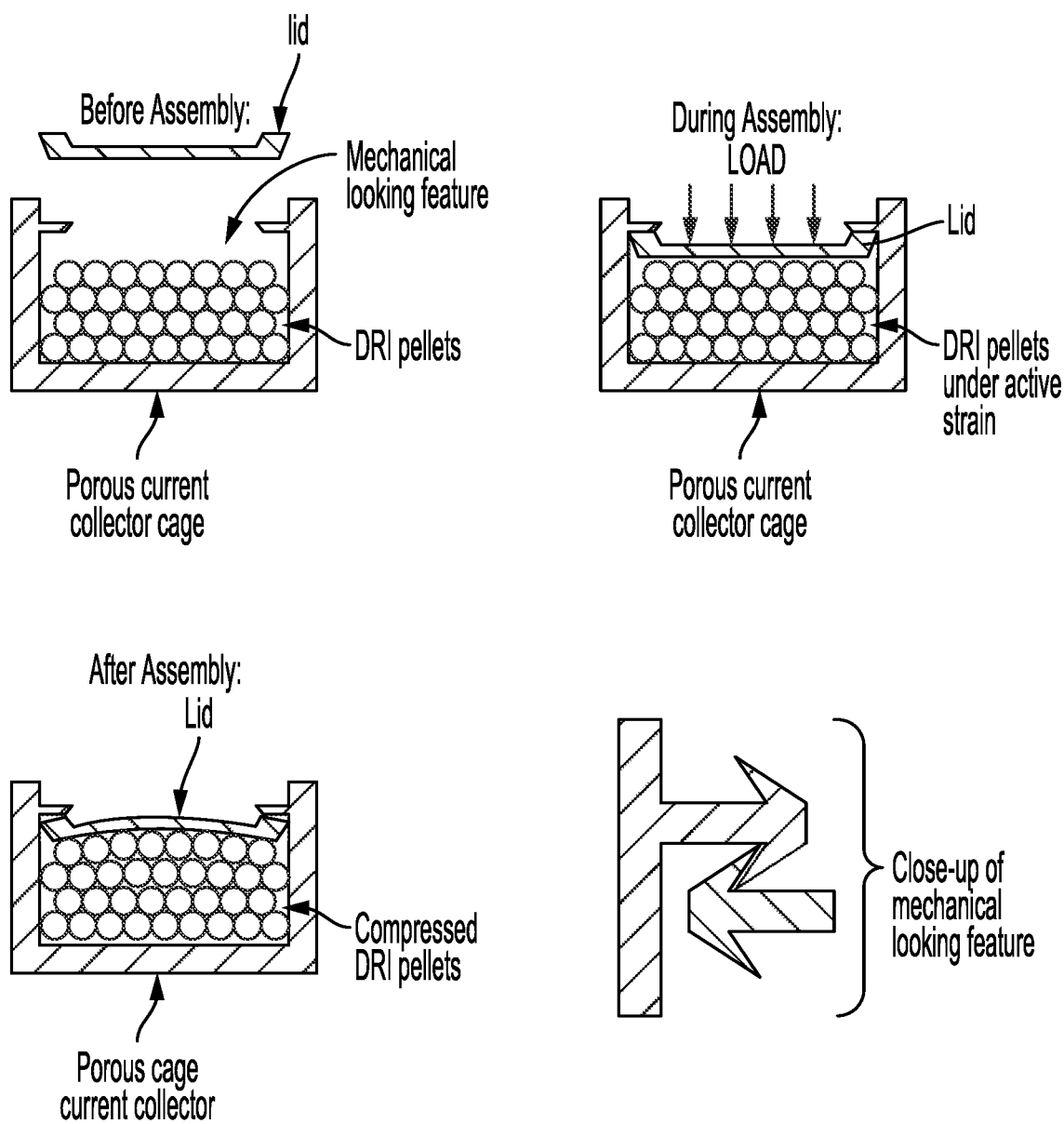
FIG. 92 illustrates a design and process for compressing large DRI pellet beds into an anode-current collector assembly using a passive mechanical locking feature.

Iron anodes comprised of DRI pellets for alkaline batteries, such as iron-air, iron-nickel, or iron-$MnO_2$ may require compressing the DRI pellets to improve inter-pellet electrical conductivity and accessible capacity. Mechanical methods of compression can typically add significant hardware and assembly cost to the assembly. Large assemblies of DRI pellets may be simultaneously compressed and retained under constant strain by the following approach outline in FIG. 92. A porous metal current collector cage is filled with DRI pellets. A current collector lid is compressed into the DRI pellet bed under a load sufficient to strain the DRI pellets to beyond a desired final value. The current collector lid and the cage mechanically mate together using a mechanical locking feature. After the load is released, the mechanical locking feature retains the lid and cage in a mated configuration. The release of the load allows some release of the elastic strain in the DRI pellets, which now are mechanically retained by the lid. The DRI pellets thereby remain under compressive load and strain, held in place by the mechanical locking mechanism.

Figure 93:
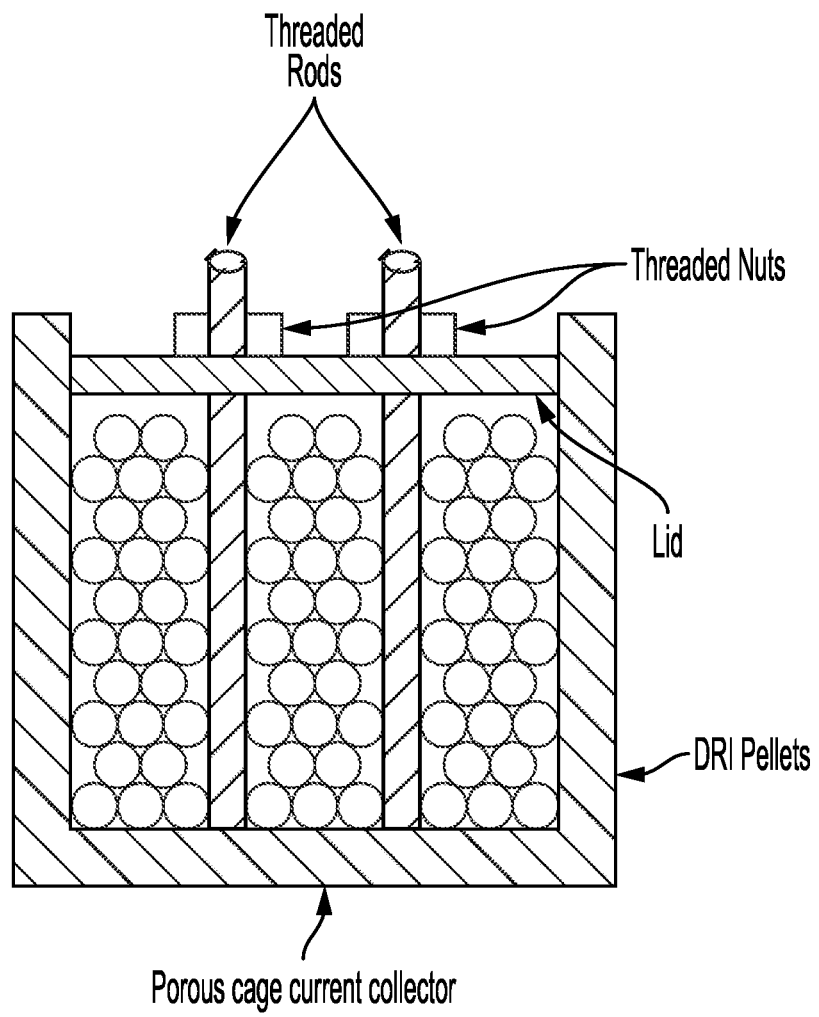
FIG. 93 illustrates a design and process for compressing large DRI pellet beds into an anode-current collector assembly using threaded rods and a threaded or locking nut.

Large assemblies of DRI pellets may be simultaneously compressed and retained under constant strain by an additional approach outline in FIG. 93. A porous metal current collector cage is filled with DRI pellets. Threaded rods are mechanically mated to the bottom of the current collector cage via a weld or mechanical fastener. A current collecting lid, containing a hole pattern that matches the threaded bolt pattern, is loaded on top of the DRI pellet bed, over the threaded rods. Threaded nuts are used to force the lid down and apply a compressive load to the DRI pellets. The threaded nuts may be locking nuts.

Various embodiments may provide devices and/or methods for use in bulk energy storage systems, such as long duration energy storage (LODES) systems, short duration energy storage (SDES) systems, etc. As an example, various embodiments may provide batteries (e.g., batteries 100, 400, 500, etc.) for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 94-102 illustrate various example systems in which one or more aspects of the various embodiments may be used as part of bulk energy storage systems, such as LODES systems, SDES systems, etc. For example, various embodiments described herein with reference to FIGS. 1A-93 may be used as batteries for bulk energy storage systems, such as LODES systems, SDES systems, etc. and/or various electrodes as described herein may be used as components for bulk energy storage systems. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 94:
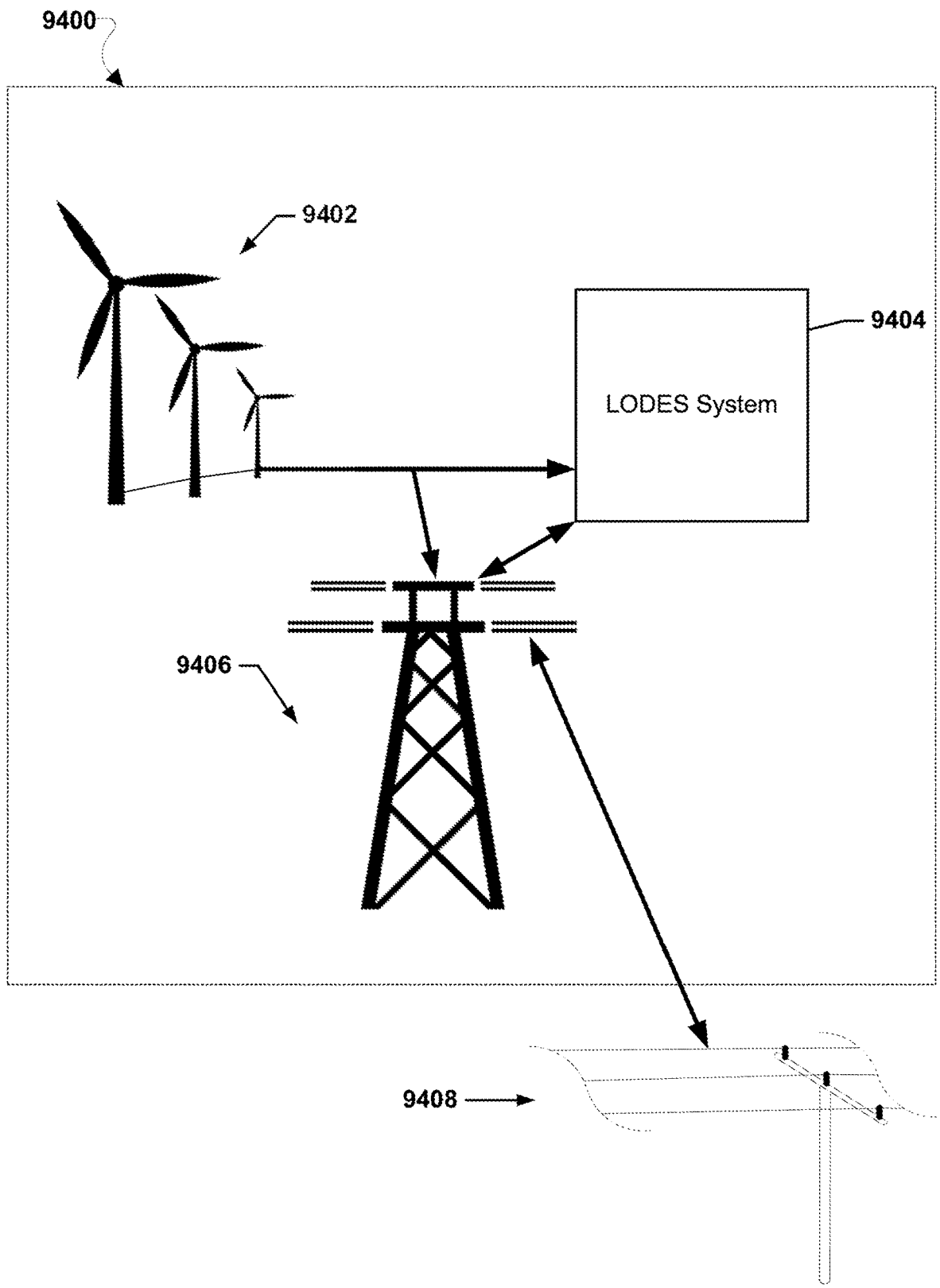
FIGS. 94-102 illustrate various example systems in which one or more aspects of the various embodiments may be used as part of bulk energy storage systems.

FIG. 94 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may be electrically connected to a wind farm 9402 and one or more transmission facilities 9406. The wind farm 9402 may be electrically connected to the transmission facilities 9406. The transmission facilities 9406 may be electrically connected to the grid 9408. The wind farm 9402 may generate power and the wind farm 9402 may output generated power to the LODES system 9404 and/or the transmission facilities 9406. The LODES system 9404 may store power received from the wind farm 9402 and/or the transmission facilities 9406. The LODES system 9404 may output stored power to the transmission facilities 9406. The transmission facilities 9406 may output power received from one or both of the wind farm 9402 and LODES system 9404 to the grid 9408 and/or may receive power from the grid 9408 and output that power to the LODES system 9404. Together the wind farm 9402, the LODES system 9404, and the transmission facilities 9406 may constitute a power plant 9400 that may be a combined power generation, transmission, and storage system. The power generated by the wind farm 9402 may be directly fed to the grid 9408 through the transmission facilities 9406, or may be first stored in the LODES system 9404. In certain cases the power supplied to the grid 9408 may come entirely from the wind farm 9402, entirely from the LODES system 9404, or from a combination of the wind farm 9402 and the LODES system 9404. The dispatch of power from the combined wind farm 9402 and LODES system 9404 power plant 9400 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 9400, the LODES system 9404 may be used to reshape and "firm" the power produced by the wind farm 9402. In one such example, the wind farm 9402 may have a peak generation output (capacity) of 260 megawatts (MW) and a capacity factor (CF) of 41%. The LODES system 9404 may have a power rating (capacity) of 106 MW, a rated duration (energy/power ratio) of 150 hours (h), and an energy rating of 15,900 megawatt hours (MWh). In another such example, the wind farm 9402 may have a peak generation output (capacity) of 300 MW and a capacity factor (CF) of 41%. The LODES system 9404 may have a power rating of 106 MW, a rated duration (energy/power ratio) of 200 h and an energy rating of 21,200 MWh. In another such example, the wind farm 9402 may have a peak generation output (capacity) of 176 MW and a capacity factor (CF) of 53%. The LODES system 9404 may have a power rating (capacity) of 88 MW, a rated duration (energy/power ratio) of 150 h and an energy rating of 13,200 MWh. In another such example, the wind farm 9402 may have a peak generation output (capacity) of 277 MW and a capacity factor (CF) of 41%. The LODES system 9404 may have a power rating (capacity) of 97 MW, a rated duration (energy/power ratio) of 50 h and an energy rating of 4,850 MWh. In another such example, the wind farm 9402 may have a peak generation output (capacity) of 315 MW and a capacity factor (CF) of 41%. The LODES system 9404 may have a power rating (capacity) of 110 MW, a rated duration (energy/power ratio) of 25 h and an energy rating of 2,750 MWh.

Figure 95:
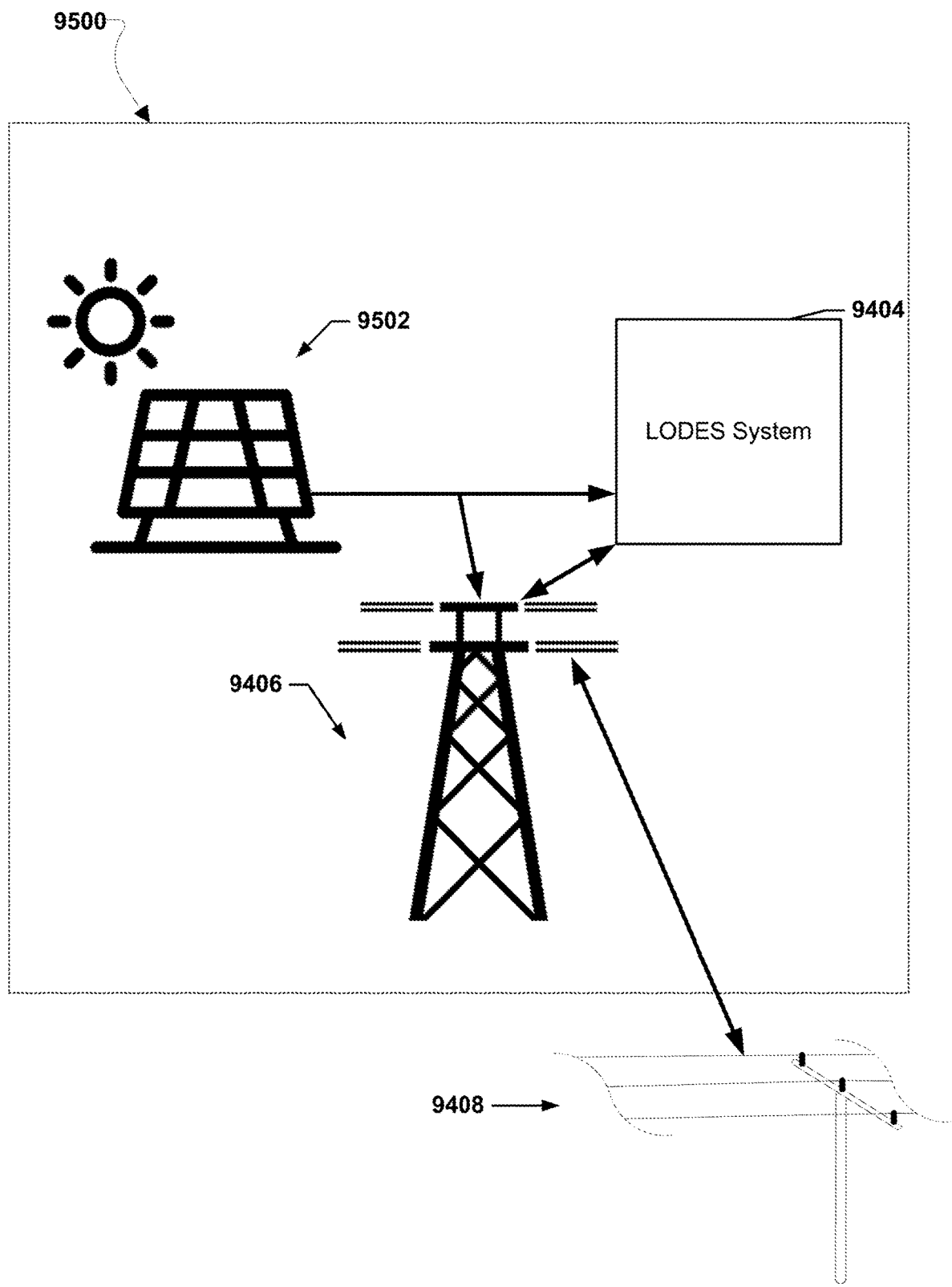

FIG. 95 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The system of FIG. 95 may be similar to the system of FIG. 94, except a photovoltaic (PV) farm 9502 may be substituted for the wind farm 9402. The LODES system 9404 may be electrically connected to the PV farm 9502 and one or more transmission facilities 9406. The PV farm 9502 may be electrically connected to the transmission facilities 9406. The transmission facilities 9406 may be electrically connected to the grid 9408. The PV farm 9502 may generate power and the PV farm 9502 may output generated power to the LODES system 9404 and/or the transmission facilities 9406. The LODES system 9404 may store power received from the PV farm 9502 and/or the transmission facilities 9406. The LODES system 9404 may output stored power to the transmission facilities 9406. The transmission facilities 9406 may output power received from one or both of the PV farm 9502 and LODES system 9404 to the grid 9408 and/or may receive power from the grid 9408 and output that power to the LODES system 9404. Together the PV farm 9502, the LODES system 9404, and the transmission facilities 9406 may constitute a power plant 9500 that may be a combined power generation, transmission, and storage system. The power generated by the PV farm 9502 may be directly fed to the grid 9408 through the transmission facilities 9406, or may be first stored in the LODES system 9404. In certain cases the power supplied to the grid 9408 may come entirely from the PV farm 9502, entirely from the LODES system 9404, or from a combination of the PV farm 9502 and the LODES system 9404. The dispatch of power from the combined PV farm 9502 and LODES system 9404 power plant 9500 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 9500, the LODES system 9404 may be used to reshape and "firm" the power produced by the PV farm 9502. In one such example, the PV farm 9502 may have a peak generation output (capacity) of 490 MW and a capacity factor (CF) of 24%. The LODES system 9404 may have a power rating (capacity) of 340 MW, a rated duration (energy/power ratio) of 150 h and an energy rating of 51,000 MWh. In another such example, the PV farm 9502 may have a peak generation output (capacity) of 680 MW and a capacity factor (CF) of 24%. The LODES system 9404 may have a power rating (capacity) of 410 MW, a rated duration (energy/power ratio) of 200 h, and an energy rating of 82,000 MWh. In another such example, the PV farm 9502 may have a peak generation output (capacity) of 330 MW and a capacity factor (CF) of 31%. The LODES system 9404 may have a power rating (capacity) of 215 MW, a rated duration (energy/power ratio) of 150 h, and an energy rating of 32,250 MWh. In another such example, the PV farm 9502 may have a peak generation output (capacity) of 510 MW and a capacity factor (CF) of 24%. The LODES system 9404 may have a power rating (capacity) of 380 MW, a rated duration (energy/power ratio) of 50 h, and an energy rating of 19,000 MWh. In another such example, the PV farm 9502 may have a peak generation output (capacity) of 630 MW and a capacity factor (CF) of 24%. The LODES system 9404 may have a power rating (capacity) of 380 MW, a rated duration (energy/power ratio) of 25 h, and an energy rating of 9,500 MWh.

Figure 96:
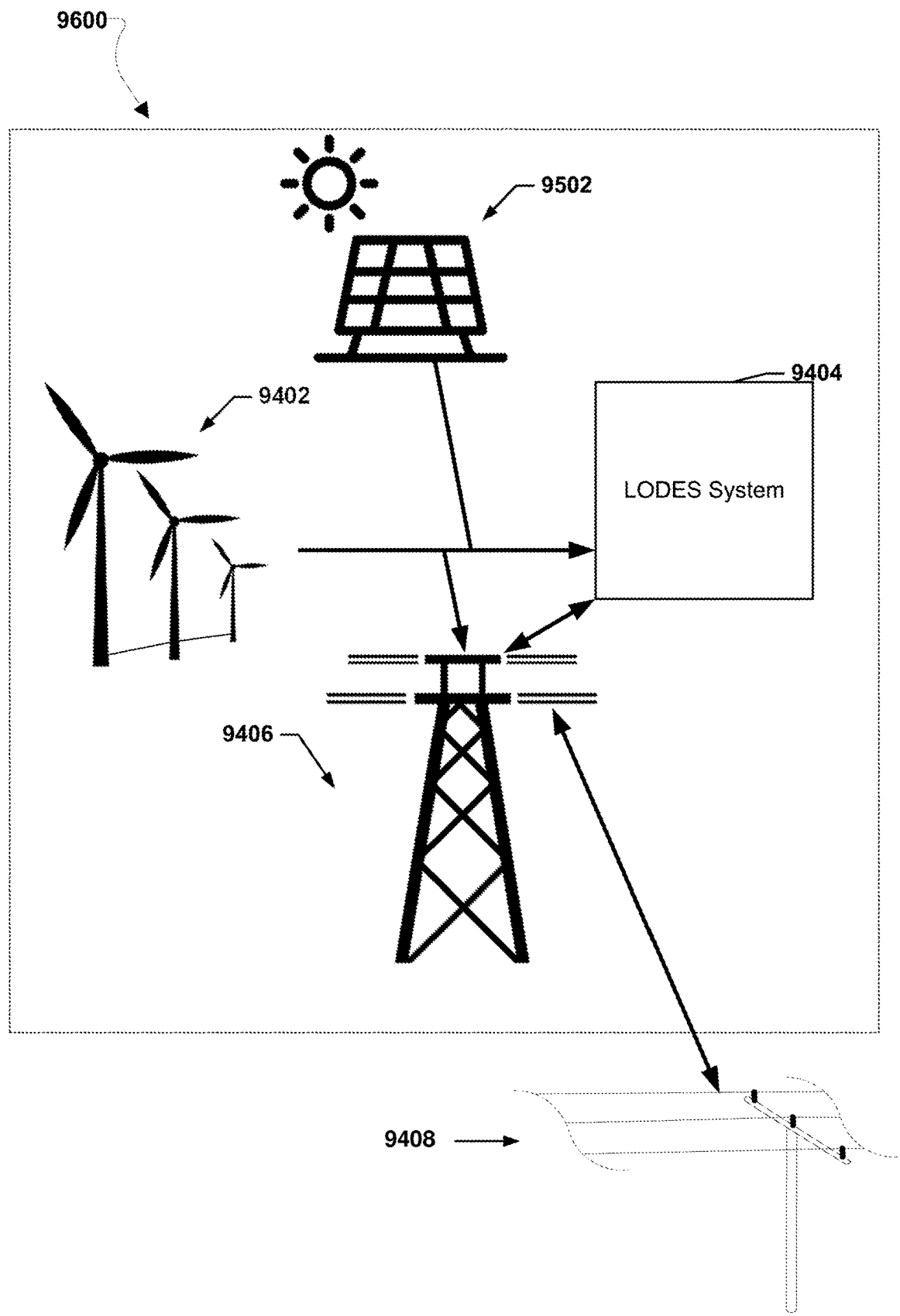

FIG. 96 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The system of FIG. 96 may be similar to the systems of FIGS. 94 and 95, except the wind farm 9402 and the photovoltaic (PV) farm 9502 may both be power generators working together in the power plant 9600. Together the PV farm 9502, wind farm 9402, the LODES system 9404, and the transmission facilities 9406 may constitute the power plant 9600 that may be a combined power generation, transmission, and storage system. The power generated by the PV farm 9502 and/or the wind farm 9402 may be directly fed to the grid 9408 through the transmission facilities 9406, or may be first stored in the LODES system 9404. In certain cases the power supplied to the grid 9408 may come entirely from the PV farm 9502, entirely from the wind farm 9402, entirely from the LODES system 9404, or from a combination of the PV farm 9502, the wind farm 9402, and the LODES system 9404. The dispatch of power from the combined wind farm 9402, PV farm 9502, and LODES system 9404 power plant 9600 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 9600, the LODES system 9404 may be used to reshape and "firm" the power produced by the wind farm 9402 and the PV farm 9502. In one such example, the wind farm 9402 may have a peak generation output (capacity) of 126 MW and a capacity factor (CF) of 41% and the PV farm 9502 may have a peak generation output (capacity) of 126 MW and a capacity factor (CF) of 24%. The LODES system 9404 may have a power rating (capacity) of 63 MW, a rated duration (energy/power ratio) of 150 h, and an energy rating of 9,450 MWh. In another such example, the wind farm 9402 may have a peak generation output (capacity) of 170 MW and a capacity factor (CF) of 41% and the PV farm 9502 may have a peak generation output (capacity) of 110 MW and a capacity factor (CF) of 24%. The LODES system 9404 may have a power rating (capacity) of 57 MW, a rated duration (energy/power ratio) of 200 h, and an energy rating of 11,400 MWh. In another such example, the wind farm 9402 may have a peak generation output (capacity) of 105 MW and a capacity factor (CF) of 51% and the PV farm 9502 may have a peak generation output (capacity) of 70 MW and a capacity factor (CF) of 31 The LODES system 9404 may have a power rating (capacity) of 61 MW, a rated duration (energy/power ratio) of 150 h, and an energy rating of 9,150 MWh. In another such example, the wind farm 9402 may have a peak generation output (capacity) of 135 MW and a capacity factor (CF) of 41% and the PV farm 9502 may have a peak generation output (capacity) of 90 MW and a capacity factor (CF) of 24%. The LODES system 9404 may have a power rating (capacity) of 68 MW, a rated duration (energy/power ratio) of 50 h, and an energy rating of 3,400 MWh. In another such example, the wind farm 9402 may have a peak generation output (capacity) of 144 MW and a capacity factor (CF) of 41% and the PV farm 9502 may have a peak generation output (capacity) of 96 MW and a capacity factor (CF) of 24%. The LODES system 9404 may have a power rating (capacity) of 72 MW, a rated duration (energy/power ratio) of 25 h, and an energy rating of 1,800 MWh.

Figure 97:
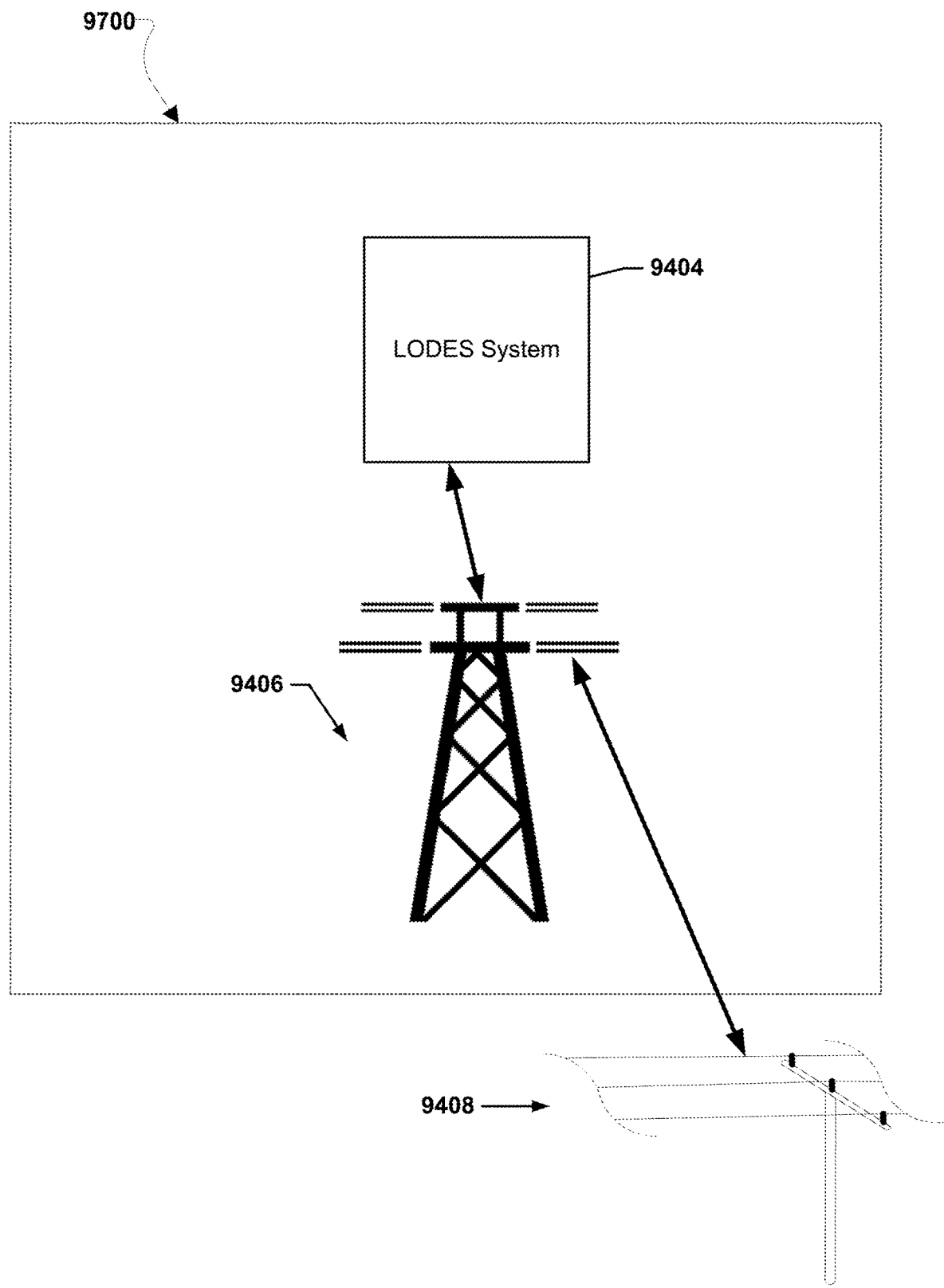

FIG. 97 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may be electrically connected to one or more transmission facilities 9406. In this manner, the LODES system 9404 may operate in a "stand-alone" manner to arbiter energy around market prices and/or to avoid transmission constraints. The LODES system 9404 may be electrically connected to one or more transmission facilities 9406. The transmission facilities 9406 may be electrically connected to the grid 9408. The LODES system 9404 may store power received from the transmission facilities 9406. The LODES system 9404 may output stored power to the transmission facilities 9406. The transmission facilities 9406 may output power received from the LODES system 9404 to the grid 9408 and/or may receive power from the grid 9408 and output that power to the LODES system 9404.

Together the LODES system 9404 and the transmission facilities 9406 may constitute a power plant 900. As an example, the power plant 900 may be situated downstream of a transmission constraint, close to electrical consumption. In such an example downstream situated power plant 9700, the LODES system 9404 may have a duration of 24 h to 500 h and may undergo one or more full discharges a year to support peak electrical consumptions at times when the transmission capacity is not sufficient to serve customers. Additionally in such an example downstream situated power plant 9700, the LODES system 9404 may undergo several shallow discharges (daily or at higher frequency) to arbiter the difference between nighttime and daytime electricity prices and reduce the overall cost of electrical service to customer. As a further example, the power plant 9700 may be situated upstream of a transmission constraint, close to electrical generation. In such an example upstream situated power plant 9700, the LODES system 9404 may have a duration of 24 h to 500 h and may undergo one or more full charges a year to absorb excess generation at times when the transmission capacity is not sufficient to distribute the electricity to customers. Additionally in such an example upstream situated power plant 9700, the LODES system 9404 may undergo several shallow charges and discharges (daily or at higher frequency) to arbiter the difference between nighttime and daytime electricity prices and maximize the value of the output of the generation facilities.

Figure 98:
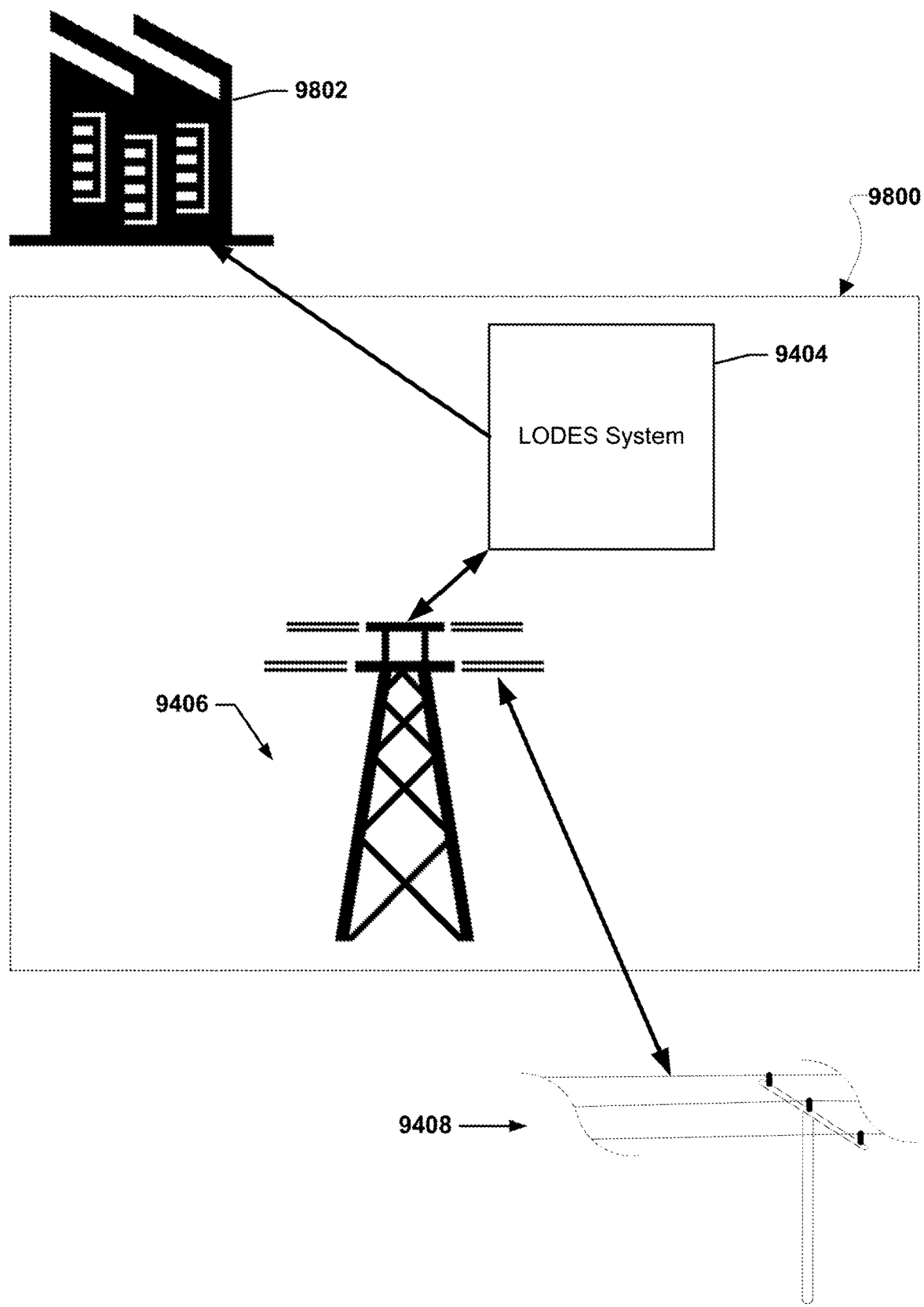

FIG. 98 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may be electrically connected to a commercial and industrial (C&I) customer 9802, such as a data center, factory, etc. The LODES system 9404 may be electrically connected to one or more transmission facilities 9406. The transmission facilities 9406 may be electrically connected to the grid 9408. The transmission facilities 9406 may receive power from the grid 9408 and output that power to the LODES system 9404. The LODES system 9404 may store power received from the transmission facilities 9406. The LODES system 9404 may output stored power to the C&I customer 9802. In this manner, the LODES system 9404 may operate to reshape electricity purchased from the grid 9408 to match the consumption pattern of the C&I customer 9802.

Together, the LODES system 9404 and transmission facilities 9406 may constitute a power plant 9800. As an example, the power plant 9800 may be situated close to electrical consumption, i.e., close to the C&I customer 9802, such as between the grid 9408 and the C&I customer 9802. In such an example, the LODES system 9404 may have a duration of 24 h to 500 h and may buy electricity from the markets and thereby charge the LODES system 9404 at times when the electricity is cheaper. The LODES system 9404 may then discharge to provide the C&I customer 9802 with electricity at times when the market price is expensive, therefore offsetting the market purchases of the C&I customer 9802. As an alternative configuration, rather than being situated between the grid 9408 and the C&I customer 9802, the power plant 9800 may be situated between a renewable source, such as a PV farm, wind farm, etc., and the transmission facilities 9406 may connect to the renewable source. In such an alternative example, the LODES system 9404 may have a duration of 24 h to 500 h, and the LODES system 9404 may charge at times when renewable output may be available. The LODES system 9404 may then discharge to provide the C&I customer 9802 with renewable generated electricity so as to cover a portion, or the entirety, of the C&I customer 9802 electricity needs.

Figure 99:
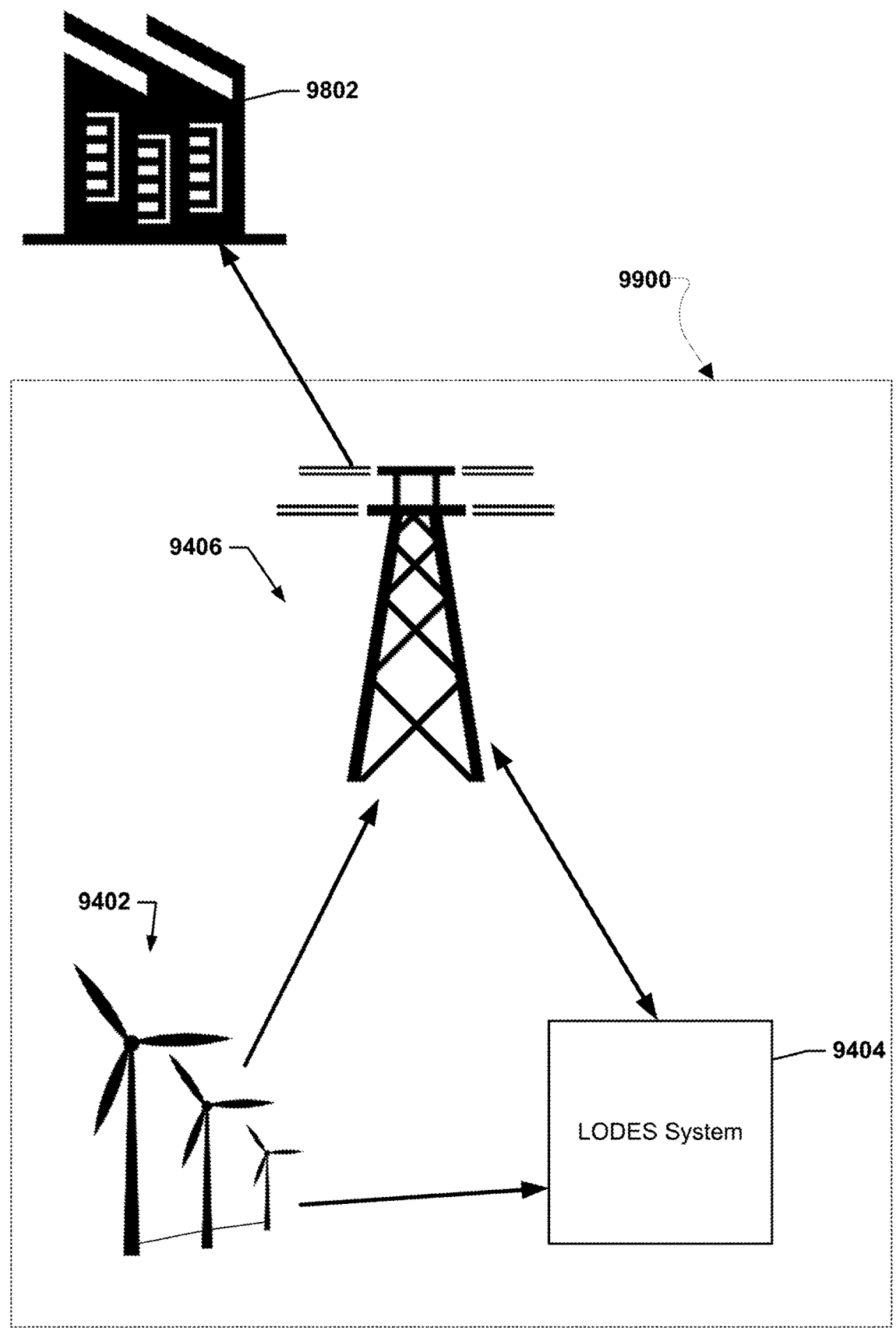
Figure 100:
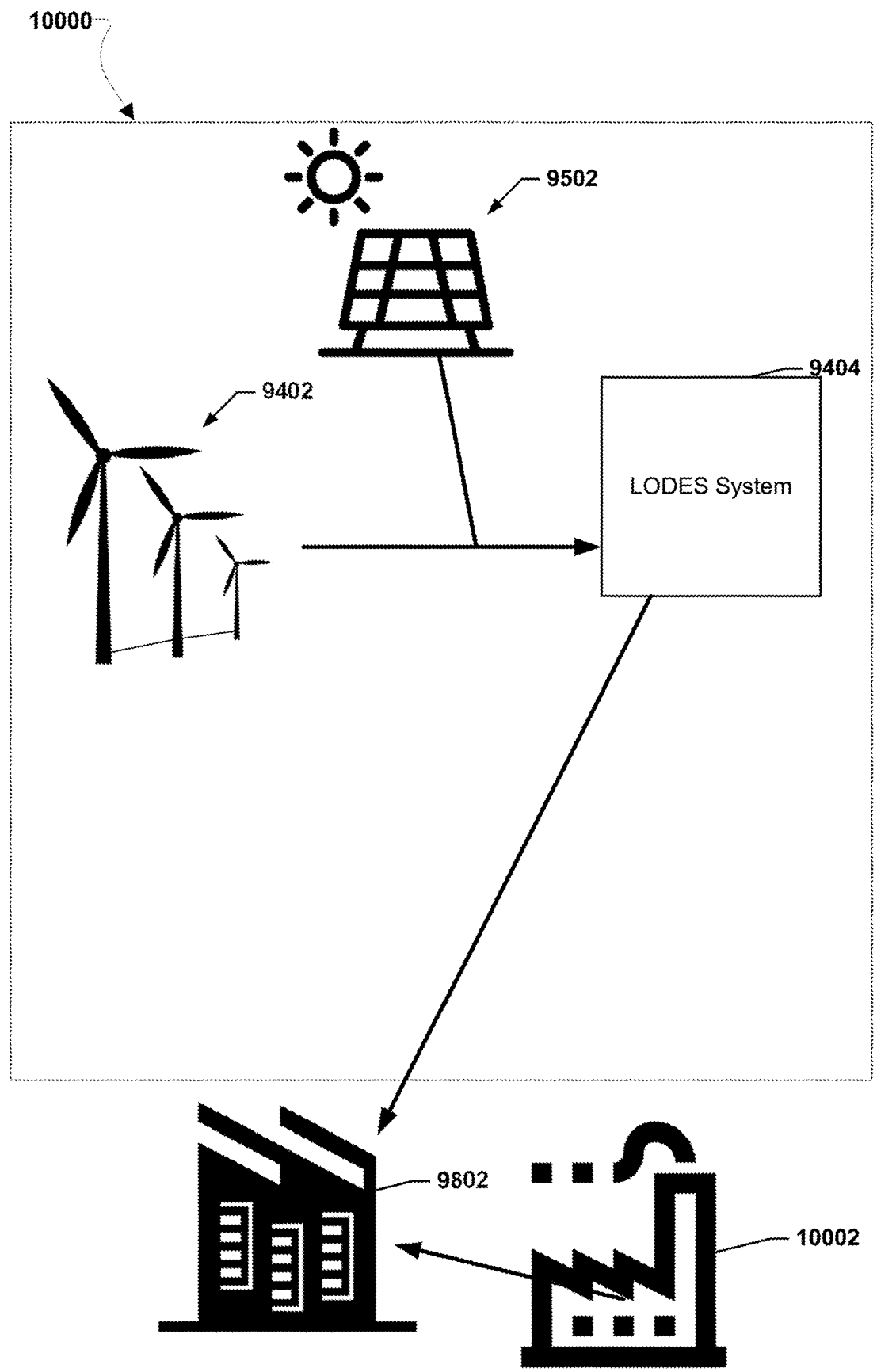

FIG. 99 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may be electrically connected to a wind farm 9402 and one or more transmission facilities 9406. The wind farm 9402 may be electrically connected to the transmission facilities 9406. The transmission facilities 9406 may be electrically connected to a C&I customer 9802. The wind farm 9402 may generate power and the wind farm 9402 may output generated power to the LODES system 9404 and/or the transmission facilities 9406. The LODES system 9404 may store power received from the wind farm 9402.

The LODES system 9404 may output stored power to the transmission facilities 9406. The transmission facilities 9406 may output power received from one or both of the wind farm 9402 and LODES system 9404 to the C&I customer 9802. Together the wind farm 9402, the LODES system 9404, and the transmission facilities 9406 may constitute a power plant 9900 that may be a combined power generation, transmission, and storage system. The power generated by the wind farm 9402 may be directly fed to the C&I customer 9802 through the transmission facilities 9406, or may be first stored in the LODES system 9404. In certain cases the power supplied to the C&I customer 9802 may come entirely from the wind farm 9402, entirely from the LODES system 9404, or from a combination of the wind farm 9402 and the LODES system 9404. The LODES system 9404 may be used to reshape the electricity generated by the wind farm 9402 to match the consumption pattern of the C&I customer 9802. In one such example, the LODES system 9404 may have a duration of 24 h to 500 h and may charge when renewable generation by the wind farm 9402 exceeds the C&I customer 9802 load. The LODES system 9404 may then discharge when renewable generation by the wind farm 9402 falls short of C&I customer 9802 load so as to provide the C&I customer 9802 with a firm renewable profile that offsets a fraction, or all of, the C&I customer 9802 electrical consumption.

FIG. 12 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may be part of a power plant 10000 that is used to integrate large amounts of renewable generation in microgrids and harmonize the output of renewable generation by, for example a PV farm 9502 and wind farm 9402, with existing thermal generation by, for example a thermal power plant 10002 (e.g., a gas plant, a coal plant, a diesel generator set, etc., or a combination of thermal generation methods), while renewable generation and thermal generation supply the C&I customer 9802 load at high availability. Microgrids, such as the microgrid constituted by the power plant 10000 and the thermal power plant 10002, may provide availability that is 90% or higher. The power generated by the PV farm 9502 and/or the wind farm 9402 may be directly fed to the C&I customer 9802, or may be first stored in the LODES system 9404.

In certain cases the power supplied to the C&I customer 9802 may come entirely from the PV farm 9502, entirely from the wind farm 9402, entirely from the LODES system 9404, entirely from the thermal power plant 10002, or from any combination of the PV farm 9502, the wind farm 9402, the LODES system 9404, and/or the thermal power plant 10002. As examples, the LODES system 9404 of the power plant 10000 may have a duration of 24 h to 500 h. As a specific example, the C&I customer 9802 load may have a peak of 100 MW, the LODES system 9404 may have a power rating of 14 MW and duration of 150 h, natural gas may cost $6/million British thermal units (MMBTU), and the renewable penetration may be 58%. As another specific example, the C&I customer 9802 load may have a peak of 100 MW, the LODES system 9404 may have a power rating of 25 MW and duration of 150 h, natural gas may cost $8/MMBTU, and the renewable penetration may be 65%.

Figure 101:
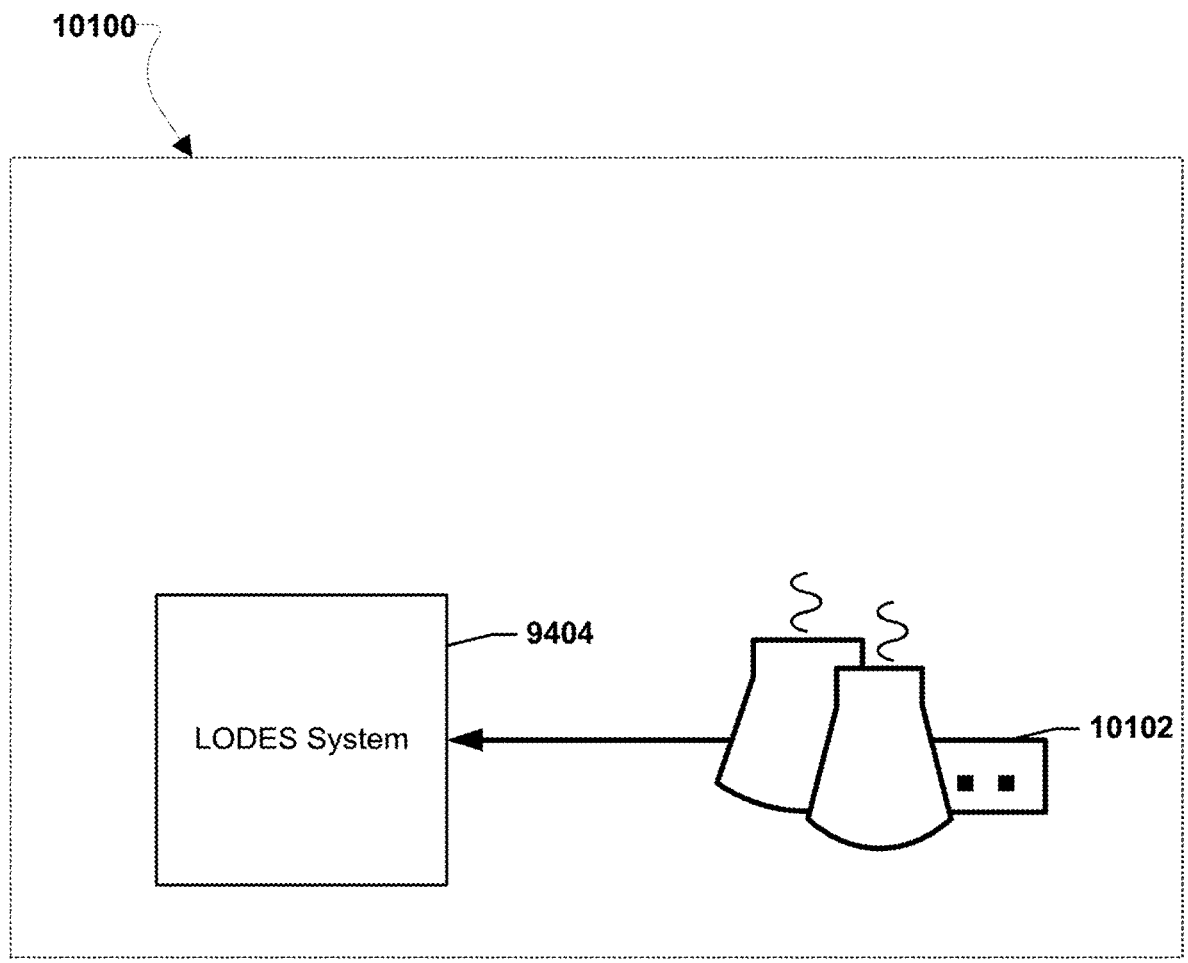

FIG. 101 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may be used to augment a nuclear plant 10102 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 10100 constituted by the combined LODES system 9404 and nuclear plant 10102. The nuclear plant 10102 may operate at high capacity factor and at the highest efficiency point, while the LODES system 9404 may charge and discharge to effectively reshape the output of the nuclear plant 10102 to match a customer electrical consumption and/or a market price of electricity.

As examples, the LODES system 9404 of the power plant 10100 may have a duration of 24 h to 500 h. In one specific example, the nuclear plant 10102 may have 1,000 MW of rated output and the nuclear plant 10102 may be forced into prolonged periods of minimum stable generation or even shutdowns because of depressed market pricing of electricity. The LODES system 9404 may avoid facility shutdowns and charge at times of depressed market pricing; and the LODES system 9404 may subsequently discharge and boost total output generation at times of inflated market pricing.

Figure 102:
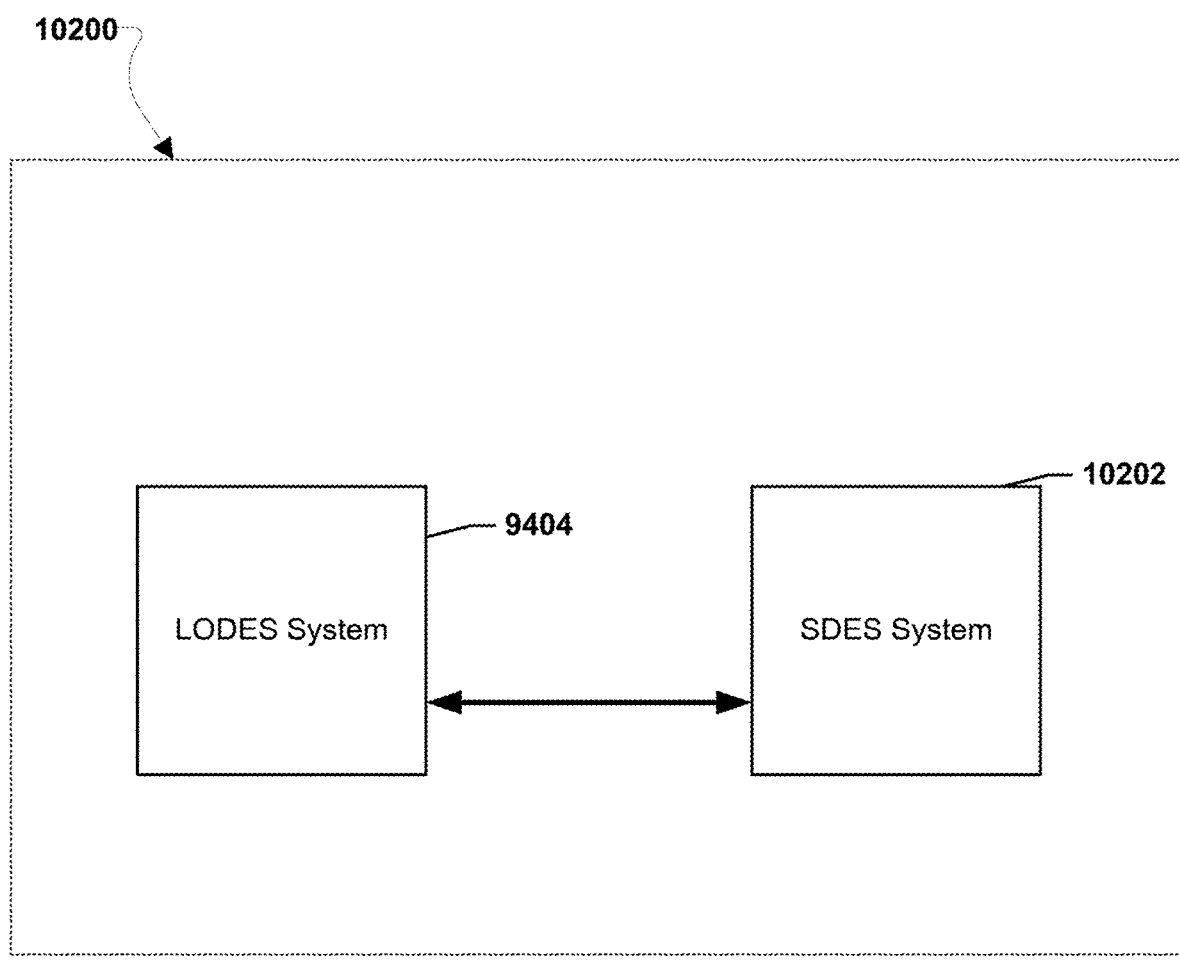

FIG. 102 illustrates an example system in which one or more aspects of the various embodiments may be used as part of bulk energy storage system. As a specific example, the bulk energy storage system incorporating one or more aspects of the various embodiments may be a LODES system 9404. As an example, the LODES system 9404 may include various embodiment batteries described herein, various electrodes described herein, etc. The LODES system 9404 may operate in tandem with a SDES system 10202. Together the LODES system 9404 and SDES system 10202 may constitute a power plant 10200. As an example, the LODES system 9404 and SDES system 10202 may be co-optimized whereby the LODES system 9404 may provide various services, including long-duration back-up and/or bridging through multi-day fluctuations (e.g., multi-day fluctuations in market pricing, renewable generation, electrical consumption, etc.), and the SDES system 10202 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 10202 may have durations of less than 10 hours and round-trip efficiencies of greater than 80%. The LODES system 9404 may have durations of 24 h to 500 h and round-trip efficiencies of greater than 40%. In one such example, the LODES system 9404 may have a duration of 150 hours and support customer electrical consumption for up to a week of renewable under-generation. The LODES system 9404 may also support customer electrical consumption during intra-day under-generation events, augmenting the capabilities of the SDES system 10202. Further, the SDES system 10202 may supply customers during intra-day under-generation events and provide power conditioning and quality services such as voltage control and frequency regulation.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A battery, comprising:
   an Oxygen Reduction Reaction (ORR) electrode;
   an Oxygen Evolution Reaction (OER) electrode;
   a metal electrode; and
   an electrolyte separating the ORR electrode and the OER electrode from the metal electrode, wherein
   the ORR electrode is submerged in the electrolyte,
   the ORR electrode comprises a series of discrete ORR electrode sections arranged vertically in a stack below a surface of the electrolyte, and
   each discrete ORR electrode section has a respective geometry varying based on depth of the given discrete ORR electrode section below the surface of the electrolyte, and pressure drop across each one of the series of discrete ORR electrode sections arranged vertically in the stack is the same in a depth direction below the surface of the electrolyte.

2. The battery of claim 1, wherein the ORR electrode and the OER electrode are separate electrodes.

3. The battery of claim 1, further comprising a stackable vessel supporting the ORR electrode, the OER electrode, the metal electrode, and the electrolyte.

4. The battery of claim 1, wherein the ORR electrode is wavy or rippled.

5. The battery of claim 1, wherein a housing of the battery operates as a current conductor for the metal electrode.

6. The battery of claim 2, wherein the ORR electrode and the OER electrode are submerged in the electrolyte.

7. The battery of claim 6, wherein the ORR electrode is supported in a frame that displaces electrolyte to create a gas volume at a depth below a surface of the electrolyte.

8. The battery of claim 6, wherein the ORR electrode comprises a box configuration filled with air.

9. The battery of claim 6, wherein the ORR electrode is supplied air.

10. The battery of claim 9, wherein the ORR electrode is curved.

11. The battery of claim 9, wherein the ORR electrode is supported in a frame that traps the supplied air in an air chamber bounded by a surface of the ORR electrode.

12. The battery of claim 9, wherein the ORR electrode is tube shaped.

13. The battery of claim 2, wherein position of the metal electrode is changeable relative to the ORR electrode and to the OER electrode.

14. The battery of claim 1, wherein the battery includes air flow regulation structures.

15. The battery of claim 14, wherein the air flow regulation structures include arrays of ramps configured with holes therein.

16. The battery of claim 1, wherein:
    the OER electrode and ORR electrode are electrically separable by the presence or the absence of airflow flexing the ORR electrode to displace the ORR electrode.

17. The battery of claim 1, wherein the ORR electrode further comprises a porous separator.

18. The battery of claim 1, wherein the metal electrode includes a bed of direct reduced iron pellets.

* * * * *